(12) United States Patent
Howard et al.

(10) Patent No.: US 12,410,883 B1
(45) Date of Patent: Sep. 9, 2025

(54) AIR HANDLER MOUNT

(71) Applicant: AmRad Manufacturing, LLC, Universal City, TX (US)

(72) Inventors: Jeffrey Steven Howard, Deltona, FL (US); Christopher Roger Baron, Palm Coast, FL (US)

(73) Assignee: AmRad Manufacturing, LLC, Universal City, TX (US)

( * ) Notice: Subject to any disclaimer, the term of this patent is extended or adjusted under 35 U.S.C. 154(b) by 0 days.

(21) Appl. No.: 18/827,551

(22) Filed: Sep. 6, 2024

Related U.S. Application Data

(60) Provisional application No. 63/691,921, filed on Sep. 6, 2024.

(51) Int. Cl.
| | | |
|---|---|---|
| *F16M 13/02* | (2006.01) | |
| *F16M 11/38* | (2006.01) | |
| *F24F 13/22* | (2006.01) | |

(52) U.S. Cl.
CPC ............ *F16M 13/02* (2013.01); *F16M 11/38* (2013.01); *F24F 13/222* (2013.01); *F24F 2013/227* (2013.01)

(58) Field of Classification Search
CPC .. F24F 13/222; F24F 2013/227; F16M 13/02; F16M 11/38; F16N 11/38
(Continued)

(56) References Cited

U.S. PATENT DOCUMENTS

| | | | |
|---|---|---|---|
| D653,064 S | 1/2012 | Lutt | |
| 8,371,458 B2 * | 2/2013 | Yu | A47F 5/0892 52/39 |

(Continued)

OTHER PUBLICATIONS

Hung-Rite [online], "Hung-Rite HVAC Equipment Hanger—HVAC horizontal installs in minutes," Dec. 4, 2012, retrieved on Dec. 3, 2024, retrieved from URL<https://www.youtube.com/watch?v=gjpiUe_wVv8>, 11 pages with machine transcript.
(Continued)

*Primary Examiner* — Alfred J Wujciak
(74) *Attorney, Agent, or Firm* — Fish & Richardson P.C.

(57) ABSTRACT

A mounting apparatus comprises a base frame assembly comprising a first fixed length support beam and a second fixed length support beam positioned parallel to one another, separated by a first distance, a first adjustable support beam and a second adjustable support beam positioned perpendicular to the first fixed length support beam, and a third adjustable support beam and a fourth adjustable support beam positioned perpendicular to the second fixed length support beam, wherein the first adjustable support beam and the fourth adjustable support beam are separated by a second distance to the second adjustable support beam and the third adjustable support beam, The first adjustable support beam comprises a first sliding extension assembly, the second adjustable support beam comprises a second sliding extension assembly, the third adjustable support beam comprises a third sliding extension assembly, and the fourth adjustable support beam comprises a fourth sliding extension assembly, wherein each of the first sliding extension the second sliding extension assembly, the third sliding extension assembly, and the fourth sliding extension assembly is extendable to a maximum extension length and to a minimum extension length. The base frame also comprises at least four leveling indicators, wherein a first leveling indicator of the at least four leveling indicators is attached to the first fixed length support beam, a second levelling indicator is attached to the second fixed length support beam, a third levelling indicator is attached to the first adjustable support beam, and a fourth levelling indicator is attached to the third adjustable support beam. The mounting apparatus also comprises a drain pan hanger assembly comprising a first drain pan hanger attached to the first fixed length support beam, a second drain pan hanger attached to the second fixed length support
(Continued)

beam, and a third drain pan hanger attached to the adjustable support beams, wherein each of the first drain pan hanger, the second drain pan hanger, the third drain pan hanger, and the fourth drain pan hanger is configured to support a sliding drain pan structure. The mounting apparatus also comprises an asymmetrical folding mechanism comprising a first folding assembly positioned along the first and the fourth adjustable support beams and a second folding assembly positioned along the second and the third adjustable support beams, wherein that the first folding assembly is located proximate to the second fixed length support beam, and the second folding assembly is located proximate to the first fixed length support beam.

6 Claims, 234 Drawing Sheets

(58) Field of Classification Search
USPC ...... 211/116, 117, 118, 119, 181.1; 108/149; 312/245, 247; 52/39, 36.4
See application file for complete search history.

(56) References Cited

U.S. PATENT DOCUMENTS

| 9,629,455 | B2 * | 4/2017 | Shah | A47B 47/0083 |
| 11,369,198 | B2 * | 6/2022 | Sytsma | A47B 96/021 |
| 2012/0181240 | A1 * | 7/2012 | Crowley | A47B 43/003 |
| | | | | 211/117 |

OTHER PUBLICATIONS

Hung-rite.com [online], "Get your HVAC equipment installed in just 15 minutes with the Hung-Rite HVAC Equipment Hangerz," available on or before Feb. 24, 2024, via Internet Archive: Wayback Machine URL<https://web.archive.org/web/20240224232035/https://www.hung-rite.com/>, retrieved on Dec. 3, 2024, retrieved from URL<https://www.hung-rite.com/>, 2 pages.

* cited by examiner

700

Right

1200

Back

1400

2100

2600

2800

Right

3300

3400

3900

4200

4600

Front

4700

4800

4900

5300

Front

5400

Back

5500

5600

6100

6200

Left

6300

Right

6900

Left

10300

Back

11100

11200

11800

11900

14500

14900

15000

15400

Front

15500

Back

15600

15700

16000

16200

16300

Left
SCALE 1:3

16400

16800

16900

17000

Left

17100

17300

17400

17500

17600

17700

17800

18100

18200

18300

18400

18500

18700

19100

19200

19300

19700

19800

19900

20000

20200

Bottom

20300

20400

Back

20500

20600

20700

21000

Front

Back

21200

21300

21500

21900

Left

22000

Right

22300

22500

22600

22700

22800

22900

23000

Folded      a

23200

AIR HANDLER MOUNT

CLAIM OF PRIORITY

This application claims priority under 35 USC § 119 (e) to U.S. patent application Ser. No. 63/691,921, filed on Sep. 6, 2024, the entire contents of which are hereby incorporated by reference.

BACKGROUND

Air conditioner systems are used to deliver cool air and adjust the temperature within an enclosed space. Such systems are placed in a variety of locations. For example, they are often placed in rooms or locations distanced from the air-conditioned space such as attics, outside a building, or on a building roof. Additionally, they can be placed in a basement, or installed in a window.

SUMMARY

The system described improves the storage, shipping, installation, and maintenance process of air handler systems. By providing an adjustable and foldable mounting frame, the air handler installation process is streamlined because the frame is easily storable and can further be configured to fit a variety of heating, ventilation, and air conditioning (HVAC) unit sizes. The system is also easily shipped, as the foldable design and attachable parts of the system allow for simple packaging and transport. In addition to the adjustable frame, the design might include numerous leveling indicators, which aids installers in easily leveling the equipment during installation. The mounting frame provides flexibility in the installation process, as it can be placed on the ground or suspended from an overhead structure. Furthermore, the frame design provides ample support for heavy HVAC units, thereby preventing bowing or deformation of the HVAC unit. Finally, the apparatus design covers limited space on the unit, as it leaves the sides, top, and most of the bottom of the unit unobstructed, which simplifies any future maintenance work required on the unit.

In one aspect, a mounting apparatus comprising a base frame assembly that comprises a first fixed length support beam and a second fixed length support beam located parallel to one another, separated by a first distance, a first adjustable support beam and a second adjustable support beam fixed perpendicular to the first fixed length support beam, a third adjustable support beam and a fourth adjustable support beam fixed perpendicular to the second fixed length support beam, wherein the first adjustable support beam and the fourth adjustable support beam are separated by a second distance to the second adjustable support beam and the third adjustable support beam. The first adjustable support beam comprises a sliding extension assembly, the second adjustable support beam comprises a sliding extension assembly, the third adjustable support beam comprises a sliding extension assembly, and the fourth adjustable support beam comprises a sliding extension assembly, wherein each sliding extension assembly is configured with a maximum and a minimum extension length. The base frame assembly comprises at least four leveling indicators, wherein a first leveling indicator of the at least four leveling indicators is fixed to the first fixed length support beam, a second levelling indicator is fixed to the second fixed length support beam, a third levelling indicator is fixed to the first adjustable support beam, and a fourth levelling indicator is fixed to the third adjustable support beam. The mount apparatus comprises a drain pan hanger assembly that comprises a first drain pan hanger fixed to the first fixed length support beam, a second drain pan hanger fixed to the second fixed length support beam, and a third drain pan hanger fixed to the adjustable support beams, each drain pan hanger configured to support a sliding drain pan structure. The mount apparatus comprises an asymmetrical folding mechanism comprising a first folding assembly positioned along the first and fourth adjustable support beams and a second folding assembly positioned along the second and third adjustable support beams, such that the first folding assembly is located at a length closer to the second fixed length support beam, and the second folding assembly is located at a length closer to the first fixed length support beam.

The foregoing and other embodiments can each optionally include one or more of the following features, alone or in combination. For example, one embodiment includes all the following features in combination.

In some implementations the apparatus further comprises one or more sensor hangers.

In some implementations, the one or more sensor hangers comprise a clip end to position a sensor above the drain pan.

In some implementations, the one or more sensor hangers comprise a hook end to position a sensor above the drain pan.

In some implementations, the first adjustable support beam of the apparatus is extendable to one or more selectable lengths.

In some implementations, the apparatus further comprises a drain pan, insertable into the first, second, and third drain pan hanger.

In another aspect, a mounting apparatus comprises a base frame assembly that comprises a first fixed length support beam and a second fixed length support beam, wherein the first fixed length support beam is positioned approximately parallel to the second fixed length support beam. The mounting apparatus also comprises a first adjustable support beam and a second adjustable support beam, where the first adjustable support beam and the second adjustable support beam are positioned approximately perpendicular to the first fixed length support beam, and a third adjustable support beam and a fourth adjustable support beam, where the third adjustable support beam and the fourth adjustable support beam are positioned approximately perpendicular to the second fixed length support beam. The first adjustable support beam comprises a first sliding extension assembly, the second adjustable support beam comprises a second sliding extension assembly, the third adjustable support beam comprises a third sliding extension assembly, and the fourth adjustable support beam comprises a fourth sliding extension assembly, wherein each of the first sliding extension the second sliding extension assembly, the third sliding extension assembly, and the fourth sliding extension assembly is extendable to a maximum extension length and to a minimum extension length. The mounting apparatus comprises an asymmetrical folding mechanism comprising a first folding assembly positioned along the first and the fourth adjustable support beams and a second folding assembly positioned along the second and the third adjustable support beams, wherein the first folding assembly is located at a first position along the first and the fourth adjustable support beams and the second folding assembly is located at a second position, different from the first position, along the second and third adjustable support beams, and wherein the first folding assembly and the second folding assembly are configured to position the mounting apparatus in a stowed or a deployed position.

In some implementations, the apparatus further comprises a first support hole and a second support hole spaced out on the first and second fixed length support beams.

In some implementations, the apparatus further comprises a cable to suspend the apparatus from the support holes.

In some implementations, the extension assemblies of the apparatus further comprise a channel configured to the adjustable support beams, enabling them to slide over the fixed length support beams to a selectable length.

In another aspect, a mounting apparatus comprises a base frame assembly comprising a frame in a stowed position, the frame comprising a first and a second fixed length support beams and a first, a second, a third, and a fourth adjustable support beams. The apparatus comprises an asymmetrical folding mechanism comprising a first folding assembly positioned along the first and fourth adjustable support beams and a second folding assembly positioned along the second and third adjustable support beams, wherein the first folding assembly is located at a length closer to the second fixed length support beam, and the second folding assembly is located at a length closer to the first fixed length support beam, such that the first folding assembly and the second folding assembly are configured to place the mounting apparatus in a stowed position or a deployed position.

In some implementations, the first adjustable support beam of the apparatus is longer than the fourth adjustable support beam of the apparatus, and the third adjustable support beam of the apparatus is longer than the second adjustable support beam of the apparatus.

In some implementations, the first folding assembly of the apparatus becomes level with the second folding assembly of the mounting apparatus when the system is folded.

In some implementations, the fixed length support beams of the apparatus pivot around the adjustable support beams of the mounting apparatus to fold the system into a compact position.

Other features and advantages will be apparent from the description and the claims.

DESCRIPTION OF DRAWINGS

FIG. 120 is a perspective view of an adjustable support beam.

FIG. 121 is a side view of the adjustable support beam of FIG. 120.

FIG. 122 is a perspective view of a fixed length support beam.

FIG. 123 is a left view of the fixed length support beam of FIG. 122.

FIG. 124 is a top view of the fixed length support beam of FIG. 122.

FIG. 125 is a perspective view of a hinge member, which may function as a folding mechanism.

FIG. 126 is a left view of the hinge member of FIG. 125.

FIG. 127 is a side view of the hinge member of FIG. 125.

FIG. 128 is a perspective view of a hinge tube, which may be configured with the hinge member to function as a folding member.

FIG. 129 is a cross-sectional view of the hinge tube of FIG. 128.

FIG. 130 is a top view of the hinge tube of FIG. 128.

FIG. 131 is a perspective view of a drain pan hanger, which may be fixed to the first and second fixed length support beams.

Figure 131:
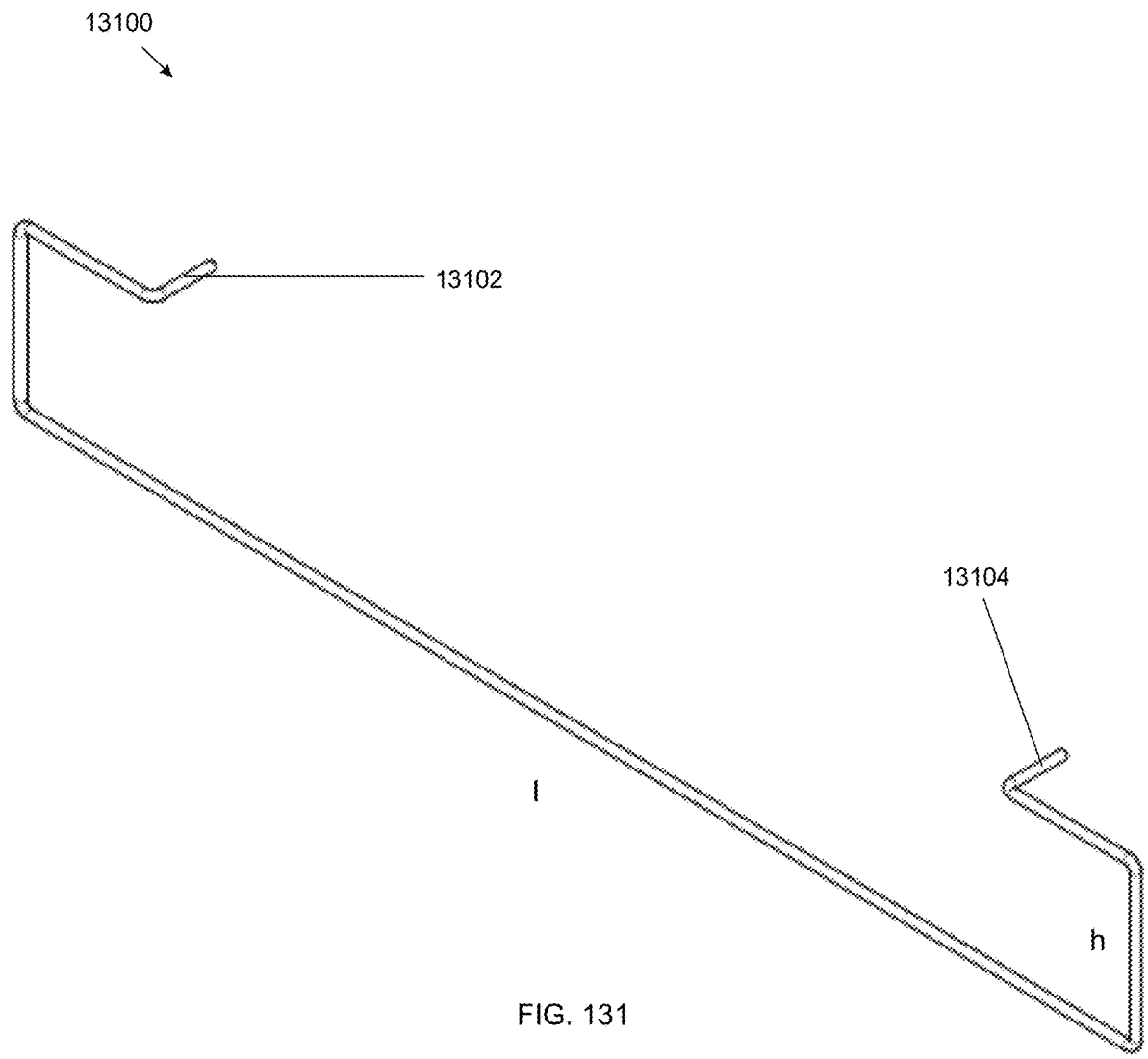
Figure 132:
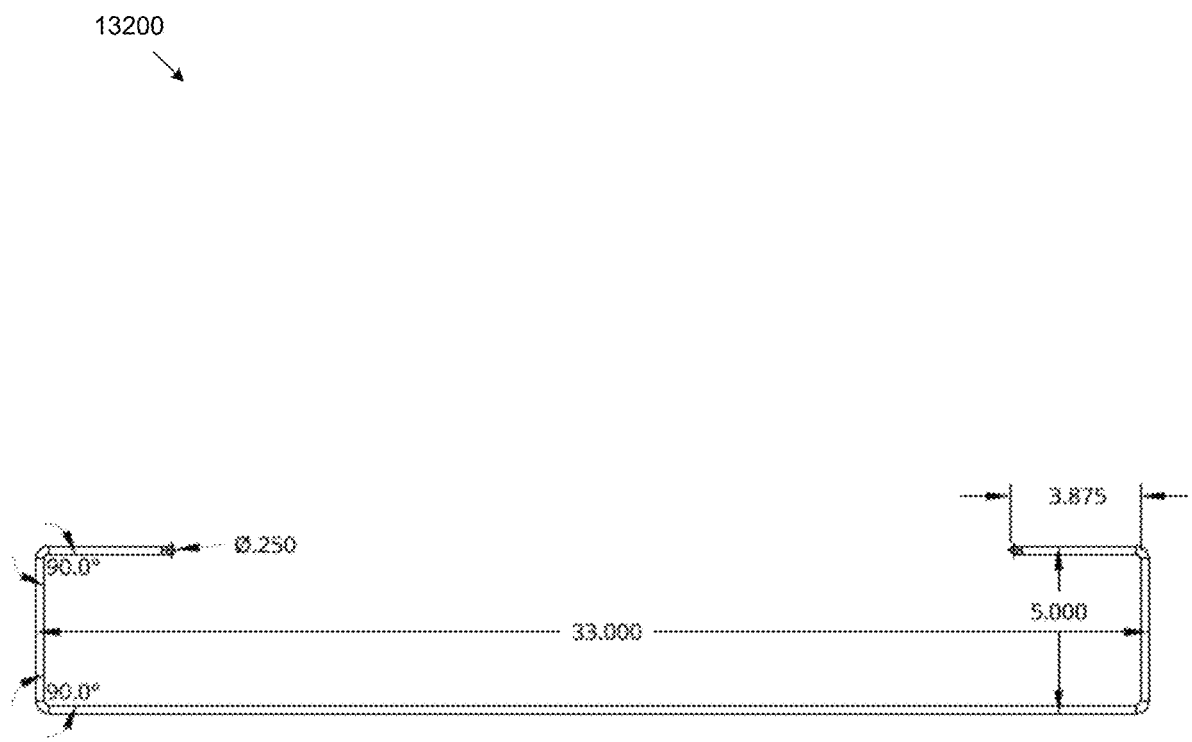

FIG. 132 is a side view of the drain pan hanger of FIG. 131.

Figure 133:
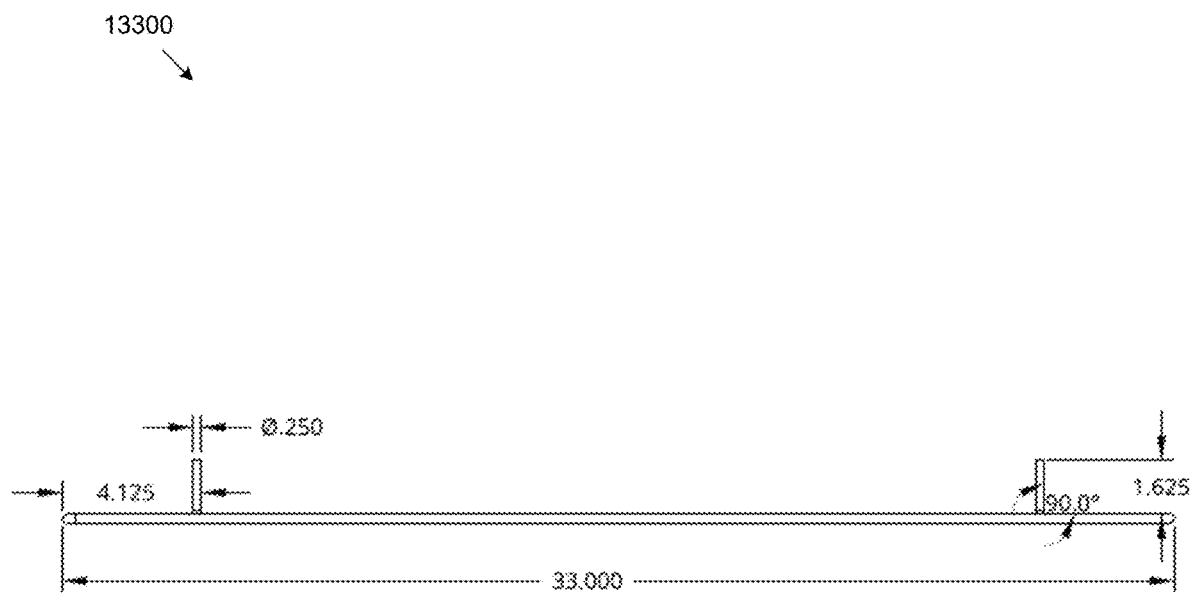

FIG. 133 is a top view of the drain pan hanger of FIG. 131.

Figure 134:
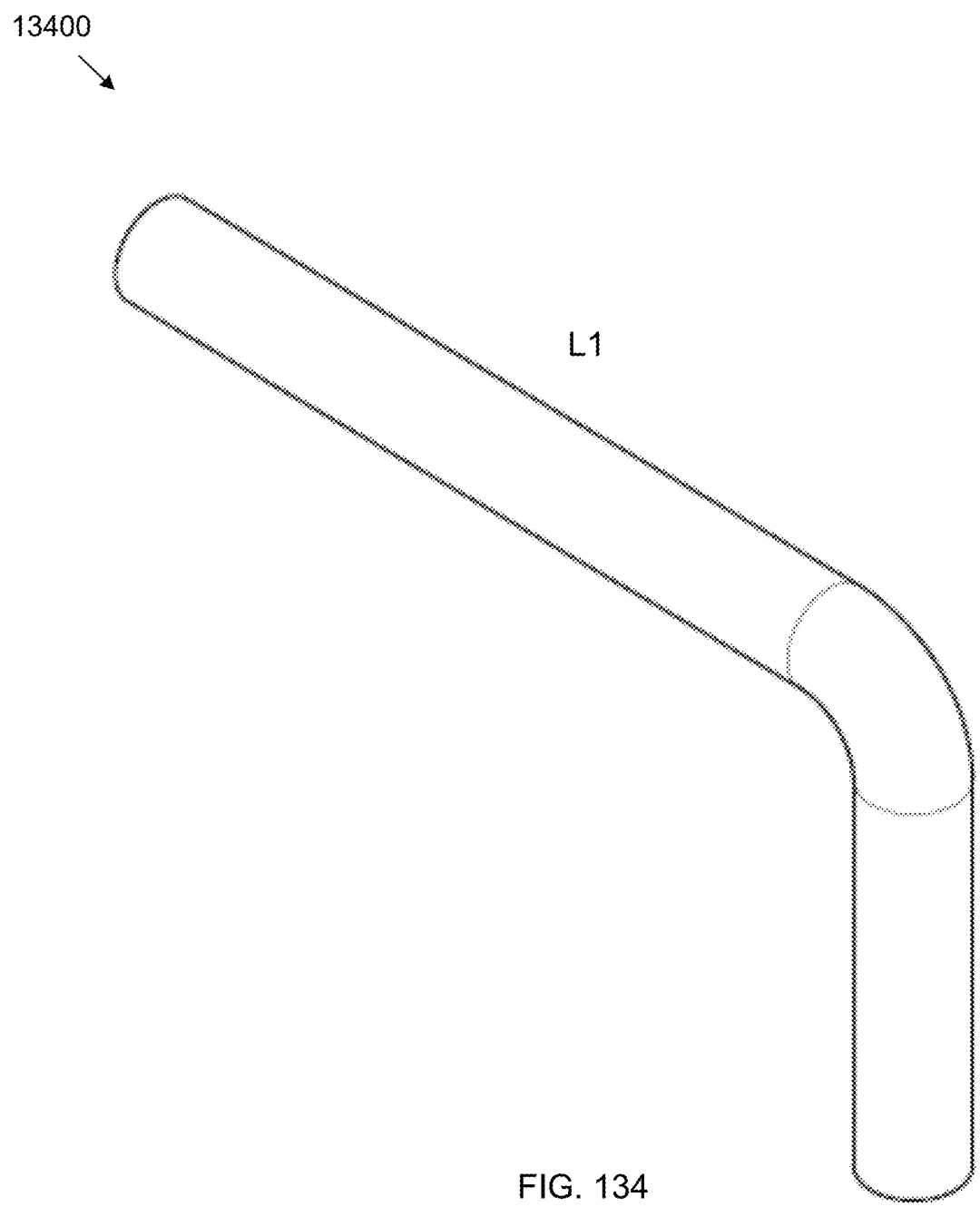

FIG. 134 is a perspective view of a hinge pin, which may be fixed between the first and second fixed length support beams and the adjustable support beams to fix the length of the system.

Figure 135:
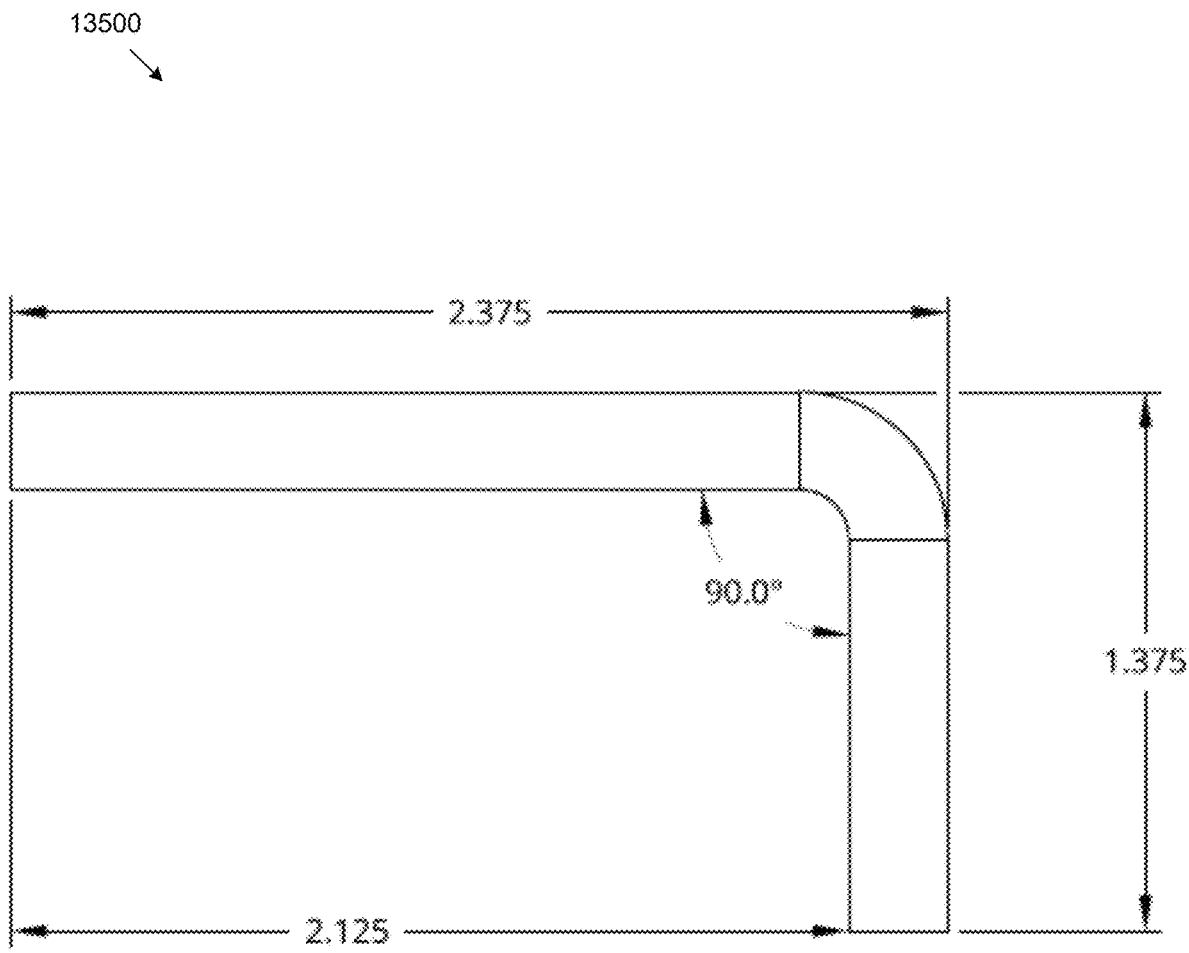

FIG. 135 is a side view of the hinge pin of FIG. 134.

Figure 136:
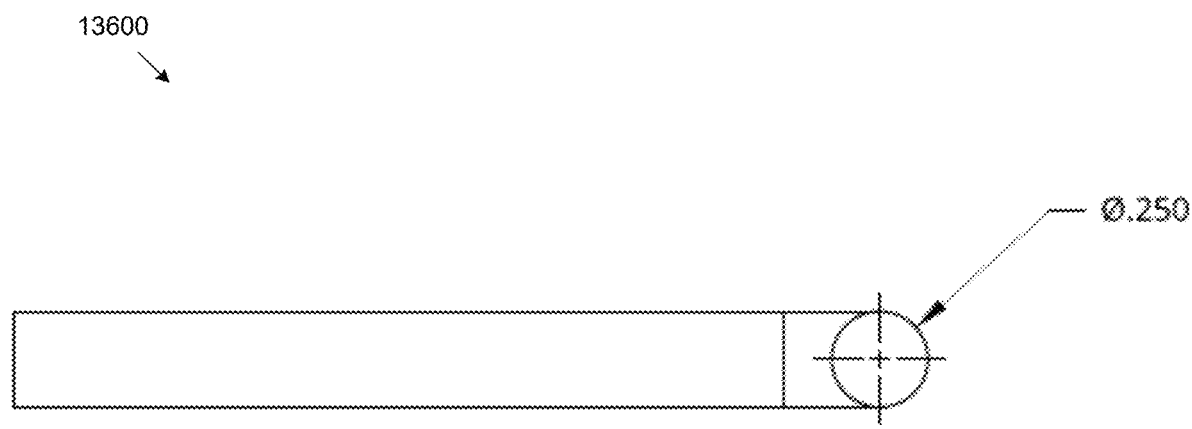

FIG. 136 is a bottom view of the hinge pin of FIG. 134.

Figure 137:
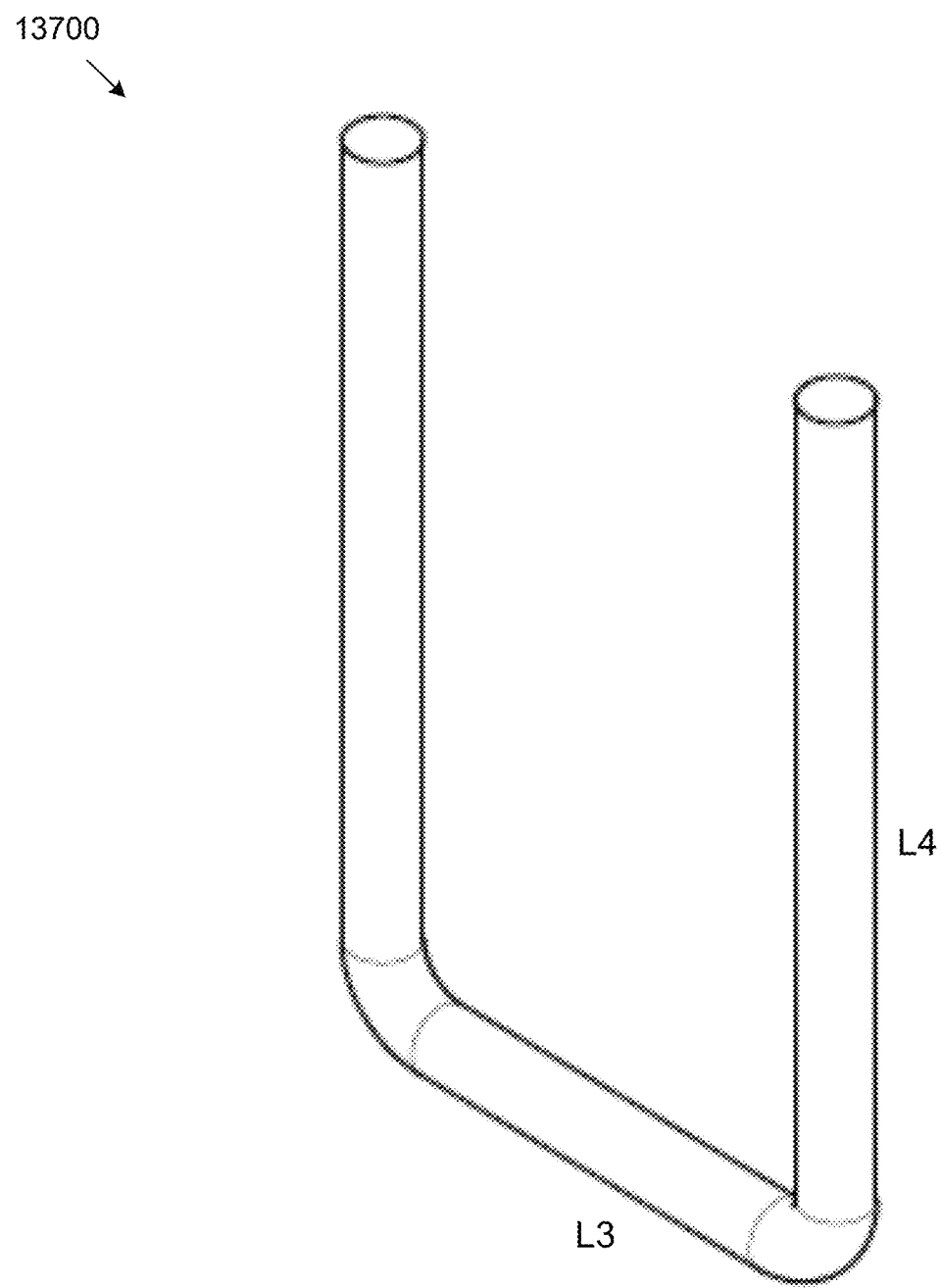

FIG. 137 is a perspective view of a slide lock pin, which may be fixed between the first and second fixed length support beams and the adjustable support beams to fix the length of the system.

Figure 138:
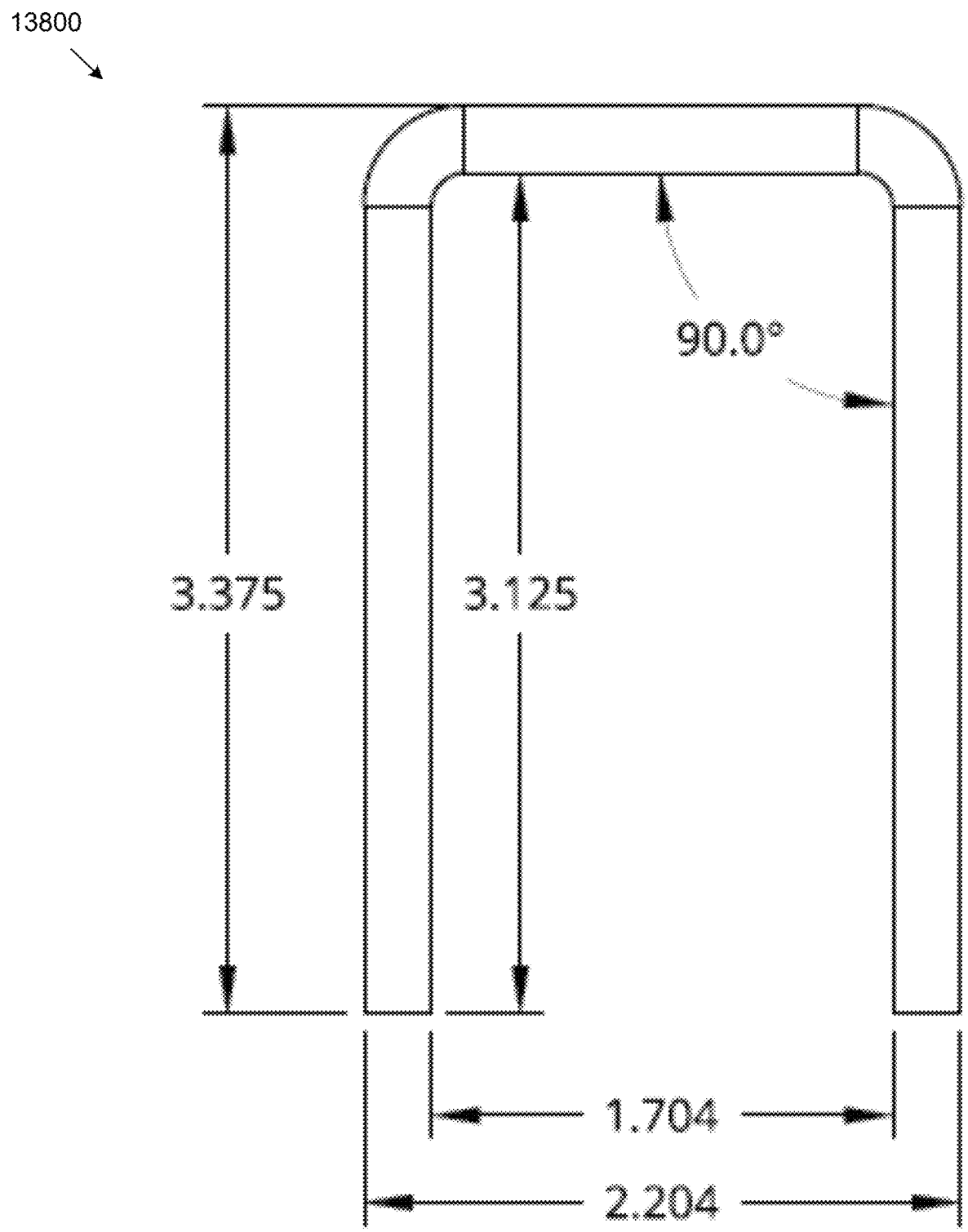

FIG. 138 is a side view of the slide lock pin of FIG. 137.

Figure 139:
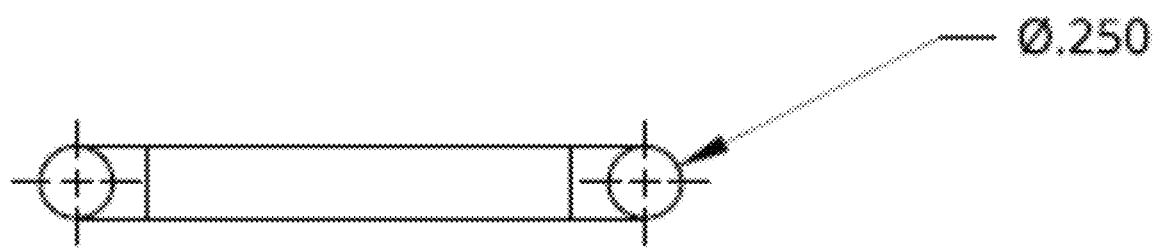

FIG. 139 is a bottom view of the slide lock pin of FIG. 137.

Figure 140:
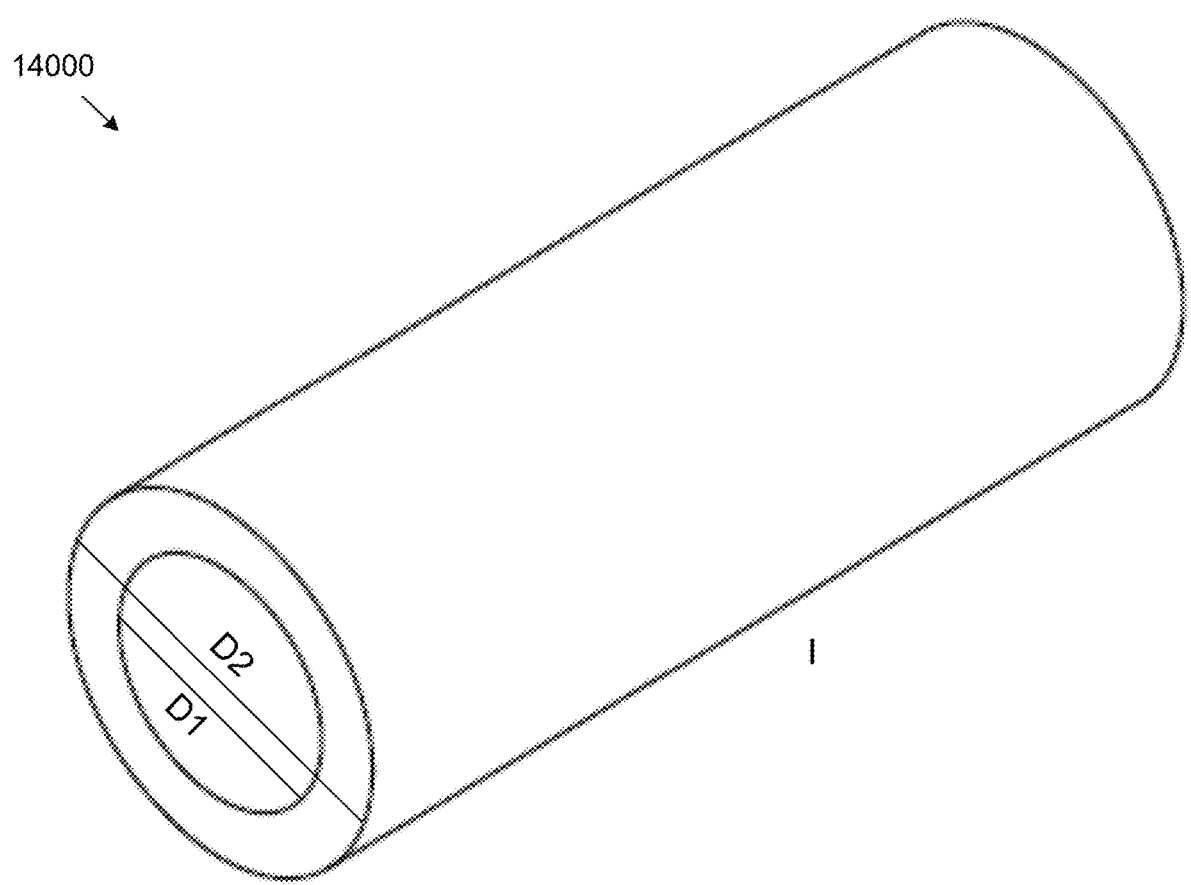

FIG. 140 is a perspective view of a slide lock tube, which may be configured within the frame to guide the slide lock and fix the length of the system.

Figure 141:
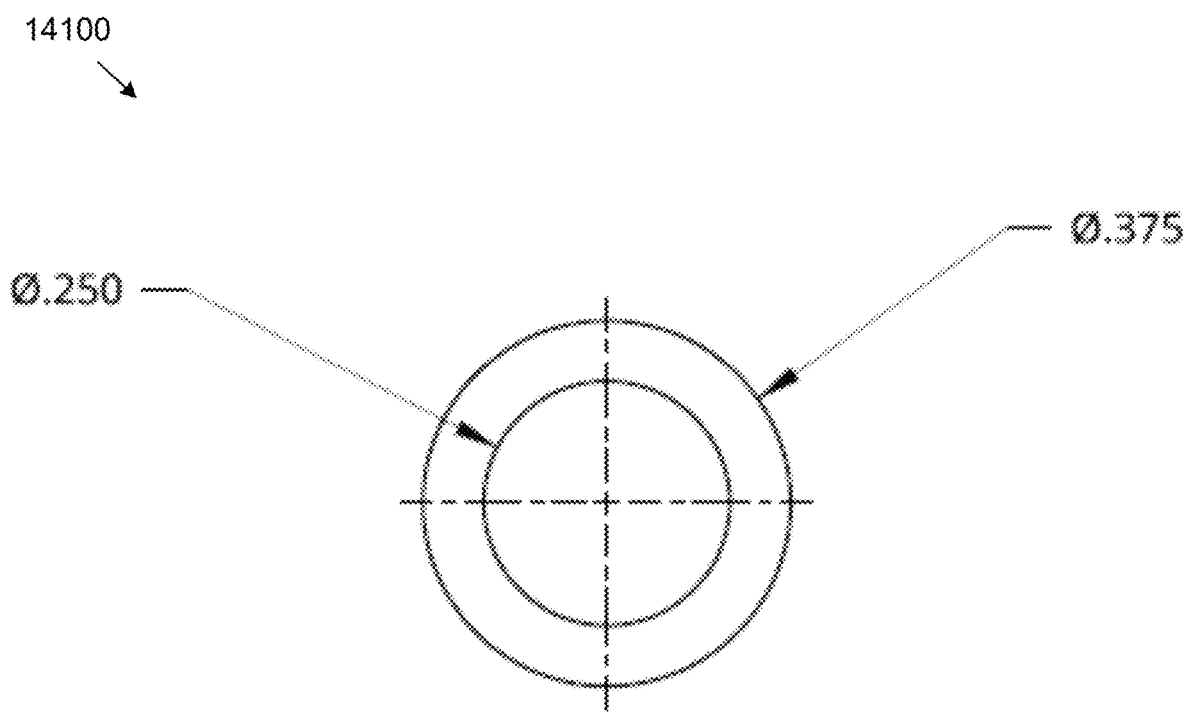

FIG. 141 is a cross-sectional view of the slide lock tube of FIG. 140.

Figure 142:
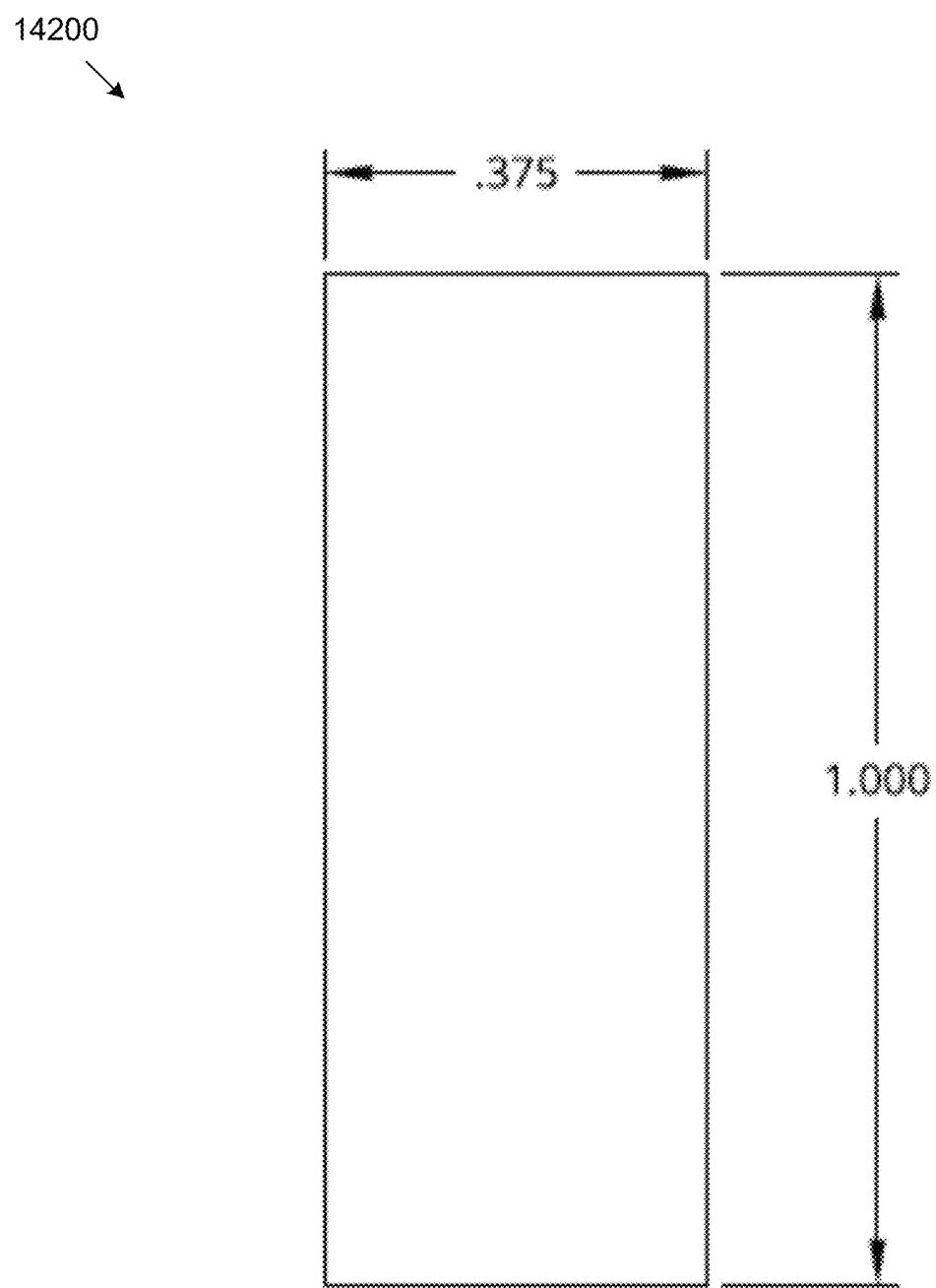

FIG. 142 is a top view of the slide lock tube of FIG. 140.

Figure 143:
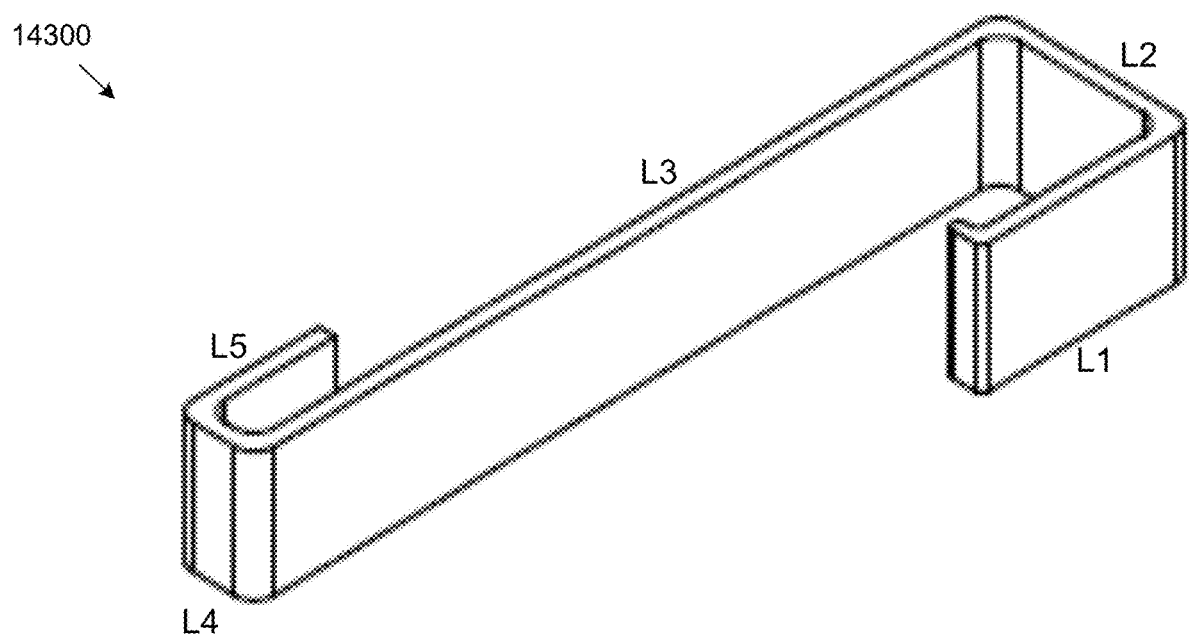

FIG. 143 is a perspective view of a hook sensor hanger, which may be configured to the support frame and suspended above the drain pan level.

Figure 144:
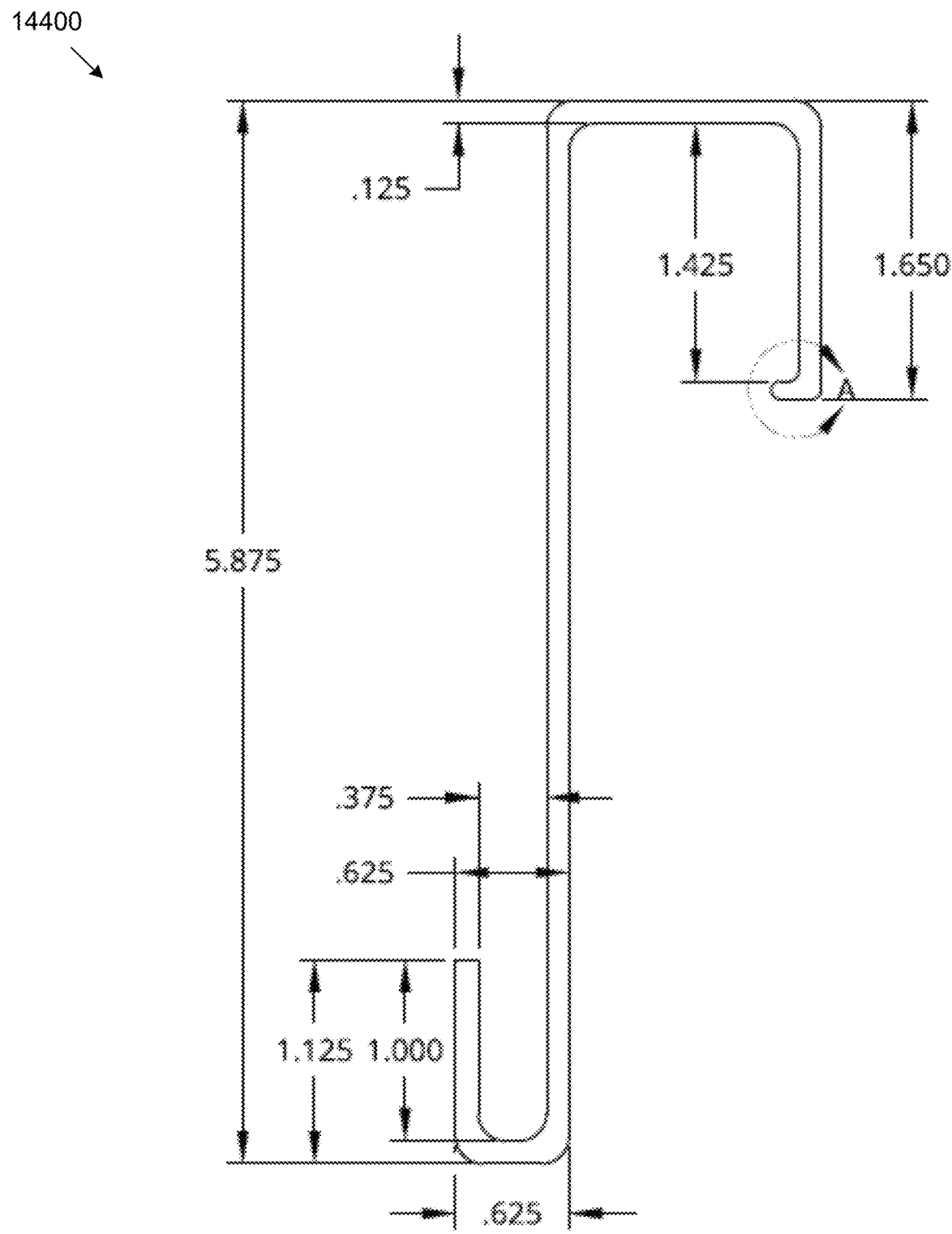

FIG. 144 is a side view of the hook sensor hanger of FIG. 143.

Figure 145:
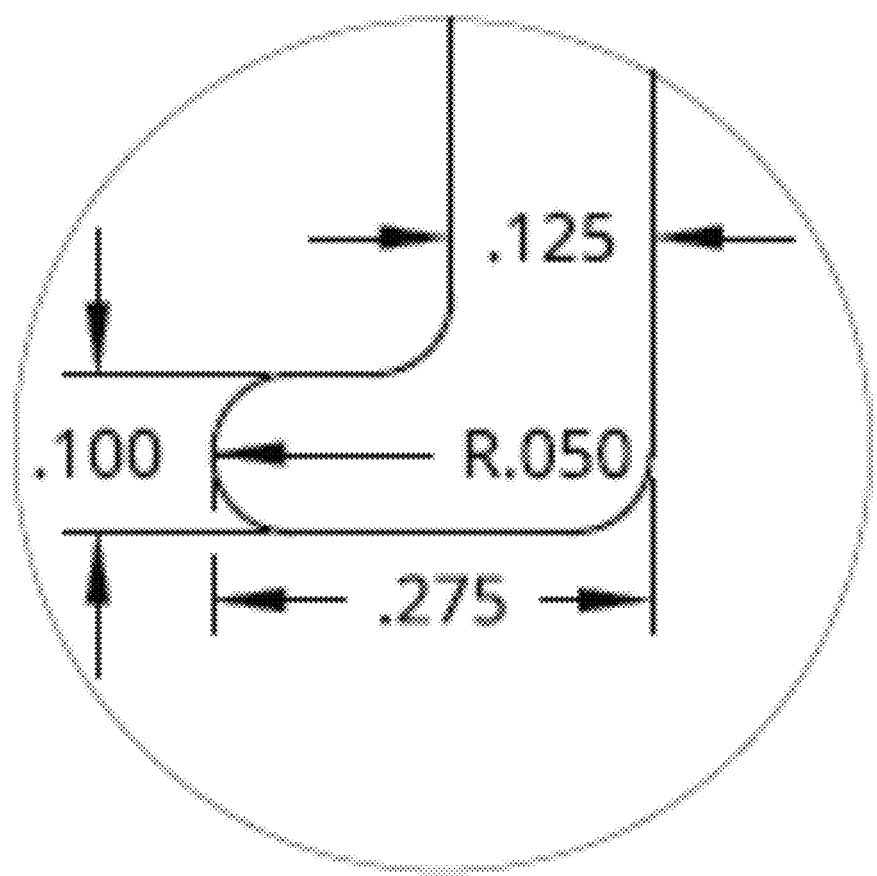

FIG. 145 depicts detail A of FIG. 143, located near the bottom of the hanger portion configured to hook onto the dimensions of the support frame.

Figure 146:
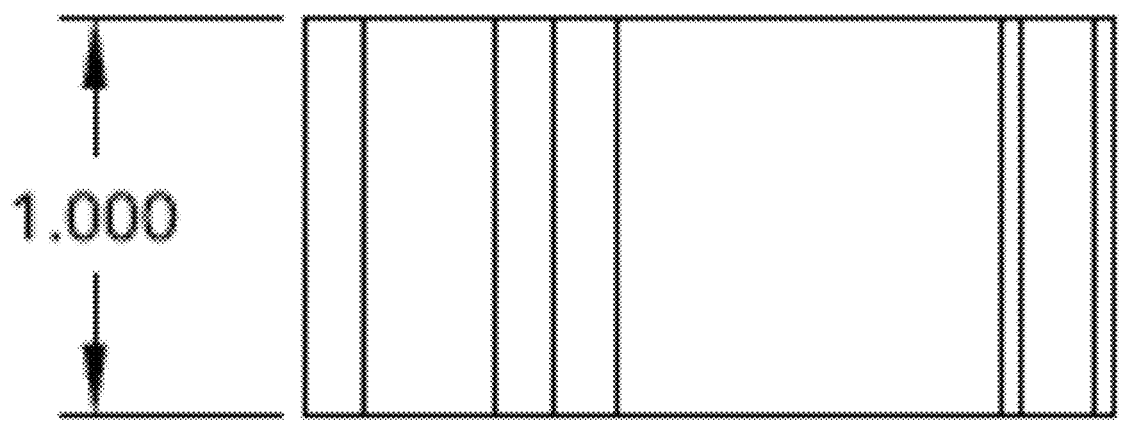

FIG. 146 is a bottom view of the hook sensor hanger of FIG. 143.

Figure 147:
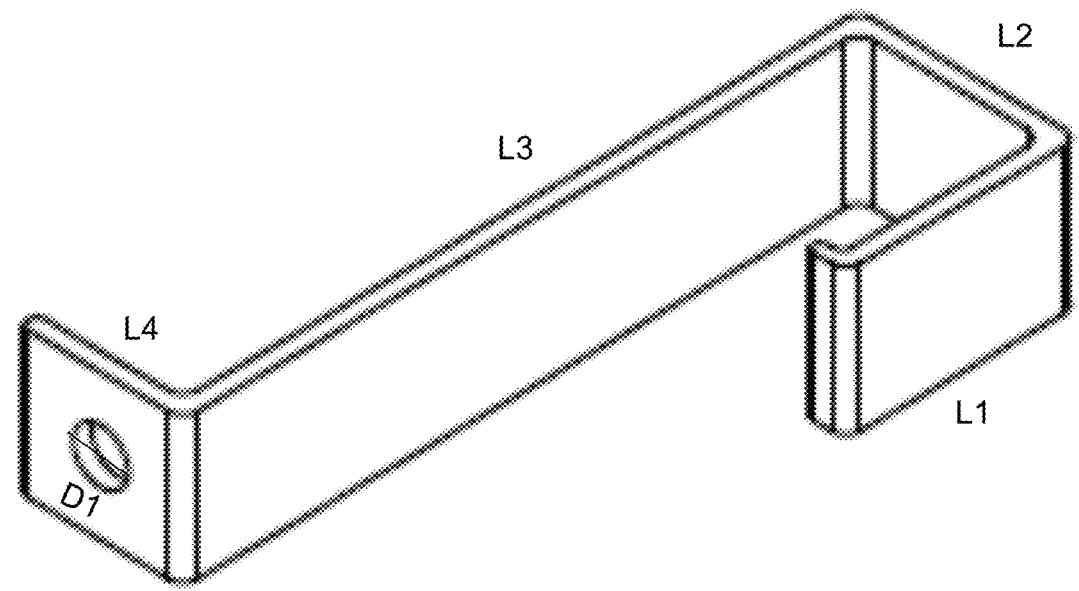

FIG. 147 is a perspective view of a clip sensor hanger, which may be configured to the support frame and suspended above the drain pan level.

Figure 148:
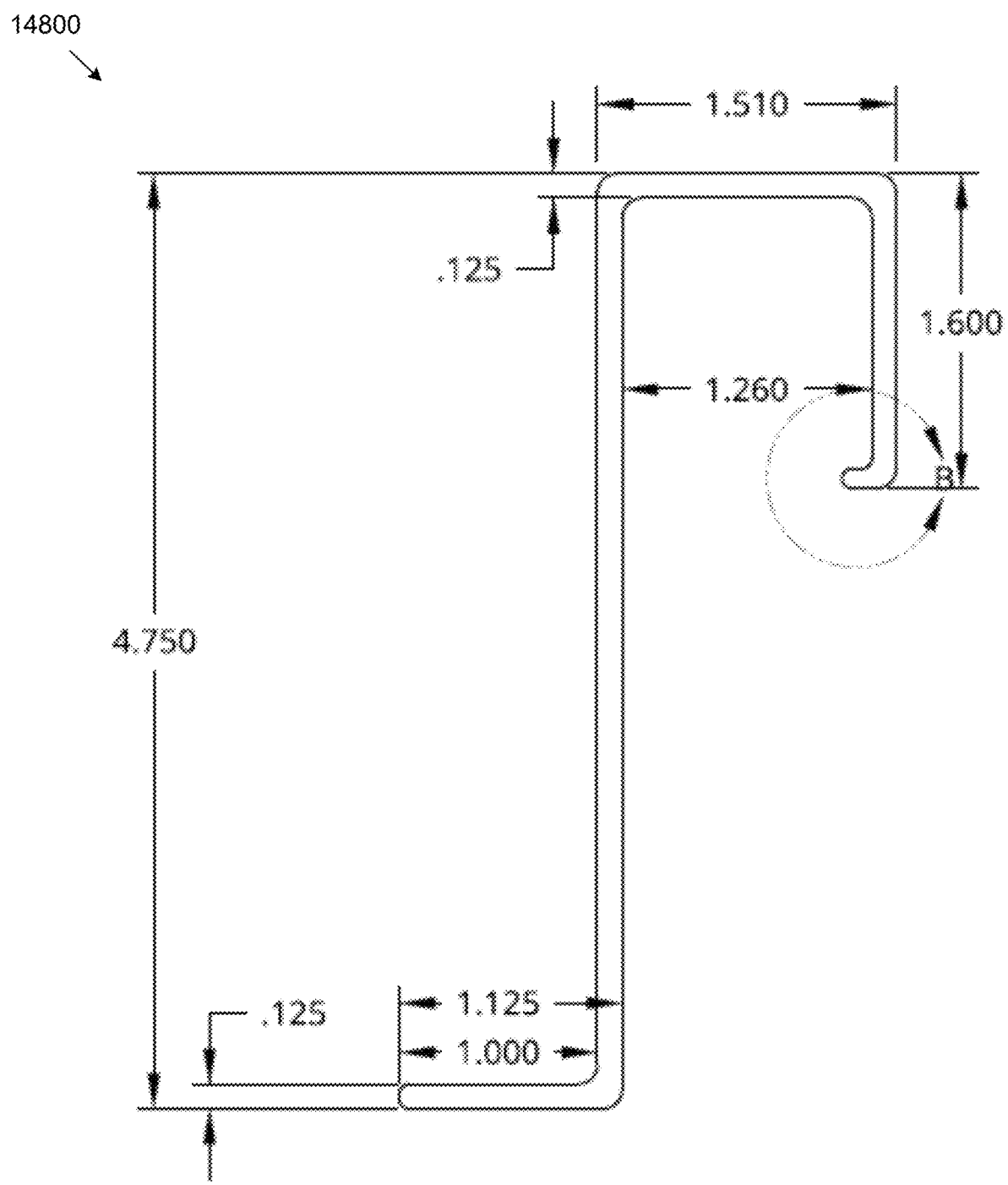

FIG. 148 is a side view of the clip sensor hanger of FIG. 147.

Figure 149:
Figure 149:
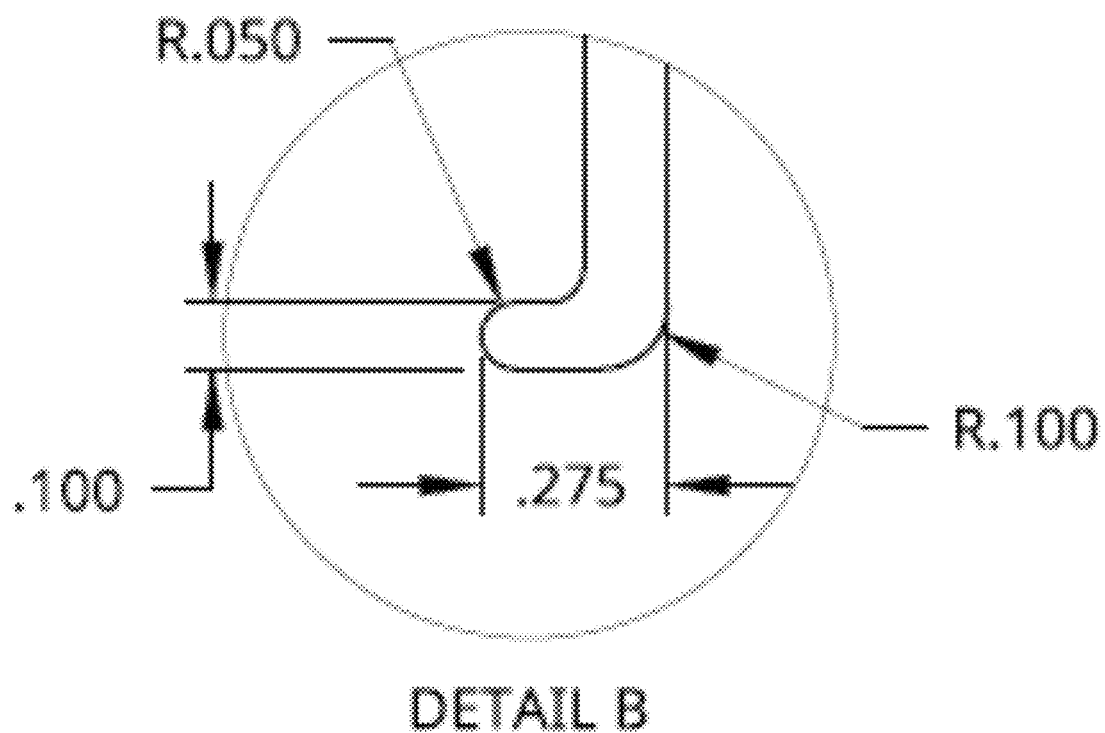

FIG. 149 depicts detail B of FIG. 147, located near the bottom of the hanger portion configured to hook onto the dimensions of the support frame.

Figure 150:
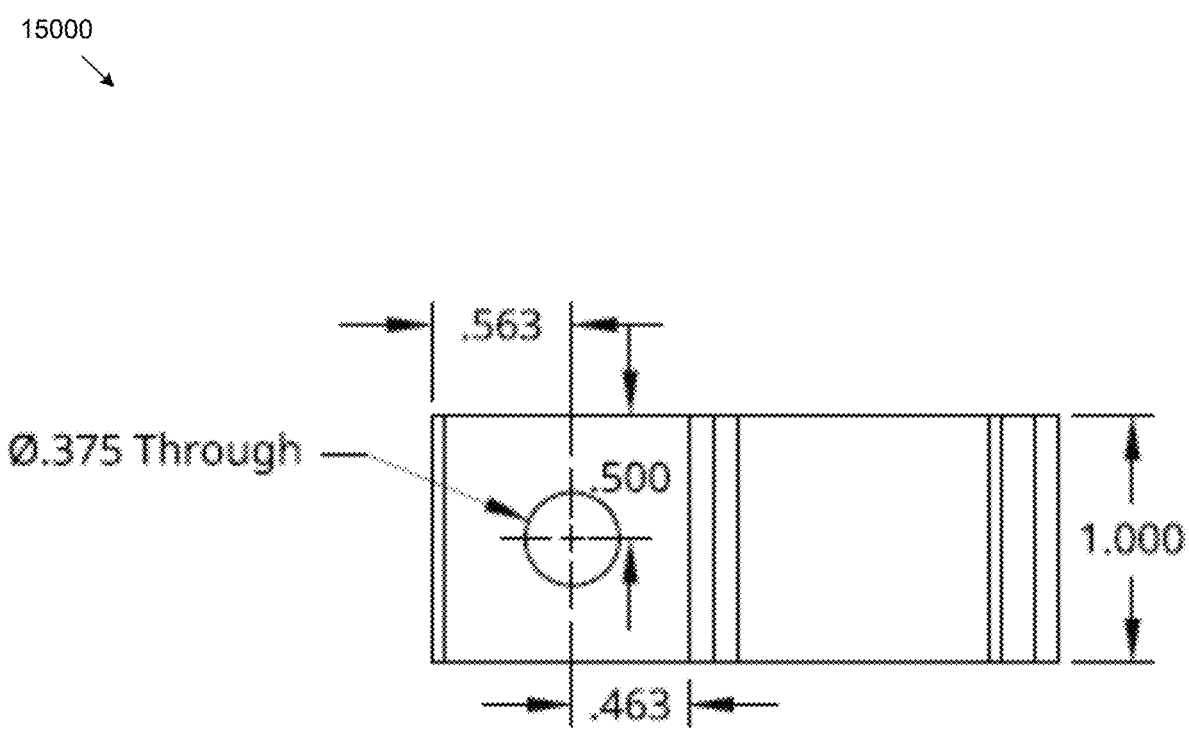
Figure 151:
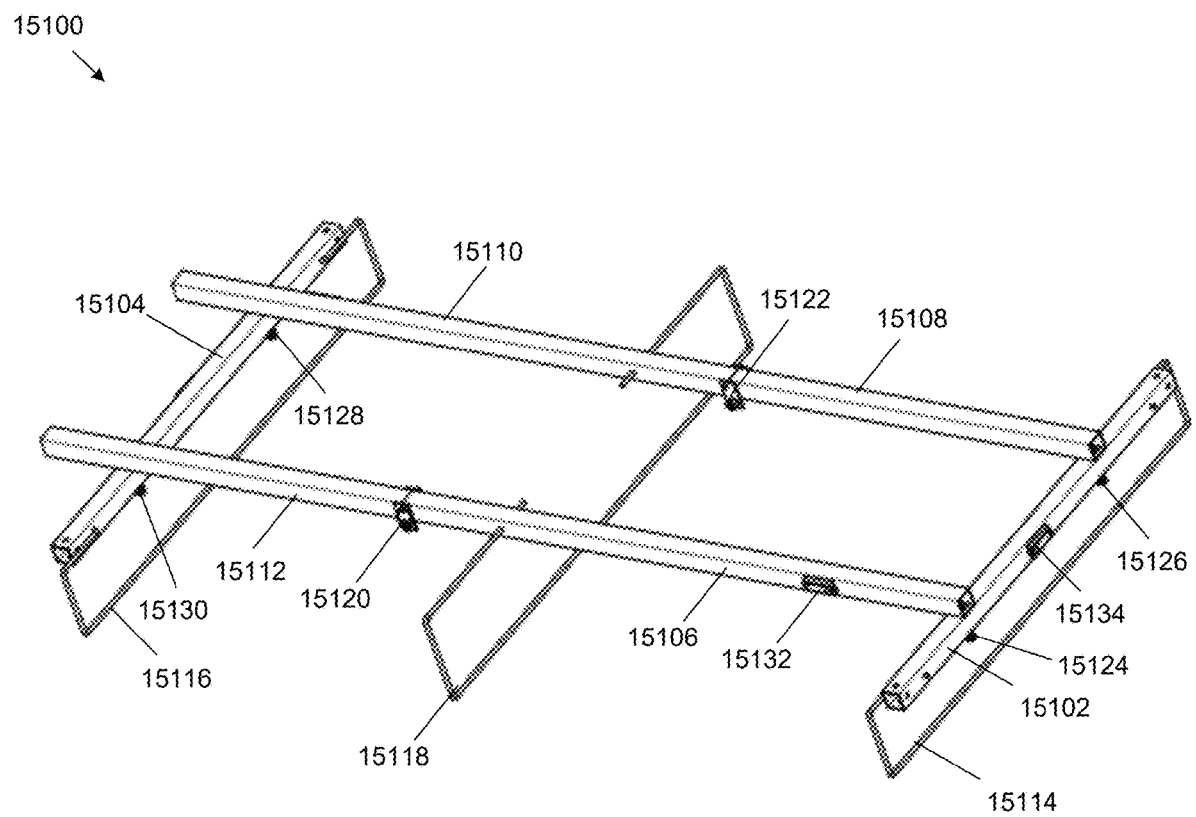

FIG. 150 is a bottom view of the clip sensor hanger of FIG. 147;

FIG. 151 is a perspective view of another mounting apparatus, depicting a base frame with drain pan hangers, sliding pins, and leveling indicators, wherein the left side of the base frame length is shortened.

Figure 152:
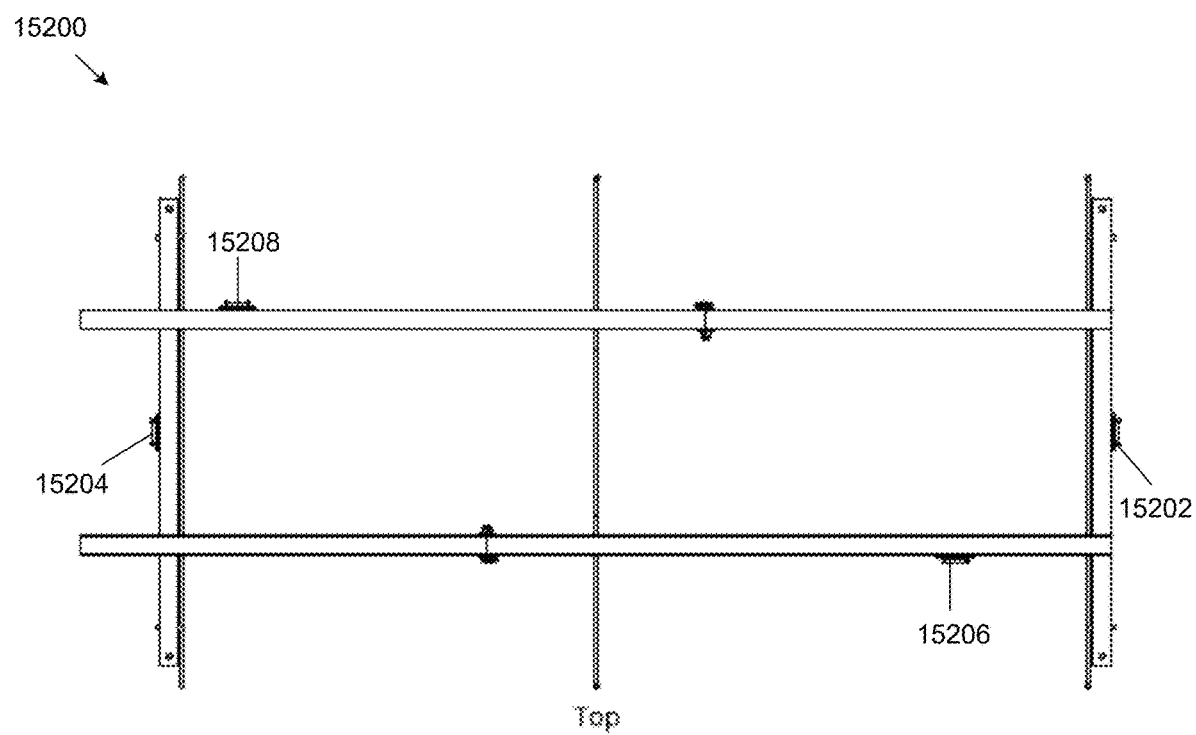

FIG. 152 is a top view of the mounting apparatus of FIG. 151.

Figure 153:
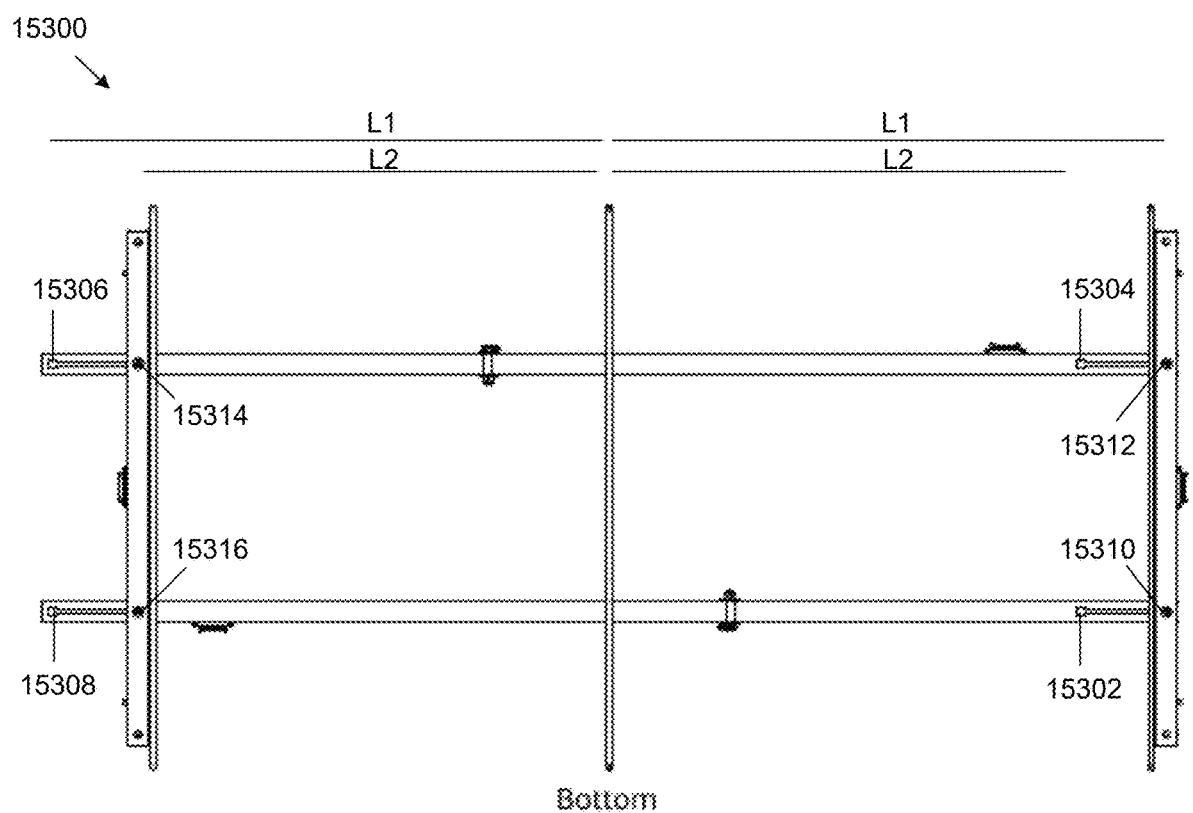

FIG. 153 is a bottom view of the mounting apparatus of FIG. 151.

Figure 154:
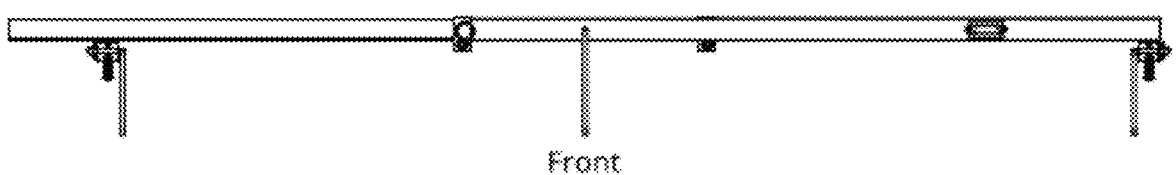

FIG. 154 is a front view of the mounting apparatus of FIG. 151.

Figure 155:
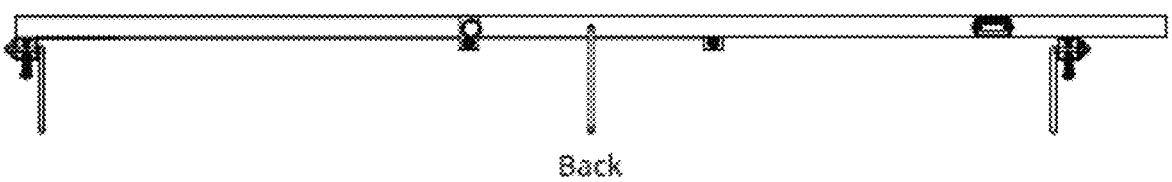

FIG. 155 is a back view of the mounting apparatus of FIG. 151.

Figure 156:
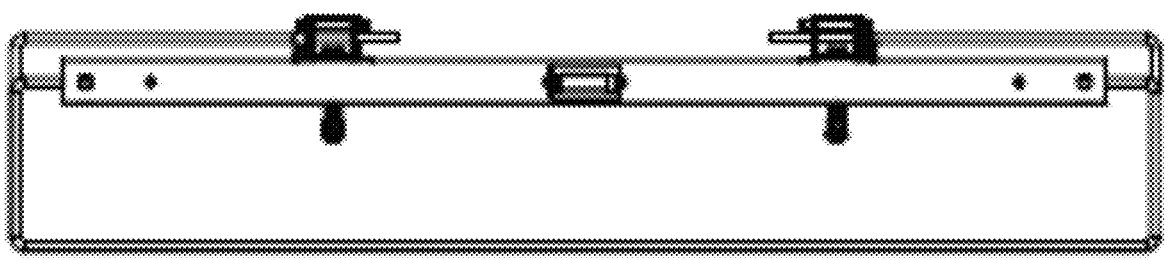

FIG. 156 is a left view of the mounting apparatus of FIG. 151.

Figure 157:
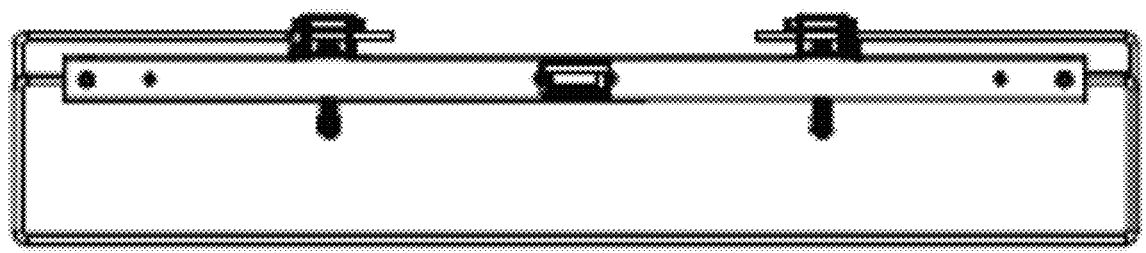

FIG. 157 is a right view of the mounting apparatus of FIG. 151.

Figure 158:
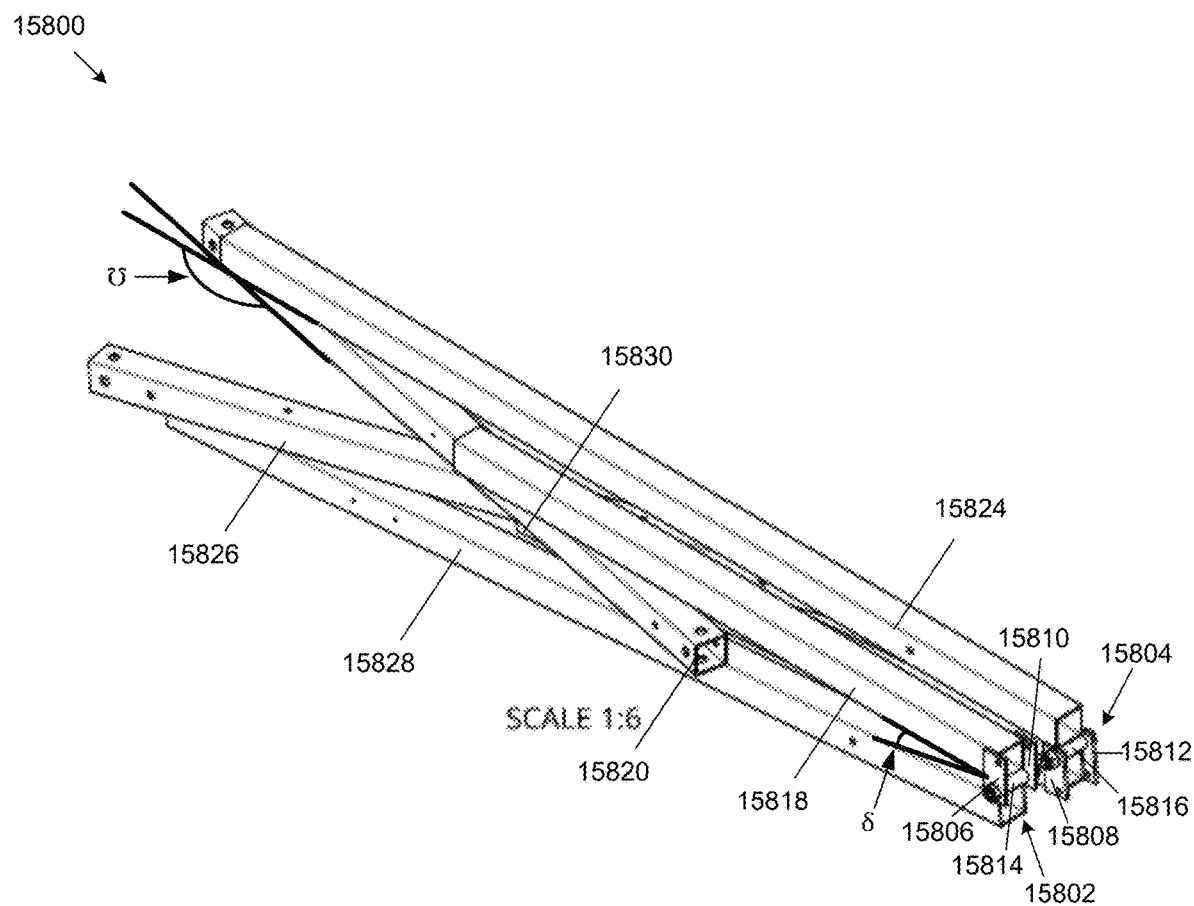

FIG. 158 is a perspective view of the folded HVAC mounting apparatus of FIG. 151.

Figure 159:
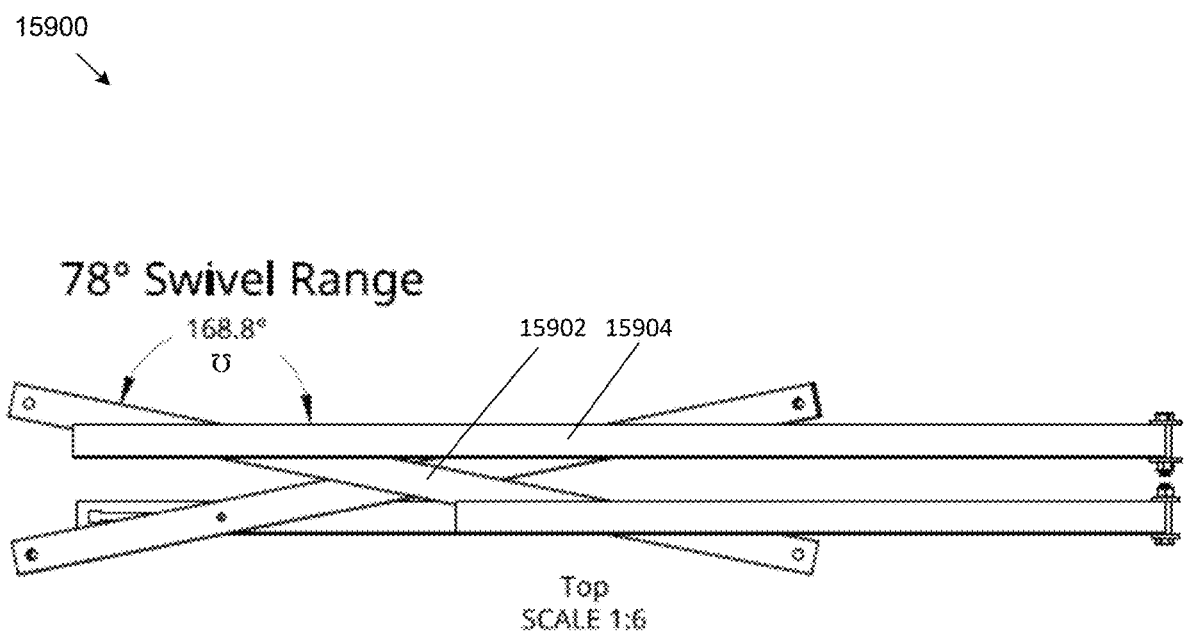

FIG. 159 is a top view of the mounting apparatus of FIG. 158.

Figure 160:
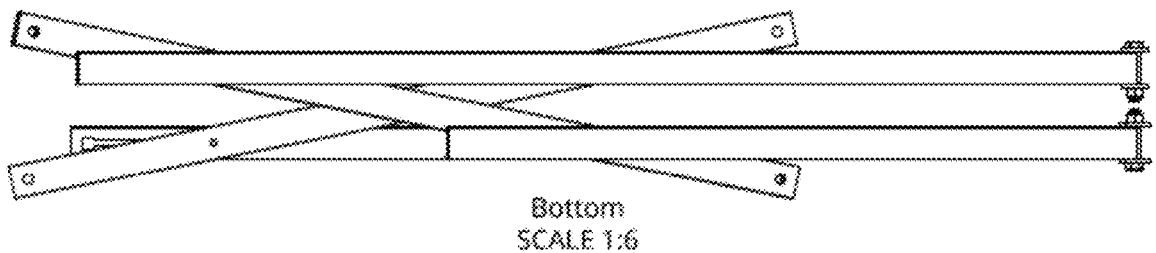

FIG. 160 is a bottom view of the mounting apparatus of FIG. 158.

Figure 161:
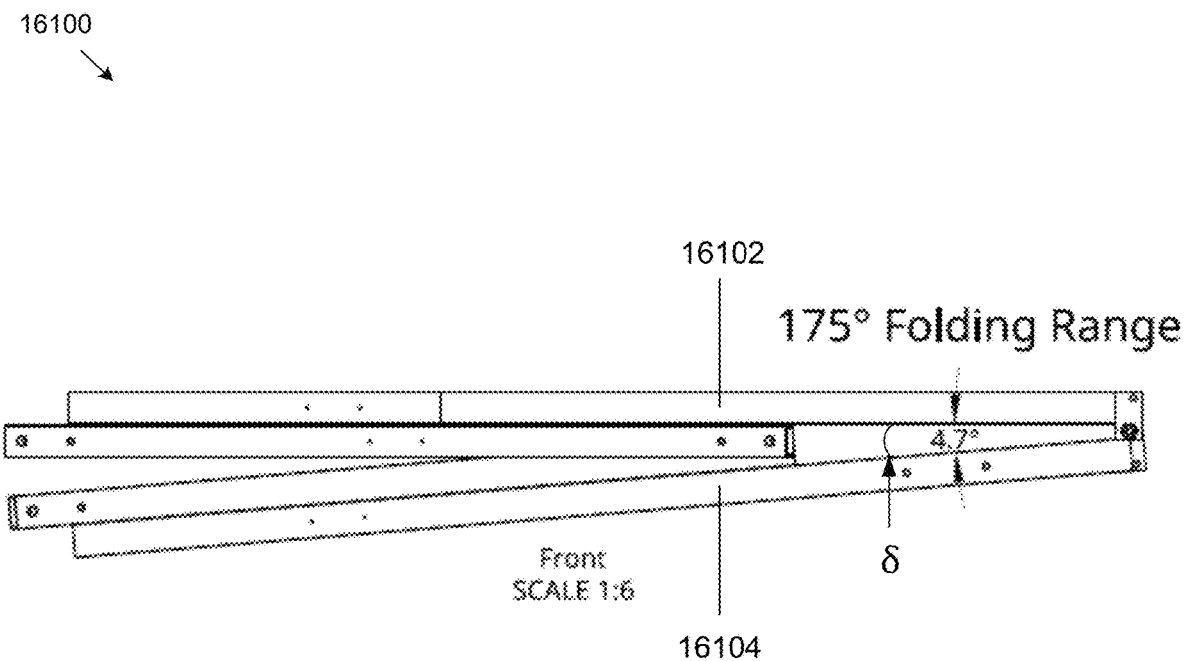

FIG. 161 is a front view of the mounting apparatus of FIG. 158.

Figure 162:
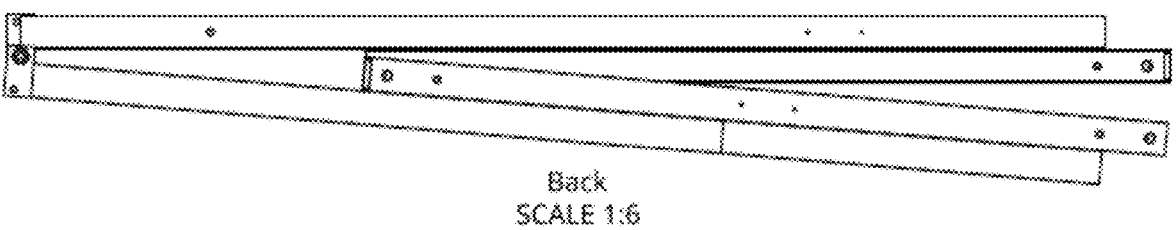

FIG. 162 is a back view of the mounting apparatus of FIG. 158.

Figure 163:
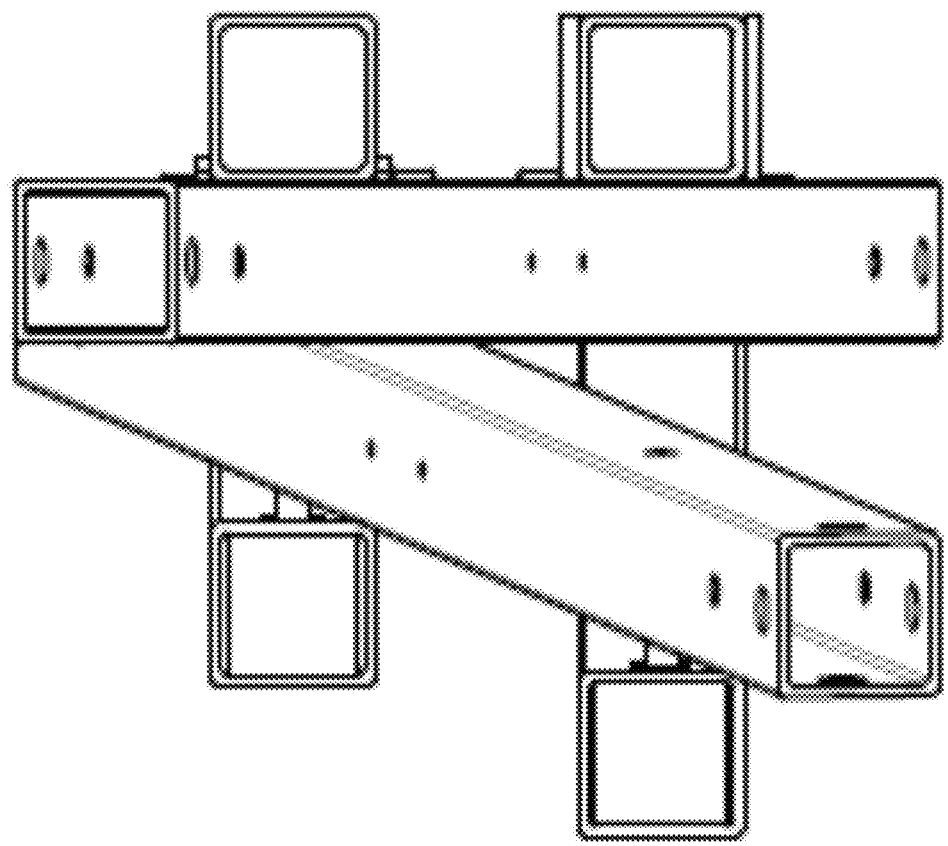

FIG. 163 is a left view of the mounting apparatus of FIG. 158.

Figure 164:
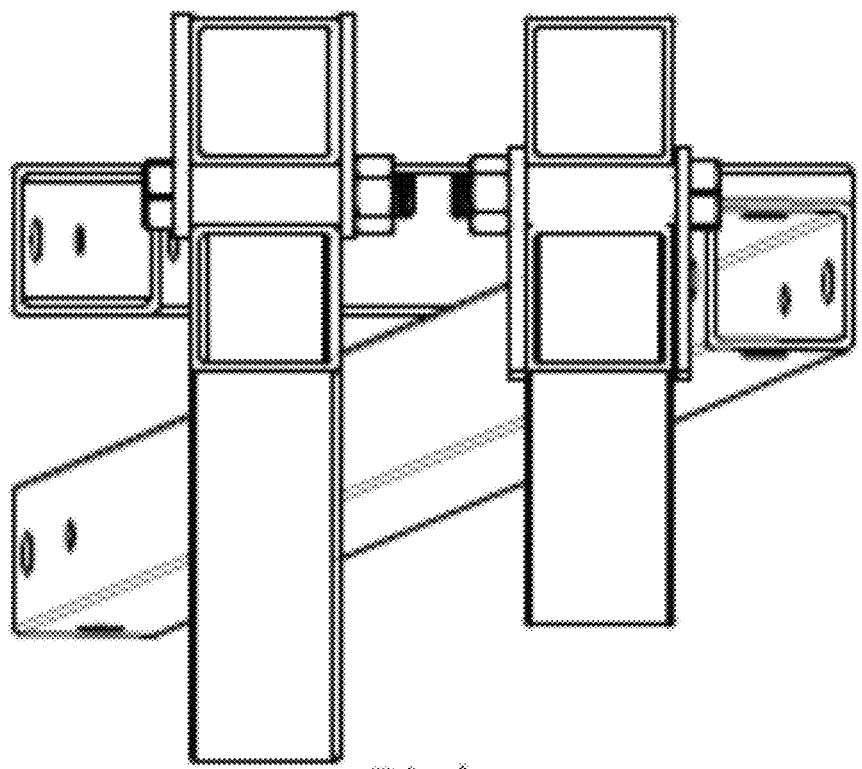

FIG. 164 is a right view of the mounting apparatus of FIG. 158.

Figure 165:
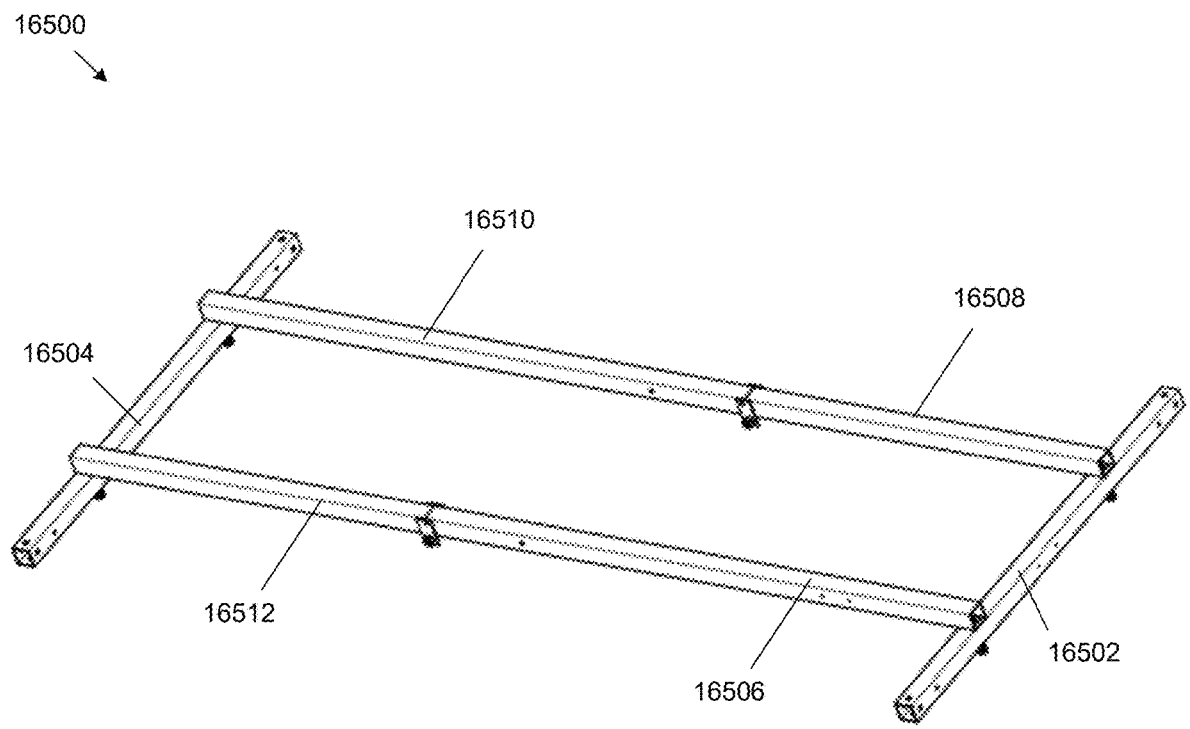

FIG. 165 is a perspective view of the mounting apparatus of FIG. 151, depicting the base frame without drain pan hangers and leveling indicators, while including sliding pins.

Figure 166:
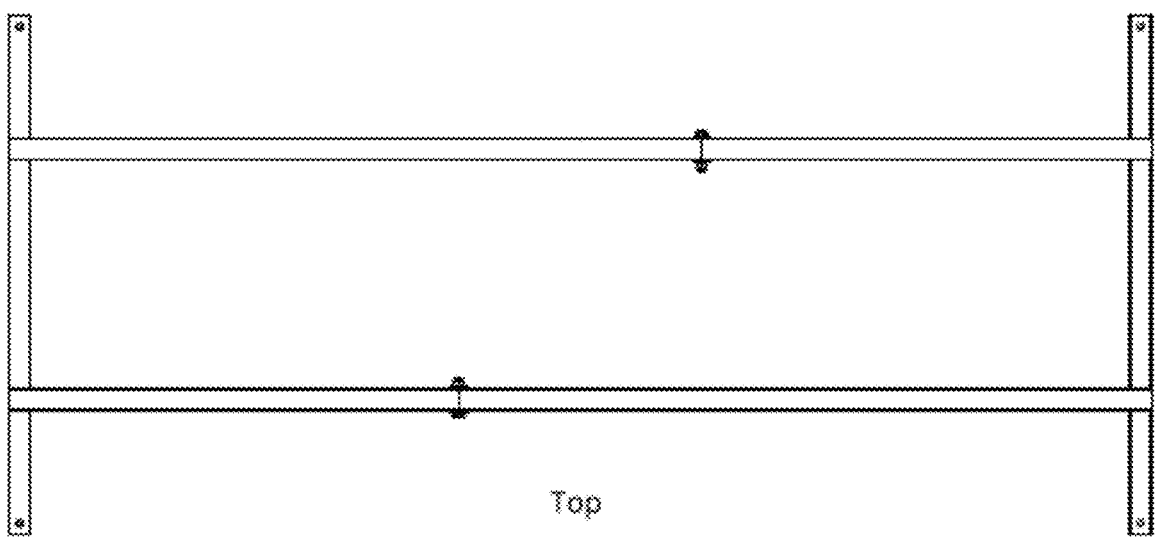

FIG. 166 is a top view of the mounting apparatus of FIG. 165.

Figure 167:
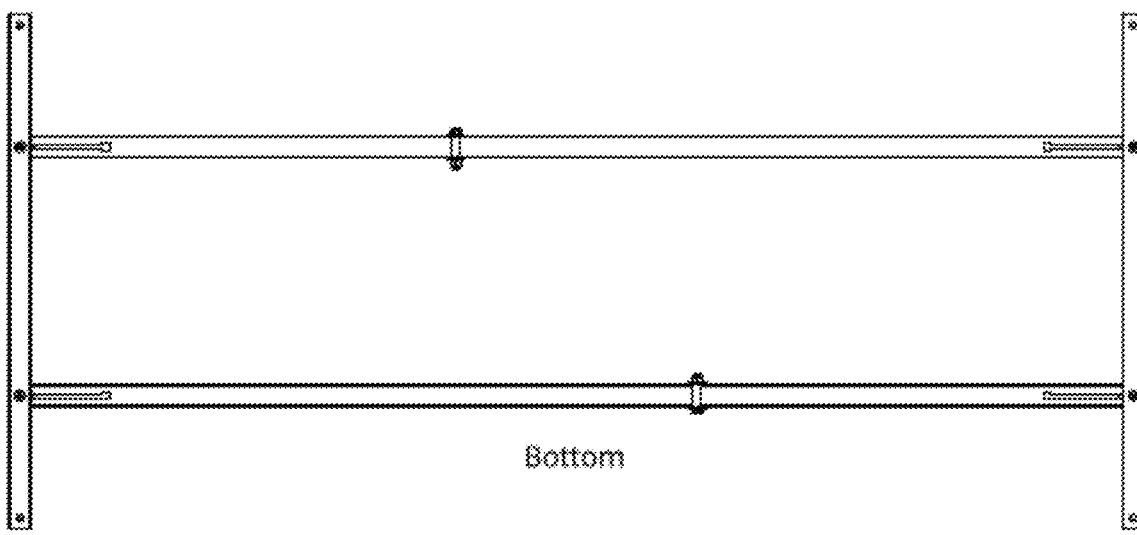

FIG. 167 is a bottom view of the mounting apparatus of FIG. 165.

Figure 168:
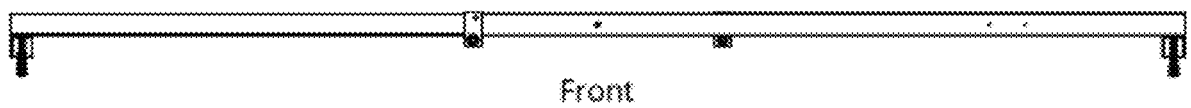

FIG. 168 is a front view of the mounting apparatus of FIG. 165.

Figure 169:
Figure 169:
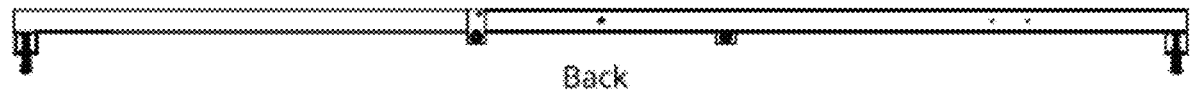

FIG. 169 is a back view of the mounting apparatus of FIG. 165.

Figure 170:
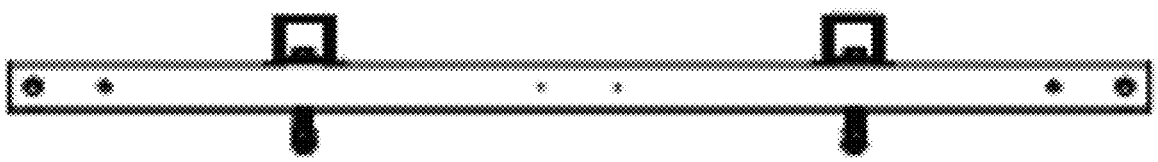

FIG. 170 is a left view of the mounting apparatus of FIG. 165.

Figure 171:
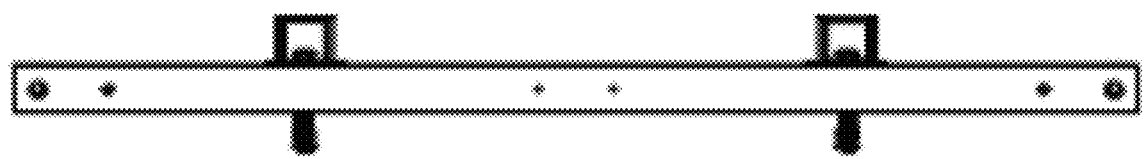

FIG. 171 is a right view of the mounting apparatus of FIG. 165.

Figure 172:
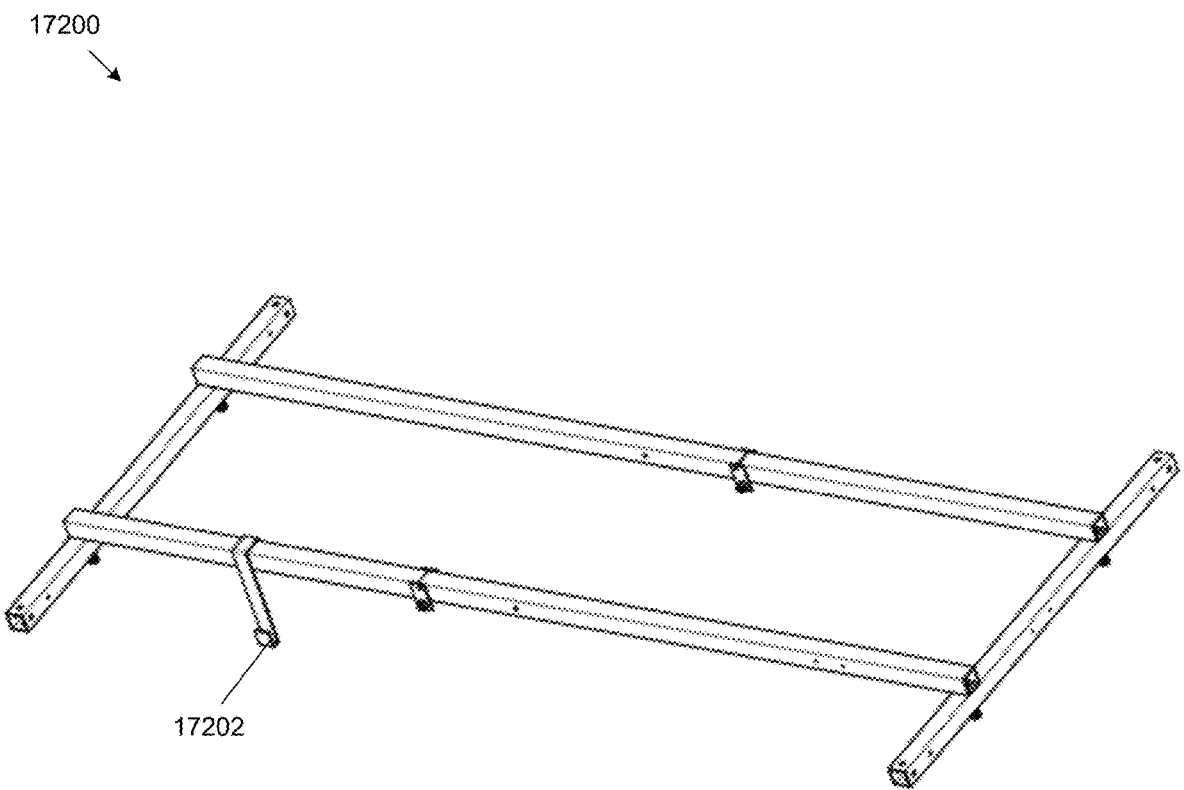

FIG. 172 is a perspective view of the mounting apparatus of FIG. 151, depicting the base frame without pins, drain pan hangers, and leveling indicators, while including a hook variant sensor hanger and sliding pins.

Figure 173:
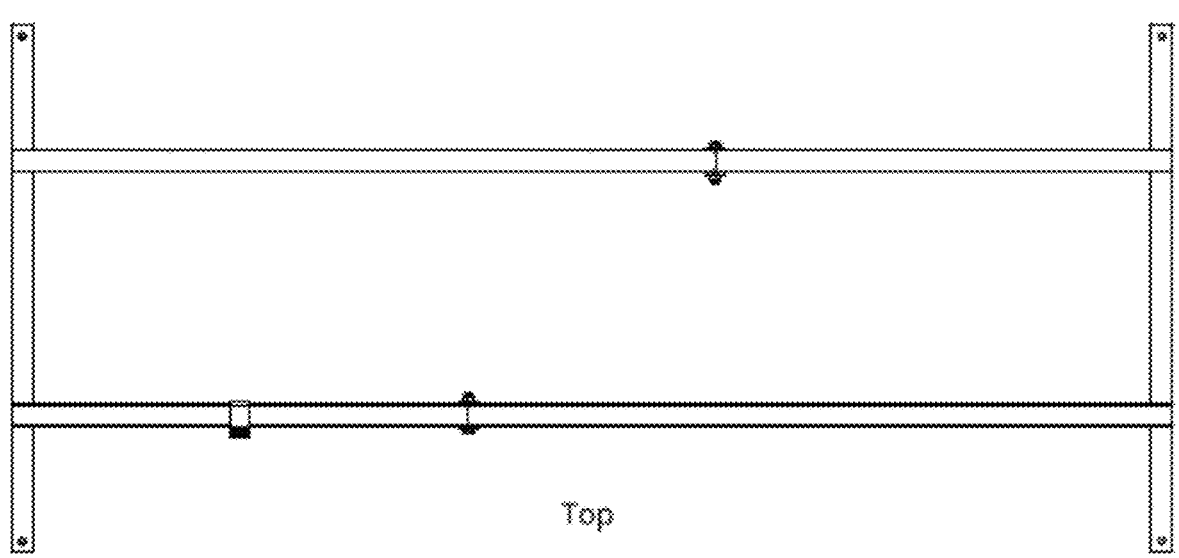

FIG. 173 is a top view of the mounting apparatus of FIG. 172.

Figure 174:
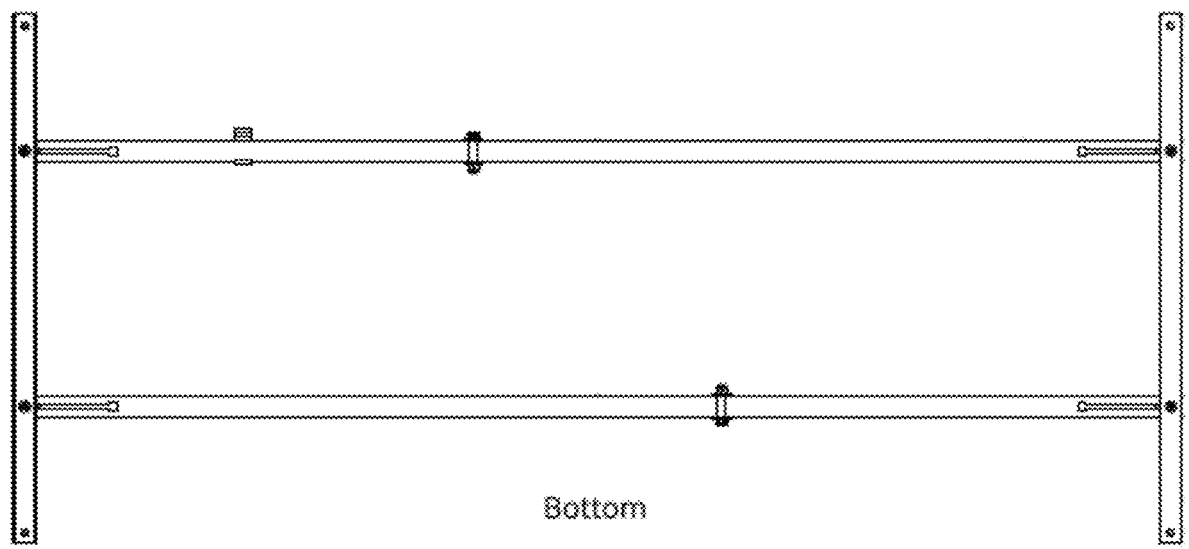

FIG. 174 is a bottom view of the mounting apparatus of FIG. 172.

Figure 175:
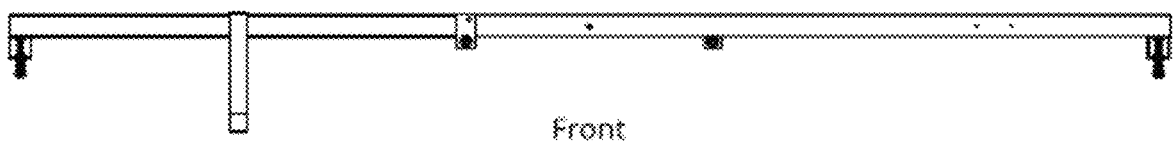

FIG. 175 is a front view of the mounting apparatus of FIG. 172.

Figure 176:
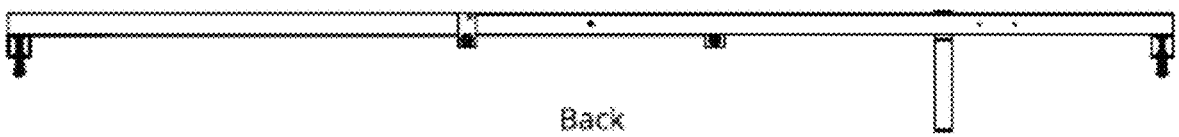

FIG. 176 is a back view of the mounting apparatus of FIG. 172.

Figure 177:
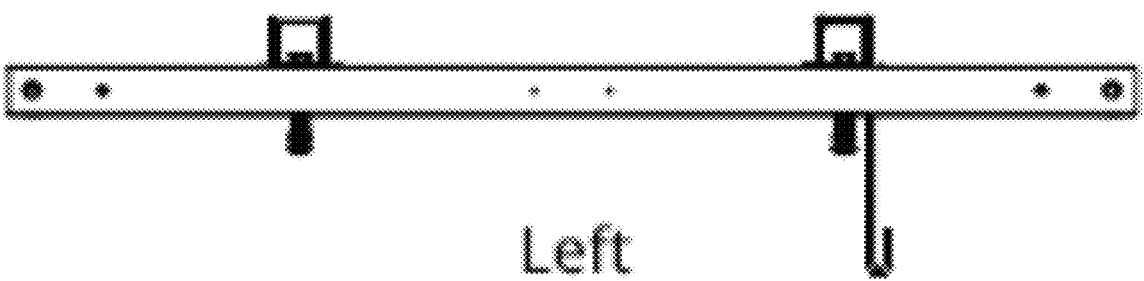

FIG. 177 is a left view of the mounting apparatus of FIG. 172.

Figure 178:
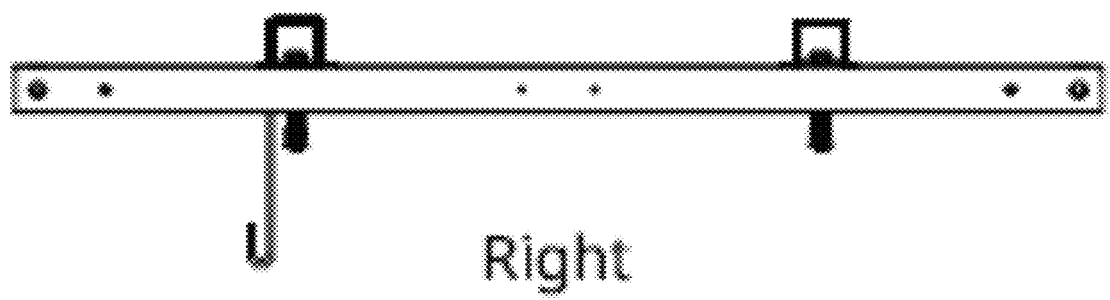

FIG. 178 is a right view of the mounting apparatus of FIG. 172.

Figure 179:
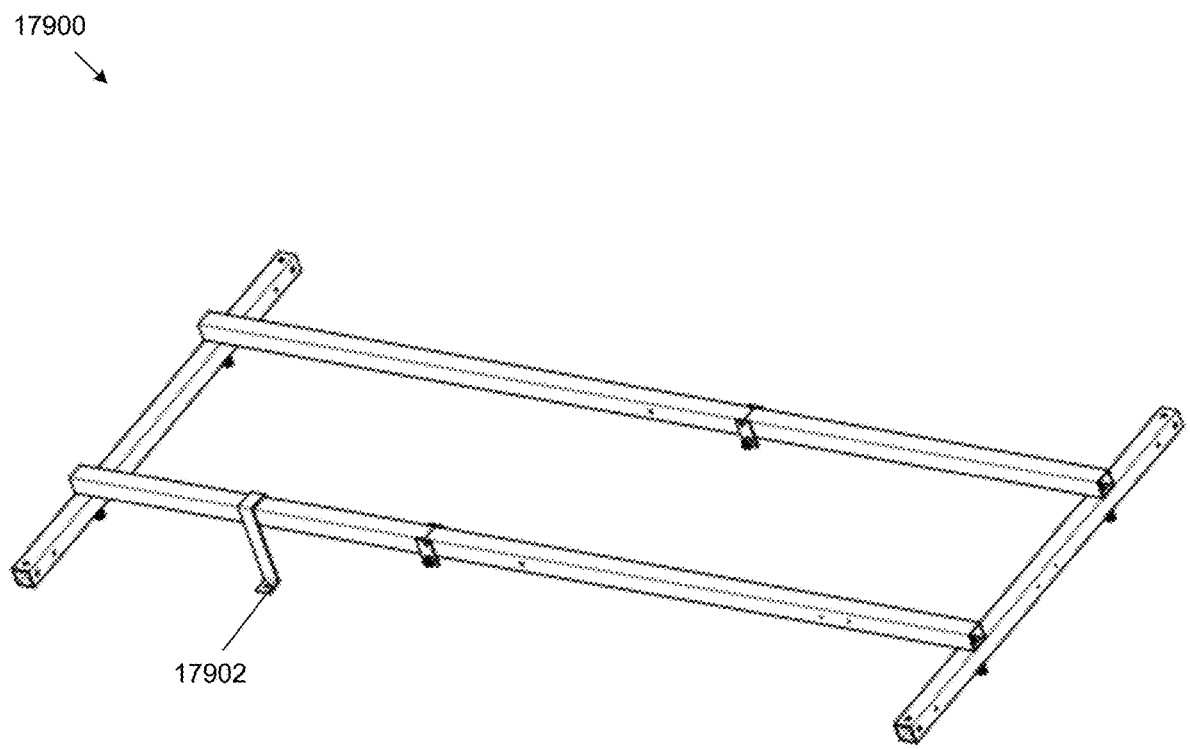

FIG. 179 is a perspective view of the mounting apparatus of FIG. 151, depicting the base frame without pins, drain pan hangers, and leveling indicators, while including a clip variant sensor hanger and sliding pins.

Figure 180:
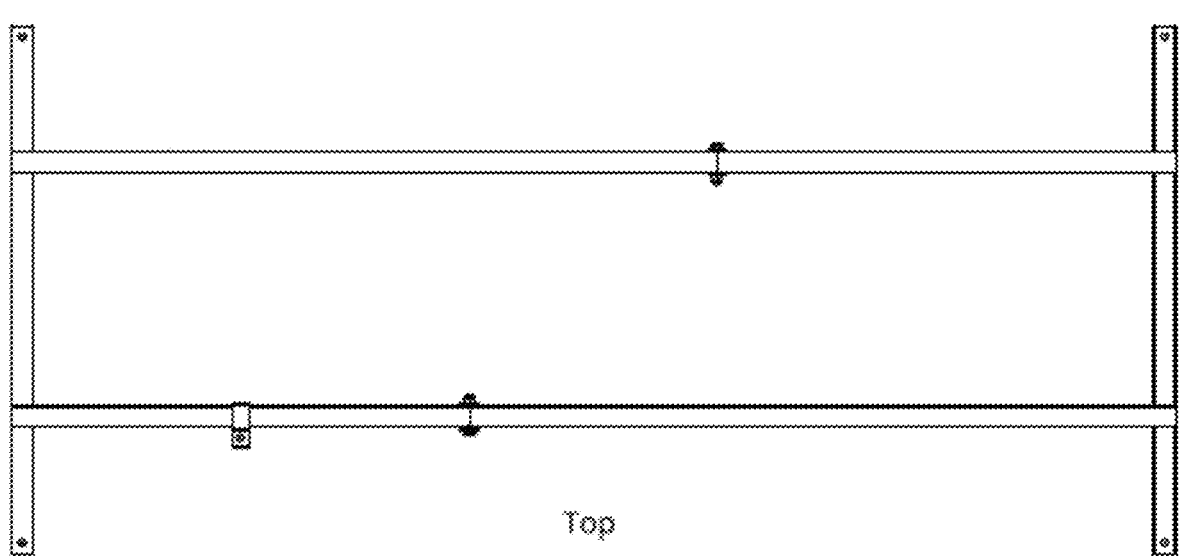

FIG. 180 is a top view of the mounting apparatus of FIG. 179.

Figure 181:
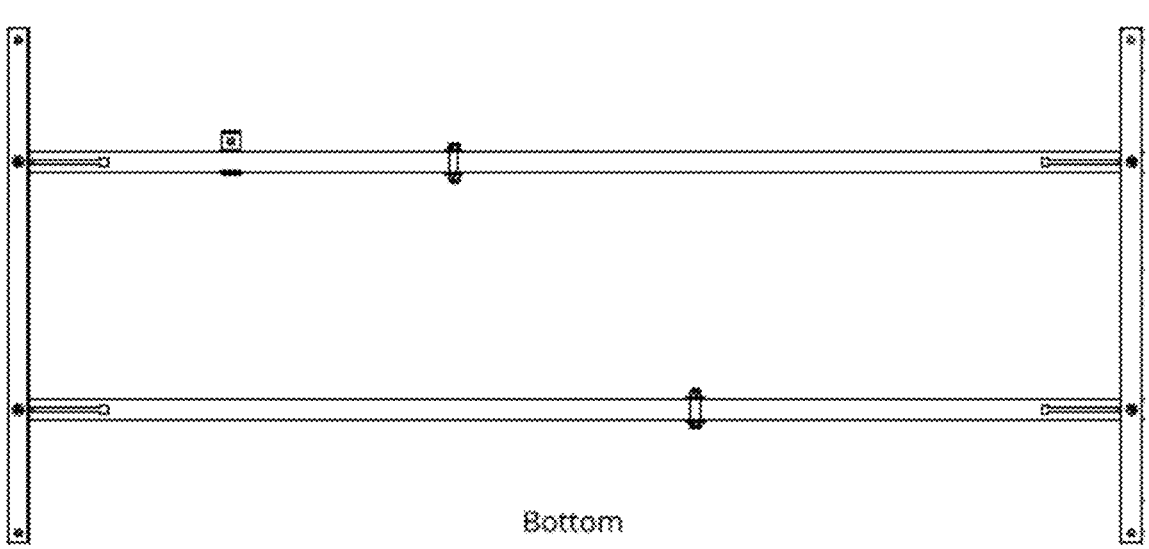

FIG. 181 is a bottom view of the mounting apparatus of FIG. 179.

Figure 182:
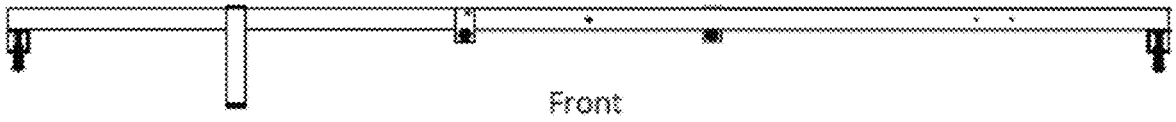

FIG. 182 is a front view of the mounting apparatus of FIG. 179.

Figure 183:
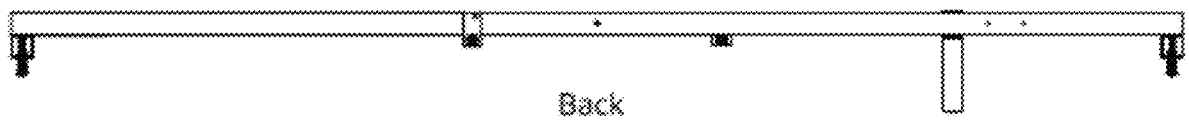

FIG. 183 is a back view of the mounting apparatus of FIG. 179.

Figure 184:
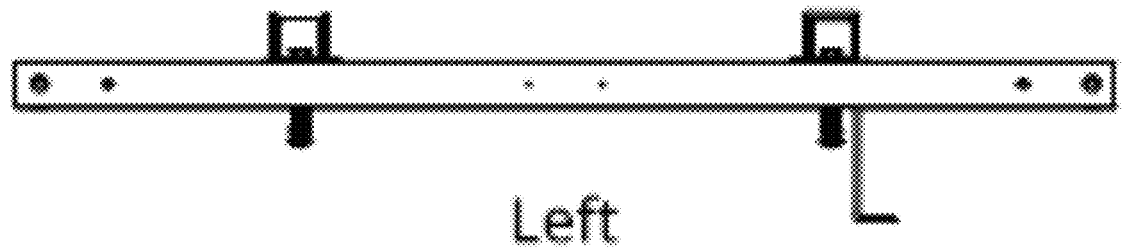

FIG. 184 is a left view of the mounting apparatus of FIG. 179.

Figure 185:
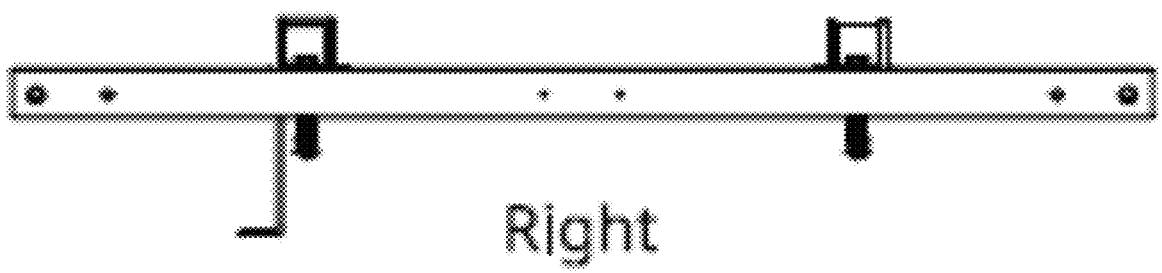

FIG. 185 is a right view of the mounting apparatus of FIG. 179.

Figure 186:
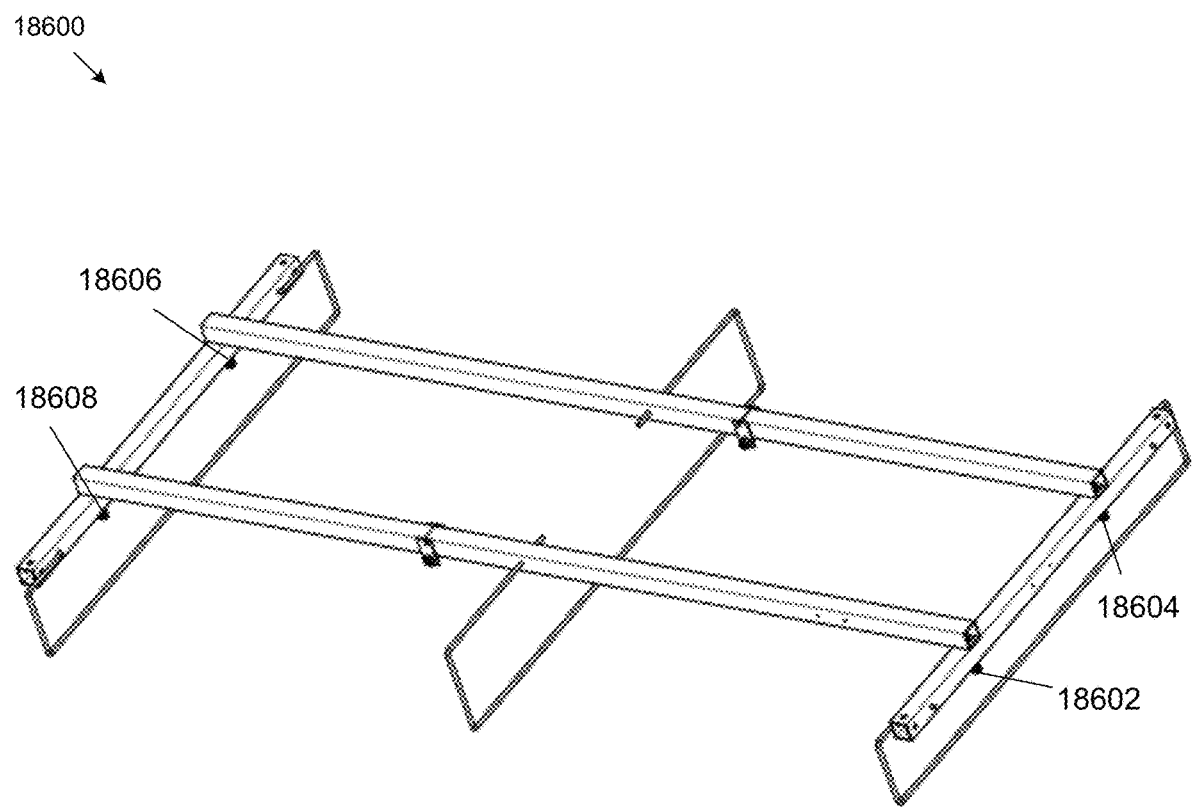

FIG. 186 is a perspective view of another mounting apparatus variant according to the invention herein, depicting a base frame with drain pan hangers and sliding pins, while excluding leveling indicators.

Figure 187:
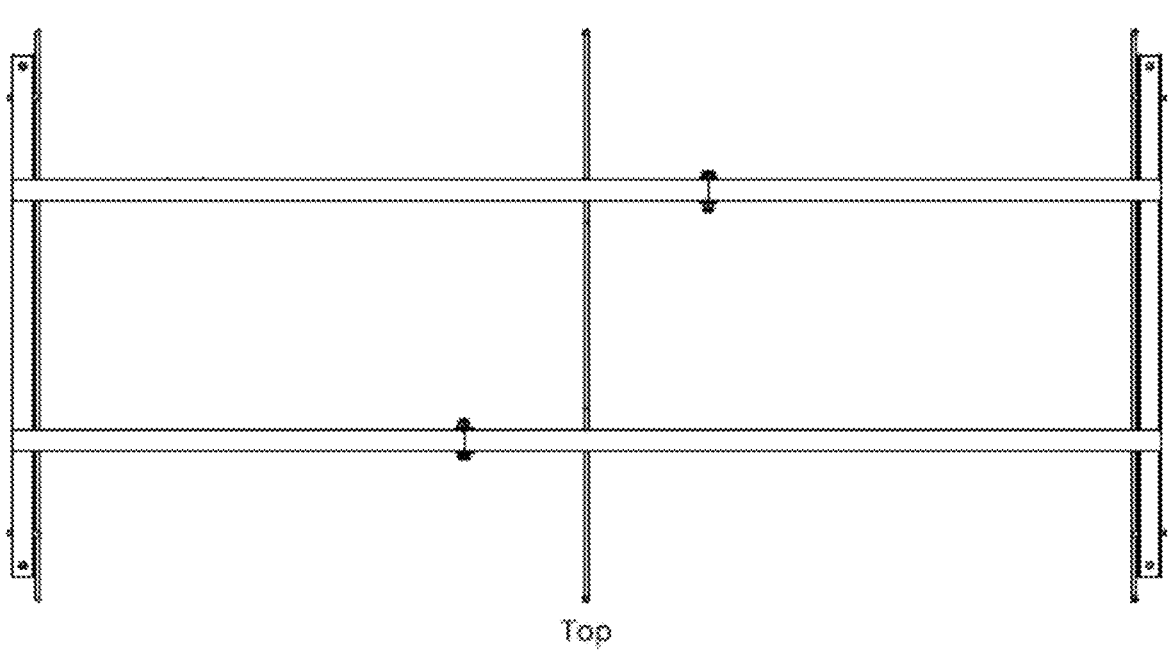

FIG. 187 is a top view of the mounting apparatus of FIG. 186.

Figure 188:
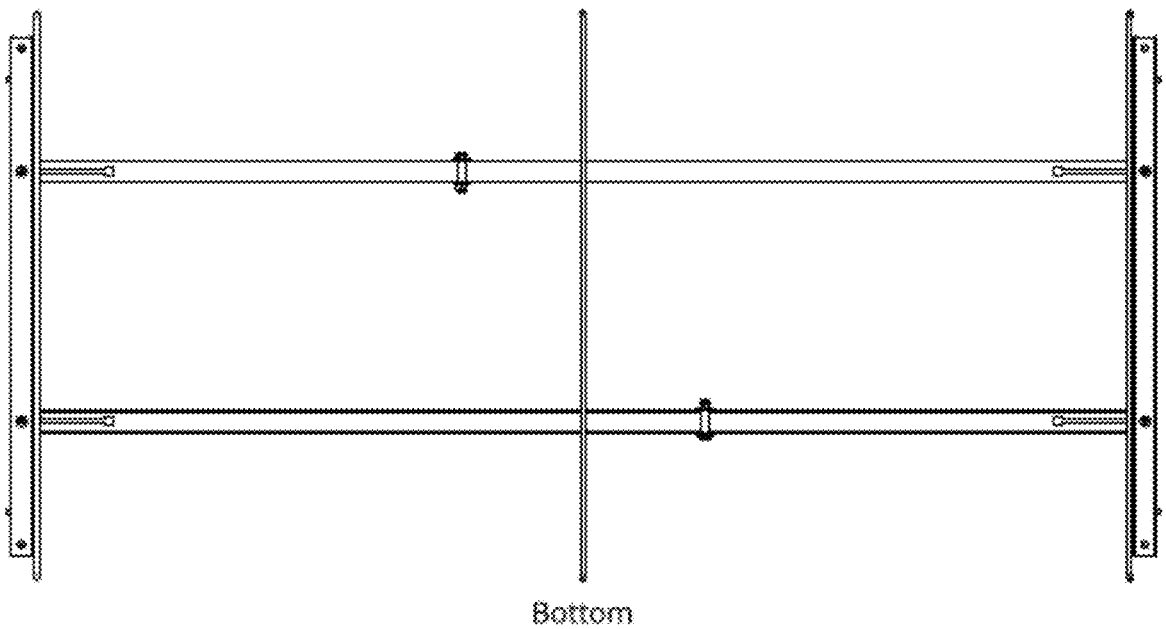

FIG. 188 is a bottom view of the mounting apparatus of FIG. 186.

Figure 189:
Figure 189:
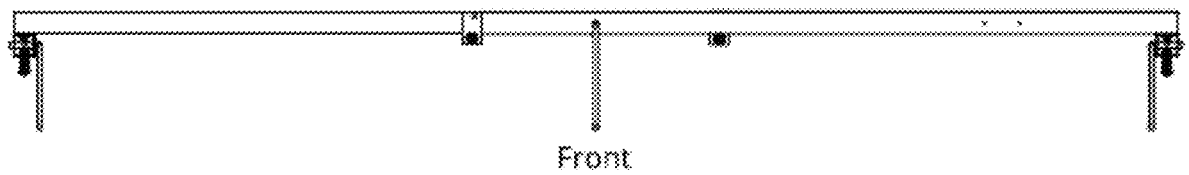

FIG. 189 is a front view of the mounting apparatus of FIG. 186.

Figure 190:
Figure 190:
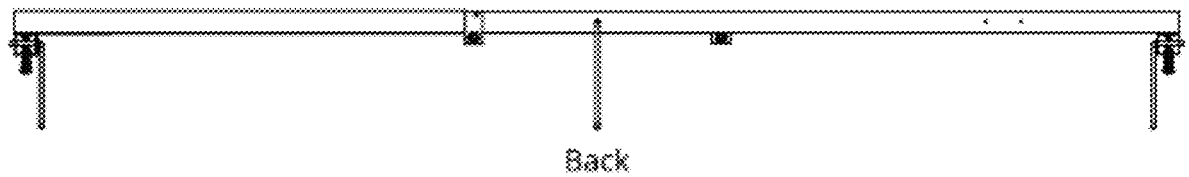

FIG. 190 is a back view of the mounting apparatus of FIG. 186.

Figure 191:
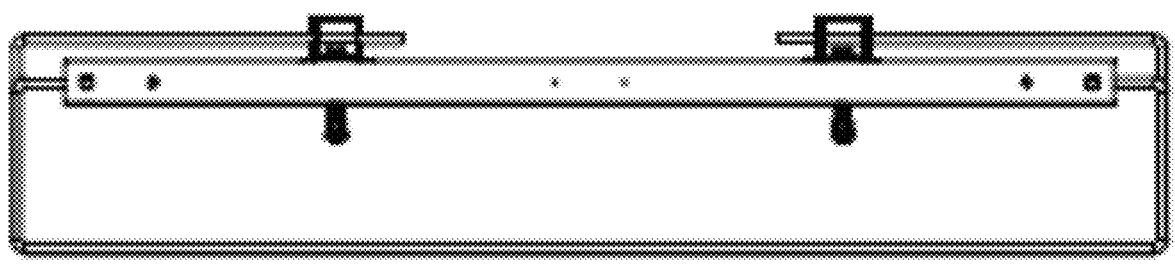

FIG. 191 is a left view of the mounting apparatus of FIG. 186.

Figure 192:
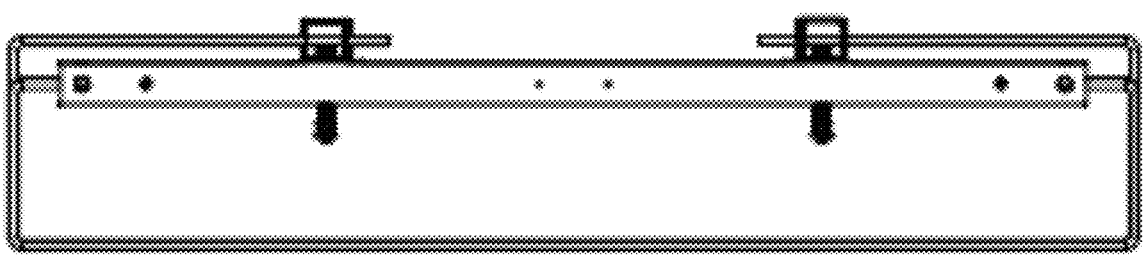

FIG. 192 is a right view of the mounting apparatus of FIG. 186.

Figure 193:
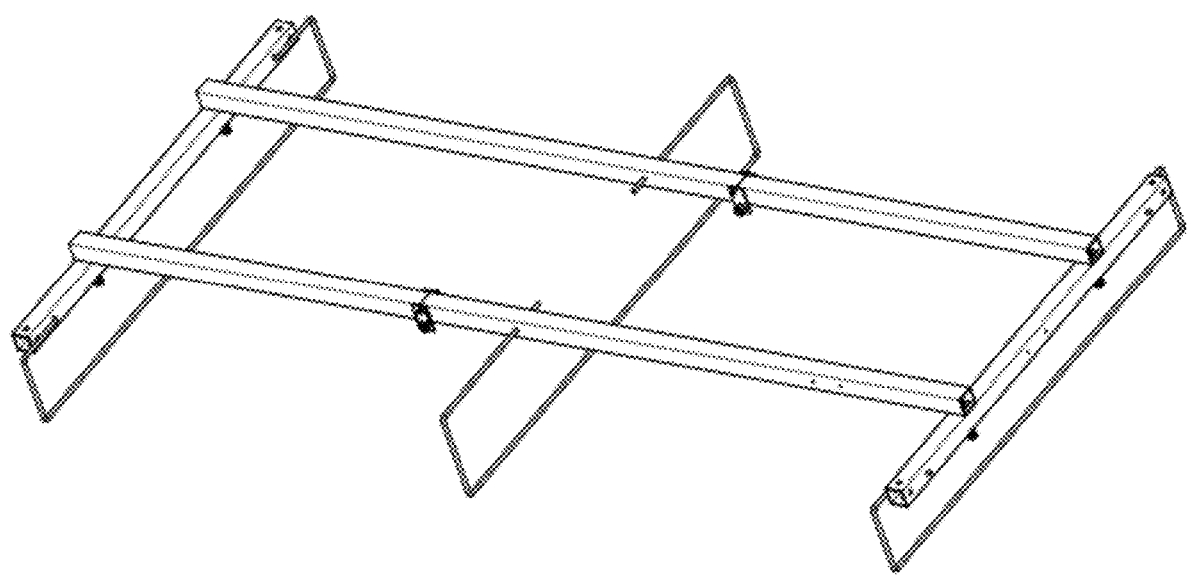

FIG. 193 is a perspective view of another mounting apparatus variant, depicting a base frame with drain pan hangers and sliding pins, while excluding leveling indicators.

Figure 194:
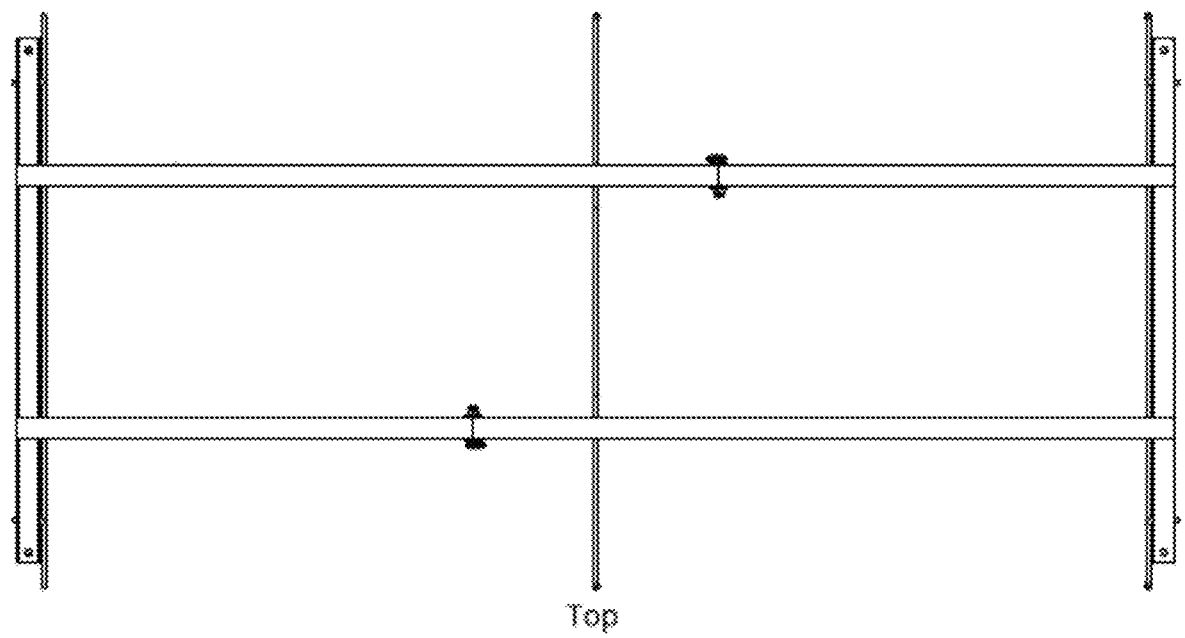

FIG. 194 is a top view of the mounting apparatus of FIG. 193.

Figure 195:
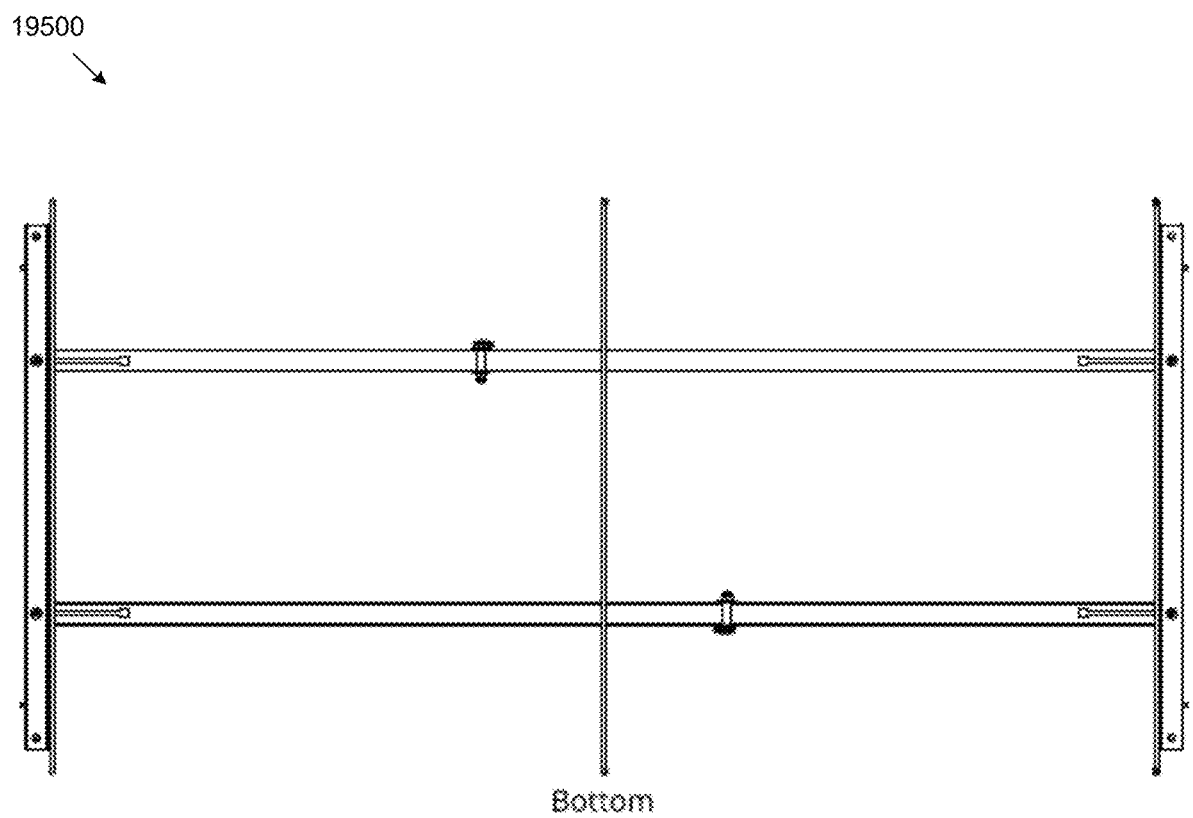

FIG. 195 is a bottom view of the mounting apparatus of FIG. 193.

Figure 196:
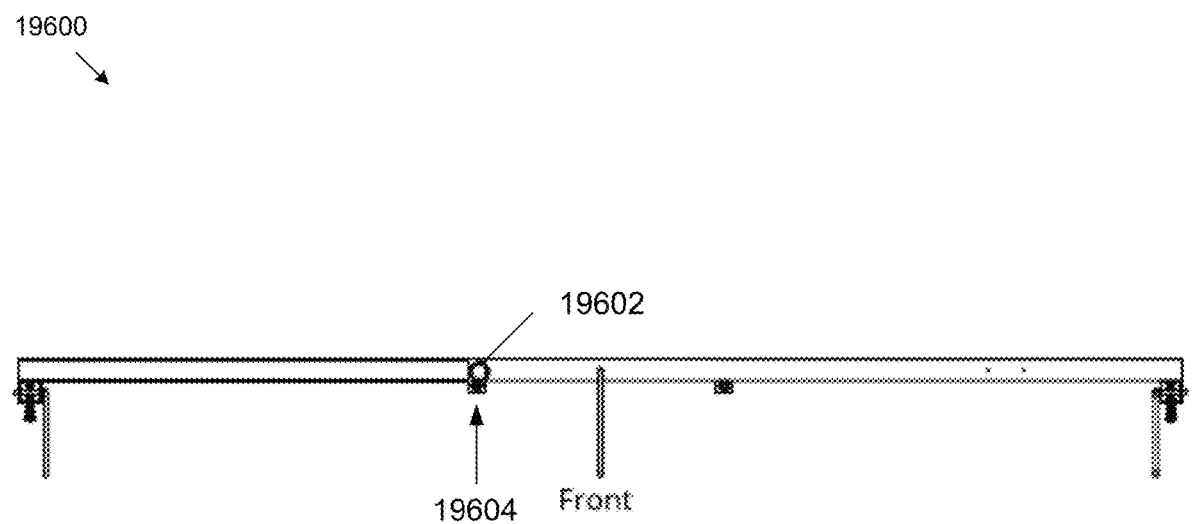

FIG. 196 is a front view of the mounting apparatus of FIG. 193.

Figure 197:
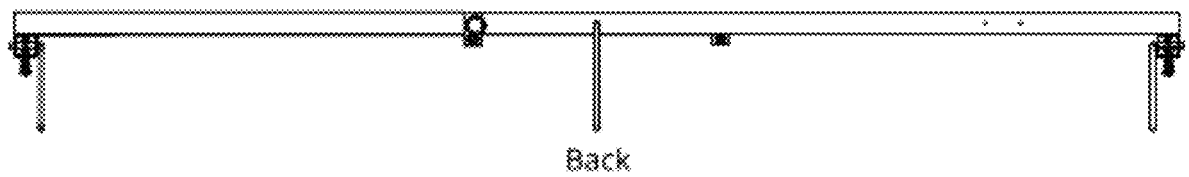

FIG. 197 is a back view of the mounting apparatus of FIG. 193.

Figure 198:
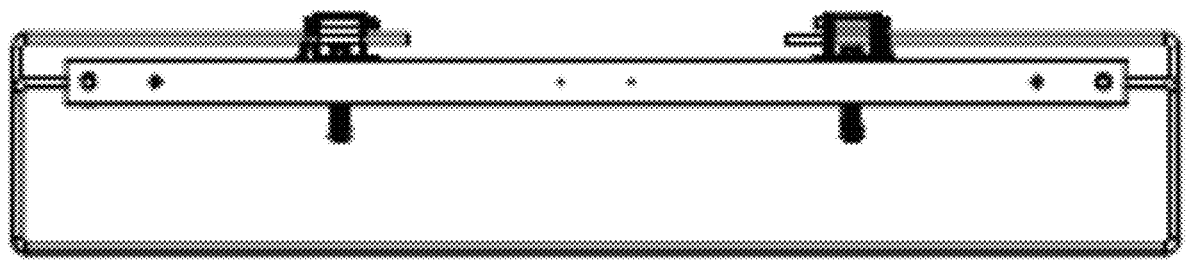

FIG. 198 is a left view of the mounting apparatus of FIG. 193.

Figure 199:
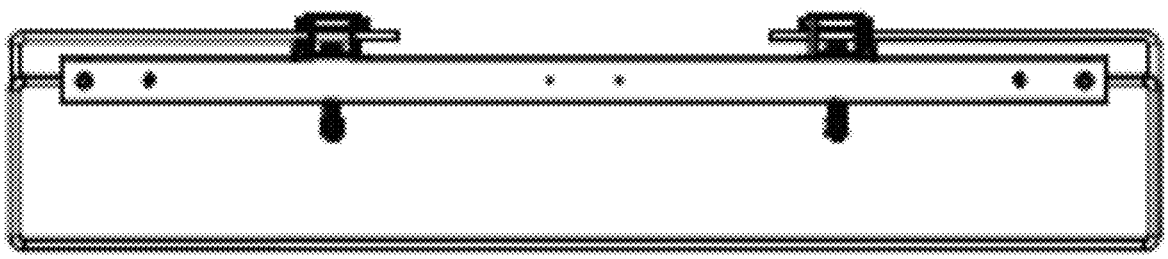

FIG. 199 is a right view of the mounting apparatus of FIG. 193.

Figure 200:
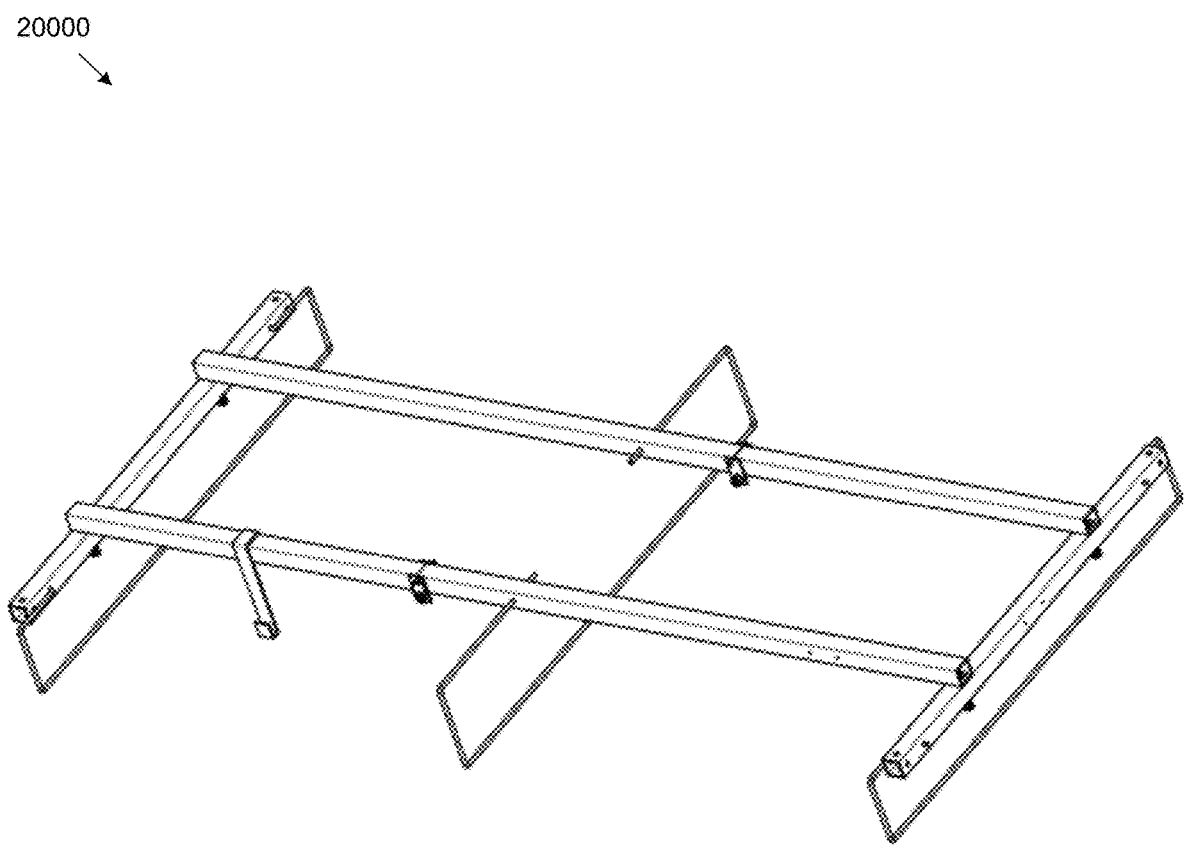

FIG. 200 is a perspective view of another mounting apparatus variant, depicting a base frame with drain pan hangers, sliding pins, and a hook variant sensor hanger, while excluding leveling indicators.

Figure 201:
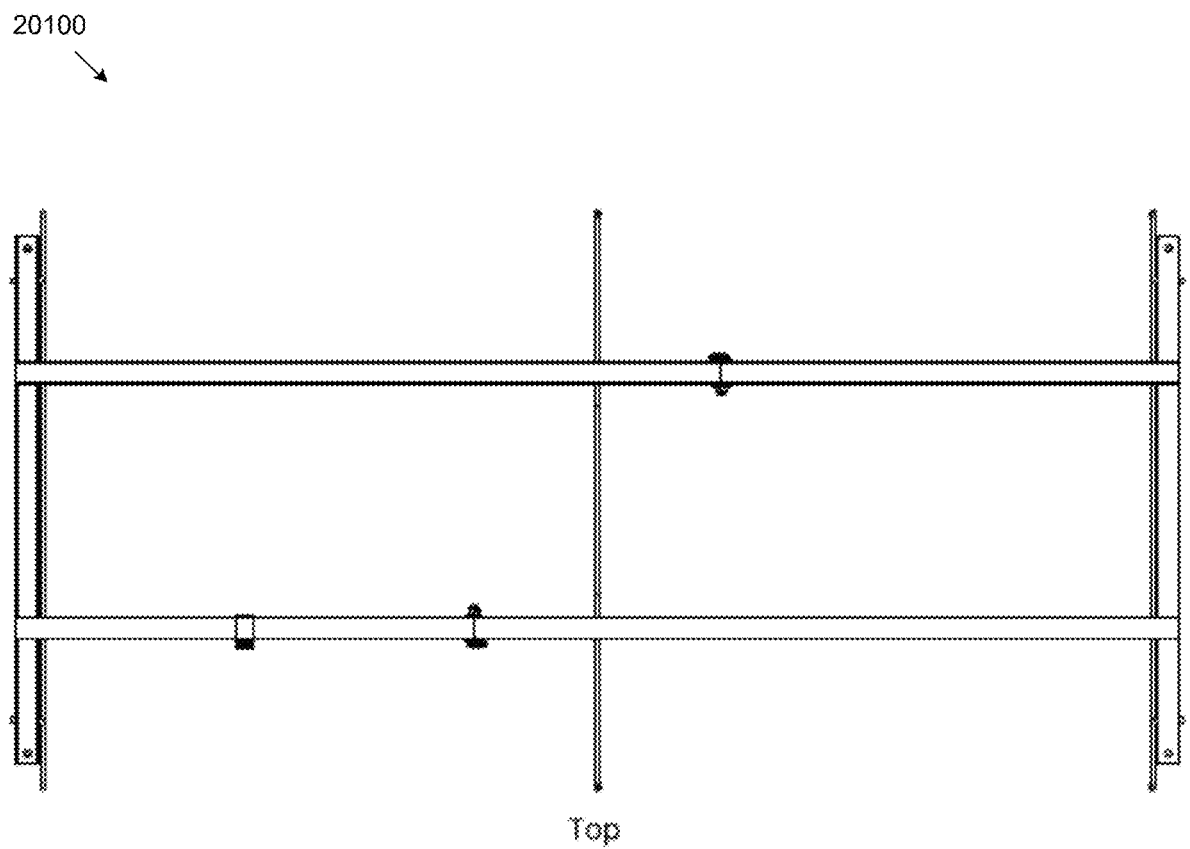

FIG. 201 is a top view of the mounting apparatus of FIG. 200.

Figure 202:
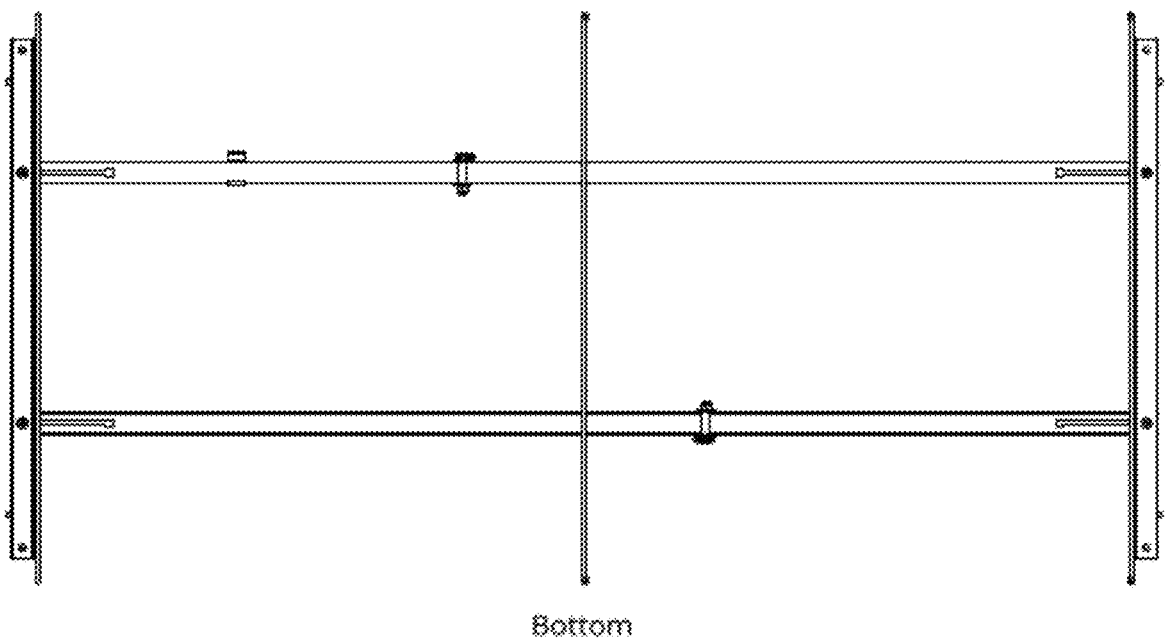

FIG. 202 is a bottom view of the mounting apparatus of FIG. 200.

Figure 203:
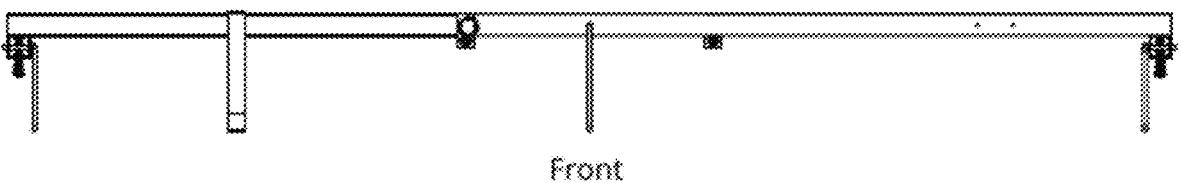

FIG. 203 is a front view of the mounting apparatus of FIG. 200.

Figure 204:
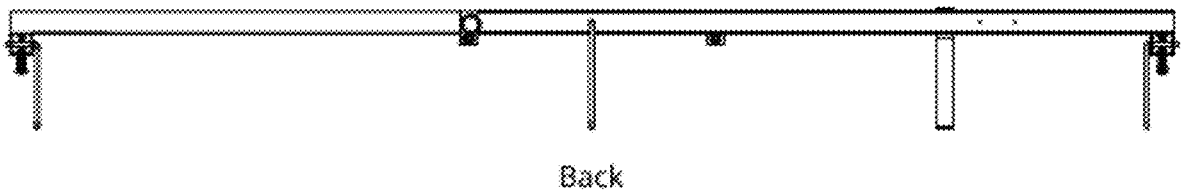

FIG. 204 is a back view of the mounting apparatus of FIG. 200.

Figure 205:
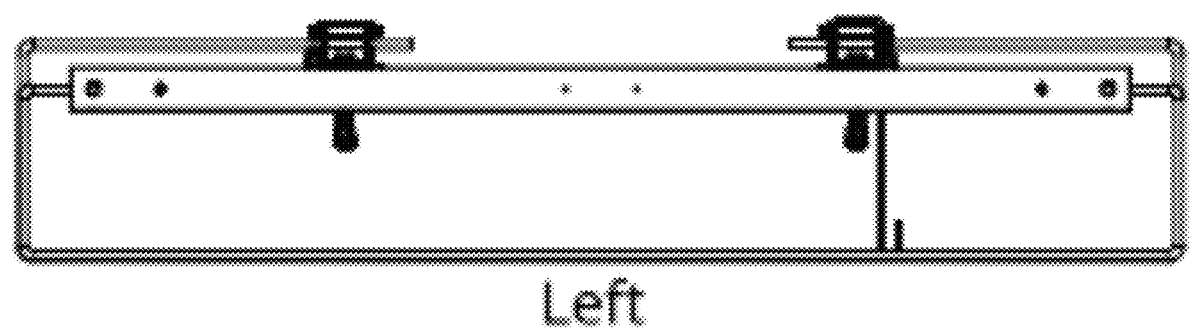

FIG. 205 is a left view of the mounting apparatus of FIG. 200.

Figure 206:
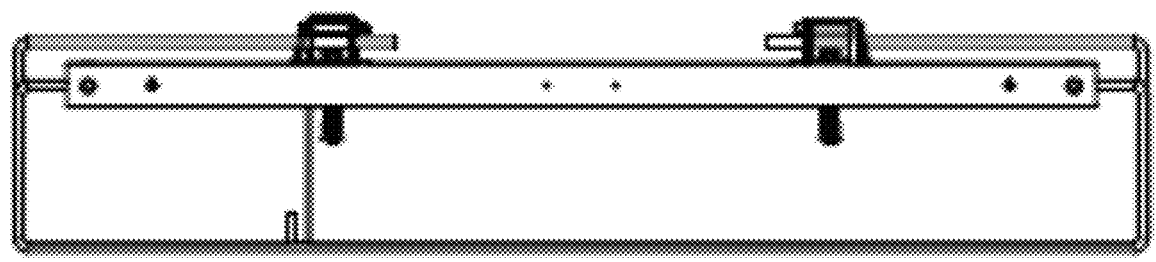

FIG. 206 is a right view of the mounting apparatus of FIG. 200.

Figure 207:
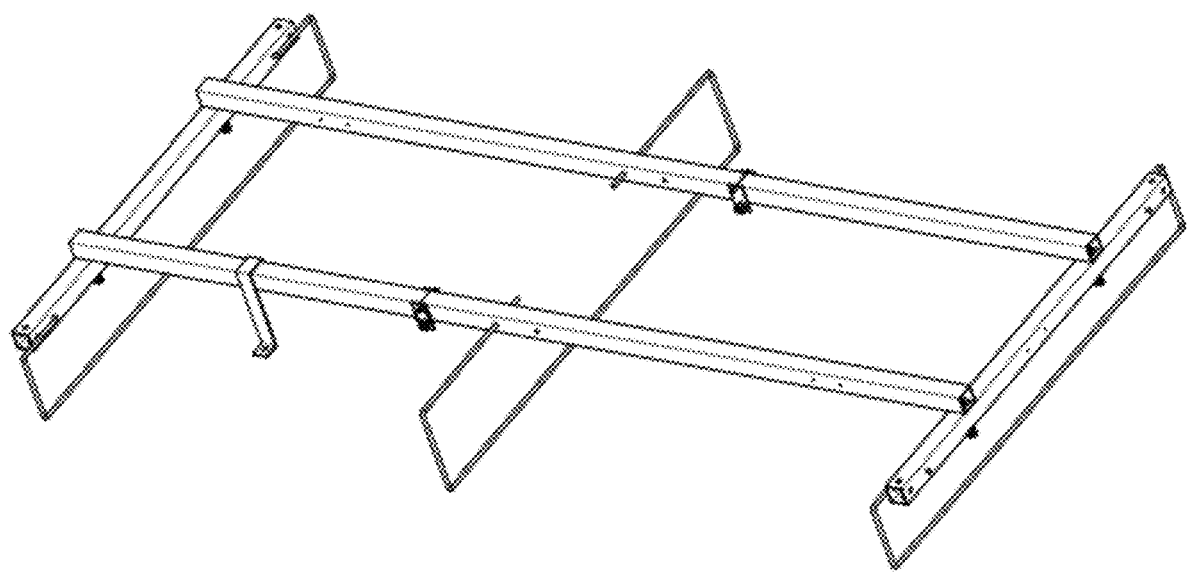

FIG. 207 is a perspective view of another mounting apparatus variant, depicting a base frame with drain pan hangers, sliding pins, and a hook variant sensor hanger, while excluding leveling indicators.

Figure 208:
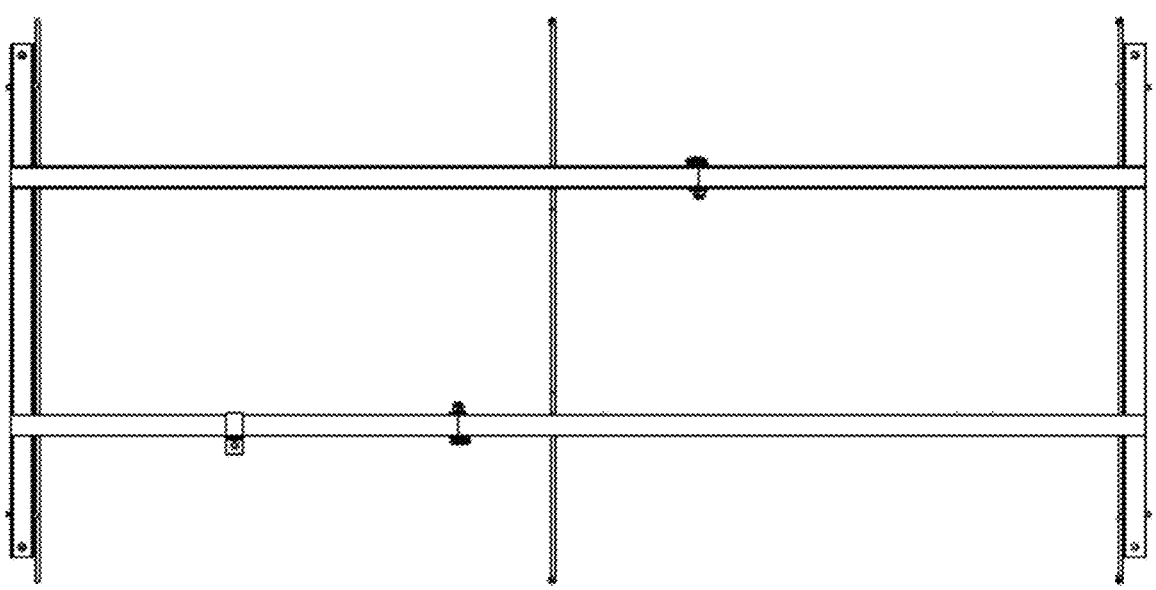

FIG. 208 is a top view of the mounting apparatus of FIG. 207.

Figure 209:
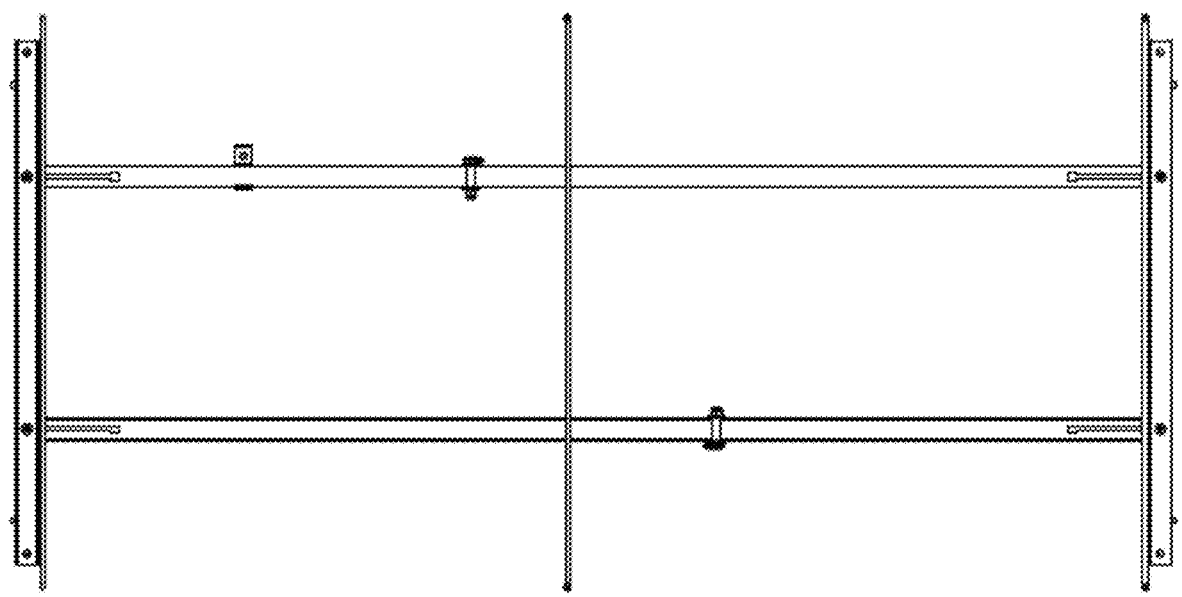

FIG. 209 is a bottom view of the mounting apparatus of FIG. 207.

Figure 210:
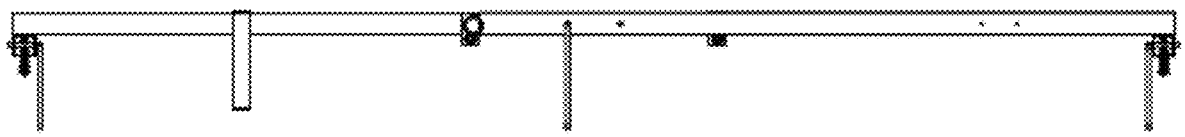

FIG. 210 is a front view of the mounting apparatus of FIG. 207.

Figure 211:
Figure 211:
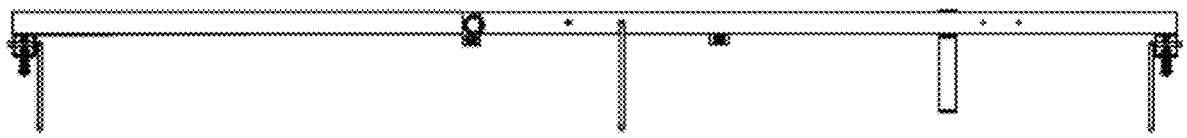

FIG. 211 is a back view of the mounting apparatus of FIG. 207.

Figure 212:
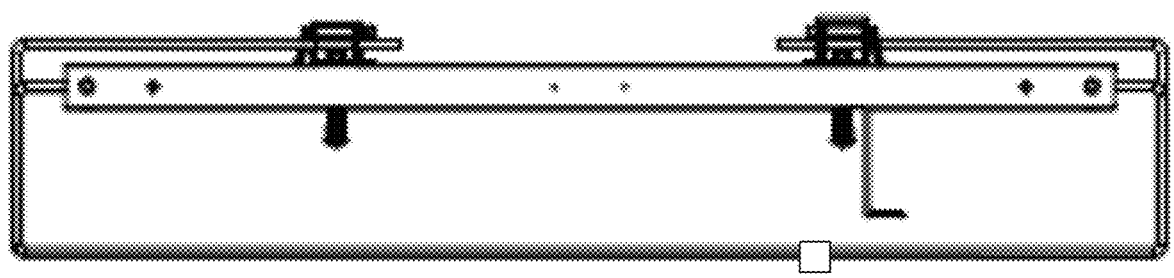

FIG. 212 is a left view of the mounting apparatus of FIG. 207.

Figure 213:
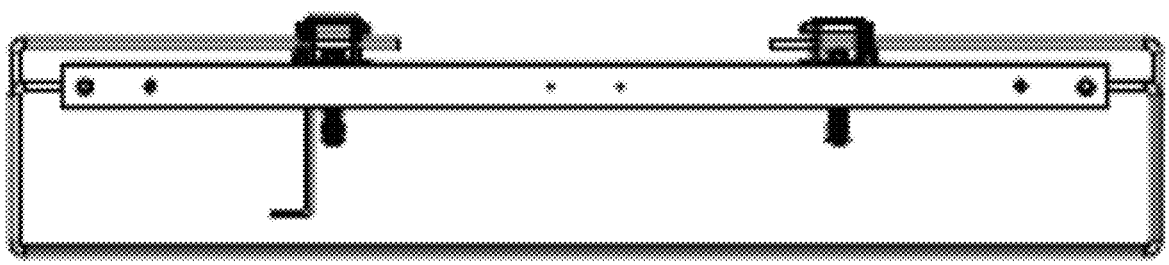

FIG. 213 is a right view of the mounting apparatus of FIG. 207.

Figure 214:
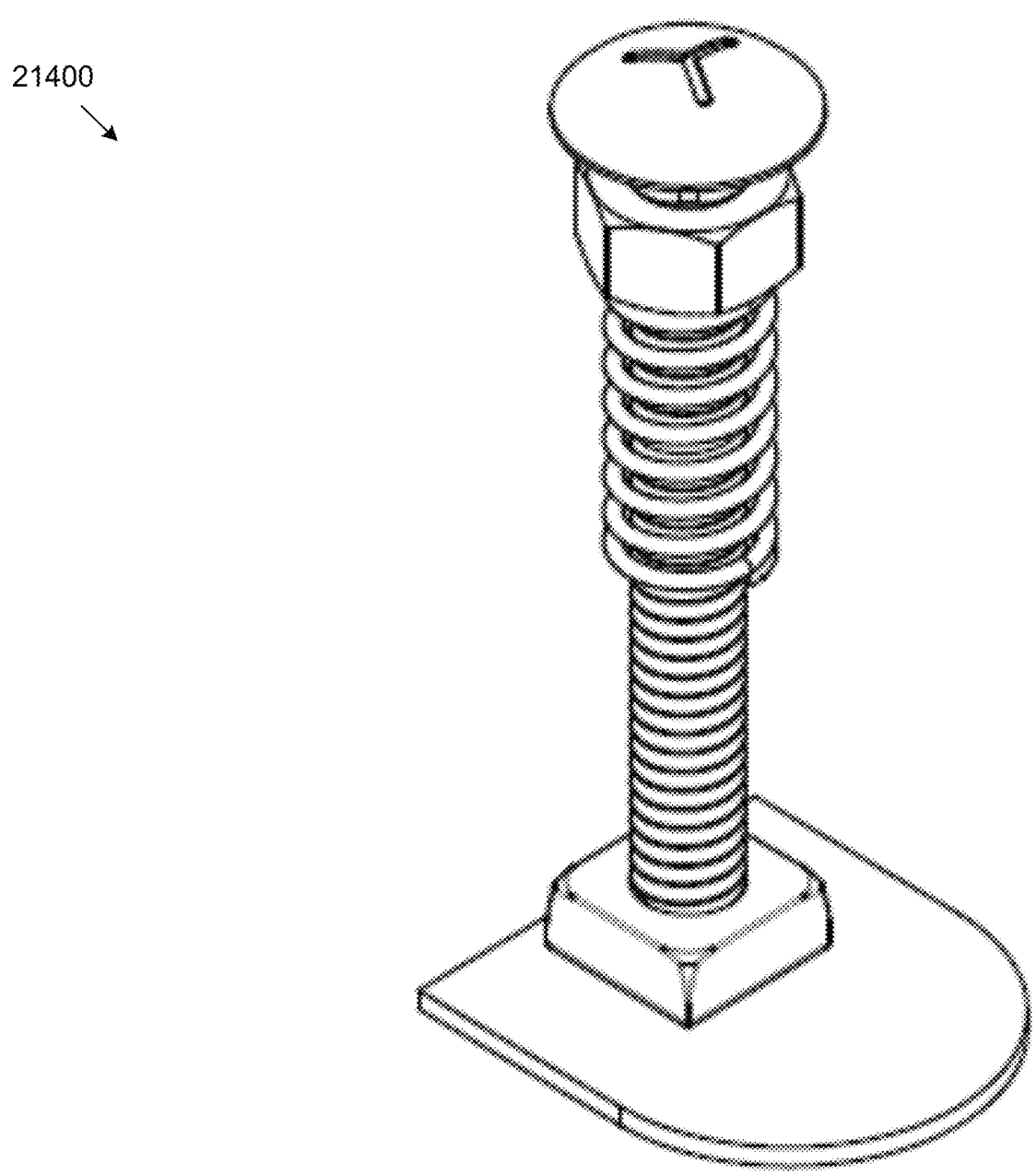

FIG. 214 is a perspective view of a sliding pin.

Figure 215:
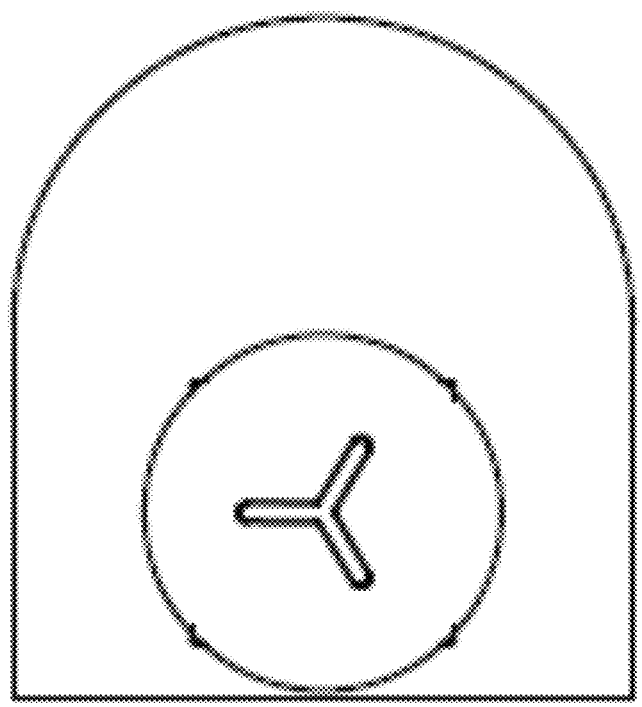

FIG. 215 is a top view of the sliding pin of FIG. 214.

Figure 216:
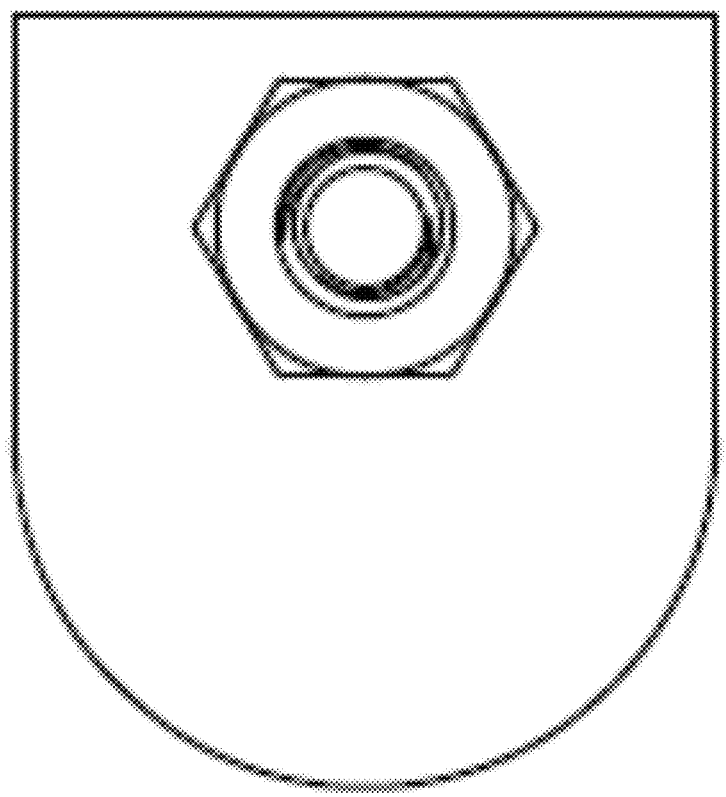

FIG. 216 is a bottom view of the sliding pin of FIG. 214.

Figure 217:
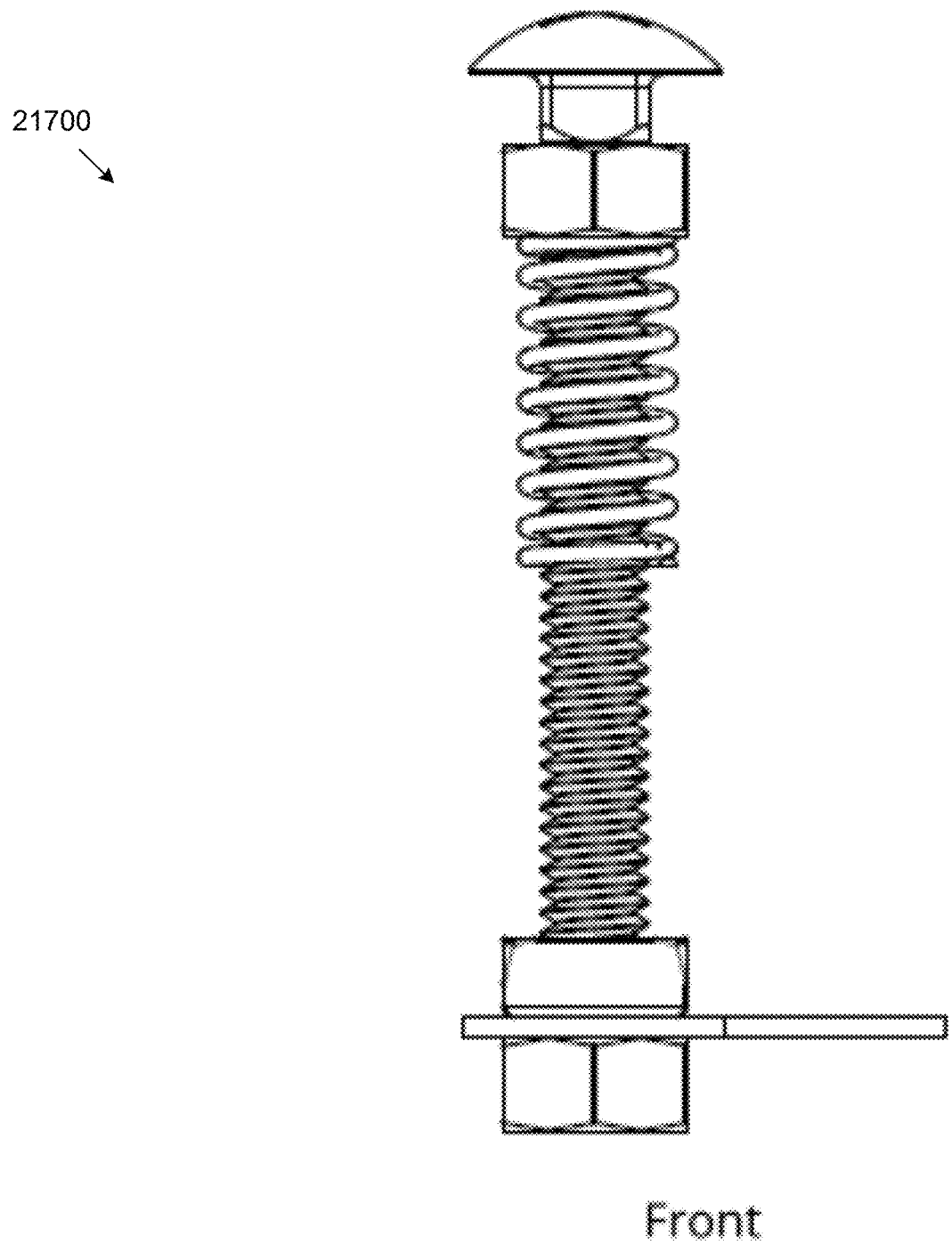

FIG. 217 is a front view of the sliding pin of FIG. 214.

Figure 218:
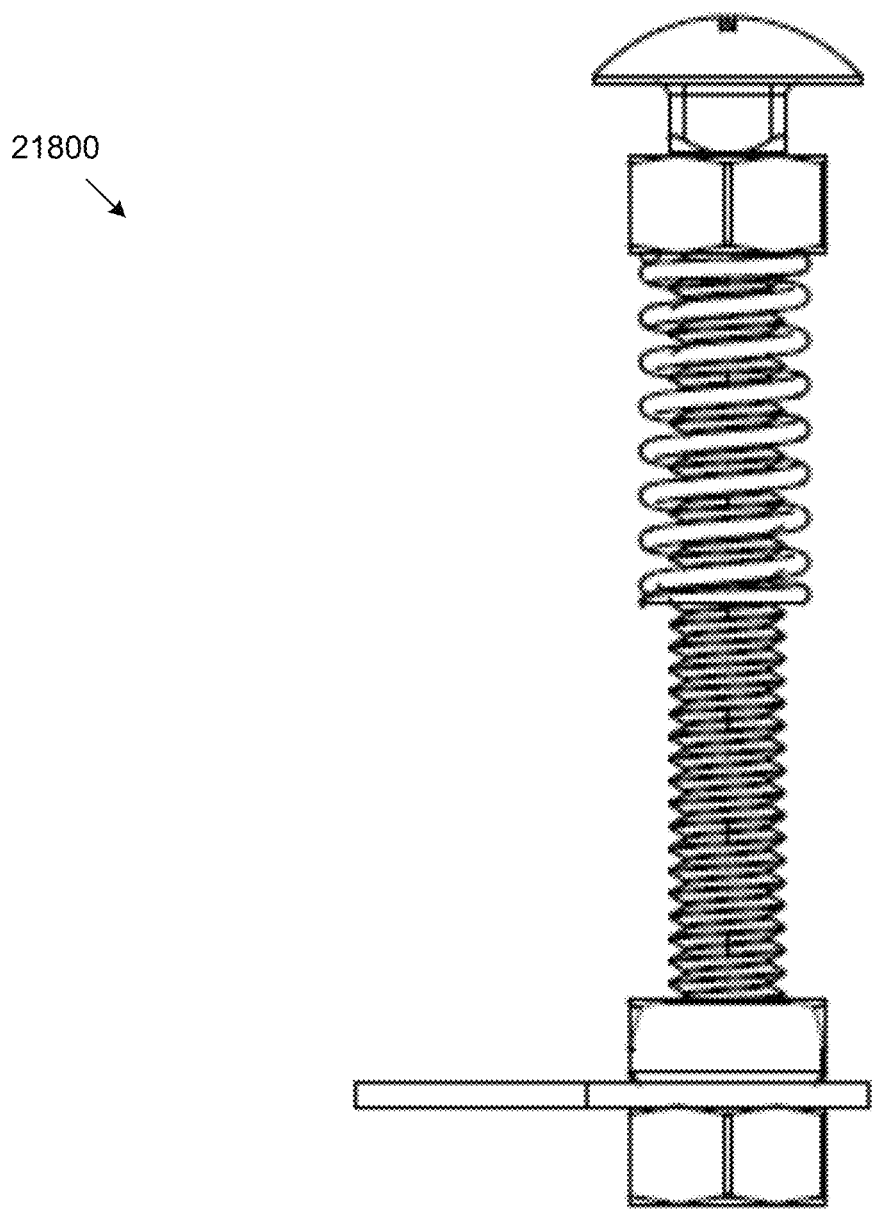

FIG. 218 is a back view of the sliding pin of FIG. 214.

Figure 219:
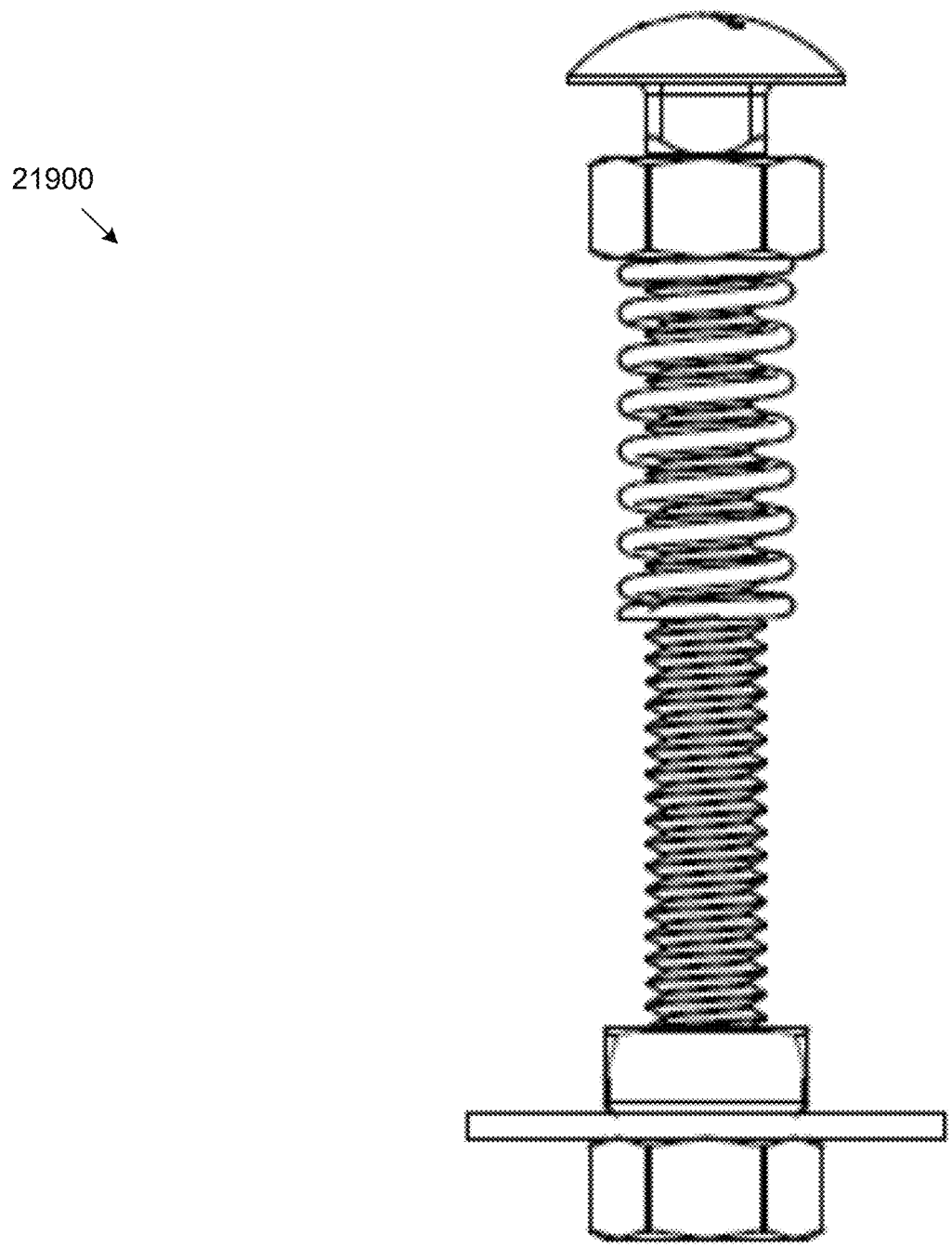

FIG. 219 is a left view of the sliding pin of FIG. 214.

Figure 220:
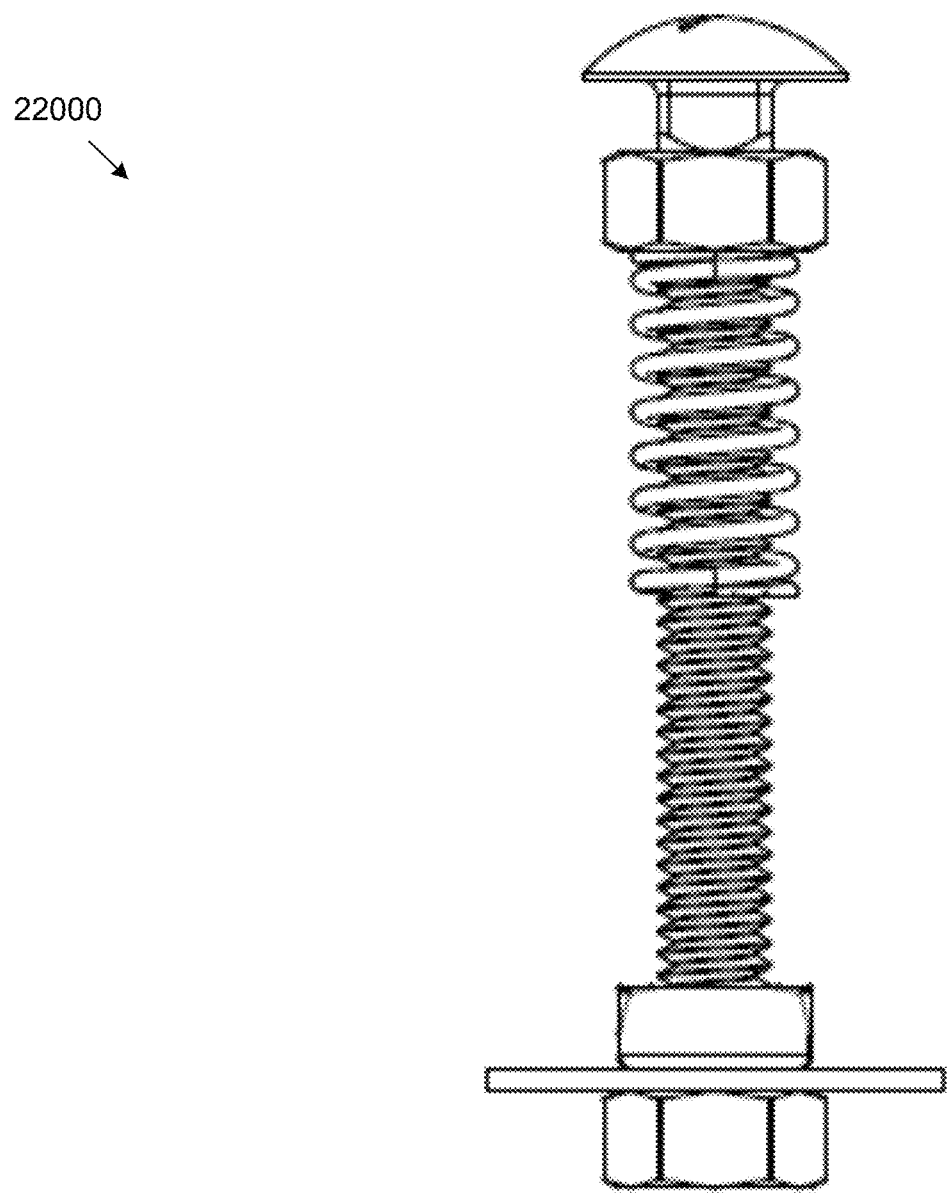

FIG. 220 is a right view of the sliding pin of FIG. 214.

Figure 221:
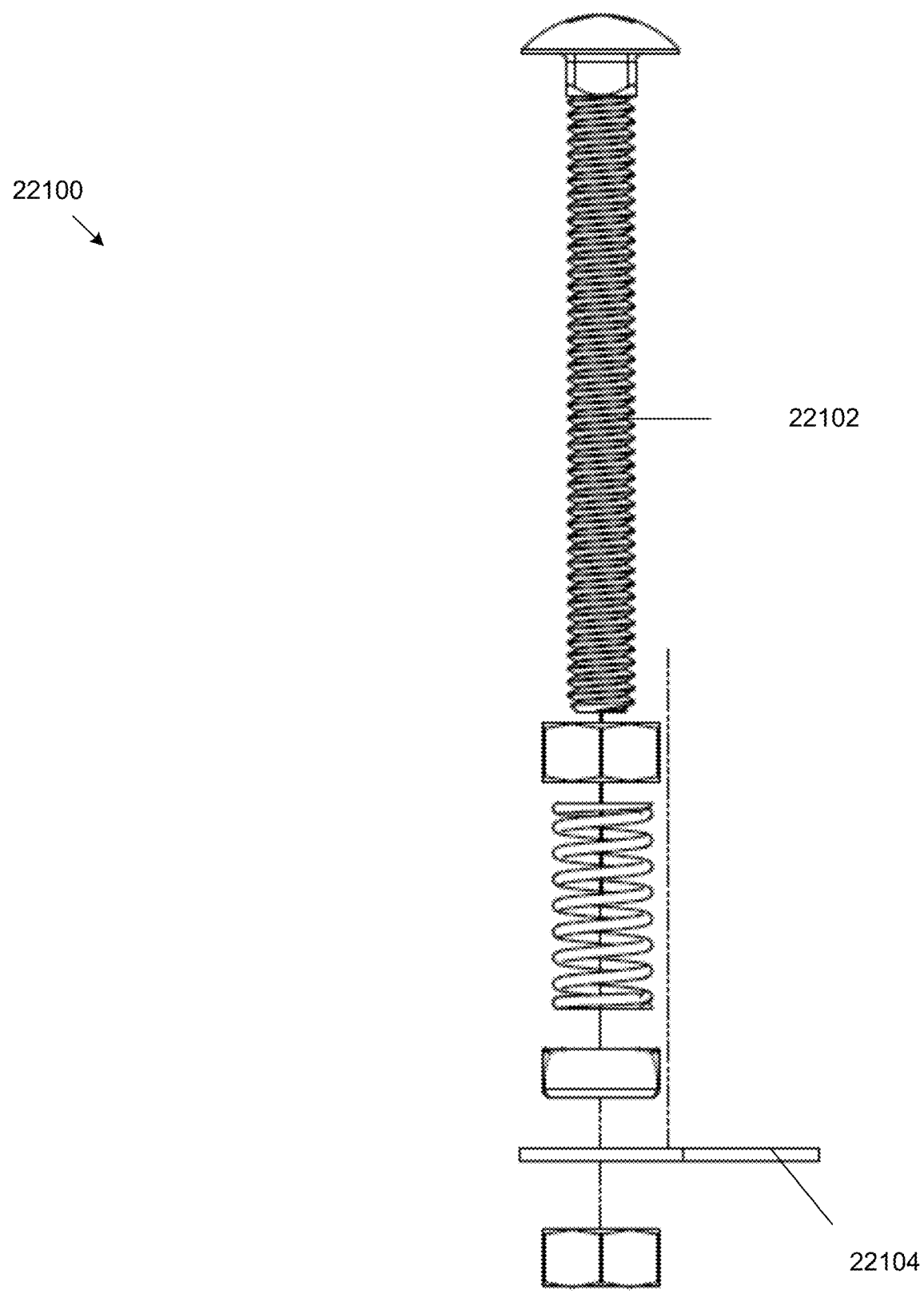

FIG. 221 is a disassembled view of the sliding pin of FIG. 214.

Figure 222:
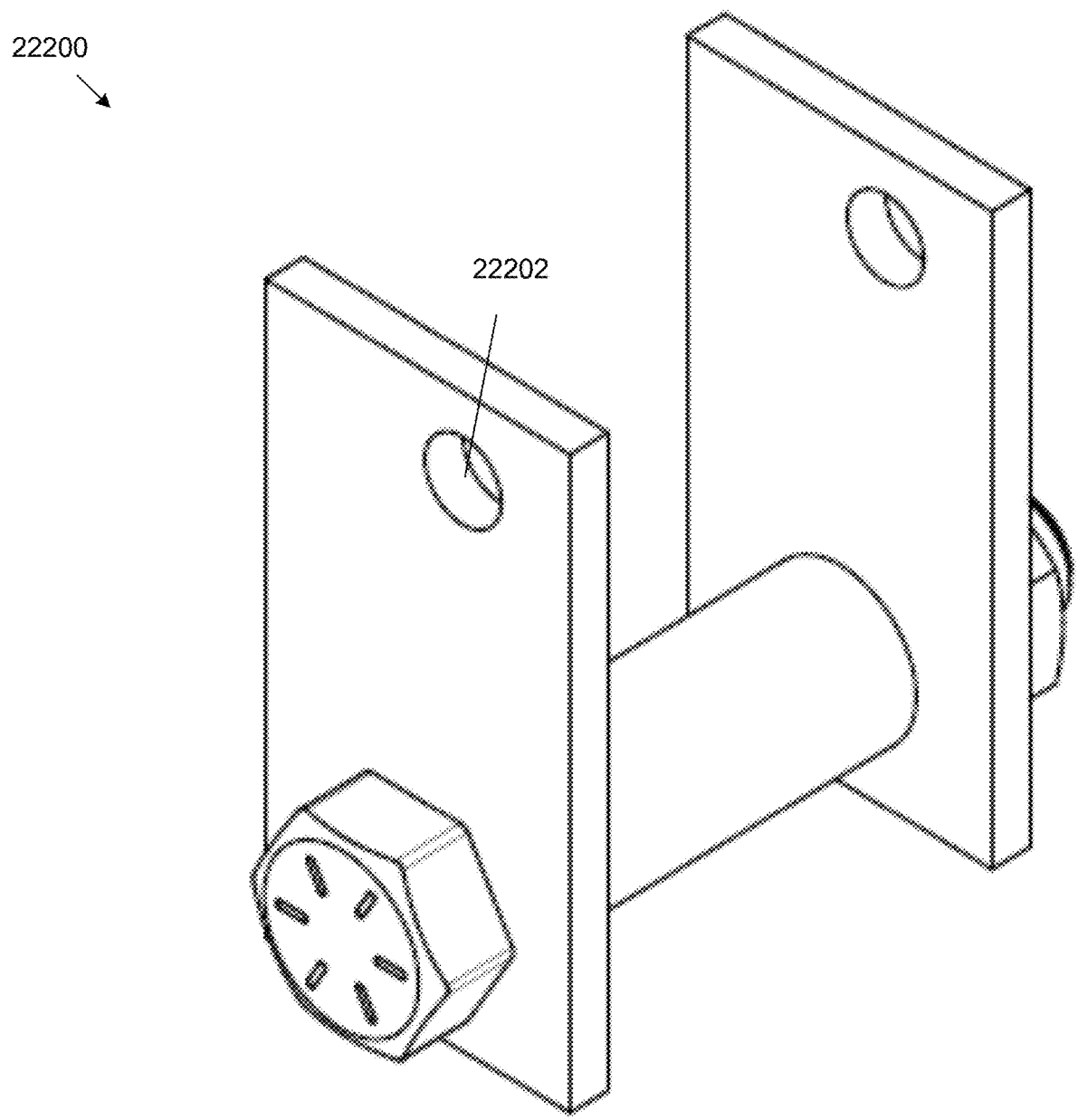

FIG. 222 is a perspective view of a hinge.

Figure 223:
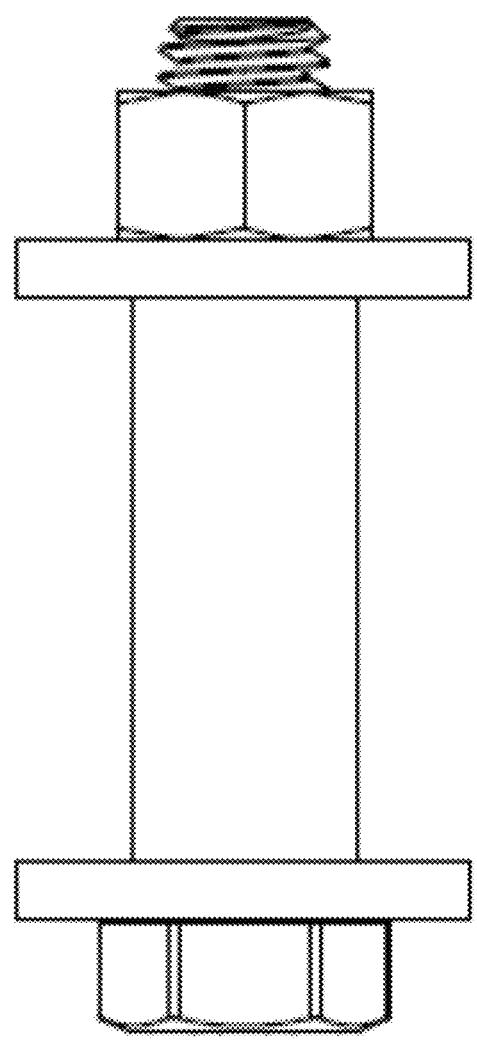

FIG. 223 is a top view of the hinge of FIG. 222.

Figure 224:
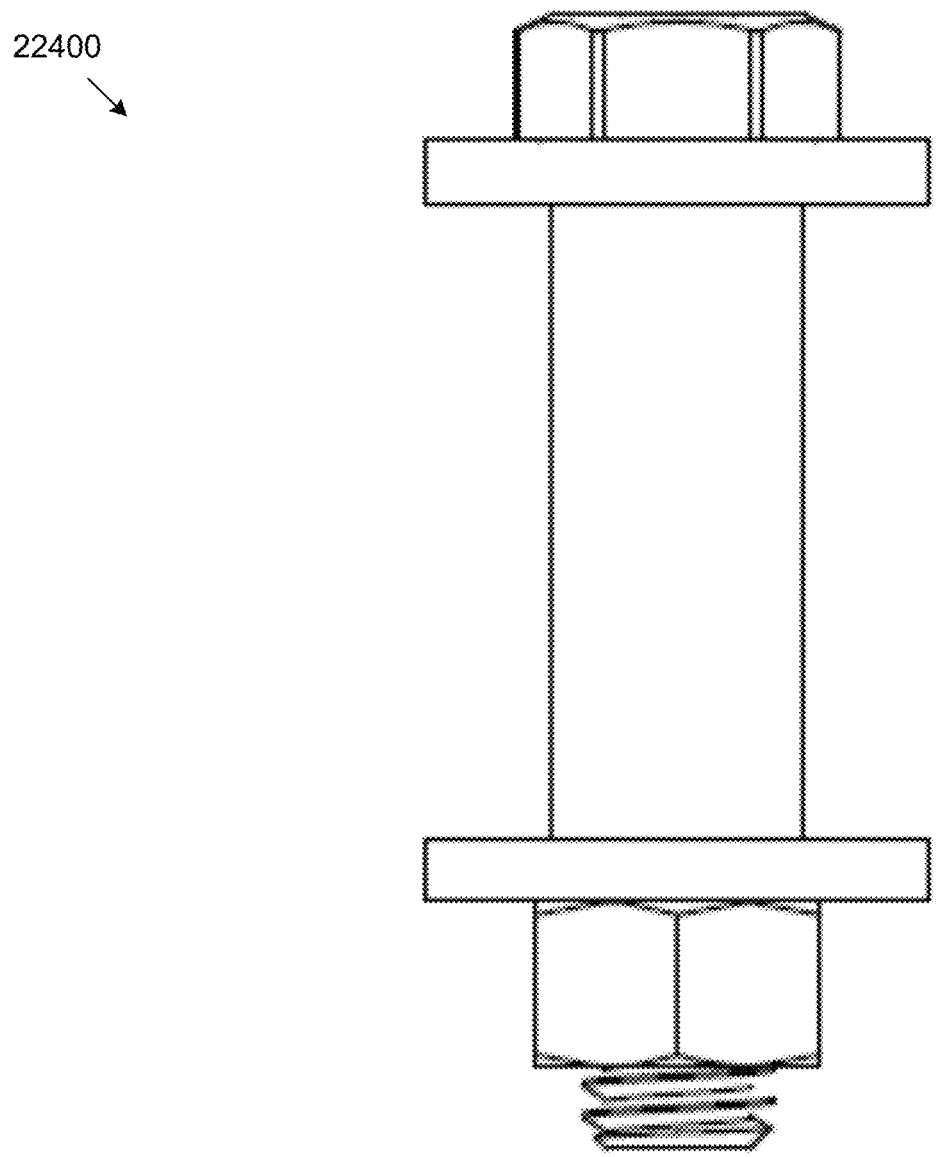

FIG. 224 is a bottom view of the hinge of FIG. 222.

Figure 225:
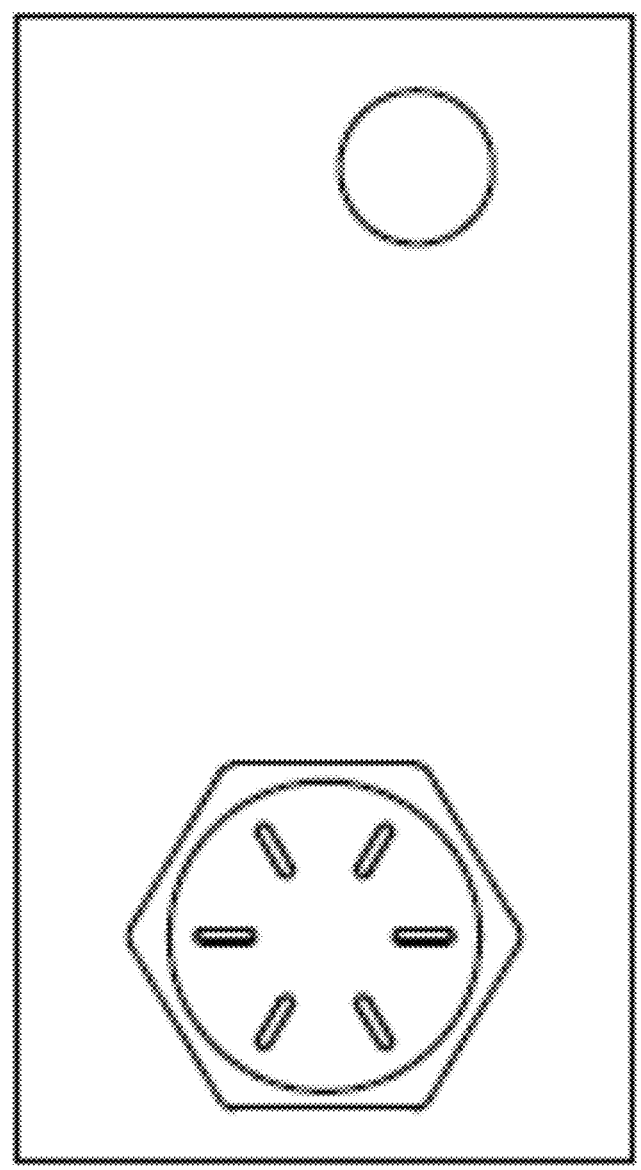

FIG. 225 is a front view of the hinge of FIG. 222.

Figure 226:
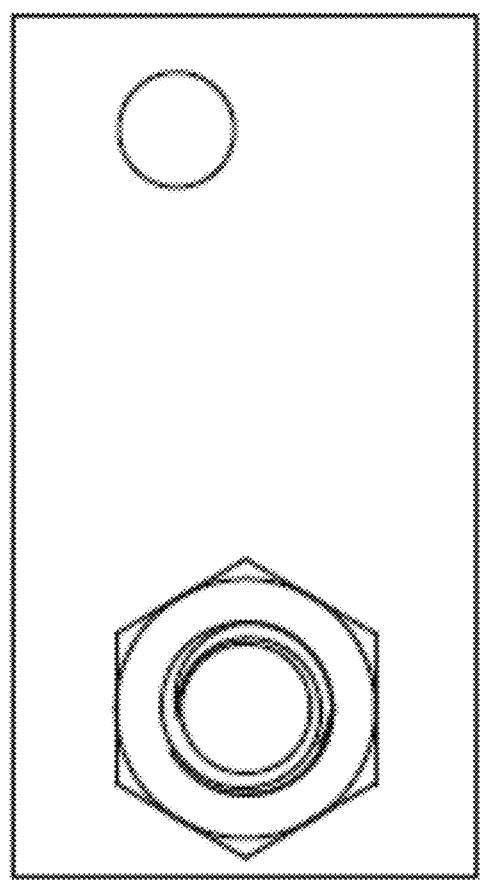

FIG. 226 is a back view of the hinge of FIG. 222.

Figure 227:
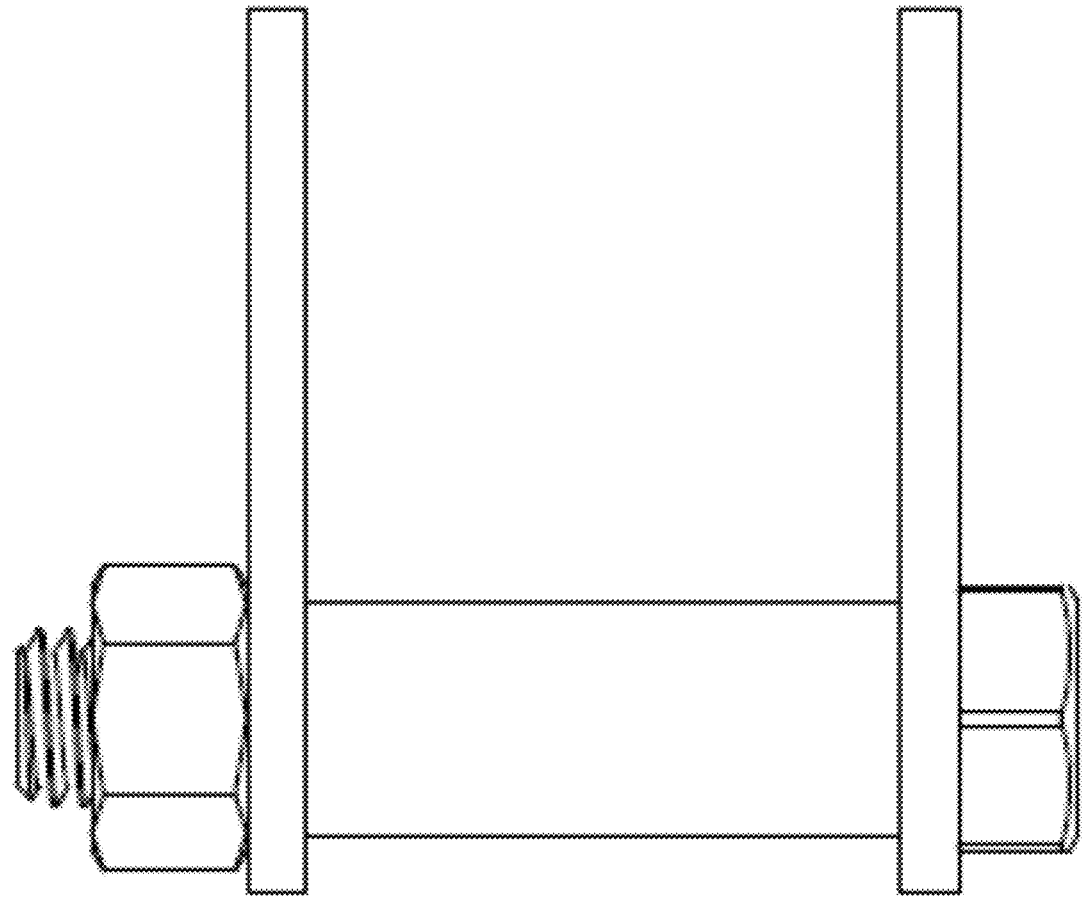

FIG. 227 is a left view of the hinge of FIG. 222.

Figure 228:
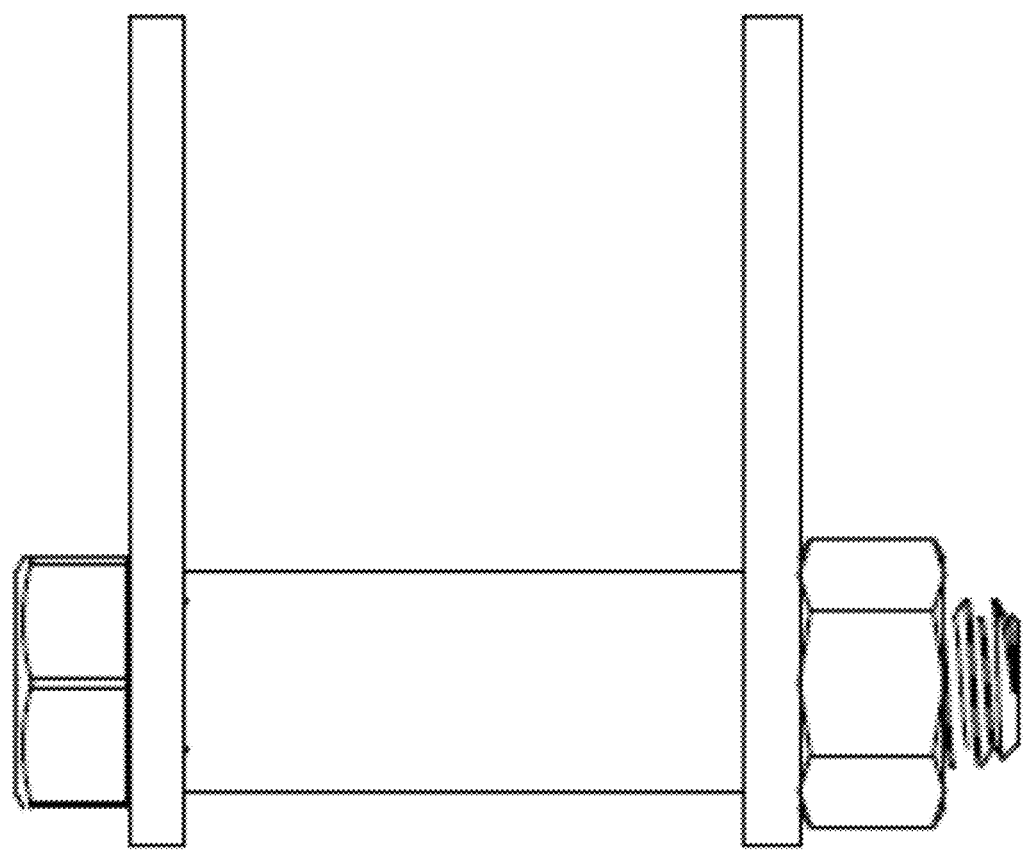

FIG. 228 is a right view of the hinge of FIG. 222.

Figure 229:
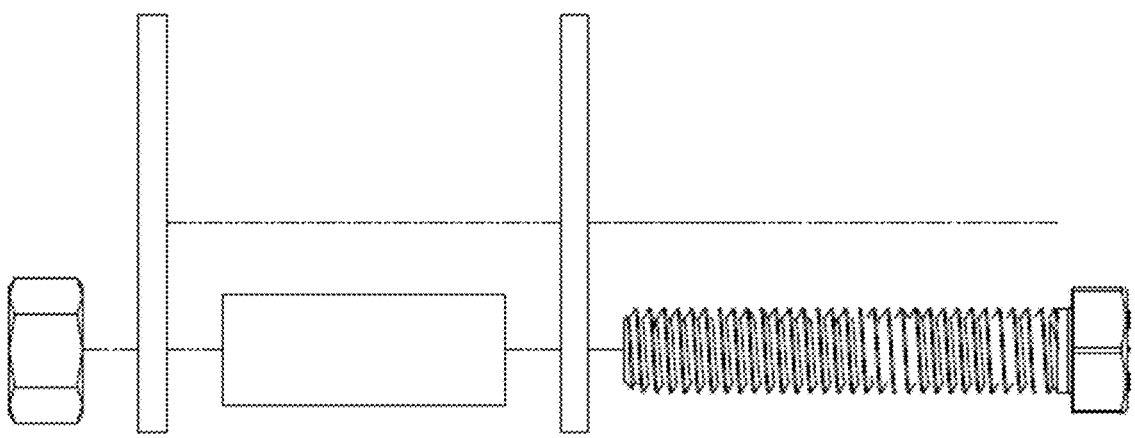

FIG. 229 is a disassembled view of the hinge of FIG. 222.

Figure 230:
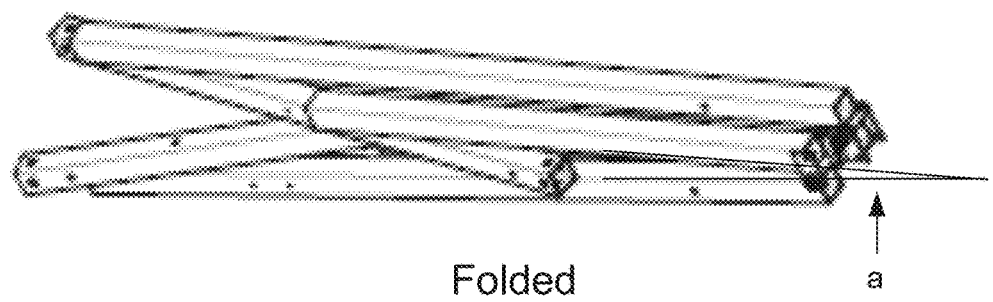

FIG. 230 is a perspective view of the folded mounting apparatus.

Figure 231:
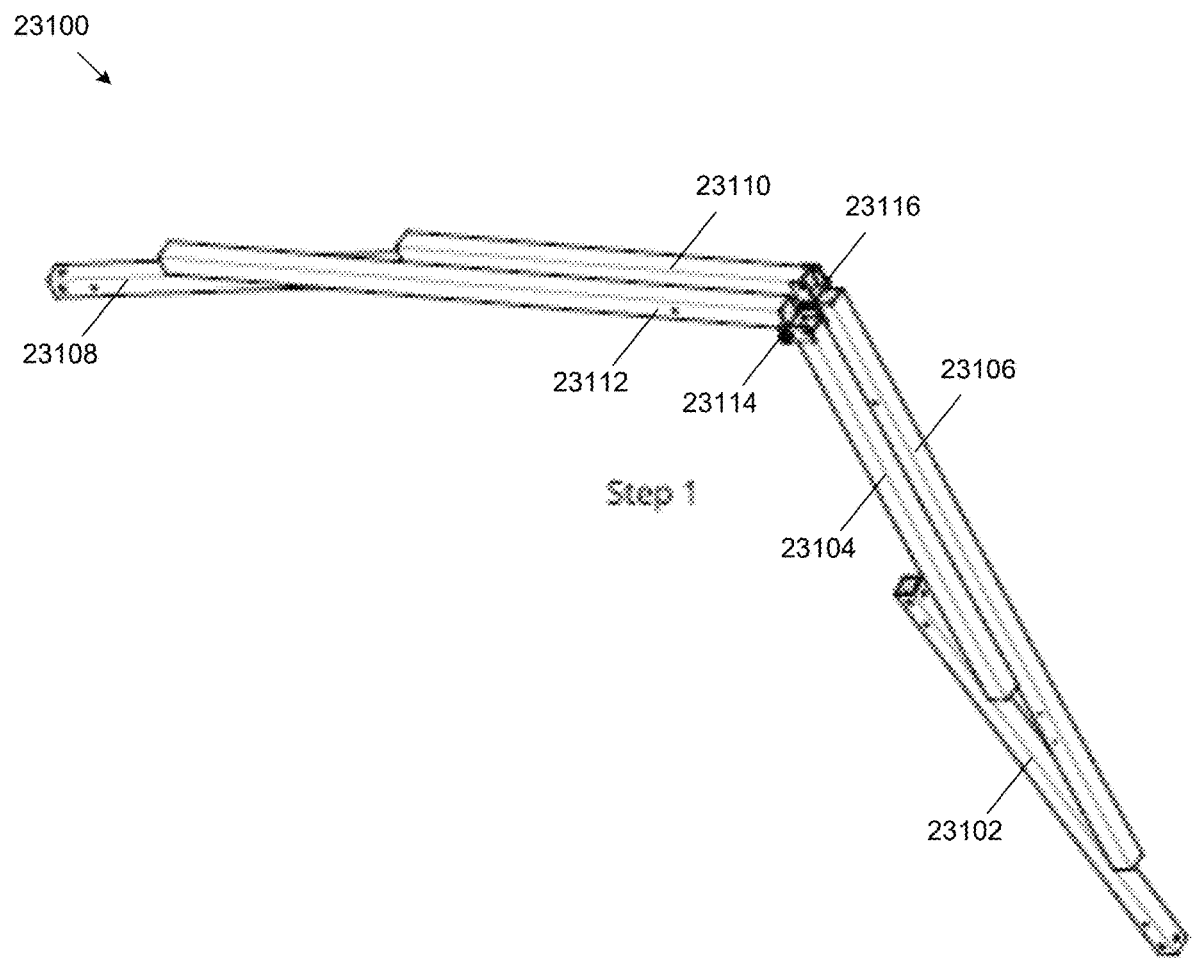

FIG. 231 is a perspective view of the first step in unfolding the folded mounting apparatus of FIG. 230.

Figure 232:
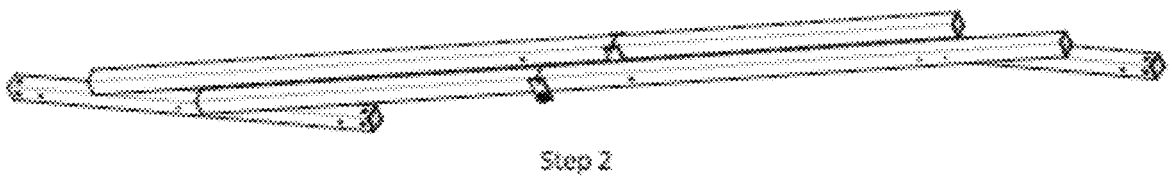

FIG. 232 is a perspective view of the second step in unfolding the folded mounting apparatus of FIG. 230.

Figure 233:
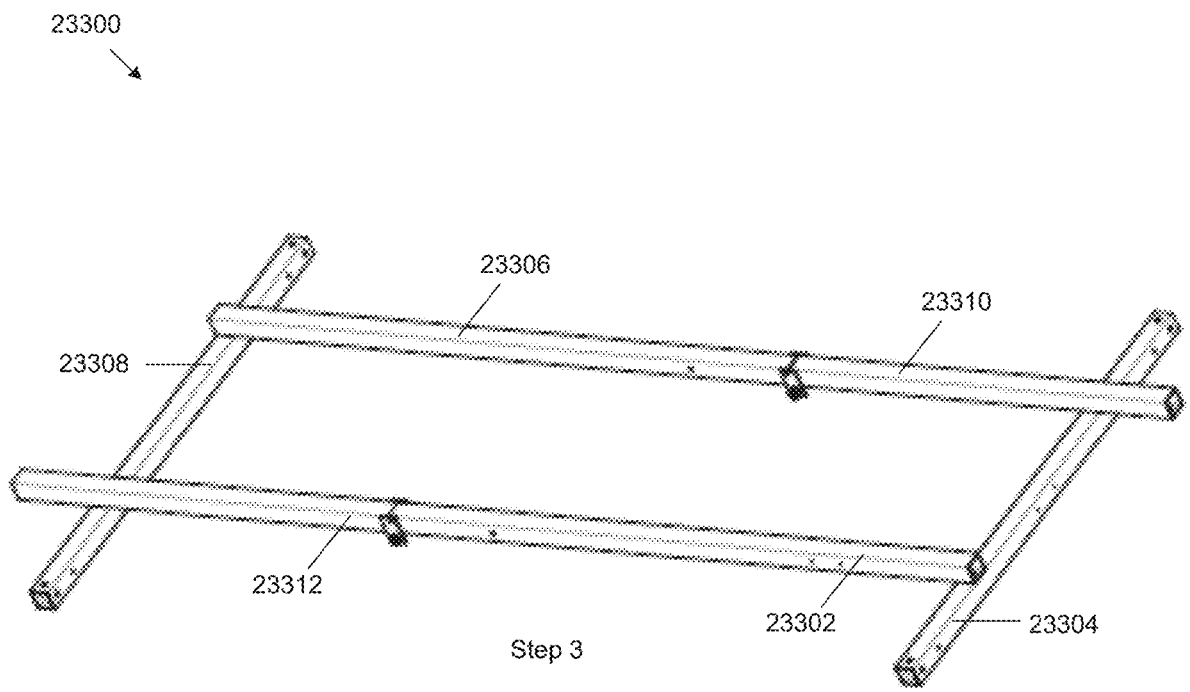

FIG. 233 is a perspective view of the third step in unfolding the folded mounting apparatus of FIG. 230.

Figure 234:
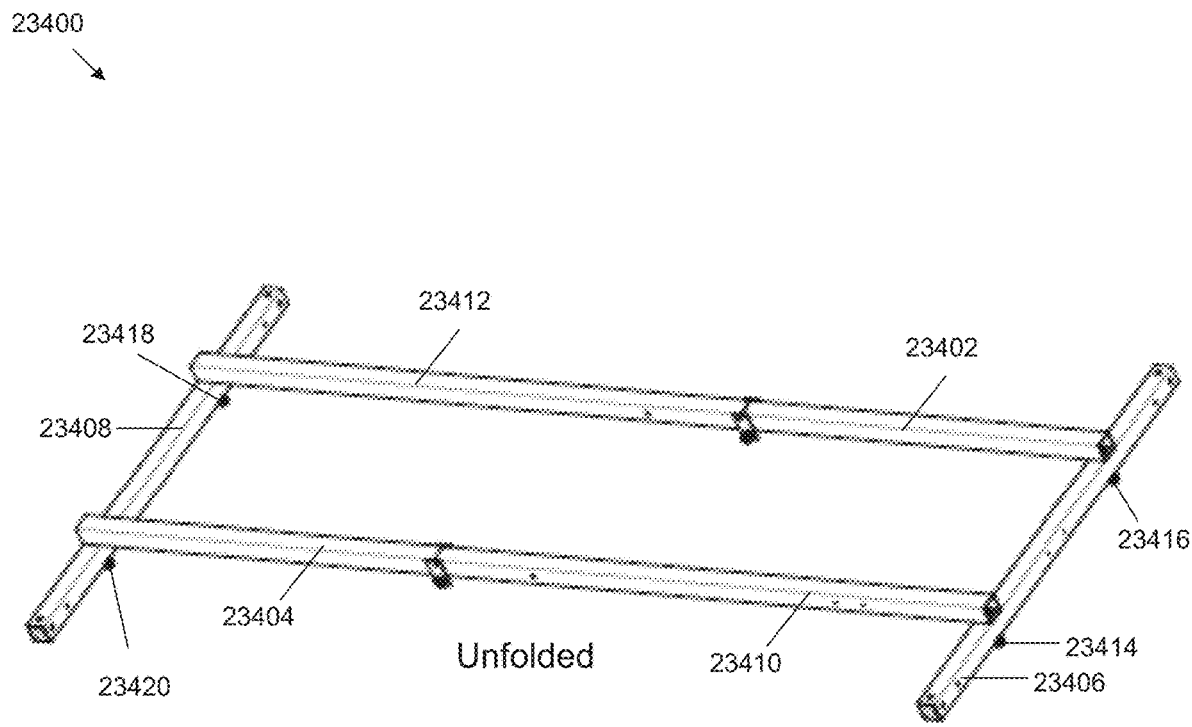

FIG. 234 is a perspective view of the fourth step in unfolding the folded mounting apparatus of FIG. 230.

DETAILED DESCRIPTION

Figure 1:
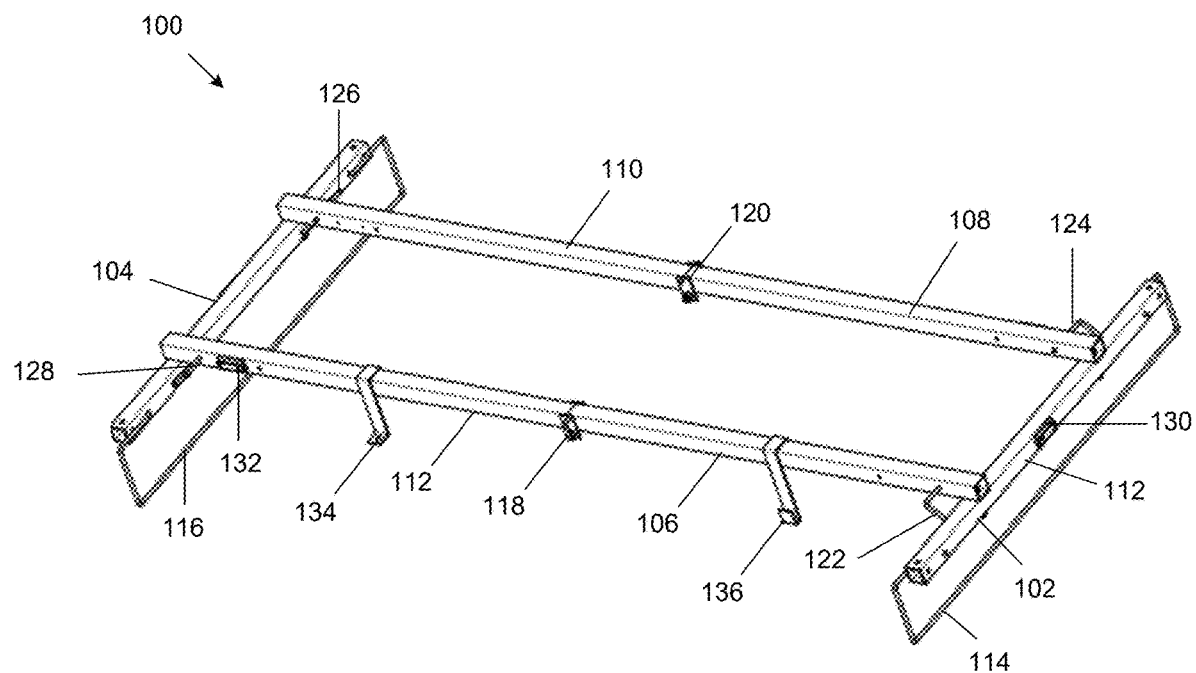
FIG. 1 is a perspective view of a mounting apparatus, depicting pins, drain pan hangers, sensor hangers, and leveling indicators.

An air handler mounting system is shown in FIGS. 1-7, as well as in other figures described below. The mounting system allows users to fold, stow (e.g., store), and extend the system, and enables users to install a variety of Heating, Ventilation, and Air Conditioning (HVAC) systems. Referring to FIG. 1, the presented air handler mounting system (e.g., mounting system 100) includes a first fixed length support beam (102) and a second fixed length support beam (104) located parallel to one another, separated by a first distance. The apparatus further includes a first adjustable support beam (106) and a second adjustable support beam (108) fixed perpendicular to the first fixed length support beam, and a third adjustable support beam (110) and a fourth adjustable support beam (112) fixed perpendicular to the second fixed length support beam (104), wherein the first adjustable support beam and the fourth adjustable support beam are separated by a second distance to the second adjustable support beam and the third adjustable support beam. In some implementations, the first fixed length support beam (102) and a second fixed length support beam (104) are located approximately parallel to one another. Furthermore, the first adjustable support beam (106) and the second adjustable support beam (108) may be fixed approximately perpendicular to the first fixed length support beam, and the third adjustable support beam (110) and fourth adjustable support beam (112) may be fixed approximately perpendicular to the second fixed length support beam (104).

The apparatus may also include a drain pan hanger assembly with a first drain pan hanger (114) fixed to the first fixed length support beam and a second drain pan hanger (116) fixed to the second fixed length support beam, each configured to support a sliding drain pan structure. The system may further include a folding mechanism with a first folding assembly (118) positioned between the first and fourth adjustable support beams, and a second folding assembly (120) positioned between the second and third adjustable support beams. Finally, the system may include a locking mechanism, which may employ a first pin (122) configured between the first adjustable support beam and the first fixed length support beam, a second pin (124) configured between the second adjustable support beam and the first fixed length support beam, a third pin (126) configured between the third adjustable support beam and the second fixed length support beam, and a fourth pin (128) configured between the fourth adjustable support beam and the second fixed length support beam.

Figure 2:
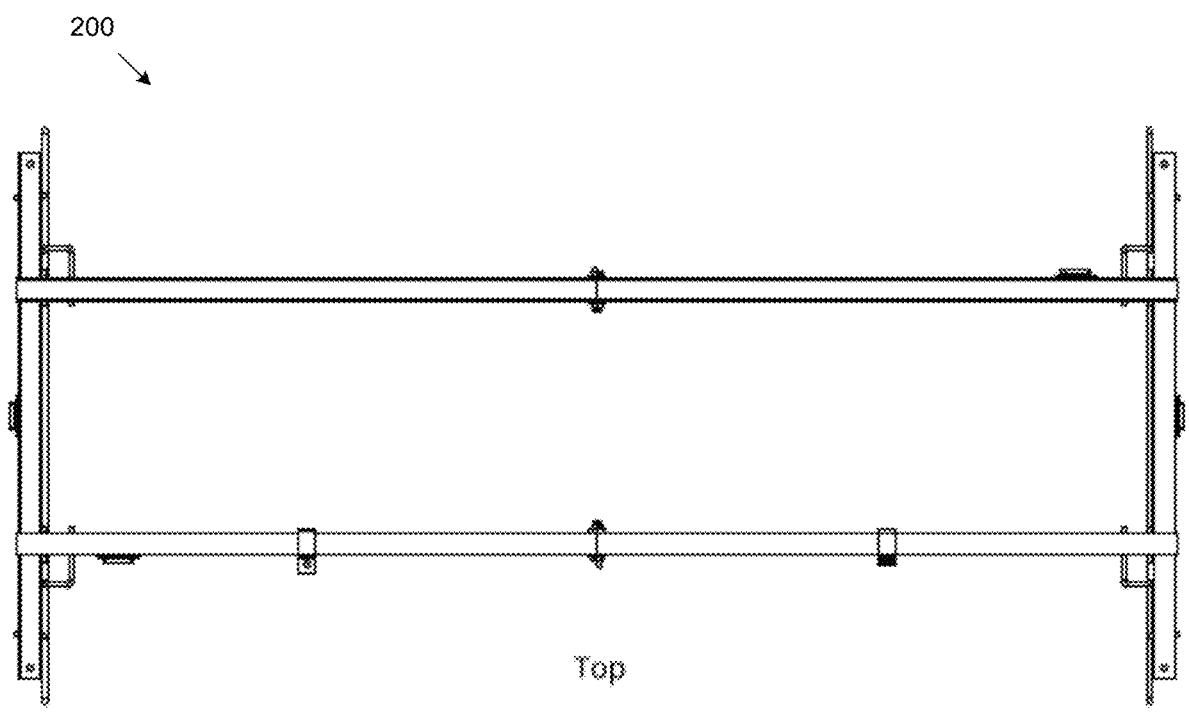
FIG. 2 is a top view of the mounting apparatus of FIG. 1.
Figure 3:
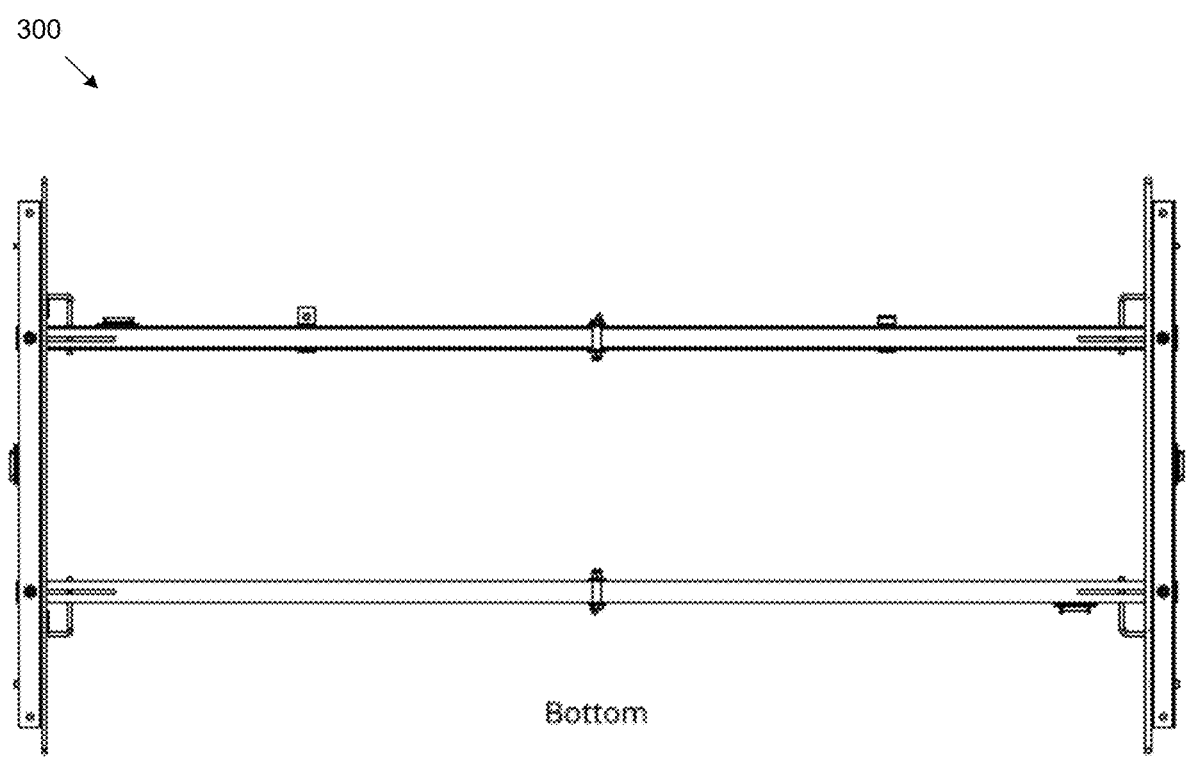
FIG. 3 is a bottom view of the mounting apparatus of FIG. 1.
Figure 4:
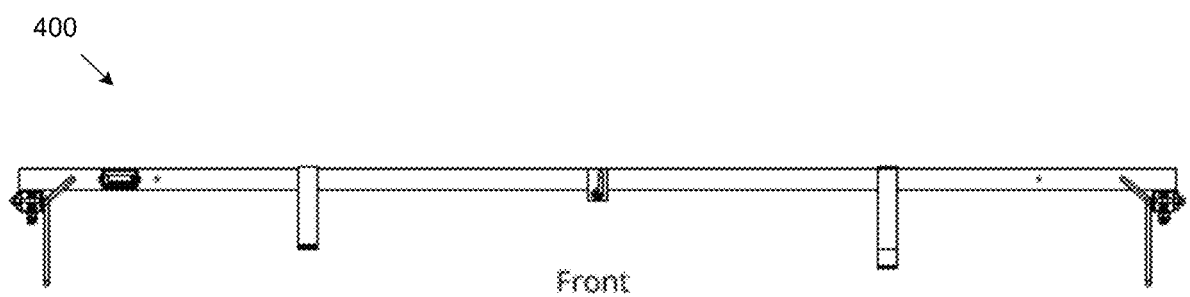
FIG. 4 is a front view of the mounting apparatus of FIG. 1.
Figure 5:
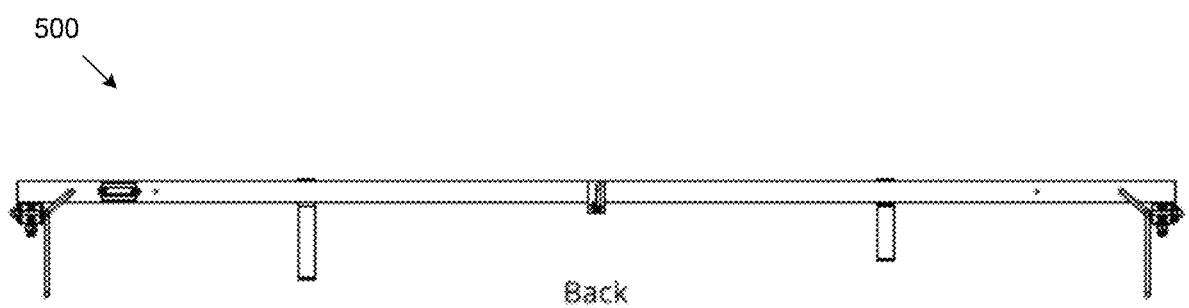
FIG. 5 is a back view of the mounting apparatus of FIG. 1.
Figure 6:
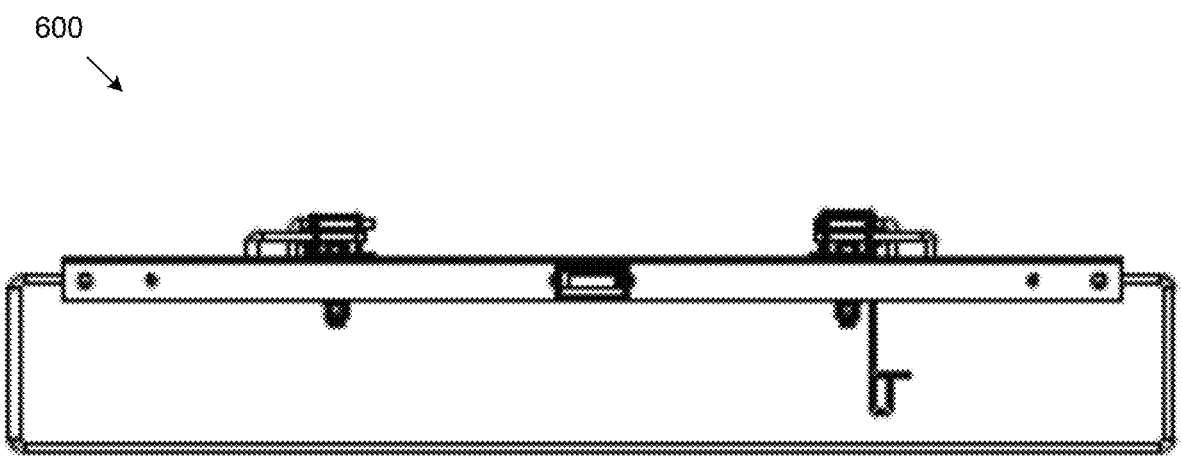
FIG. 6 is a left view of the mounting apparatus of FIG. 1.
Figure 7:
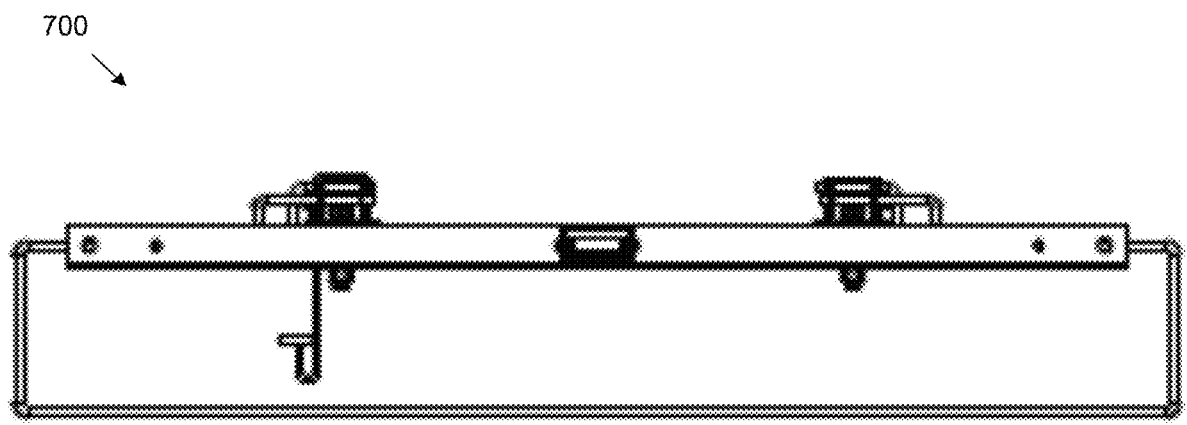
FIG. 7 is a right view of the mounting apparatus of FIG. 1.

The system also has four leveling indicators, two of which are shown in the perspective view (130)(132). Finally, the system might be configured with two types of sensor hanger variants, the first one being a clip variant (134), and the second being a hanger variant (136). Alternative views of system 100 are presented in FIGS. 2-7. FIG. 2 presents a top view (200) of system 100. FIG. 3 presents a bottom view (300) of system 100. FIG. 4 presents a front view (400) of system 100. FIG. 5 presents a back view (500) of system 100. FIG. 6 presents a left view (600) of system 100. FIG. 7 presents a right view (700) of system 100.

Figure 8:
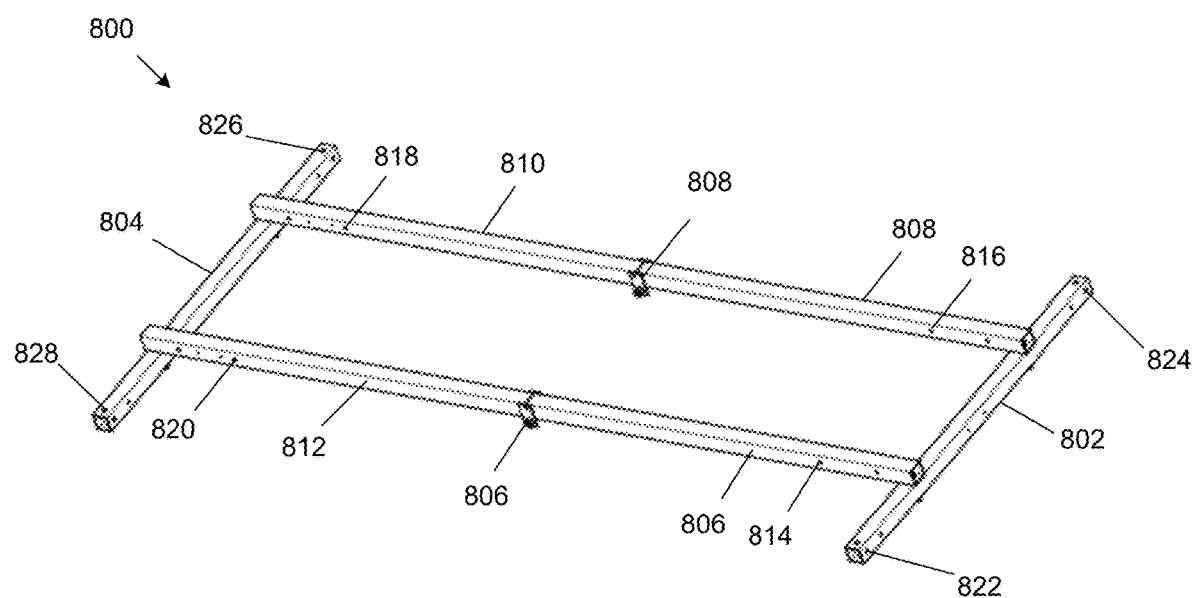
FIG. 8 is a perspective view of a mounting apparatus, depicting the base frame without pins, drain pan hangers, and leveling indicators.

Referring to FIG. 8, the presented air handler mounting frame (e.g., mounting frame 800) includes a first fixed length support beam (802) and a second fixed length support beam (804) located parallel to one another, separated by a first distance. The apparatus further includes a first adjustable support beam (806) and a second adjustable support beam (808) fixed perpendicular to the first fixed length support beam, and a third adjustable support beam (810) and a fourth adjustable support beam (812) fixed perpendicular to the second fixed length support beam, wherein the first adjustable support beam and the fourth adjustable support beam are separated by a second distance to the second adjustable support beam and the third adjustable support beam.

Figure 9:
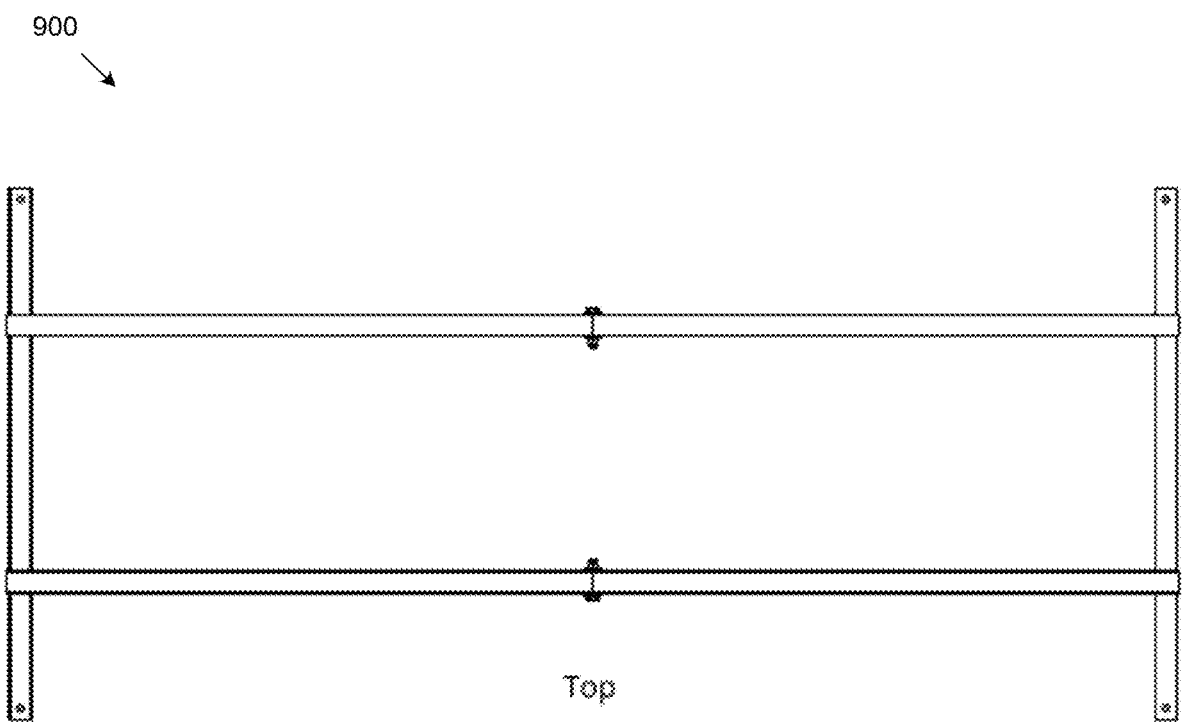
FIG. 9 is a top view of the mounting apparatus of FIG. 8.
Figure 10:
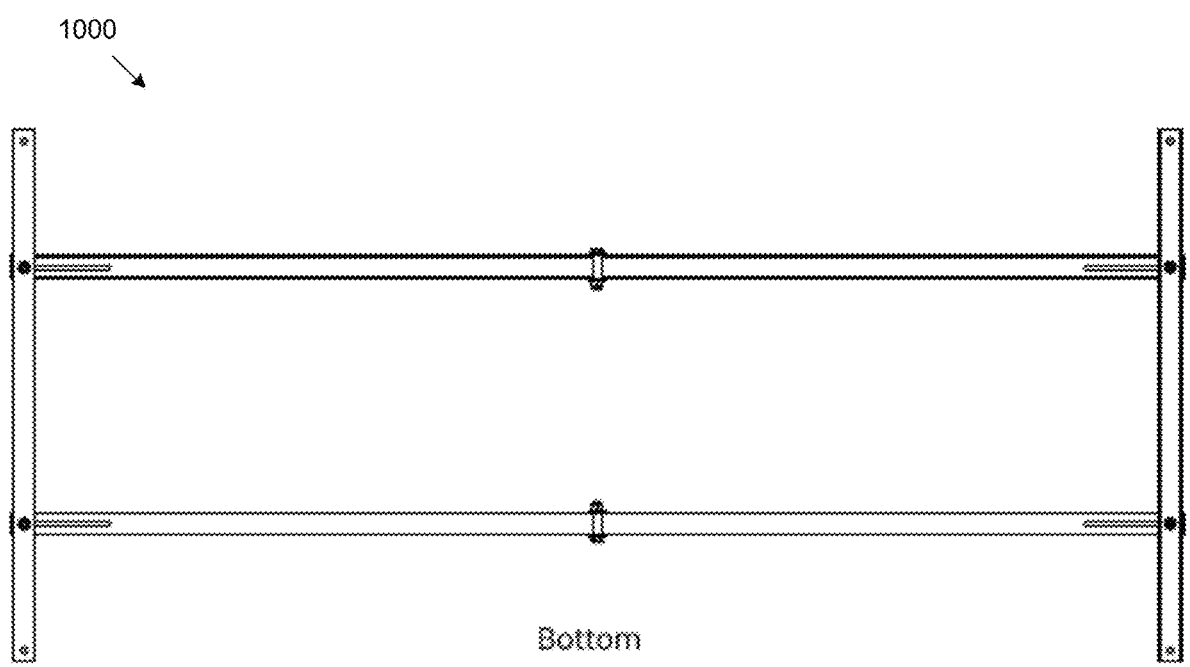
FIG. 10 is a bottom view of the mounting apparatus of FIG. 8.
Figure 11:
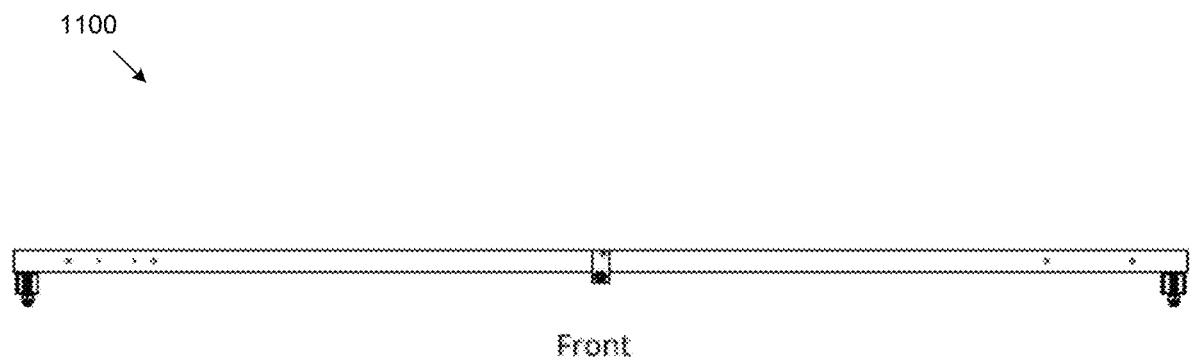
FIG. 11 is a front view of the mounting apparatus of FIG. 8.
Figure 12:
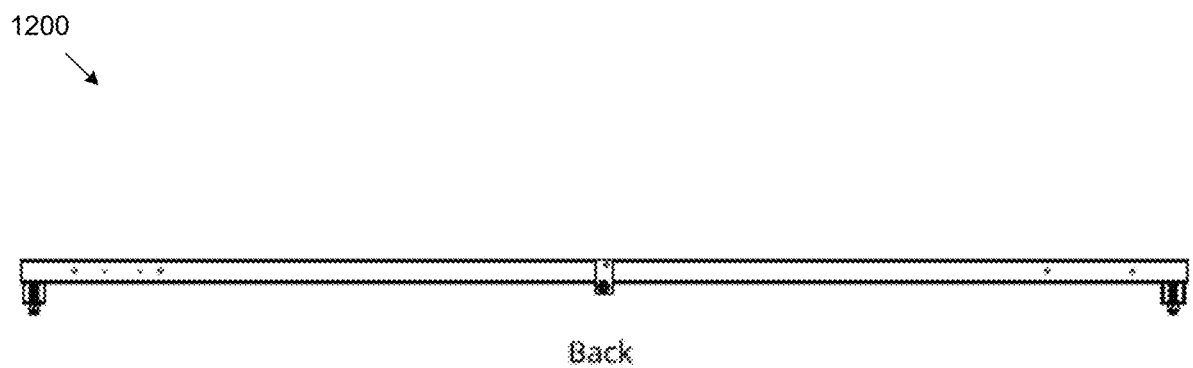
FIG. 12 is a back view of the mounting apparatus of FIG. 8.
Figure 13:
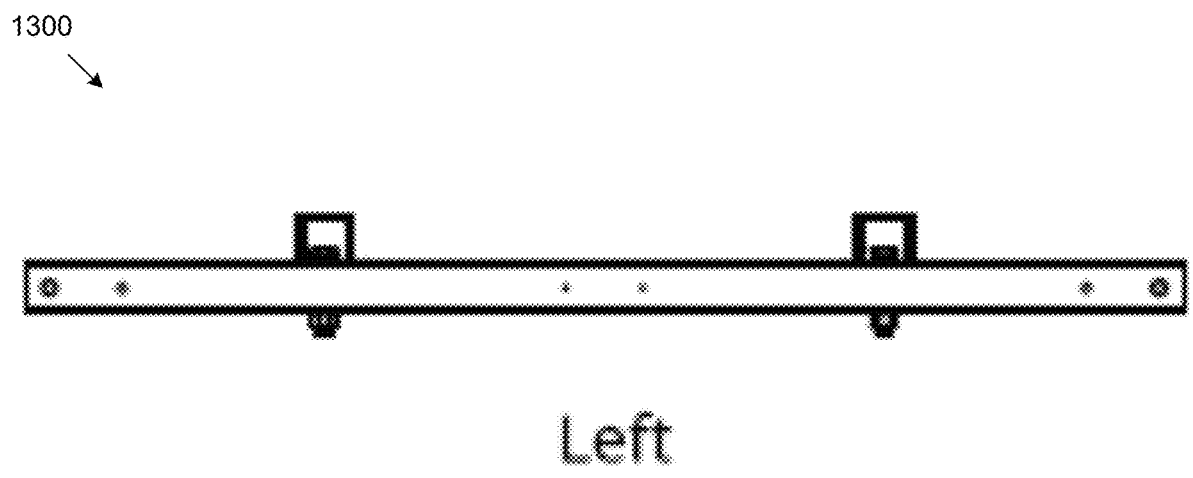
FIG. 13 is a left view of the mounting apparatus of FIG. 8.
Figure 14:
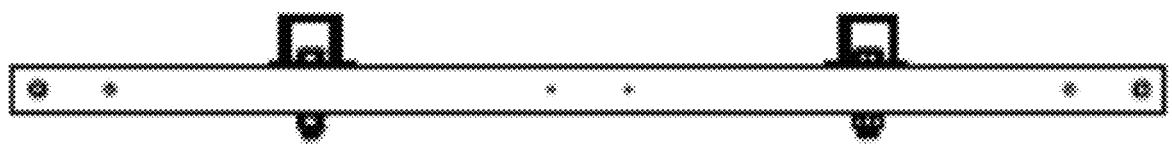
FIG. 14 is a right view of the mounting apparatus of FIG. 8.

Furthermore, the first, second, third, and fourth adjustable support beams are configured with a set of extension points (814)(816)(818)(820), which can be used to extend and/or secure the frame length. The apparatus further includes a first set of support holes spaced out on the first fixed length support beam (822)(824) and a second set of support holes spaced out on the second fixed length support beam (826)(828). These holes may enable the first and second fixed length support beams to engage a support mechanism such as a cable, wire, or hanger, which can suspend the system frame and adjust its height. Alternative views of system 800 are presented in FIGS. 9-14. FIG. 9 presents a top view (900) of system 800. FIG. 10 presents a bottom view (1000) of system 800. FIG. 11 presents a front view (1100) of system 800. FIG. 12 presents a back view (1200) of system 800. FIG. 13 presents a left view (1300) of system 800. FIG. 14 presents a right view (1400) of system 800.

The system frame may have a variety of geometries. In one aspect, the adjustable support beams are positioned below and/or above the fixed length support beams. In another aspect, adjustable support beams are positioned in the same plane as the fixed length support beams. In some aspects, the cross section of the tube is square or rectangular. In other aspects, the cross-section might be elliptical. In other aspects, the system frame might be made of metal structural tubing, fiber-reinforced polymer, resin filling, or pultruded FRP Composites.

Additionally, the frame might be configured to be suspended from an existing overhead structure at varying heights, from either a level or uneven surface. In one arrangement, the fixed length support beams are configured to connect to an overhead structure by passing a cable through holes in the support beams and adjusting the frame suspension height through cable locks, cable crimp connectors, or the like. Another suspension method may employ a 3/8-16 all threaded rod. In another aspect, a combination of the first, second, third, and fourth adjustable support beams are configured to suspend the frame system by passing a cable through support holes. In an alternative aspect, the first, second, third, and fourth adjustable support beams or the fixed beams might contain an additional or alternative support structure (for example, a cable track) to loop cable through or around any members of the supporting frame. In another aspect, the cable is configured with threaded rod, which may be used to drill into an overhead structure to secure the unit.

Alternatively, the system might be configured to rest on the ground. In some embodiments, the frame is configured to sit over a supporting drain pan structure on the floor. In alternative aspects, the frame might support the HVAC unit on the floor while the HVAC unit is drained to a drain pan on the floor nearby. In another aspect, the frame separates the HVAC unit from the ground at varying heights with additional support members extending from the floor. Alternatively, the frame might have a larger height configured to separate the HVAC unit from the floor, allowing for a drain pan to be placed under the unit on the floor.

Figure 15:
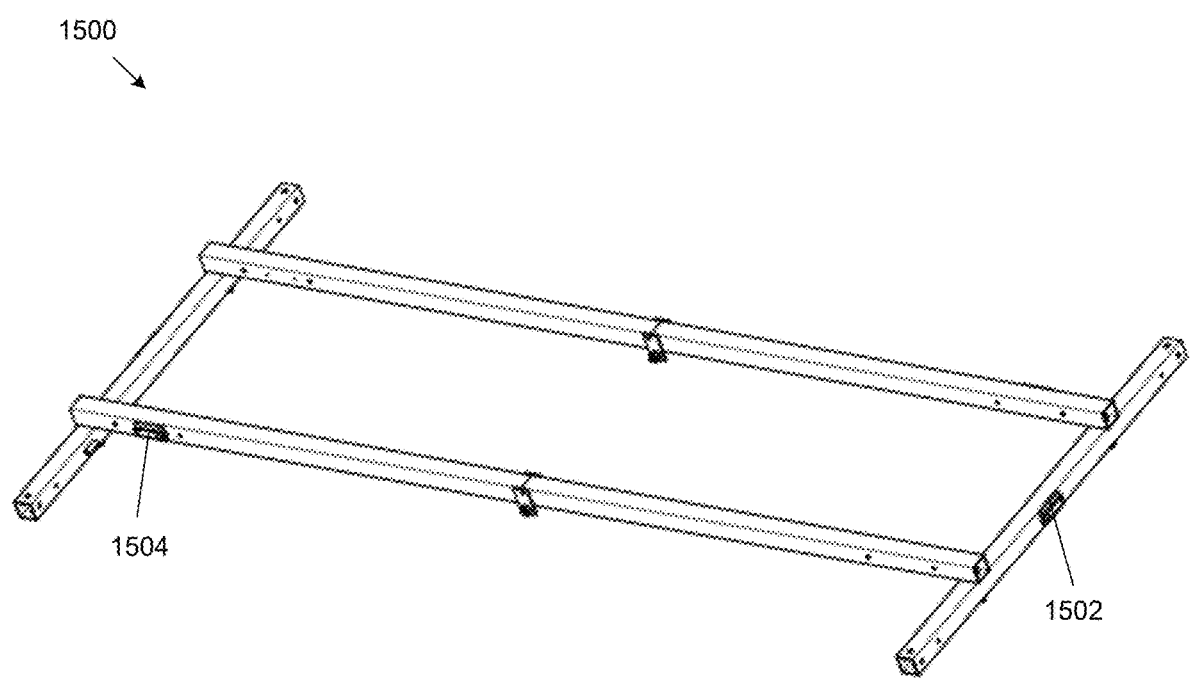
FIG. 15 is a perspective view of a mounting apparatus, depicting the base frame without pins, sensors, and drain pan hangers, while including leveling indicators.
Figure 16:
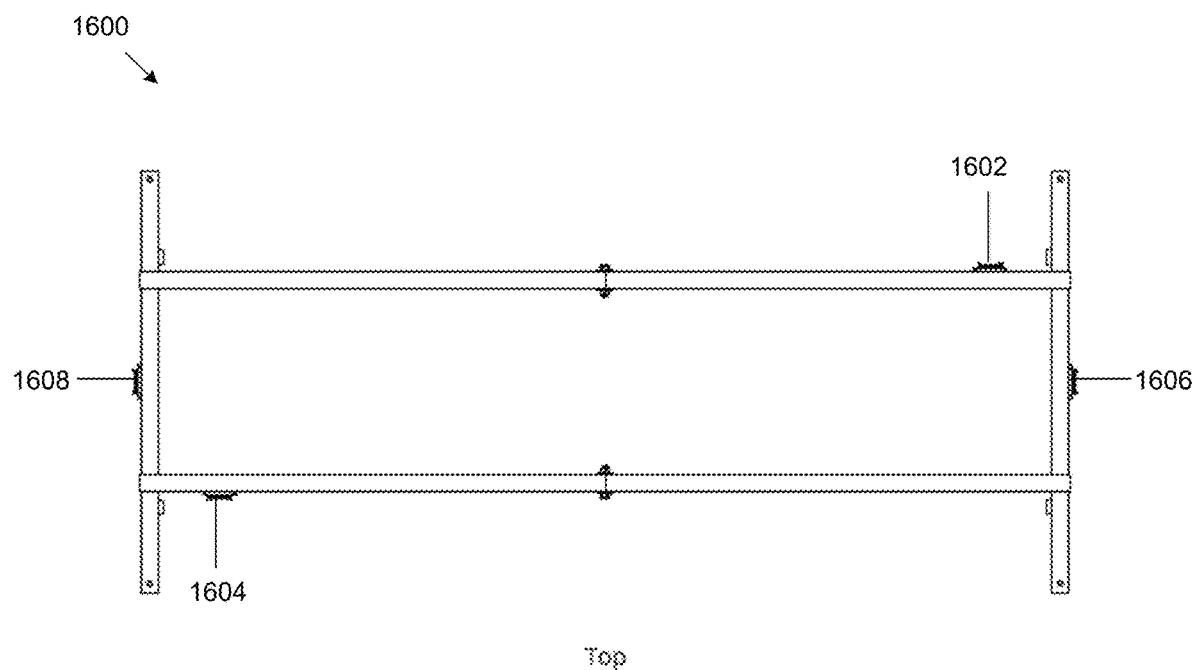
FIG. 16 is a top view of the mounting apparatus of FIG. 15.

Referring to FIG. 15, the presented air handler mounting frame (1500) may include four leveling indicators attached to the frame, which indicate whether the system is leveled during mounting. FIG. 15 depicts a perspective view of the system, showing a first leveling indicator (1502) attached to the first fixed length support beam and another leveling indicator (1504) attached to the fourth adjustable support beam. The leveling indicator placement is further shown in FIG. 16, which highlights a top view of the frame apparatus 1600. Four leveling indicators are depicted, wherein a first leveling indicator (1602) of the at least four leveling indicators is fixed to the second adjustable support beam, a second leveling indicator (1604) is fixed to the fourth adjustable support beam, a third leveling indicator (1606) is fixed to the first fixed length support beam, and a fourth leveling indicator (1608) is fixed to the second fixed length support beam.

Figure 17:
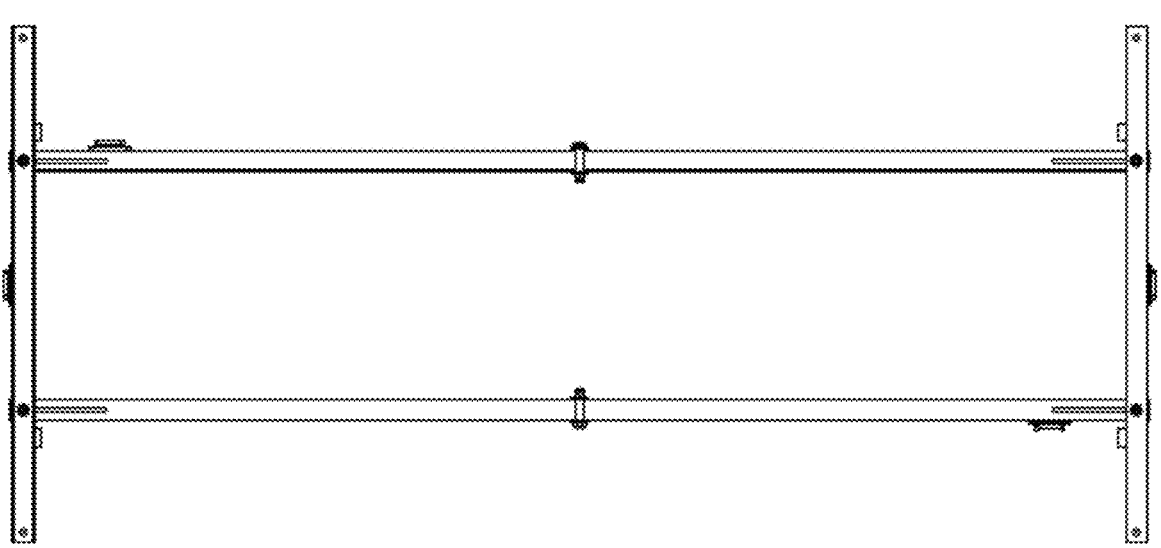
FIG. 17 is a bottom view of the mounting apparatus of FIG. 15.
Figure 18:
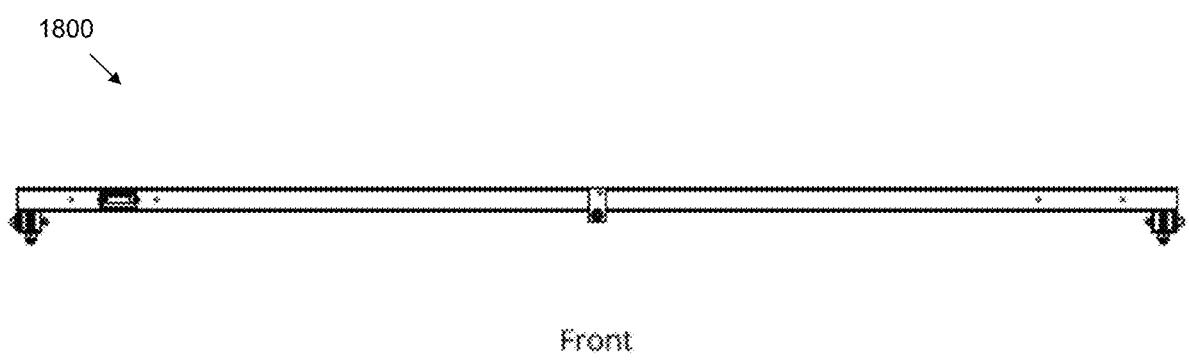
FIG. 18 is a front view of the mounting apparatus of FIG. 15.
Figure 19:
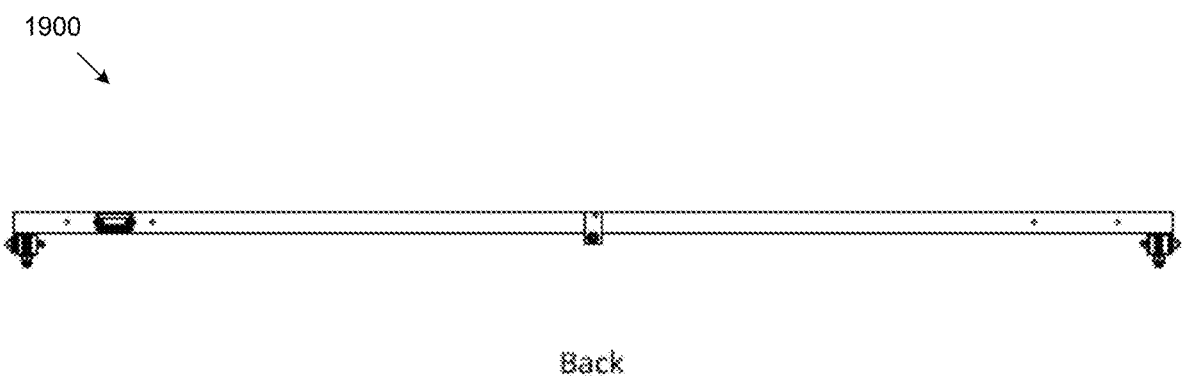
FIG. 19 is a back view of the mounting apparatus of FIG. 15.
Figure 20:
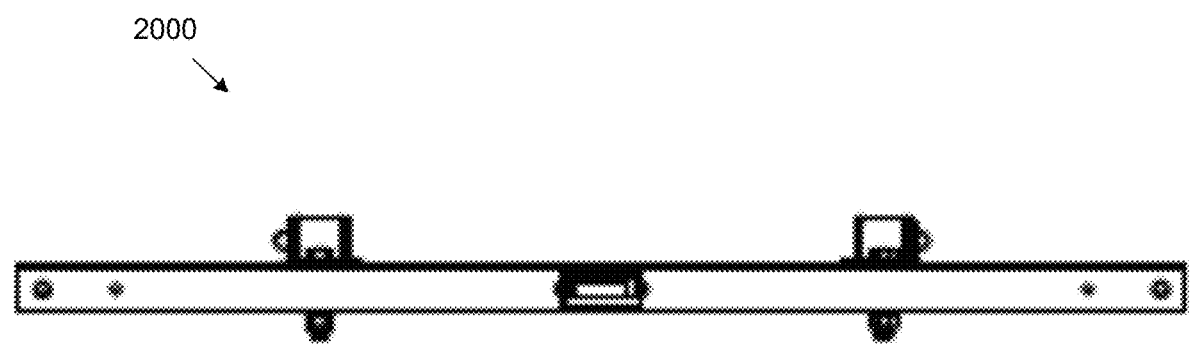
FIG. 20 is a left view of the mounting apparatus of FIG. 15.
Figure 21:
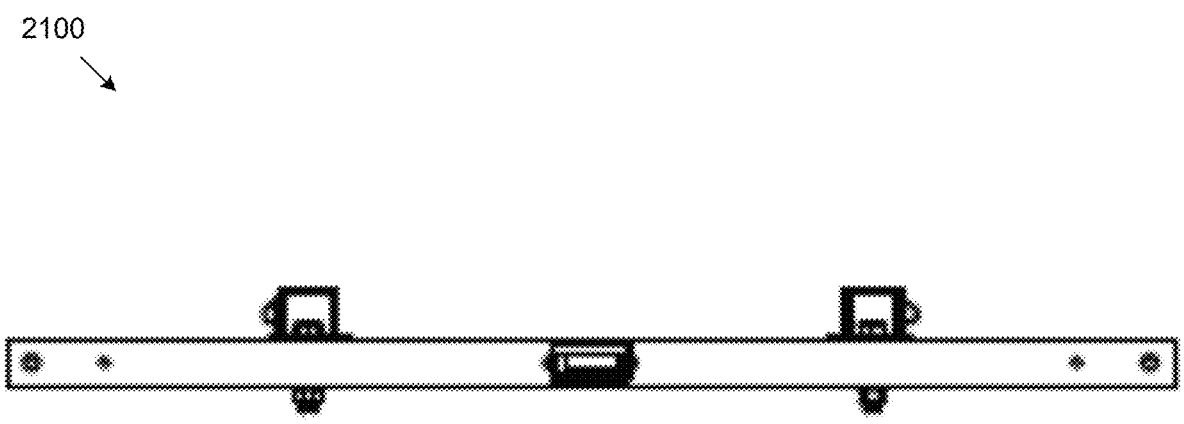
FIG. 21 is a right view of the mounting apparatus of FIG. 15.

This leveling indicator placement may provide an improved leveling system over alternative mounting structures. Each leveling indicator corresponds to one edge of the frame structure and can determine whether individual support beams are leveled. This improves leveling because, while the four adjustable support beams are level to one another, they may not be level to the first and second fixed length support beams if the system is tilted. Leveling indicators on each edge can ensure that the adjustable support beams are level to one another and the fixed length support beams. Alternative views of system 1500 are presented in FIGS. 17-21. FIG. 17 presents a bottom view (1700) of system 1500. FIG. 18 presents a front view (1800) of system 1500. FIG. 19 presents a back view (1900) of system 1500. FIG. 20 presents a left view (2000) of system 1500. FIG. 21 presents a right view (2100) of system 1500. The system might employ one or more, or a combination of leveling indicators, which may include bubble levels, a digital readout, torpedo levels, laser levels, plumb lines, or a software leveling application to indicate the system is leveled during mounting. Additionally, the leveling indicators might be distributed in a different manner than depicted, as the leveling indicators can be placed in a plurality of locations on the fixed or adjustable support beams.

Figure 22:
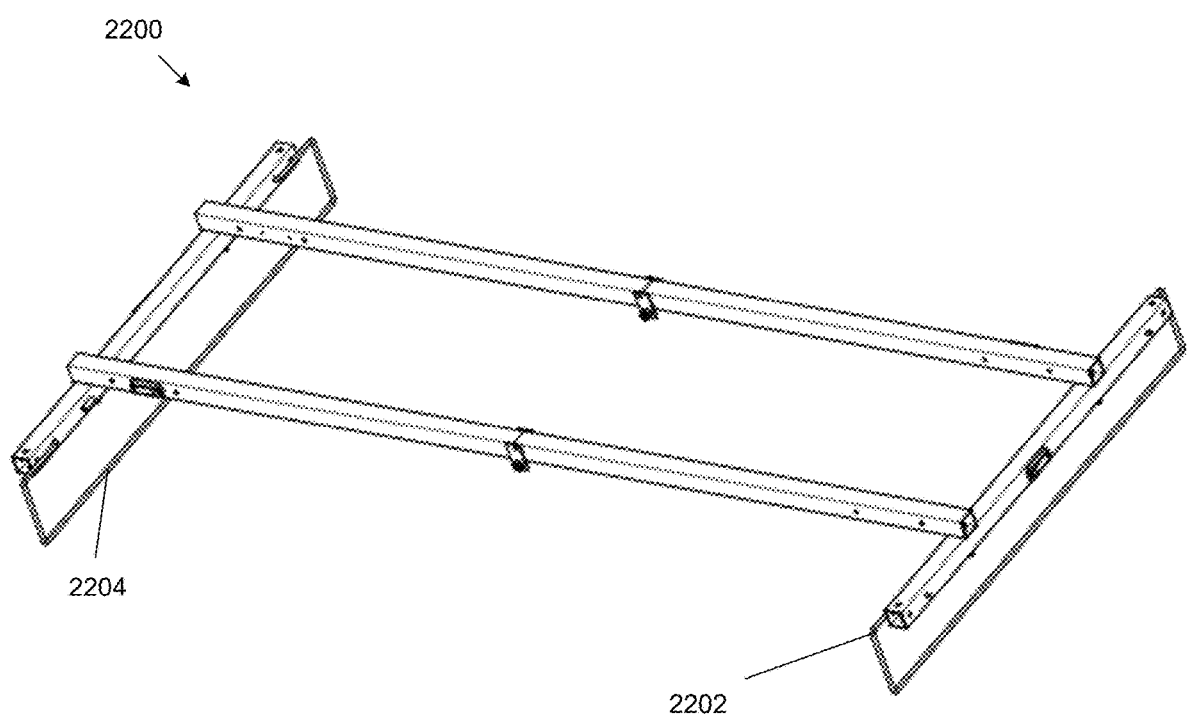
FIG. 22 is a perspective view of a mounting apparatus, depicting the base frame without pins and sensors while including drain pan hangers and leveling indicators.

Turning to FIG. 22, (e.g., mounting system 2200) another implementation of the system may include drain pan hangers fixed orthogonally to the plane of the first and second fixed length support beams, wherein the drain pan hangers may support an insertable drain pan. The mounting system 2200 depicts this system, as the frame may include a first drain pan hanger (2202) fixed to the first fixed length support beam, and a second drain pan hanger (2204) fixed to the second fixed length support beam. In other embodiments the drain pan hangers might be attached to the adjustable support beams, or a combination of the adjustable or fixed length support beams. As depicted, the drain pan hanger may be fixed to the fixed length support beams through holes in the fixed length support beams. However, the drain pan hangers may be fixed to the fixed length support beams with alternative securement methods. For example, the drain pan hangers may be hung from or welded to the support frame.

Figure 23:
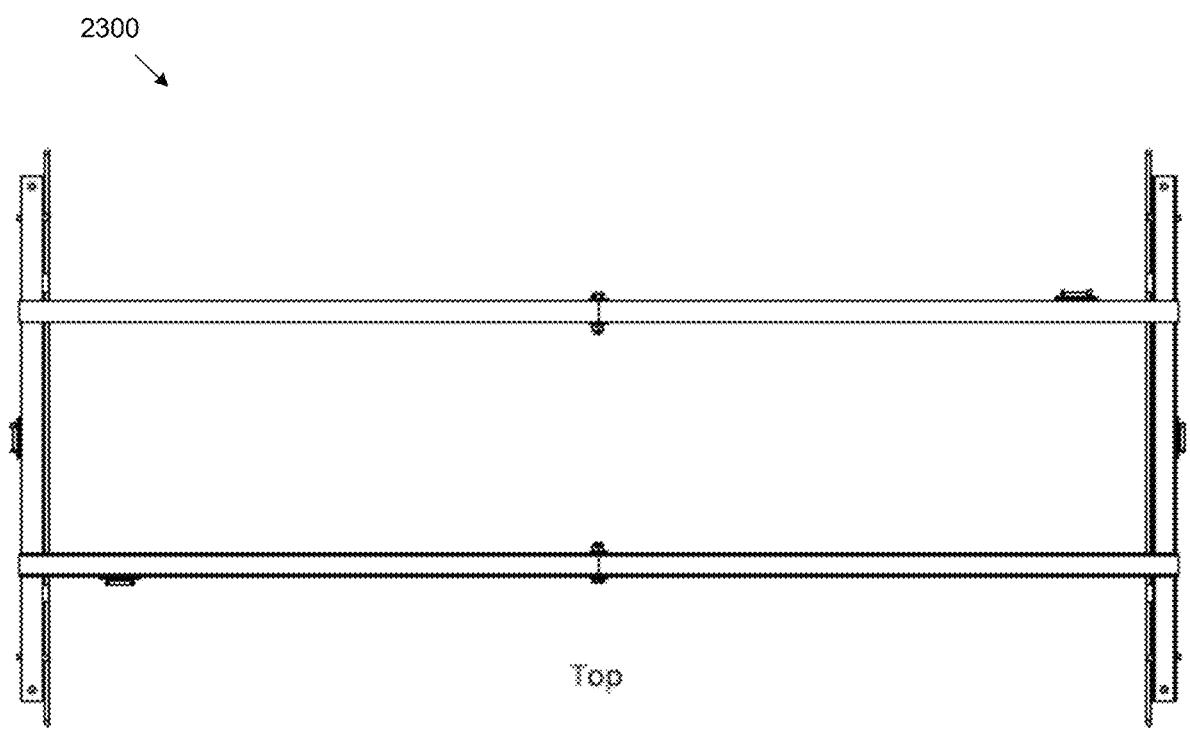
FIG. 23 is a top view of the mounting apparatus of FIG. 22.
Figure 24:
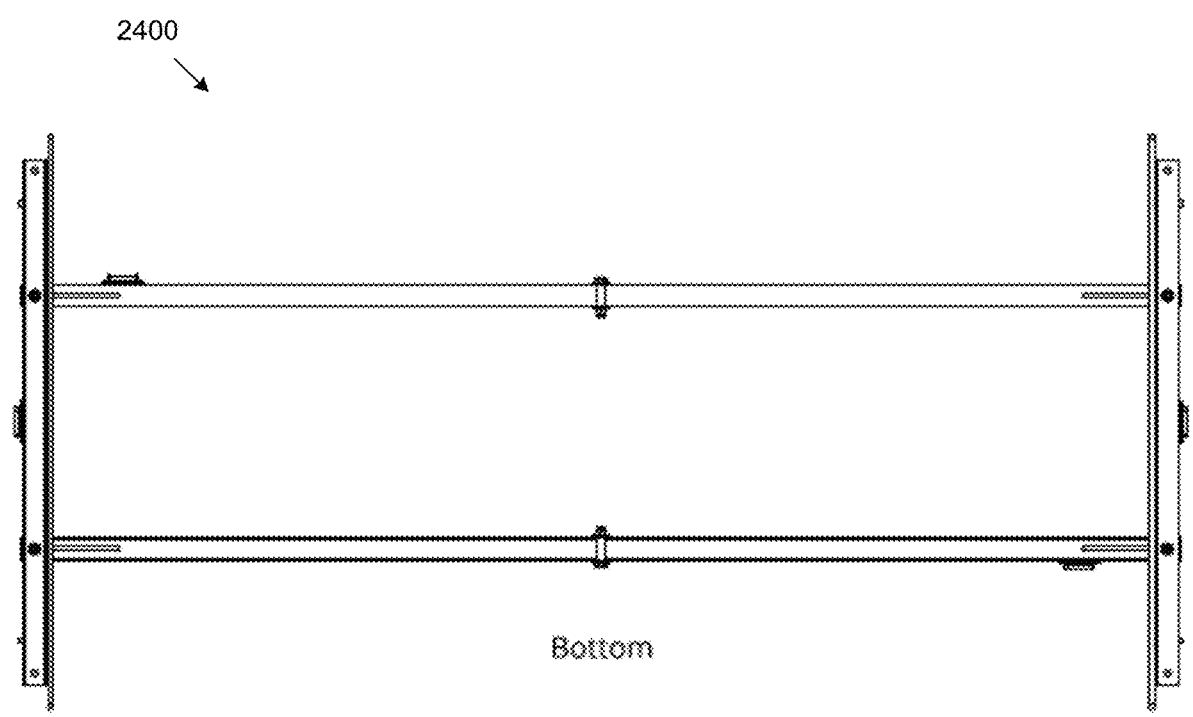
FIG. 24 is a bottom view of the mounting apparatus of FIG. 22.
Figure 25:
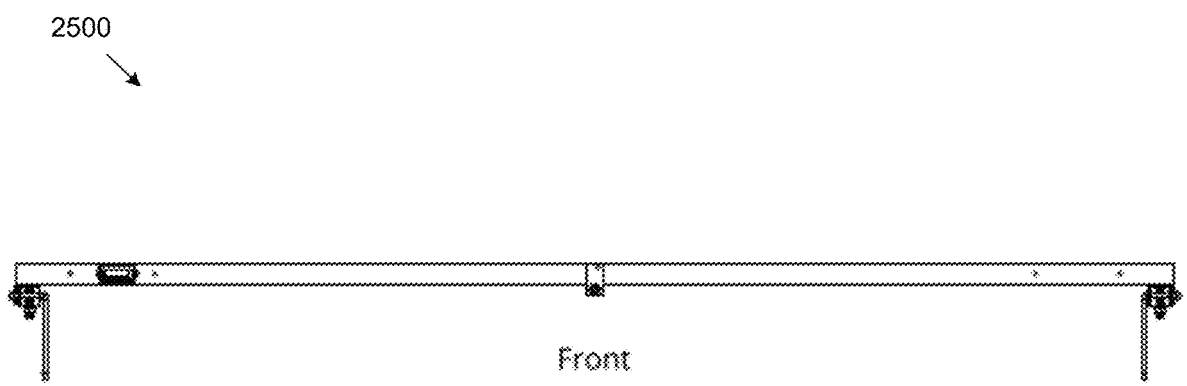
FIG. 25 is a front view of the mounting apparatus of FIG. 22.
Figure 26:
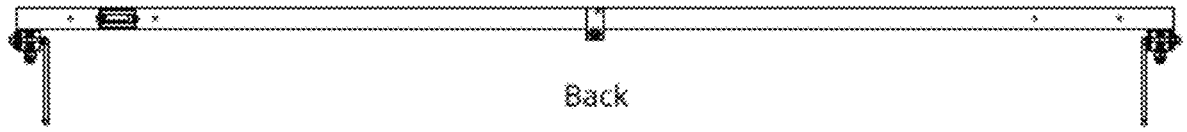
FIG. 26 is a back view of the mounting apparatus of FIG. 22.
Figure 27:
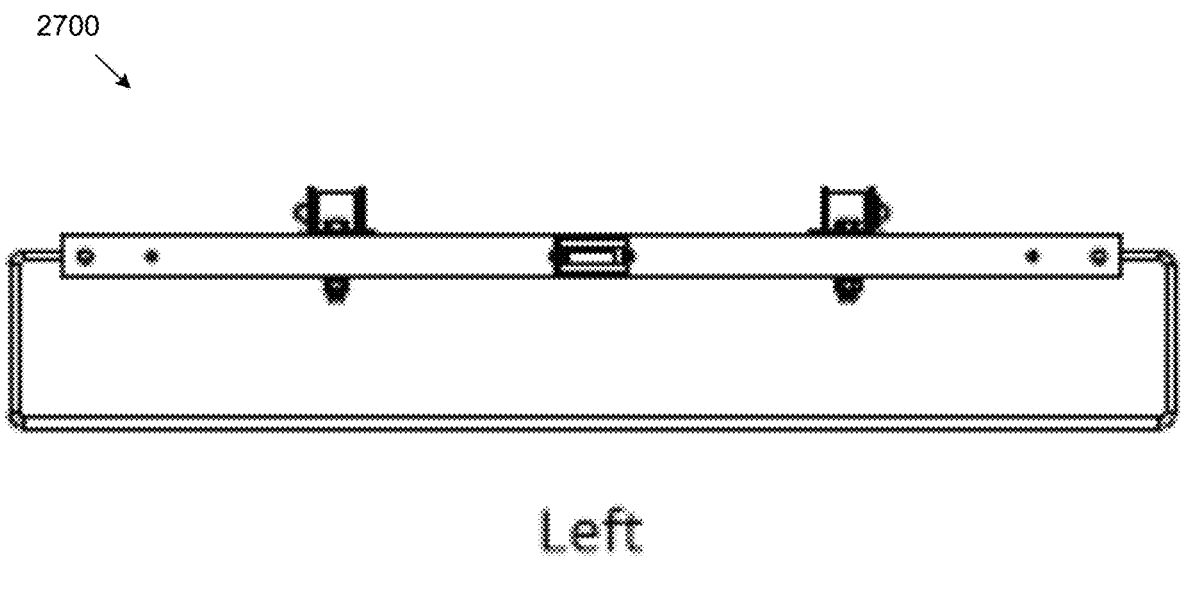
FIG. 27 is a left view of the mounting apparatus of FIG. 22.
Figure 28:
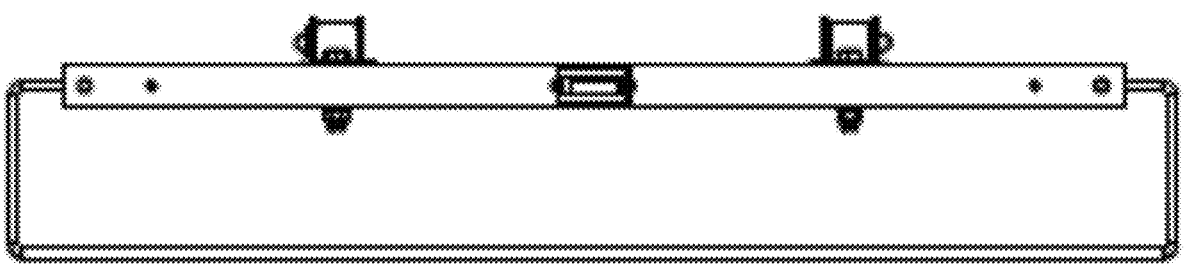
FIG. 28 is a right view of the mounting apparatus of FIG. 22.

The drain pan hangers may be made of a variety of materials. For example, they may be made of metal, molded plastic, hard plaster, or resin filling, among other materials, combinations of materials, etc. Alternative views of system 2200 are presented in FIGS. 23-28. FIG. 23 presents a top view (2300) of system 2200. FIG. 24 presents a bottom view (2400) of system 2200. FIG. 25 presents a front view (2500) of system 2200. FIG. 26 presents a back view (2600) of system 2200. FIG. 27 presents a left view (2700) of system 2200. FIG. 28 presents a right view (2800) of system 2200.

In further arrangements, a drain pan is included, configured to slide into the drain pan hangers described above. The drain pan may have various dimensions configured to match the plurality of dimensions of the adjustable support members. In one embodiment, the drain pan might be extendable to the maximum length of the support members. In another aspect, the drain pan might include a hose attachment or water drainage system. The drain pan might be made of molded plastic, or it can alternatively be made using slush latex, metal, hard plaster, resin filling, or silicon, among other materials. The drain pan might alternatively be configured to sit on the floor and support the frame and HVAC unit above it. In another aspect, it can be hung under the frame using hooks or metal cable attached to the fixed length support beams or one or a combination of the first, second, third, and fourth support beams.

In some arrangements, the system might employ sensors to determine liquid dispensed from the HVAC unit. For example, the system might use one or a combination of float sensors, capacitance sensors, ultrasonic sensors, pressure sensors, humidity sensors, electromagnetic (e.g., radar) sensors, combinations of sensors, etc. to measure a water level dispensed from an HVAC unit. Additionally, the apparatus may contain one or a plurality of sensor hangers configured to suspend liquid detection sensors at a fixed height above the drain pan. In one embodiment, the apparatus has two sensor hangers attached to one or a combination of the first and fourth adjustable support beams. The sensor hangers might employ a hook variant, clip variant, or an alternative securement variant to suspend a sensor. In another embodiment, the sensor hangers might be attached to one or a combination of the fixed length support beams or the first, second, third or fourth adjustable support beams. In another embodiment, one sensor may be suspended at a lower height than the other sensor to indicate a low water level or a high-water level warning. In another embodiment, only one sensor hanger is used. In some embodiments, one or more of the sensor hangers might be suspended (e.g., two inches, one inch, three inches, etc.) above the drain pan to sense when the water depth reaches this height. For both hanger variants, the upper hook portion is enabled to be fixed to the first, second, third, or fourth support beam.

Figure 29:
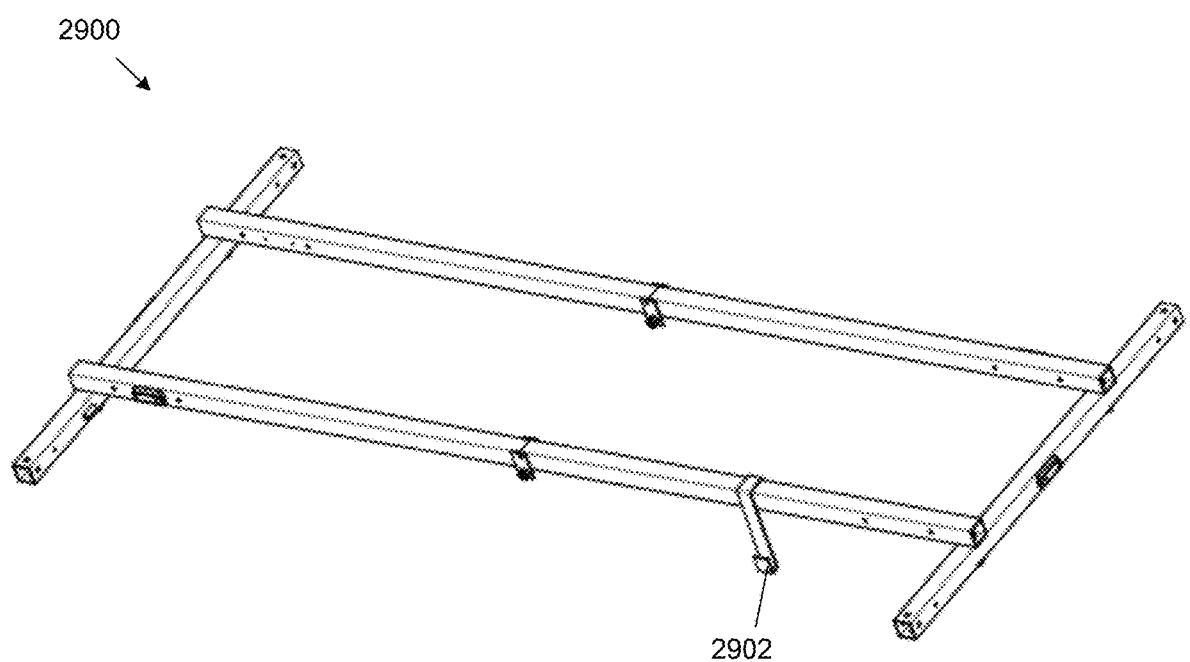
FIG. 29 is a perspective view of a mounting apparatus, depicting the base frame without pins and drain pan hangers, while including a hook variant sensor hanger and leveling indicators.
Figure 30:
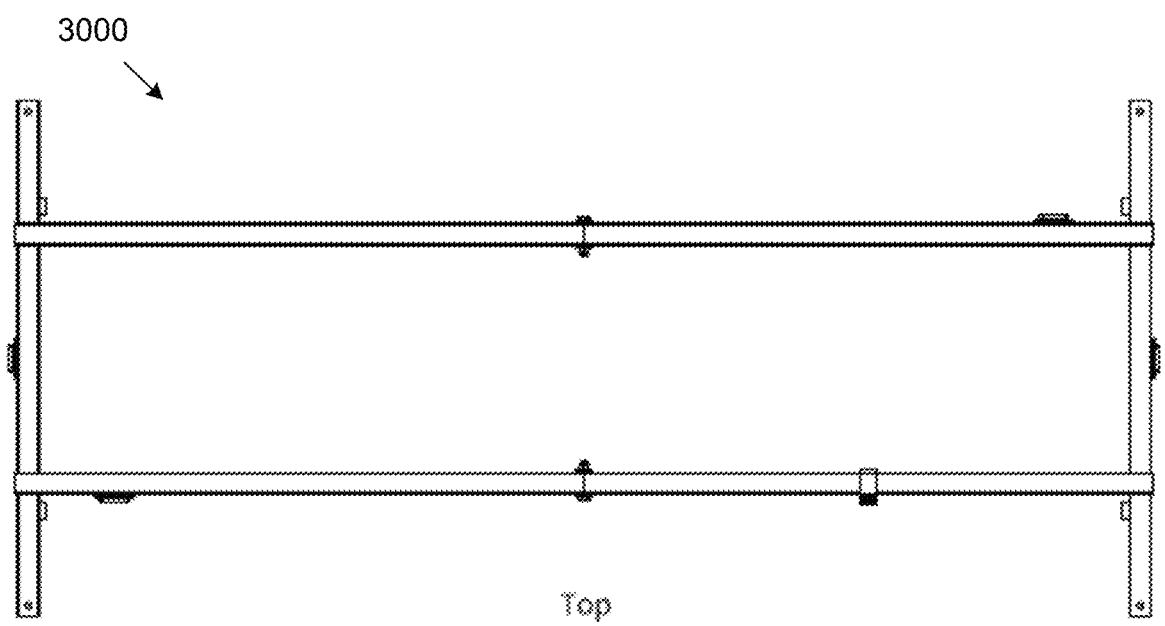
FIG. 30 is a top view of the mounting apparatus of FIG. 29.
Figure 31:
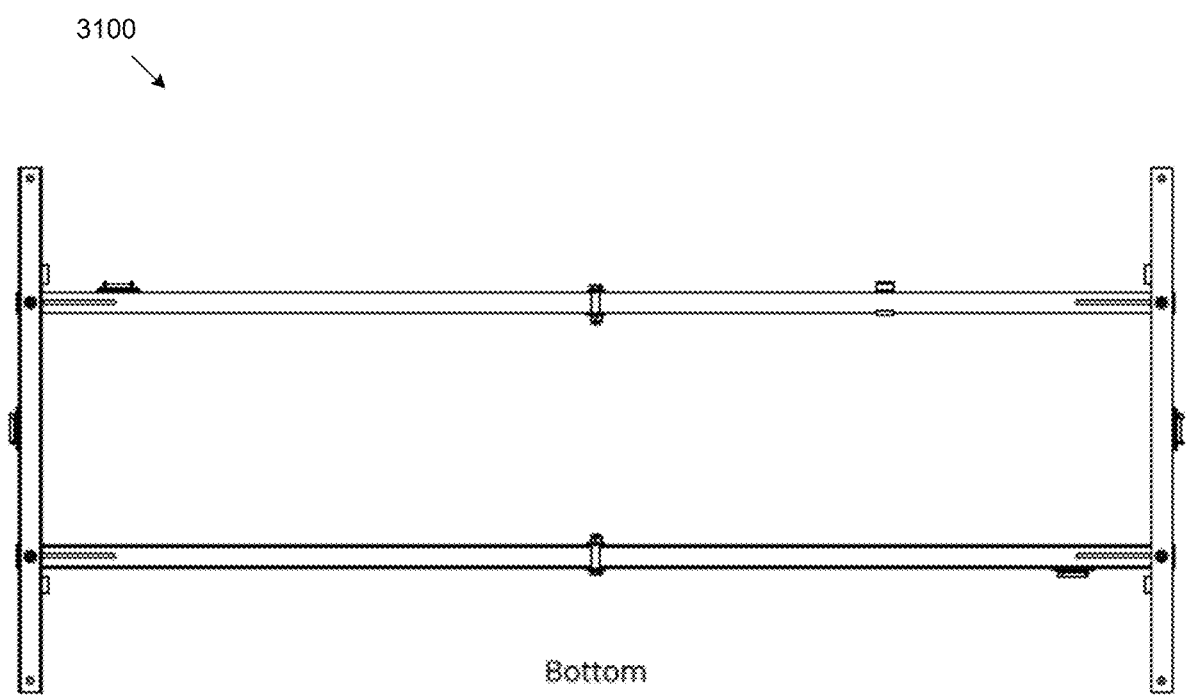
FIG. 31 is a bottom view of the mounting apparatus of FIG. 29.
Figure 32:
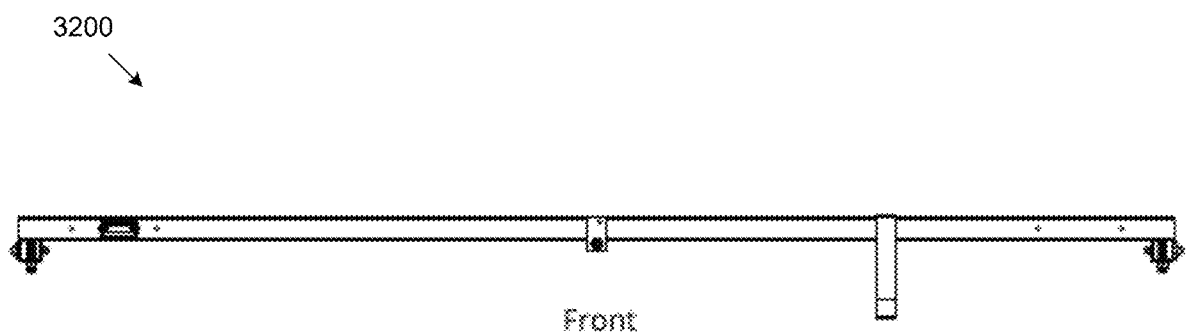
FIG. 32 is a front view of the mounting apparatus of FIG. 29.
Figure 33:
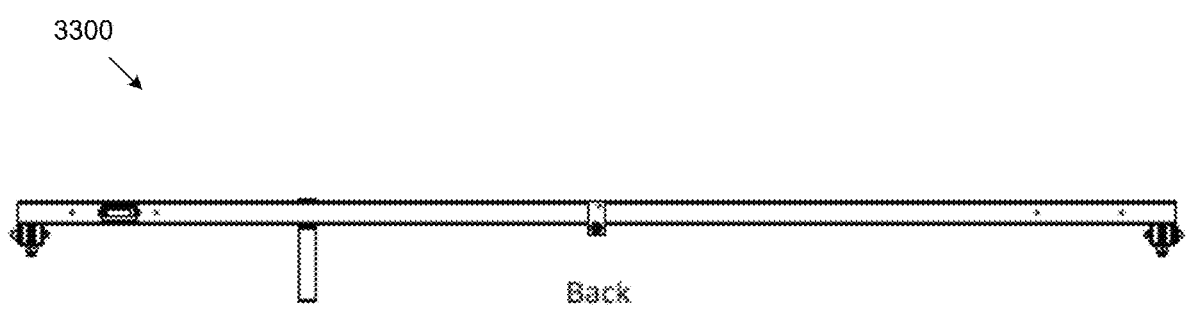
FIG. 33 is a back view of the mounting apparatus of FIG. 29.
Figure 34:
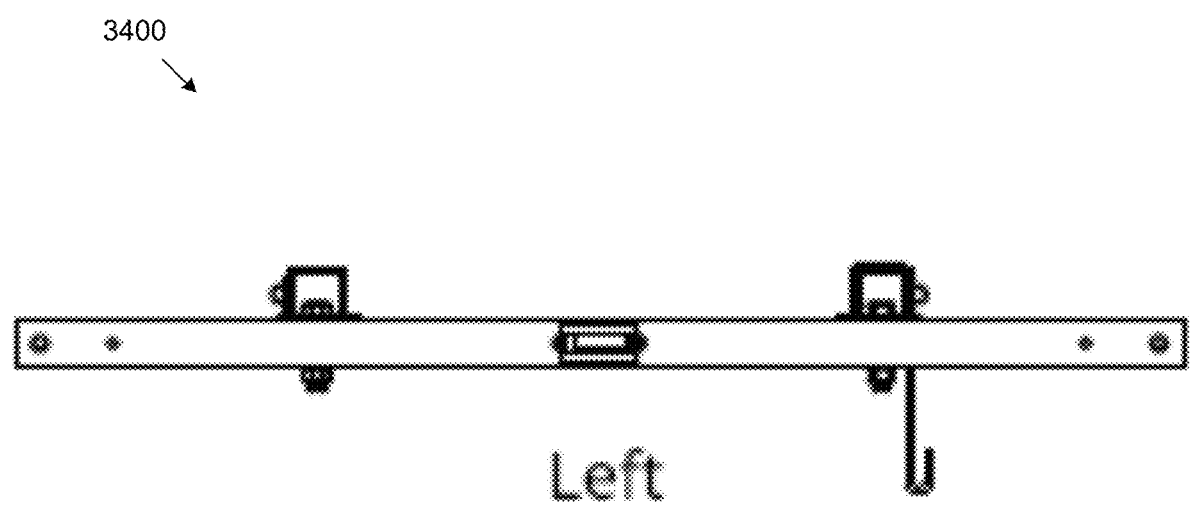
FIG. 34 is a left view of the mounting apparatus of FIG. 29.
Figure 35:
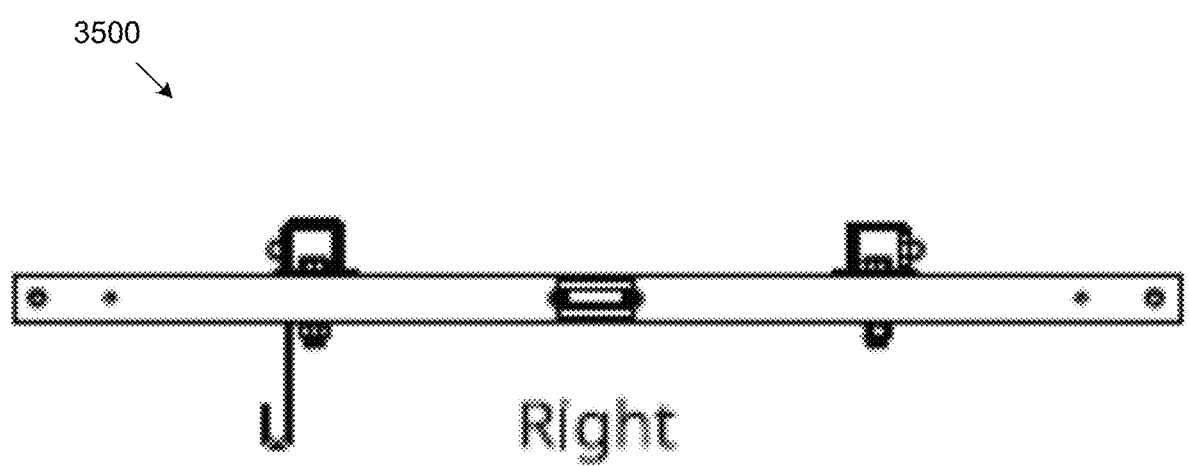
FIG. 35 is a right view of the mounting apparatus of FIG. 29.

FIG. 29 depicts an example mounting system 2900 with a hook sensor hanger (2902) described above. Alternative views of FIG. 29 are presented in FIG. 30-FIG. 35. FIG. 30 presents a top view (3000) of system 2900. FIG. 31 presents a bottom view (3100) of system 2900. FIG. 32 presents a front view (3200) of system 2900. FIG. 33 presents a back view (3300) of system 2900. FIG. 34 presents a left view (3400) of system 2900. FIG. 35 presents a right view (3500) of system 2900.

Figure 36:
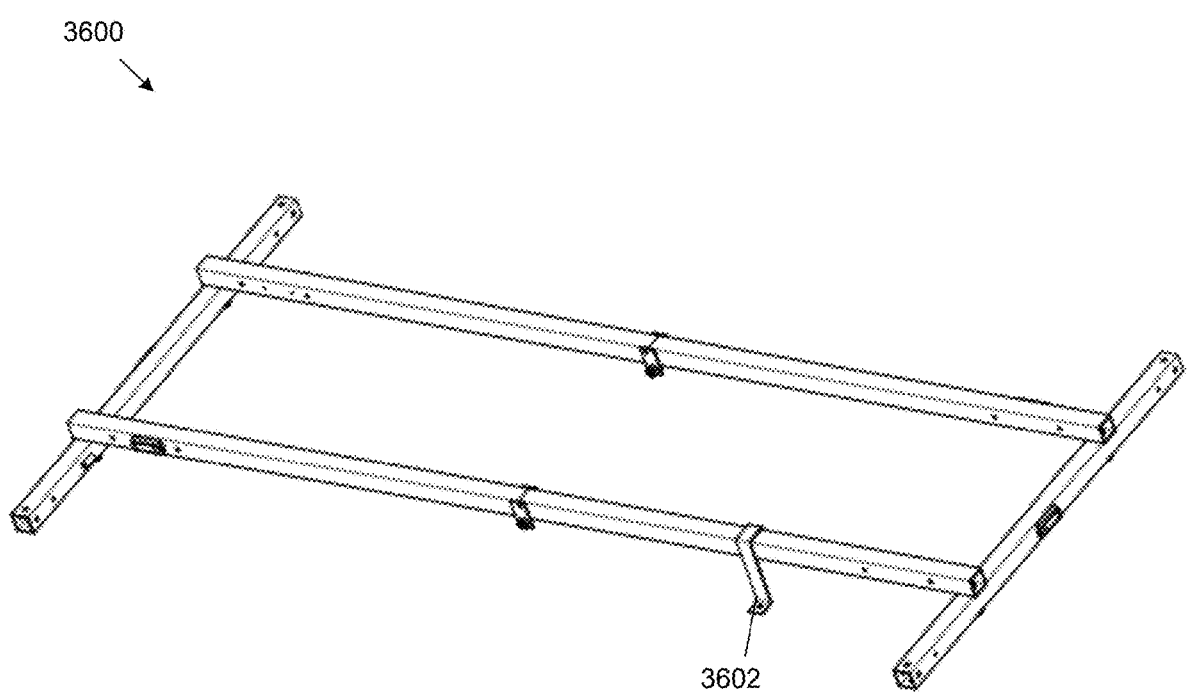
FIG. 36 is a perspective view of an HVAC mounting apparatus, depicting the base frame without pins and drain pan hangers, while including a clip variant sensor hanger and leveling indicators.
Figure 37:
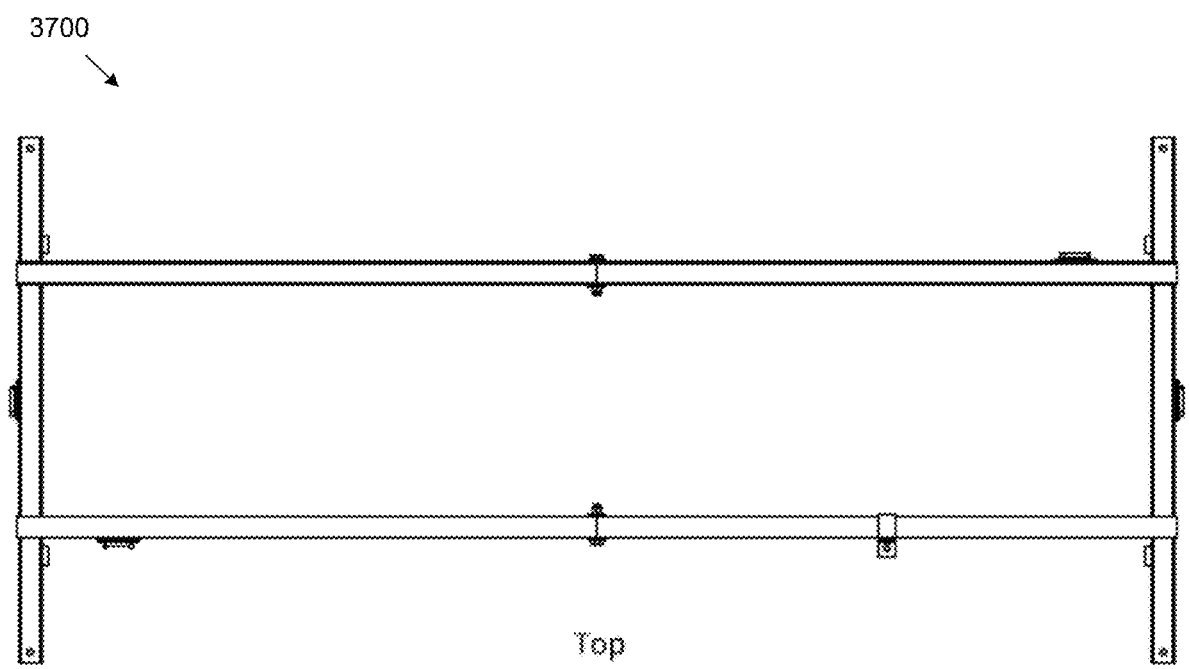
FIG. 37 is a top view of the mounting apparatus of FIG. 36.
Figure 38:
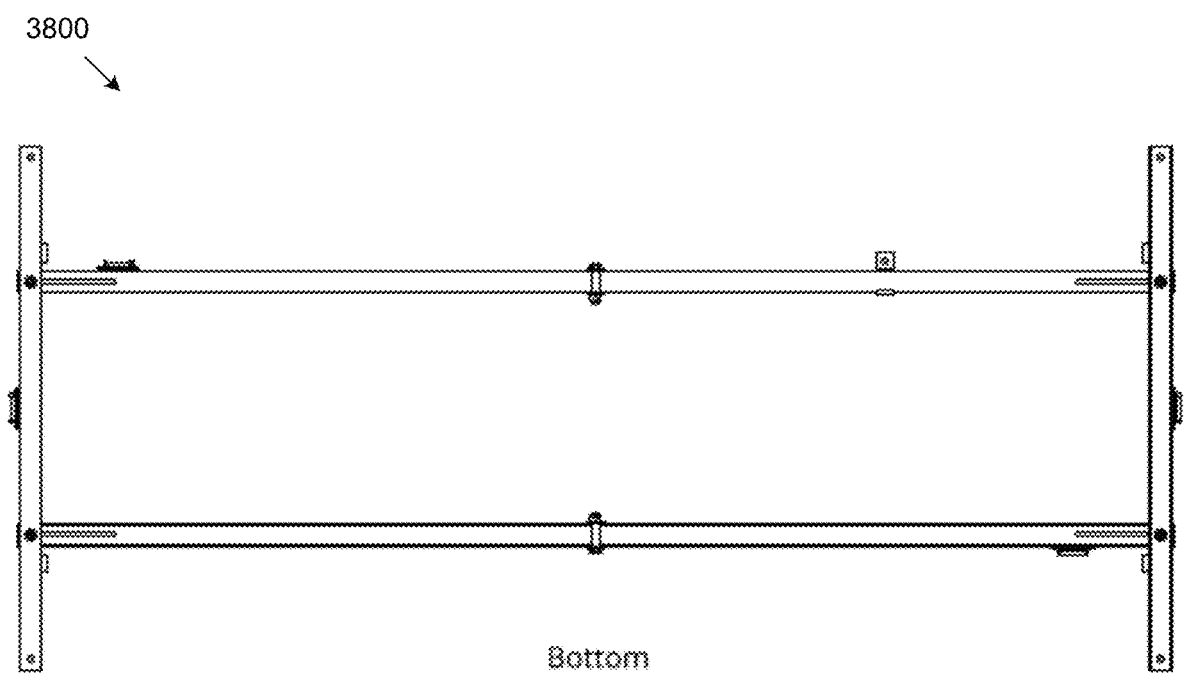
FIG. 38 is a bottom view of the mounting apparatus of FIG. 36.
Figure 39:
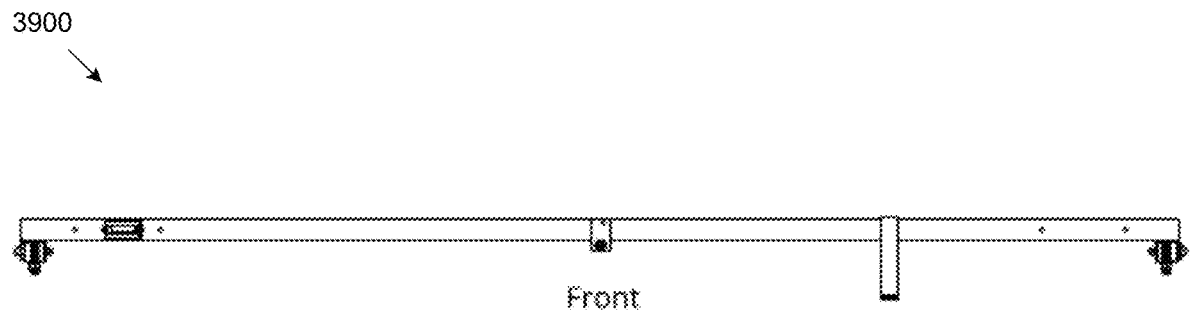
FIG. 39 is a front view of the mounting apparatus of FIG. 36.
Figure 40:
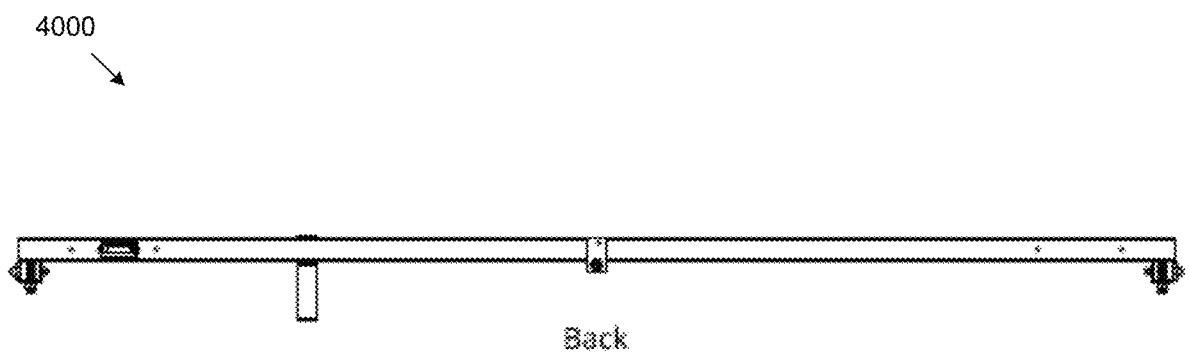
FIG. 40 is a back view of the mounting apparatus of FIG. 36.
Figure 41:
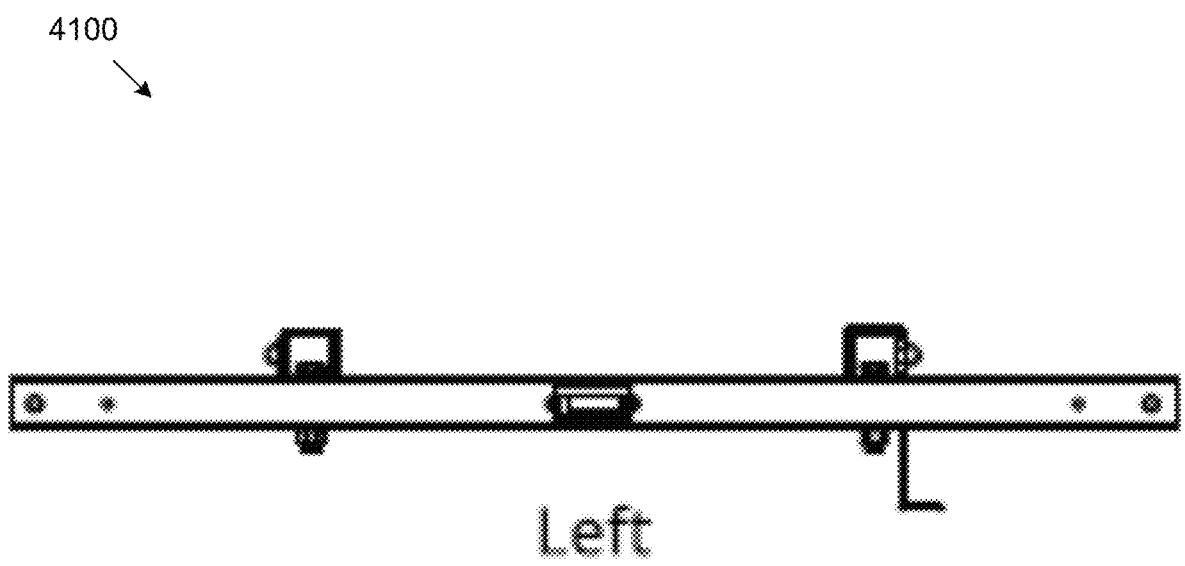
FIG. 41 is a left view of the mounting apparatus of FIG. 36.
Figure 42:
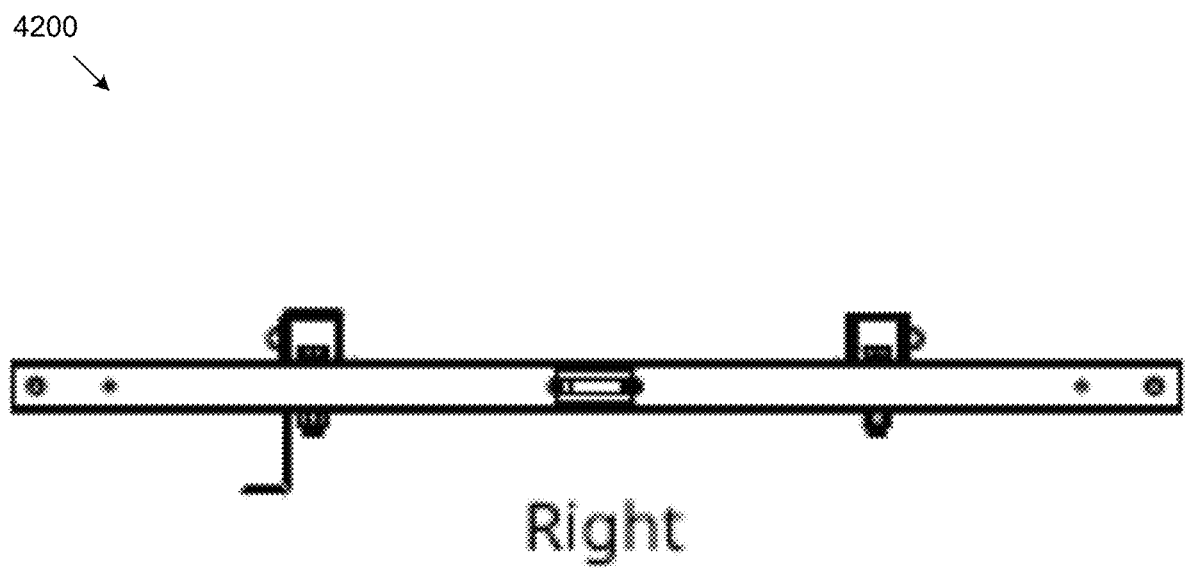
FIG. 42 is a right view of the mounting apparatus of FIG. 36.

FIG. 36 depicts an example mounting system (3600) with a clip sensor hanger (3602) described above. Alternative views of FIG. 36 are presented in FIG. 37-FIG. 42. FIG. 37 presents a top view (3700) of system 3600. FIG. 38 presents a bottom view (3800) of system 3600. FIG. 39 presents a front view (3900) of system 3600. FIG. 40 presents a back view (4000) of system 3600. FIG. 41 presents a left view (4100) of system 3600. FIG. 42 presents a right view (4200) of system 3600.

Figure 43:
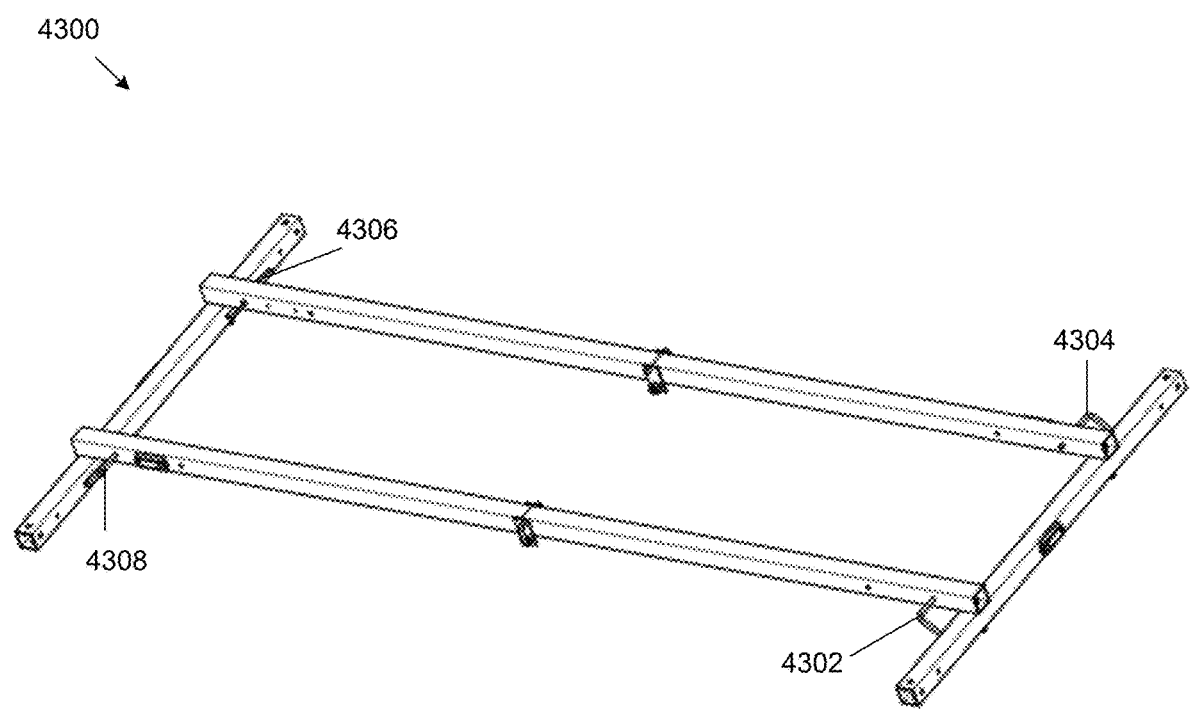
FIG. 43 is a perspective view of an HVAC mounting apparatus, depicting the base frame without pan hangers present, while including pins and bubble leveling indicators.
Figure 44:
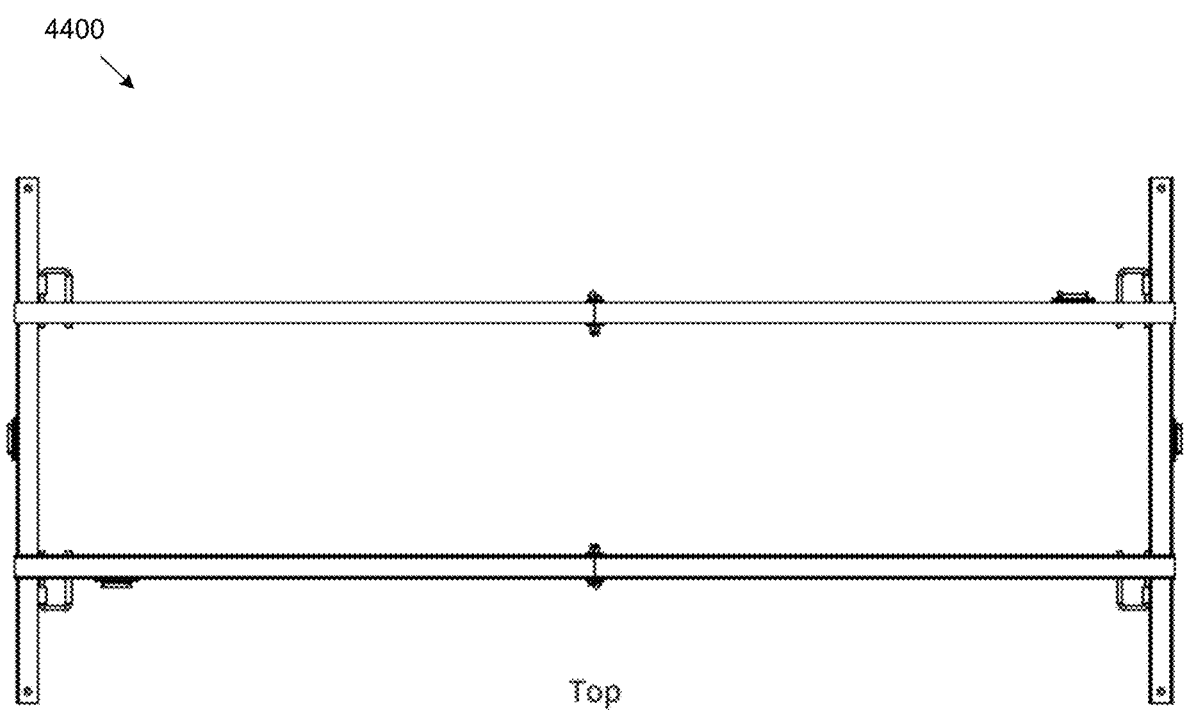
FIG. 44 is a top view of the mounting apparatus of FIG. 43.
Figure 45:
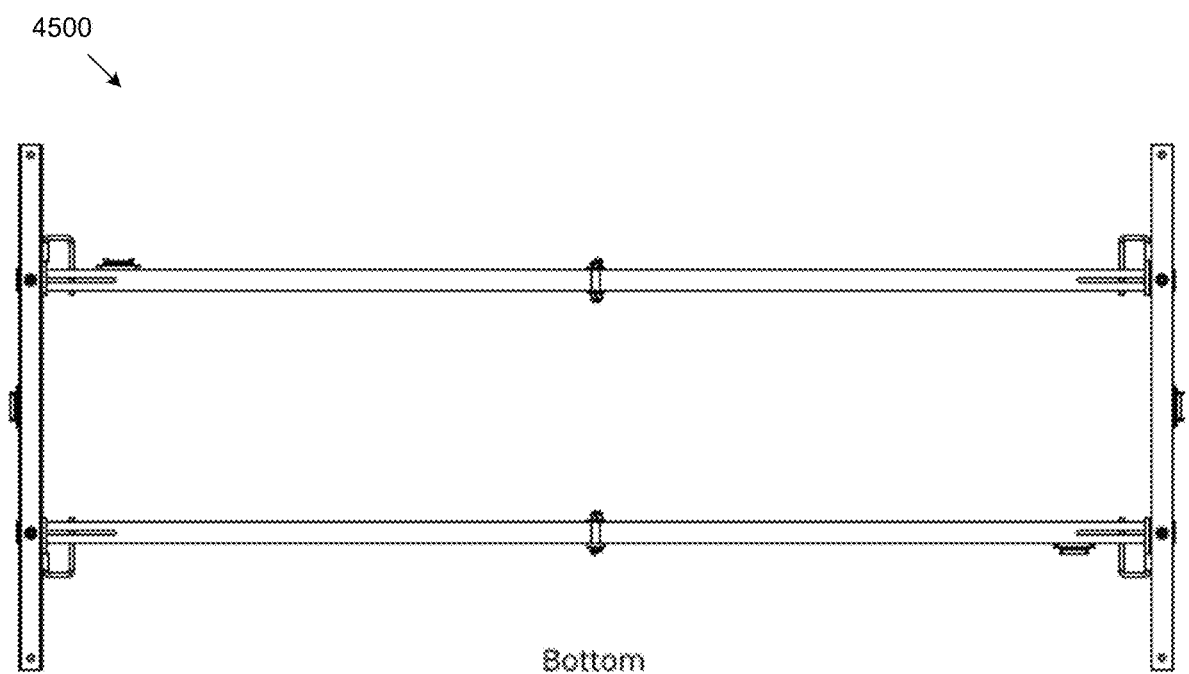
FIG. 45 is a bottom view of the mounting apparatus of FIG. 43.
Figure 46:
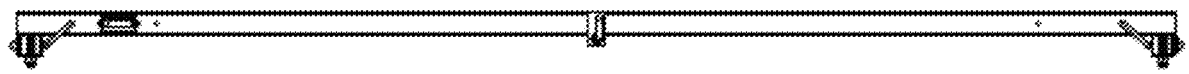
FIG. 46 is a front view of the mounting apparatus of FIG. 43.
Figure 47:
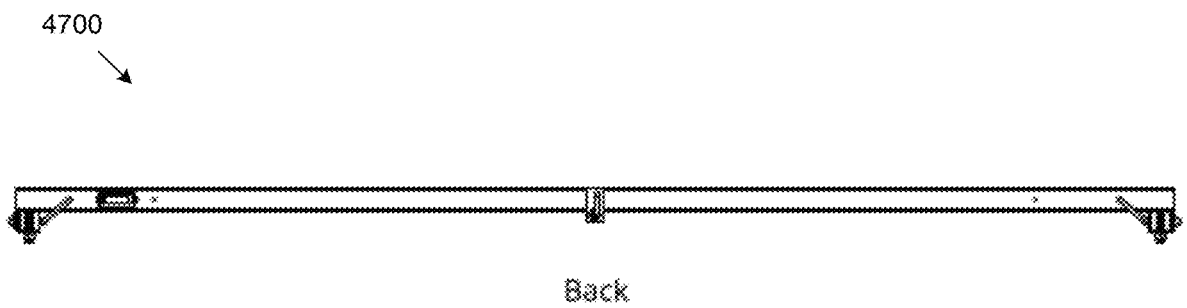
FIG. 47 is a back view of the mounting apparatus of FIG. 43.
Figure 48:
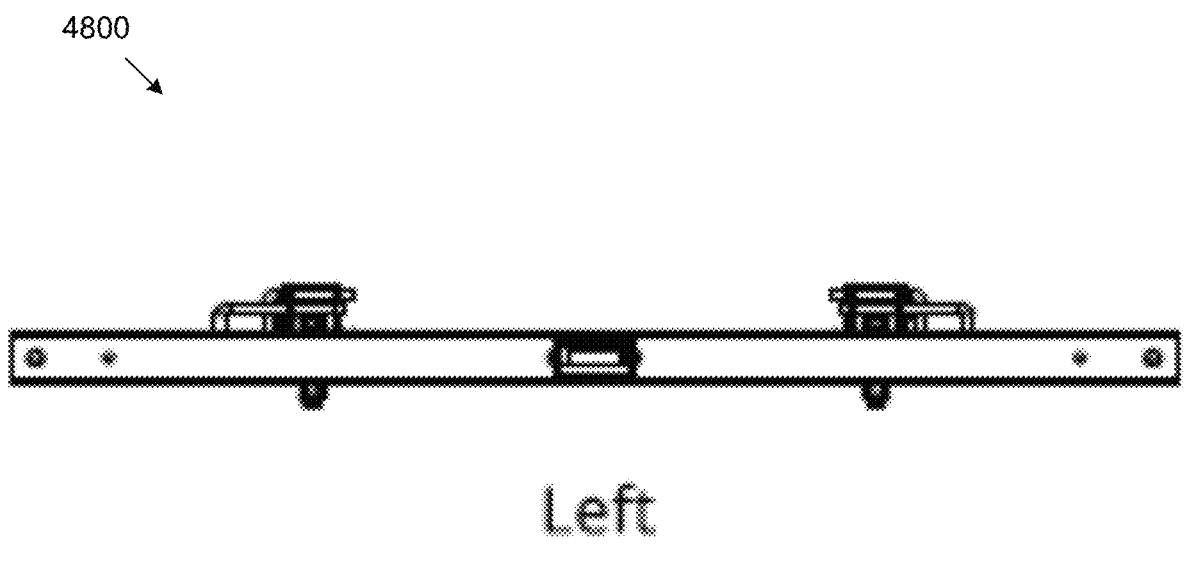
FIG. 48 is a left view of the mounting apparatus of FIG. 43.
Figure 49:
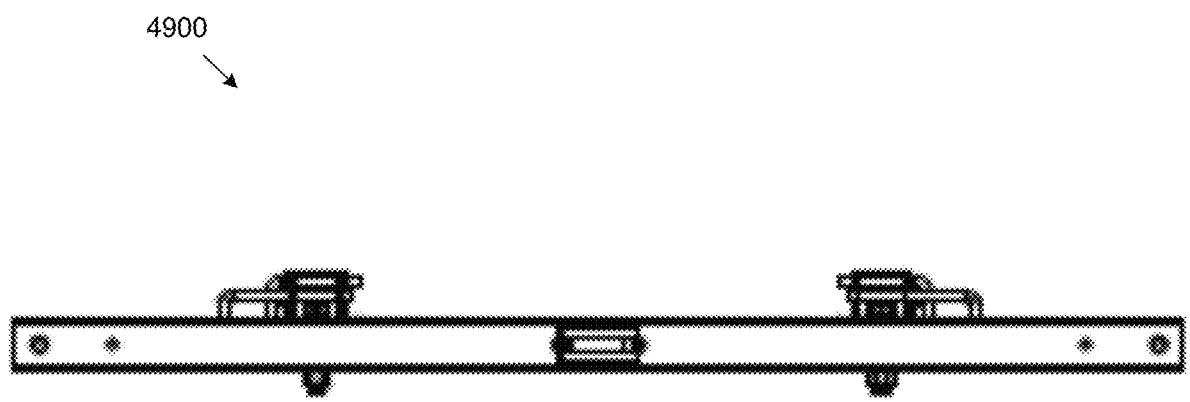
FIG. 49 is a right view of the mounting apparatus of FIG. 43.

Turning to FIG. 43, the system 4300 might employ one or more pins to secure the frame length into place. As depicted, four pins (4302)(4304)(4306)(4308) might be configured on the outside of the first, second, third, and fourth adjustable support beams to fix the adjustable support beams to the fixed length support beams. While the pins are depicted on the outside of the adjustable support beams, they may be configured on the inside of the frame components. In other arrangements, the system might employ one or a combination of locking pins, hinge pins, slide lock pins, locking nuts, click-lock technology, thread lockers, retaining mechanisms, extended rods, etc. placed through extension points on the frame to secure the frame length. Furthermore, the system may employ tubes configured to the inside of the frame (for example, a slide lock tube) to guide the pins through the adjustable support beam and lock the frame into place. These slide lock tubes may be fixed to the inside of the adjustable support beams, wherein their tube hole may line up with a hole in the adjustable support beams. Alternative views of system 4300 are presented in FIGS. 44-49. FIG. 44 presents a top view (4400) of system 4300. FIG. 45 presents a bottom view (4500) of system 4300. FIG. 46 presents a front view (4600) of system 4300. FIG. 47 presents a back view (4700) of system 4300. FIG. 48 presents a left view (4800) of system 4300. FIG. 49 presents a right view (4900) of system 4300.

Figure 50:
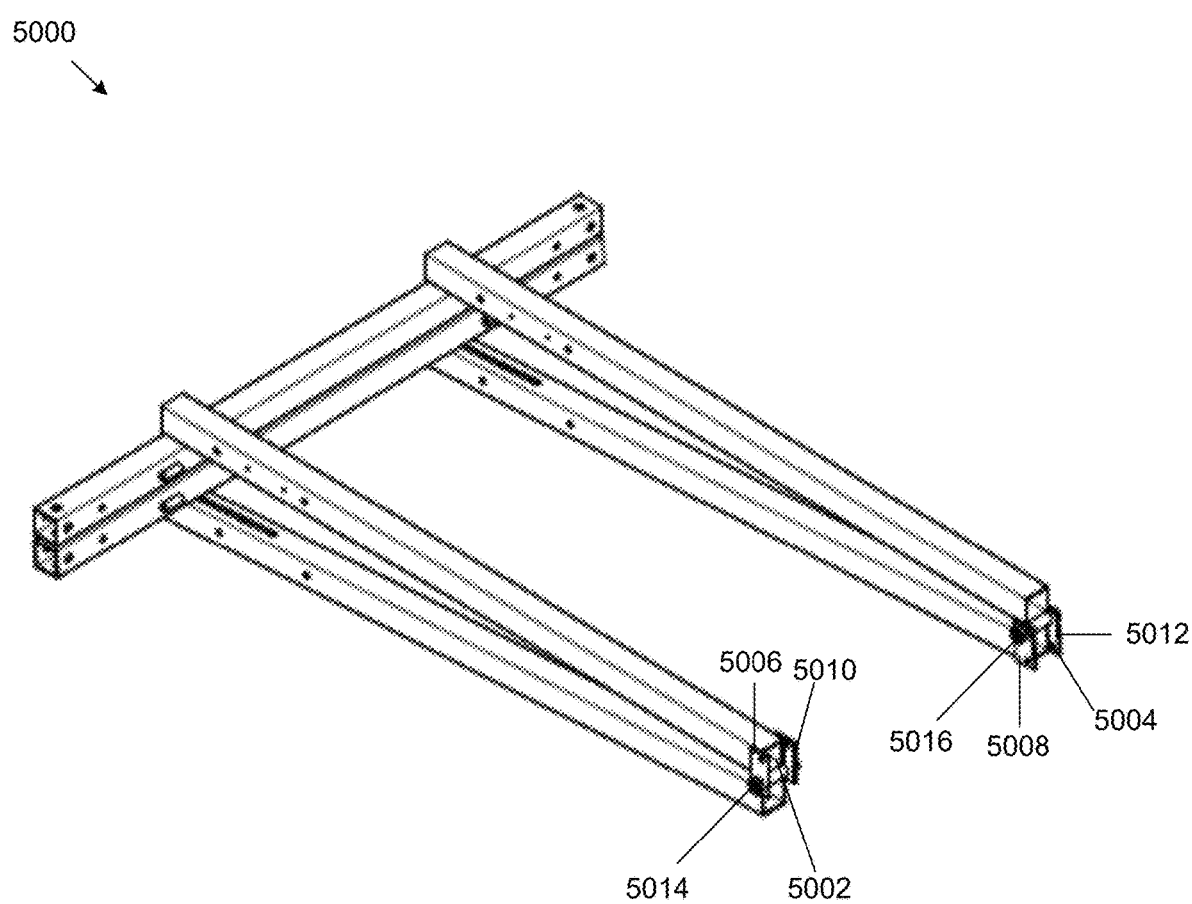
FIG. 50 is a perspective view of a folded HVAC mounting apparatus.

Turning to FIG. 50, a frame (5000) might be configured with one or more folding mechanisms, which may include a first folding assembly positioned between the first and fourth adjustable support beams and a second folding assembly positioned between the second and third adjustable support beams. Each folding assembly may employ a hinge (5002) (5004). Each hinge has a front hinge member (5006)(5008) fixed to the front side of the adjustable support beams, either between the first and fourth or the second and third adjustable support beams. Each hinge also has a back hinge member (5010)(5012) fixed to the back side of the adjustable support beams, either between the first and fourth or the second and third adjustable support beams. The front and back hinge members may engage a first hinge tube (5014), fixed within the frame between the first and fourth adjustable support beams, and a second hinge tube (5016), fixed within the frame between the second and third adjustable support beams. The hinge tube (5014, 5016) may have an inner diameter and an outer diameter, wherein the inner diameter may line up with holes in the adjustable support beam. The inner diameter may serve as a guiding tube for a pin, which may be used to secure the folding assemblies and fold the system, wherein the adjustable support beams may pivot around the hinge tube to fold the system. The folding mechanism can be configured in a variety of ways. For example, the folding mechanism one or more components with various properties. For example, components can be flexible and produced with flexible materials (e.g., rubber, plastic, etc.), produced with rigid or semi rigid materials, such as metal, epoxy resin, carbon fiber, etc., produced with a combination of flexible and rigid components, etc. In some implementations, the folding mechanism may use one hinge and pin, or it may employ multiple hinges and pins to fold the system into a stowable position.

The system may fold in a variety of geometries. In some embodiments, the first fixed beam is positioned above or below the second fixed beam, the first adjustable beam is positioned above or below the fourth adjustable beam, and the second adjustable beam is positioned above or below the third adjustable beam, wherein each beam may form an approximate 30-degree angle at the folding point. In other embodiments, the frame may fold flat, wherein the fixed beams may fold to lay side by side in the same plane and the first and fourth adjustable support beams and the second and third adjustable support beams may fold directly on top of one another.

Figure 51:
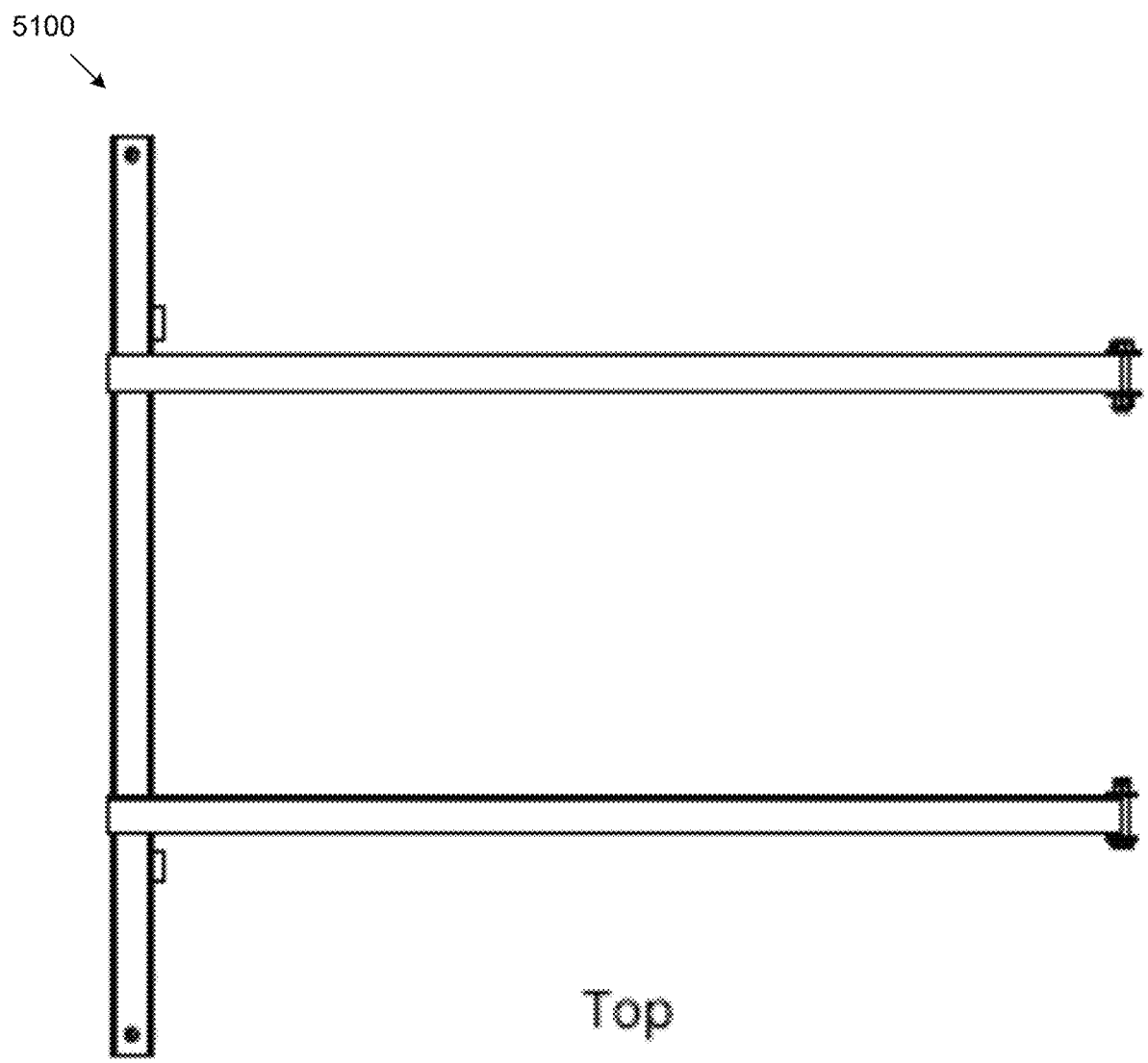
FIG. 51 is a top view of the mounting apparatus of FIG. 50.
Figure 52:
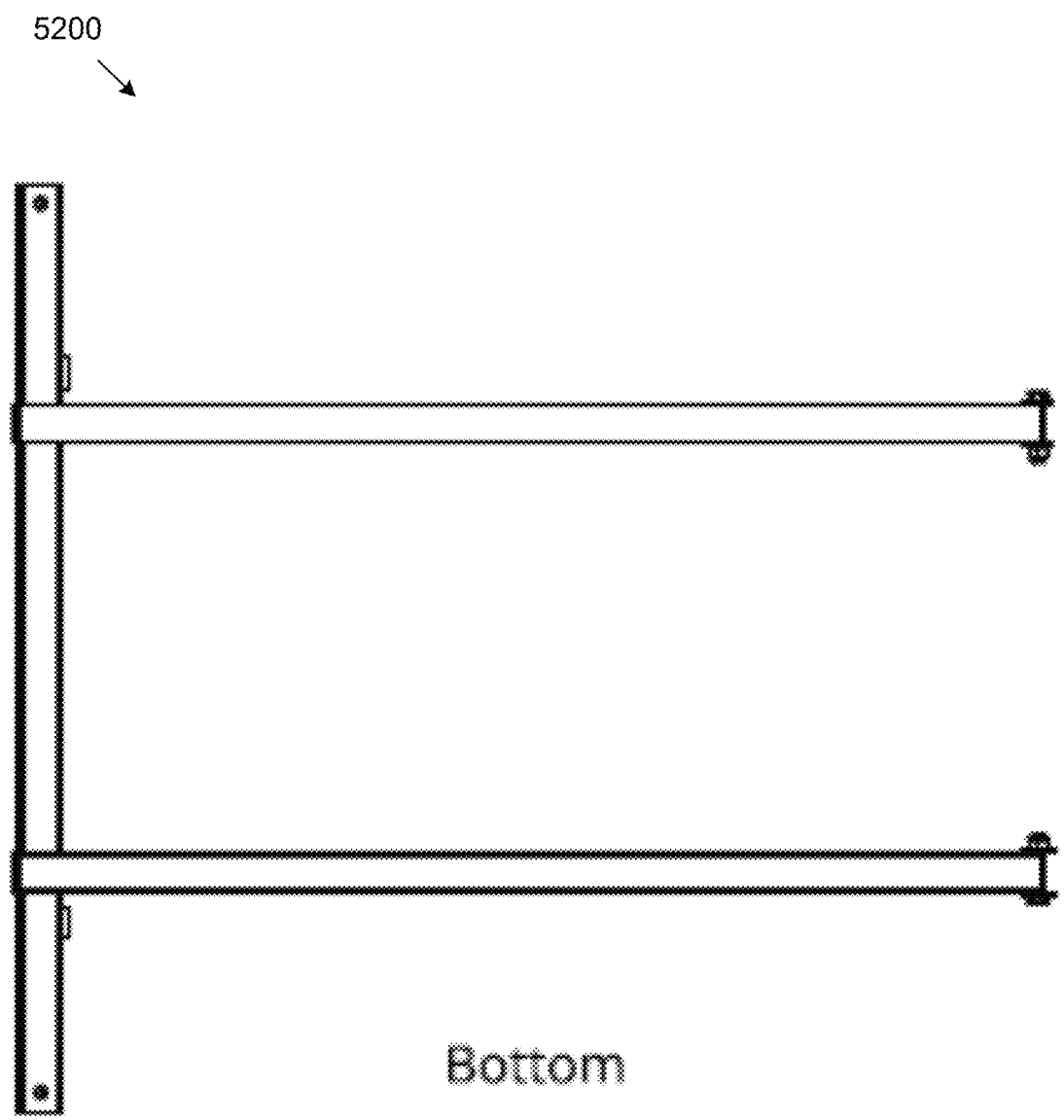
FIG. 52 is a bottom view of the mounting apparatus of FIG. 50.
Figure 53:
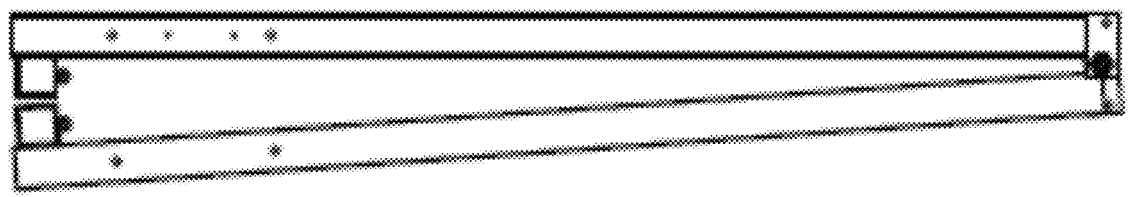
FIG. 53 is a front view of the mounting apparatus of FIG. 50.
Figure 54:
FIG. 54 is a back view of the mounting apparatus of FIG. 50.
Figure 55:
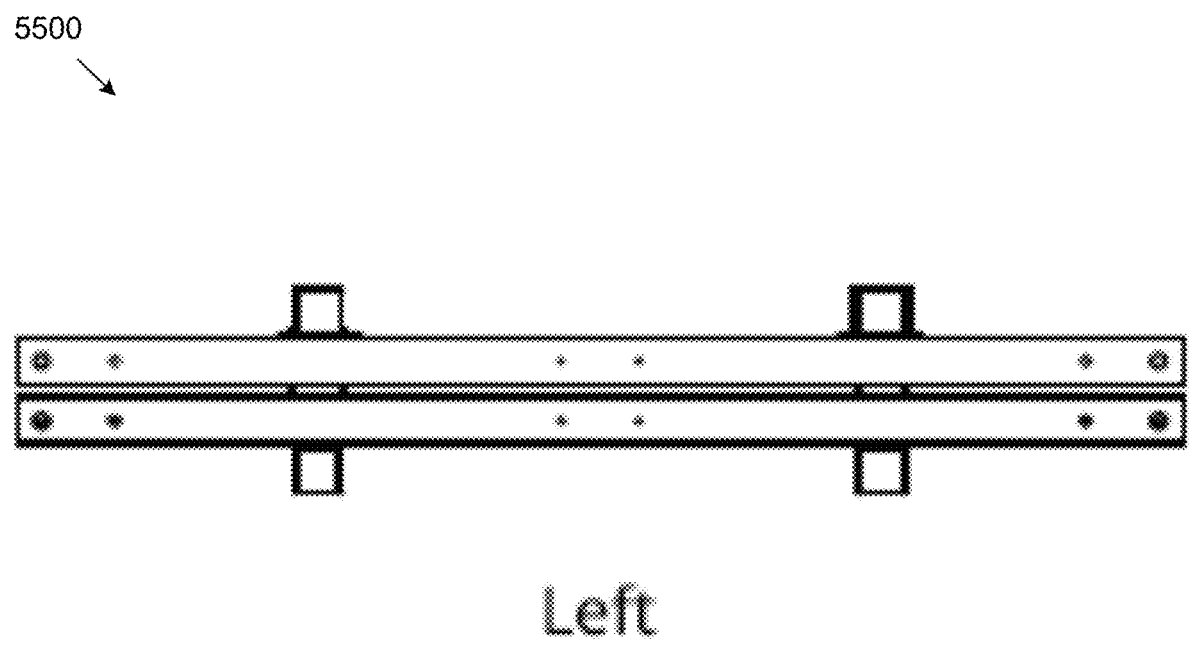
FIG. 55 is a left view of the mounting apparatus of FIG. 50.
Figure 56:
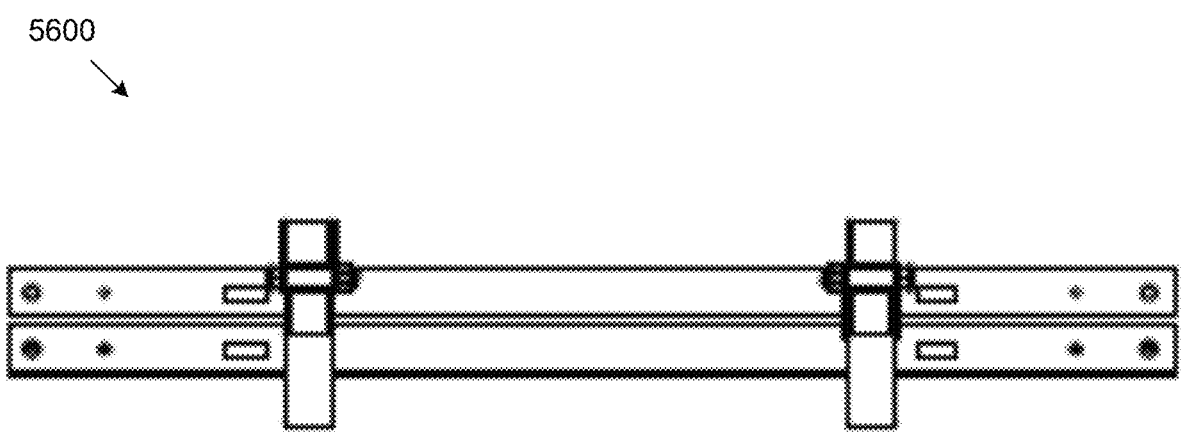
FIG. 56 is a right view of the mounting apparatus of FIG. 50.

In other aspects, the first and second support beams might have a plurality of folding members, allowing the system to fold at numerous points and in numerous directions, such as downwards or sideways. In yet another aspect, the third and fourth support beams might include a folding member. Overall, the folded configuration may preserve the integrity of the system, as it can remain folded or stowed (e.g., stored in a box) for long periods of time. In the folded configuration, the system might have an approximate dimension of 33 in. by 30 in., with an approximate height of 3 in., wherein the folded system can be stored in a box with an approximate dimension of 34 in. by 31 in. by 4 in. While the system may fold according to the values described, the length, width, and height of the system may be higher or lower than what is described. Furthermore, the system may utilize alternative folding mechanisms, such as tube hinge, ladder hinge, PVC couplers, or a self-locking folding hinge. Alternative views of the folded system 5000 are presented in FIGS. 51-56. FIG. 51 presents a top view (5100) of system 5000. FIG. 52 presents a bottom view (5200) of system 5000. FIG. 53 presents a front view (5300) of system 5000. FIG. 54 presents a back view (5400) of system 5000. FIG. 55 presents a left view (5500) of system 5000. FIG. 56 presents a right view (5600) of system 5000.

Figure 57:
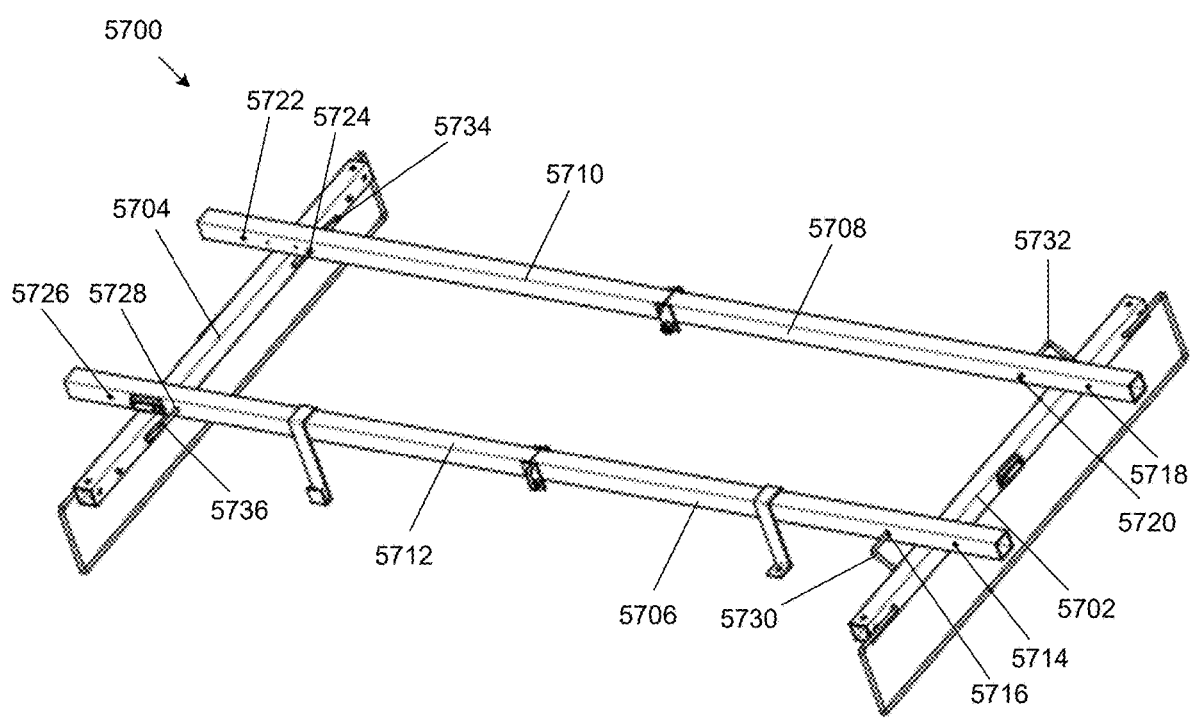
FIG. 57 is a perspective view of an extended HVAC mounting apparatus, depicting the base frame extended to minimum length, with pan hangers, leveling indicators, and pins present.

In some respects, the mounting frame can be adjusted in length. The previous figures depict the mount extended to a particular length (e.g., a maximum length). FIG. 57 presents the air handler mounting system 5700 (e.g., a mounting frame) with a shortened adjustable length, which includes a first fixed length support beam (5702) and a second fixed length support beam (5704) located parallel to one another, separated by a first distance. The apparatus further includes a first adjustable support beam (5706) and a second adjustable support beam (5708) fixed perpendicular to the first fixed length support beam, and a third adjustable support beam (5710) and a fourth adjustable support beam (5712) fixed perpendicular to the second fixed length support beam, wherein the first adjustable support beam and the fourth adjustable support beam are separated by a second distance to the second adjustable support beam and the third adjustable support beam. The system 5700 also includes: a first extension point (5714) and a second extension point (5716) spaced apart on the first adjustable support beam, a first extension point (5718) and a second extension point (5720) spaced apart on the second adjustable support beam, a first extension point (5722) and a second extension point (5724) spaced apart on the third adjustable support beam, and a first extension point (5726) and a second extension point (5728) spaced apart on the fourth adjustable support beam. The first and second extension points allow the system to be adjustable between two lengths, wherein the adjustable support beams may slide over the fixed length support beams to the desired length before being fixed to the fixed length support beams. While two extension points are depicted, the system may be extendable to more lengths.

To adjust the length of the system, a pin may be secured into the second extension point instead of the first extension point, which shortens the frame length. As depicted in the shortened configuration, a first of four pins (5730) are fixed to the second extension point of the first adjustable support beam and the first fixed length support beam. A second pin (5732) is fixed to the second extension point of the second adjustable support beam and the first fixed length support beam. A third pin (5734) is fixed to the second extension point of the third adjustable support beam and the second fixed length support beam. A fourth pin (5736) is fixed to the second extension point of the fourth adjustable support beam and the second fixed length support beam. While the system may range in extension length, the fixed length support beams may be separated by about 52 in. in the depicted shortened configuration, wherein this length may extend from 52 in. to 66 in., depending on the length needed for a drain pan or for HVAC unit mounting.

Figure 58:
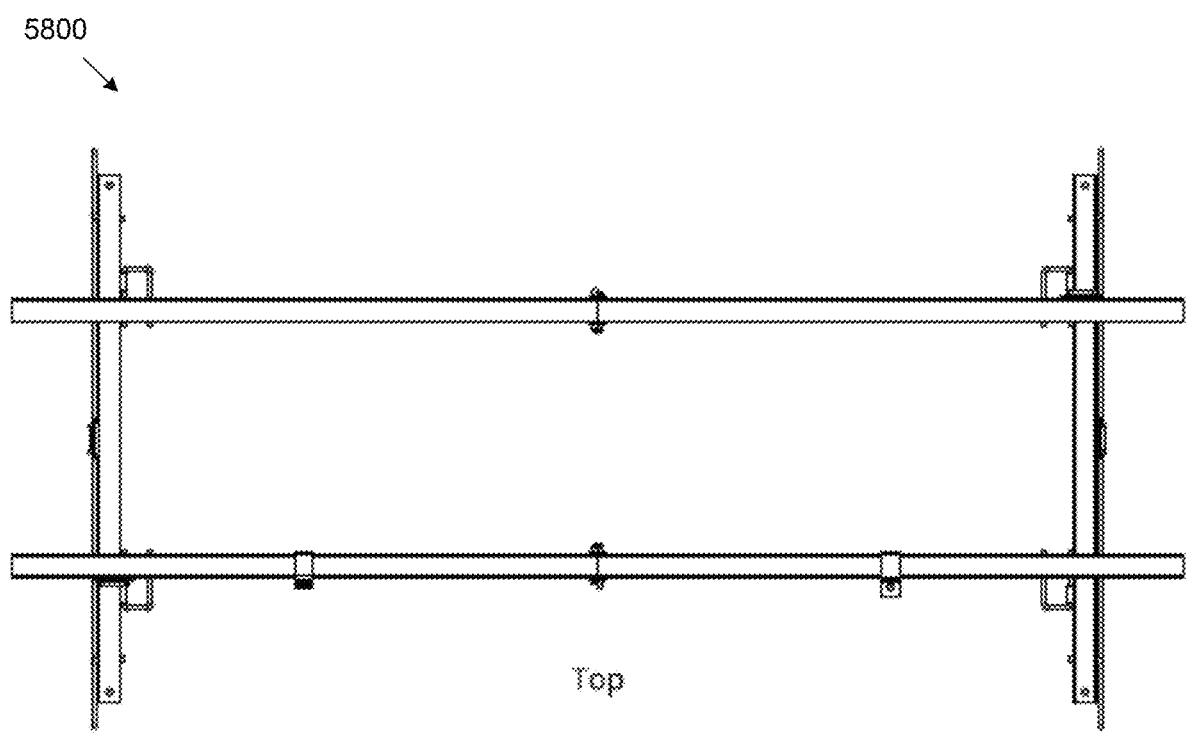
FIG. 58 is a top view of the mounting apparatus of FIG. 57.
Figure 59:
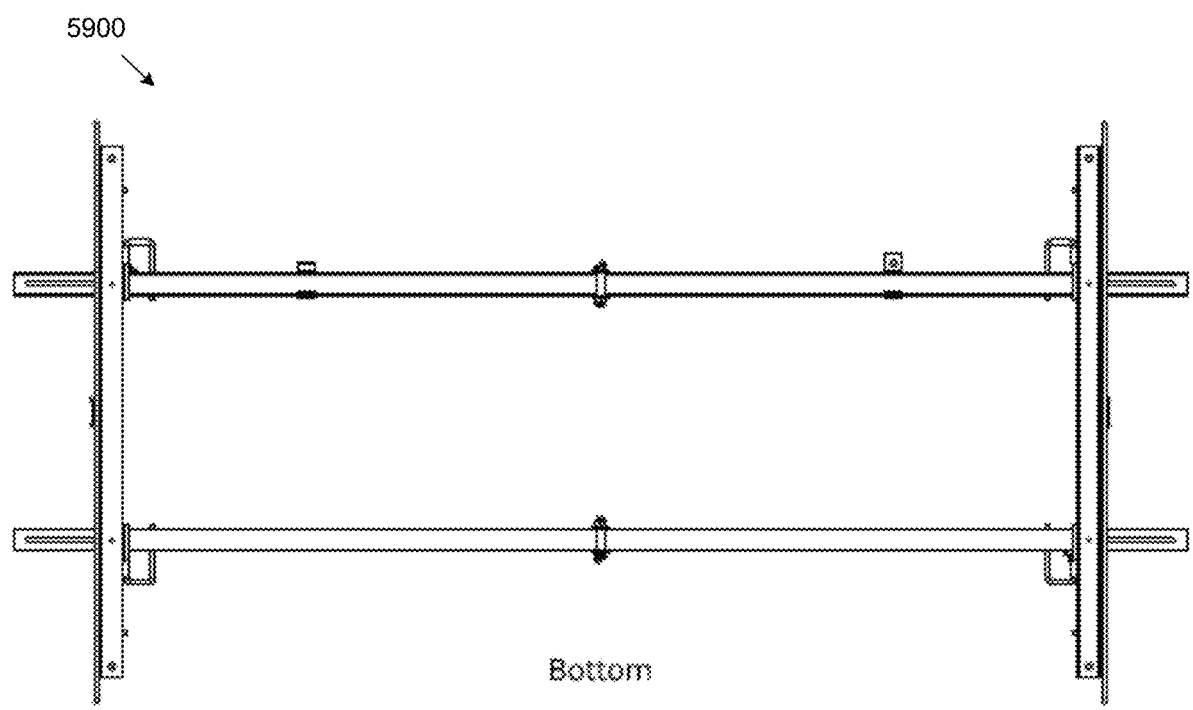
FIG. 59 is a bottom view of the mounting apparatus of FIG. 57.
Figure 60:
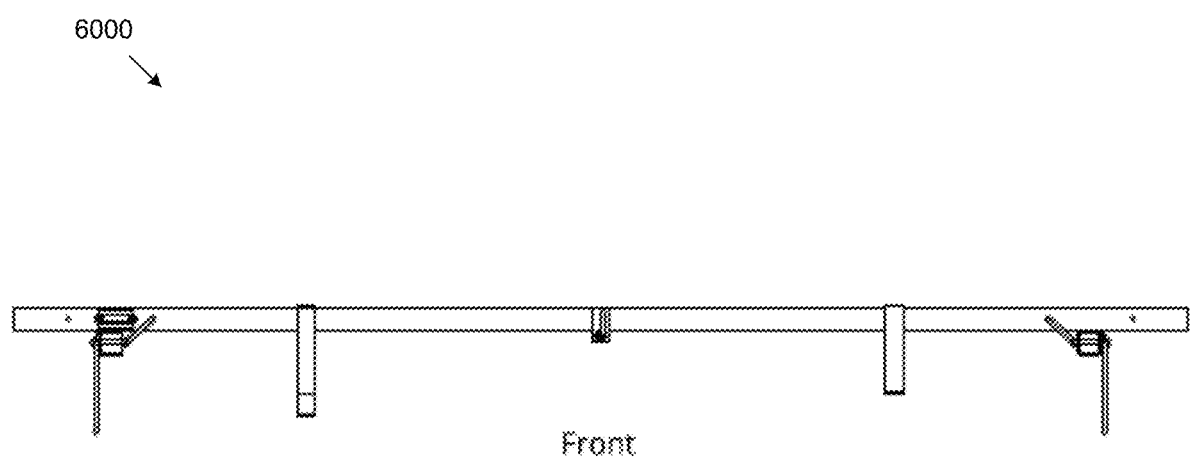
FIG. 60 is a front view of the mounting apparatus of FIG. 57.
Figure 61:
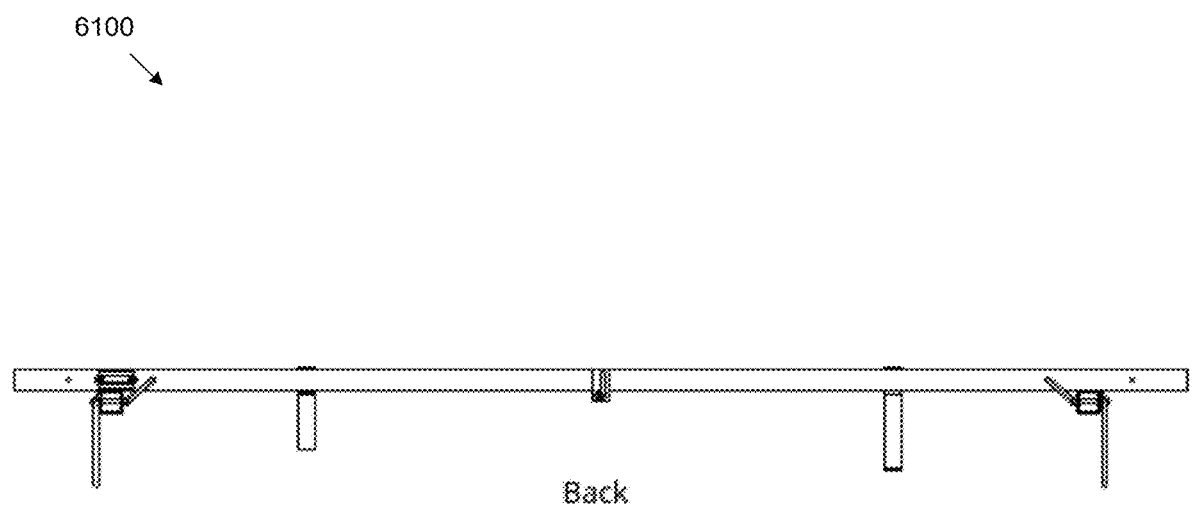
FIG. 61 is a back view of the mounting apparatus of FIG. 57.
Figure 62:
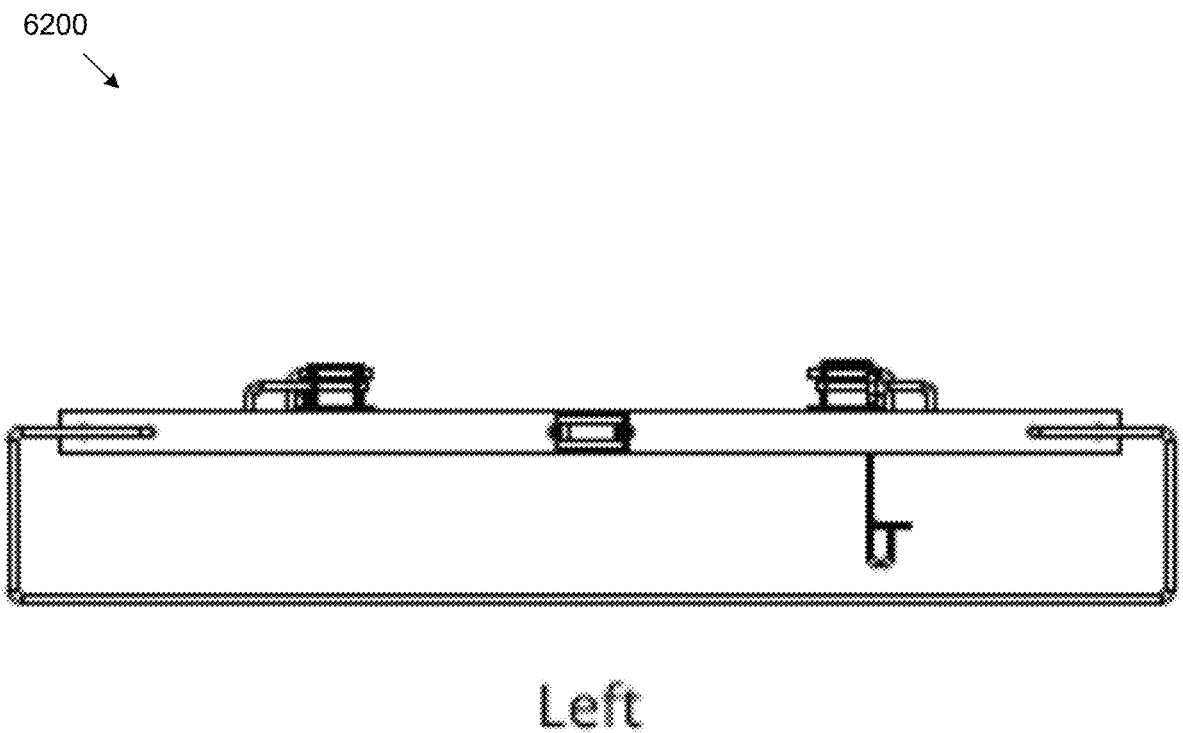
FIG. 62 is a left view of the mounting apparatus of FIG. 57.
Figure 63:
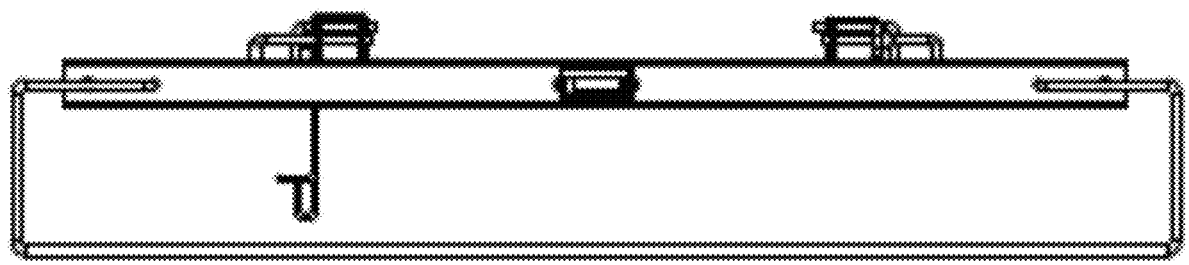
FIG. 63 is a right view of the mounting apparatus of FIG. 57.

The system 5700 may be extendable in multiple geometries and might employ multiple adjustable components to match the dimensions of a variety of air handler systems. In one aspect, the adjustable support beams might be configured to telescopically extend to a variety of lengths. Furthermore, while the mounting system is depicted with two extension points, the system may employ a plurality of extension points to further adjust the system length. In some embodiments, these extension points are secured with pins fixed to the first and second fixed length support beams. In other aspects, the length of the system 5700 might be fixed, and the width of the frame might be adjusted through similar methods to those described above. In a further aspect, a combination of the fixed and adjustable supporting beams might be configured with numerous extension points, allowing the system 5700 to be adjusted for width and length. Alternative views of the system 5700 are presented in FIGS. 58-63. FIG. 58 presents a top view (5800) of the system 5700. FIG. 59 presents a bottom view (5900) of the system 5700. FIG. 60 presents a front view (6000) of the system 5700. FIG. 61 presents a back view (6100) of the system 5700. FIG. 62 presents a left view (6200) of the system 5700. FIG. 63 presents a right view (6300) of the system 5700.

Figure 64:
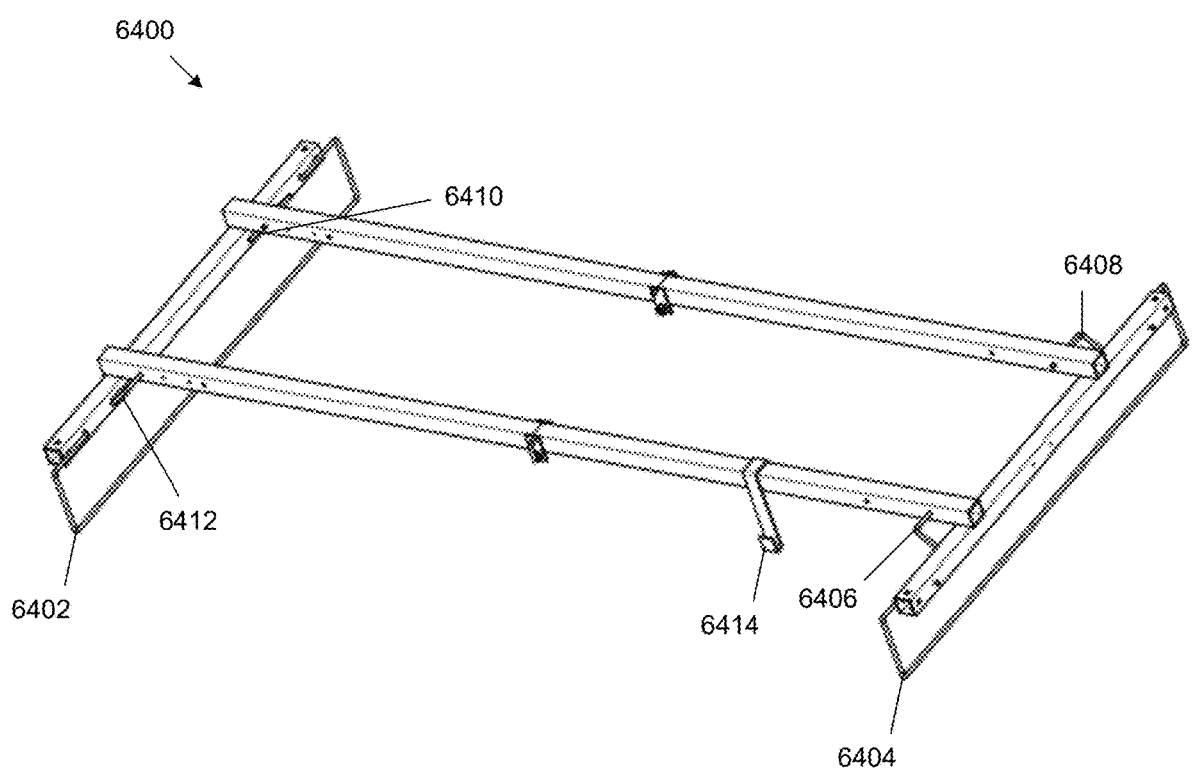
FIG. 64 is a perspective view of an HVAC mounting apparatus, depicting a base frame without leveling indicators while including pins, drain pan hangers, and a hook variant sensor hanger.
Figure 65:
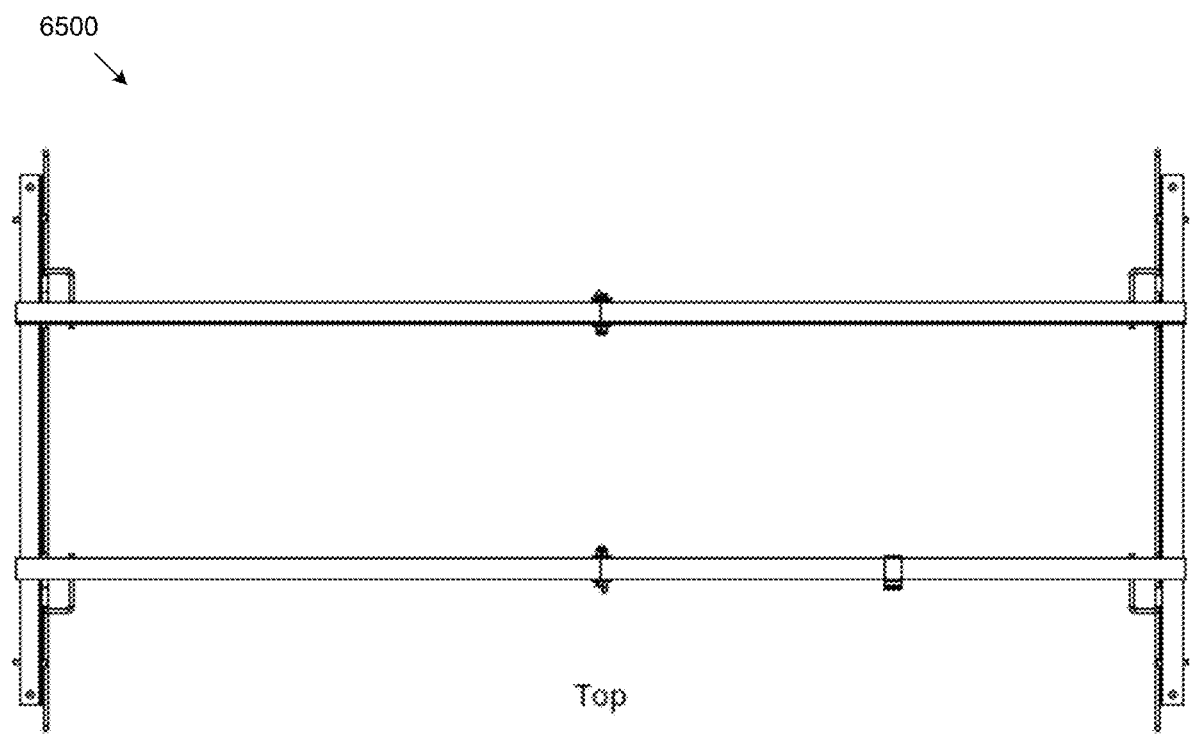
FIG. 65 is a top view of the mounting apparatus of FIG. 64.
Figure 66:
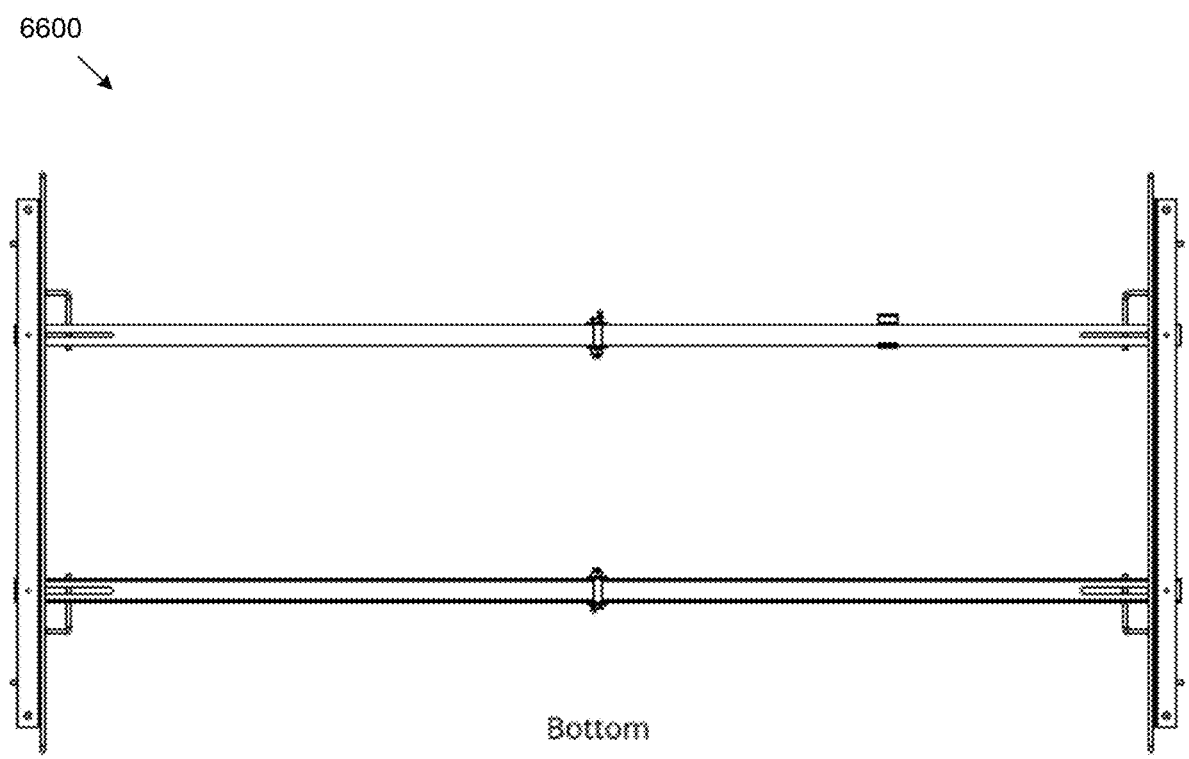
FIG. 66 is a bottom view of the mounting apparatus of FIG. 64.
Figure 67:
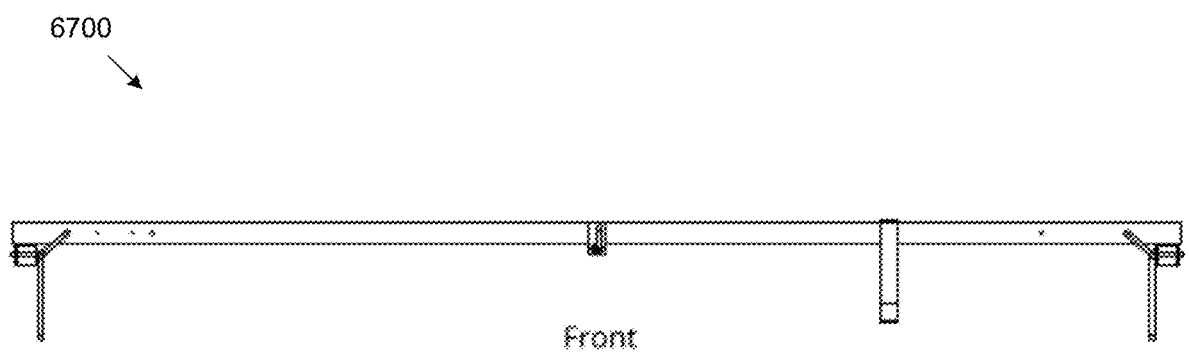
FIG. 67 is a front view of the mounting apparatus of FIG. 64.
Figure 68:
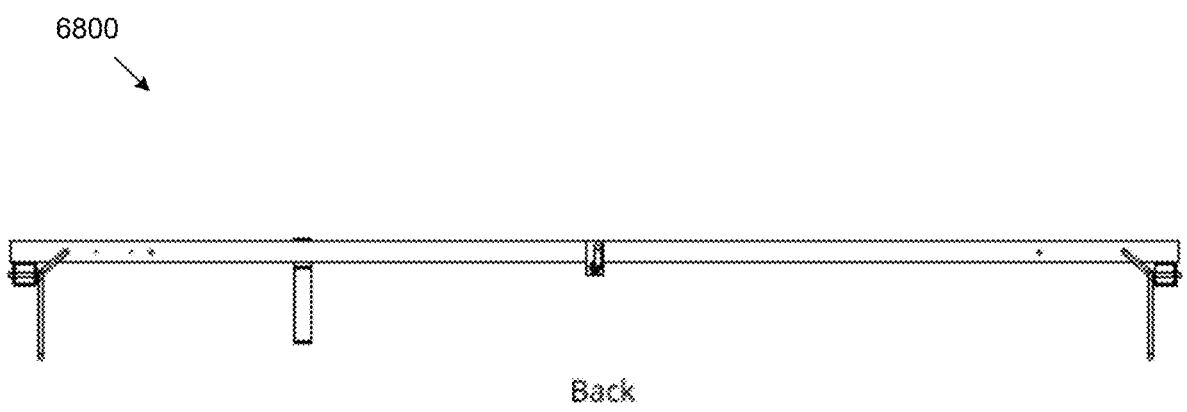
FIG. 68 is a back view of the mounting apparatus of FIG. 64.
Figure 69:
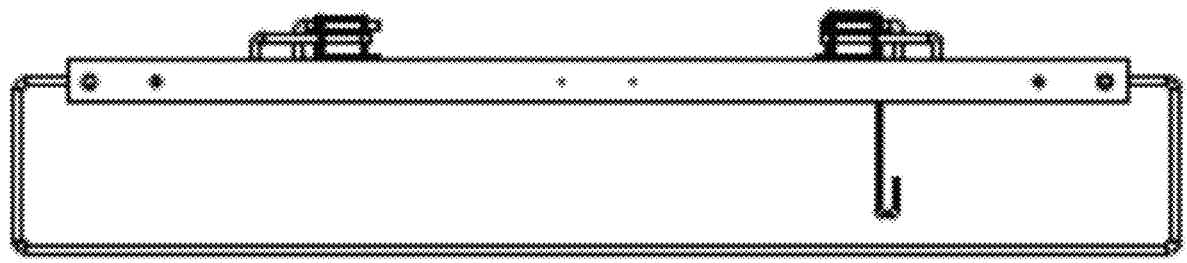
FIG. 69 is a left view of the mounting apparatus of FIG. 64.
Figure 70:
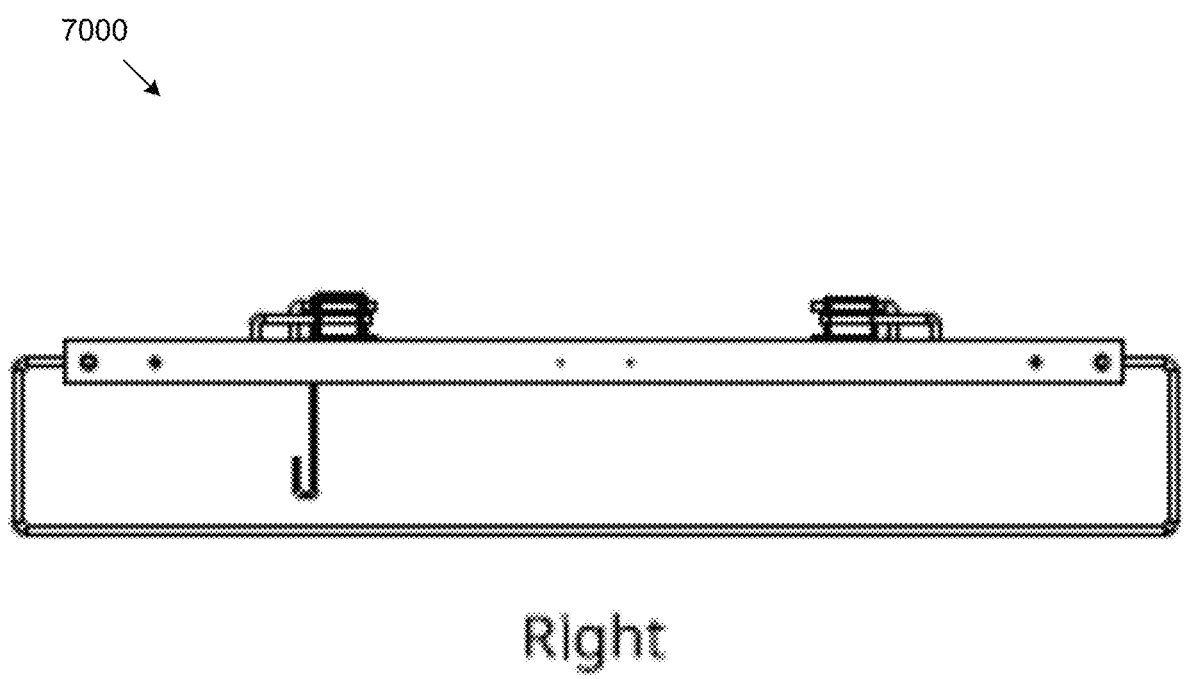
FIG. 70 is a right view of the mounting apparatus of FIG. 64.

In addition to the components and examples described above, the mounting system might have a variety of implementations. For example, turning to FIG. 64, a mounting system (6400) might not include leveling indicators, while it may employ a left drain pan hanger (6402), a right drain pan hanger (6404), four pins (6406)(6408)(6410)(6412), and a hook sensor variant (6414). Alternative views of the system 6400 are presented in FIGS. 65-70. FIG. 65 presents a top view (6500) of system 6400. FIG. 66 presents a bottom view (6600) of system 6400. FIG. 67 presents a front view (6700) of the system 6400. FIG. 68 presents a back view (6800) of system 6400. FIG. 69 presents a left view (6900) of system 6400. FIG. 70 presents a right view (7000) of the system 6400.

Figure 71:
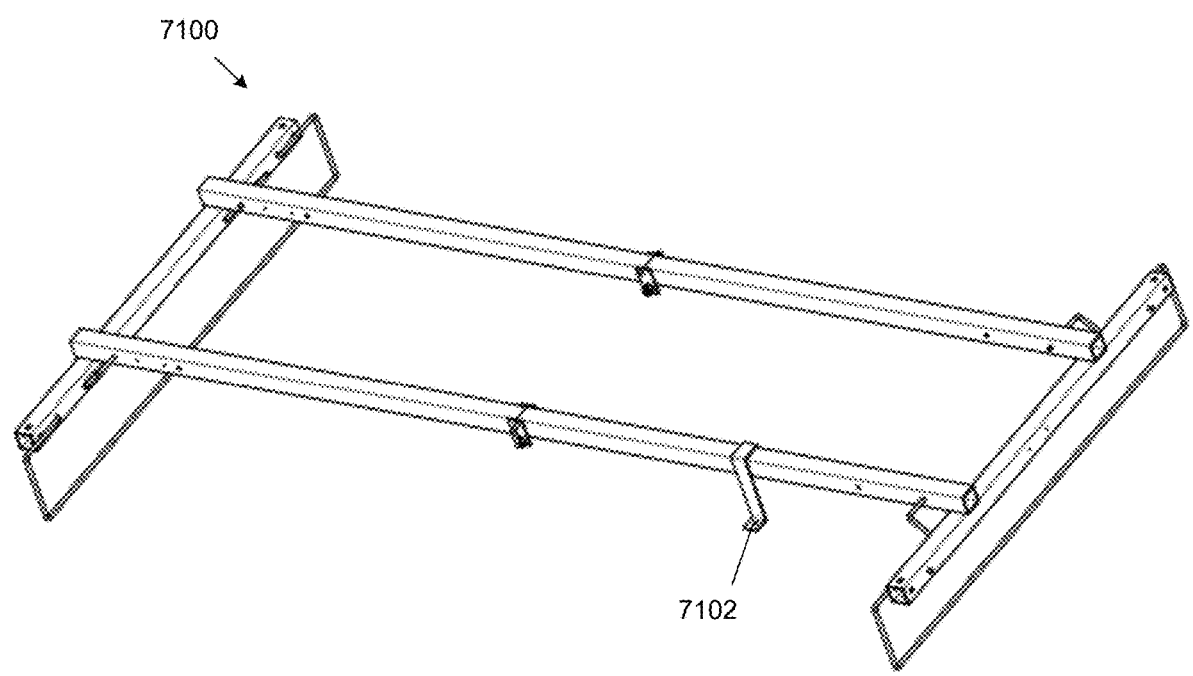
FIG. 71 is a perspective view of an HVAC mounting apparatus, depicting a base frame without leveling indicators while including pins, drain pan hangers, and a clip variant sensor hanger.
Figure 72:
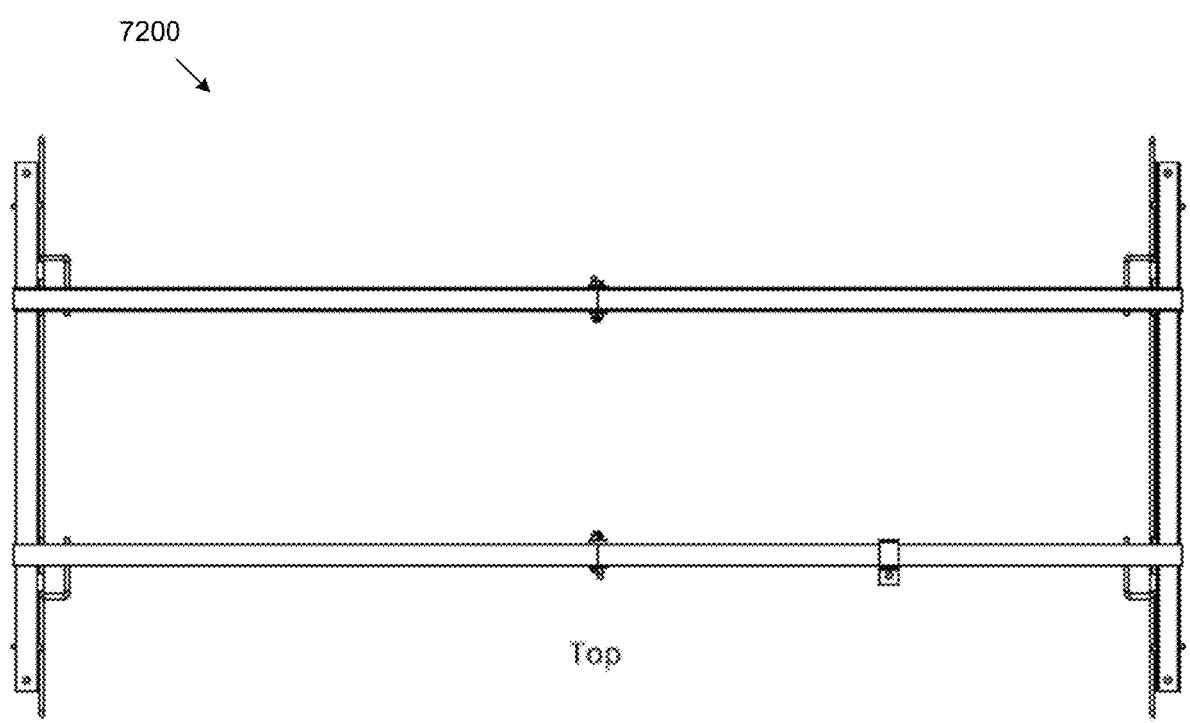
FIG. 72 is a top view of the mounting apparatus of FIG. 71.
Figure 73:
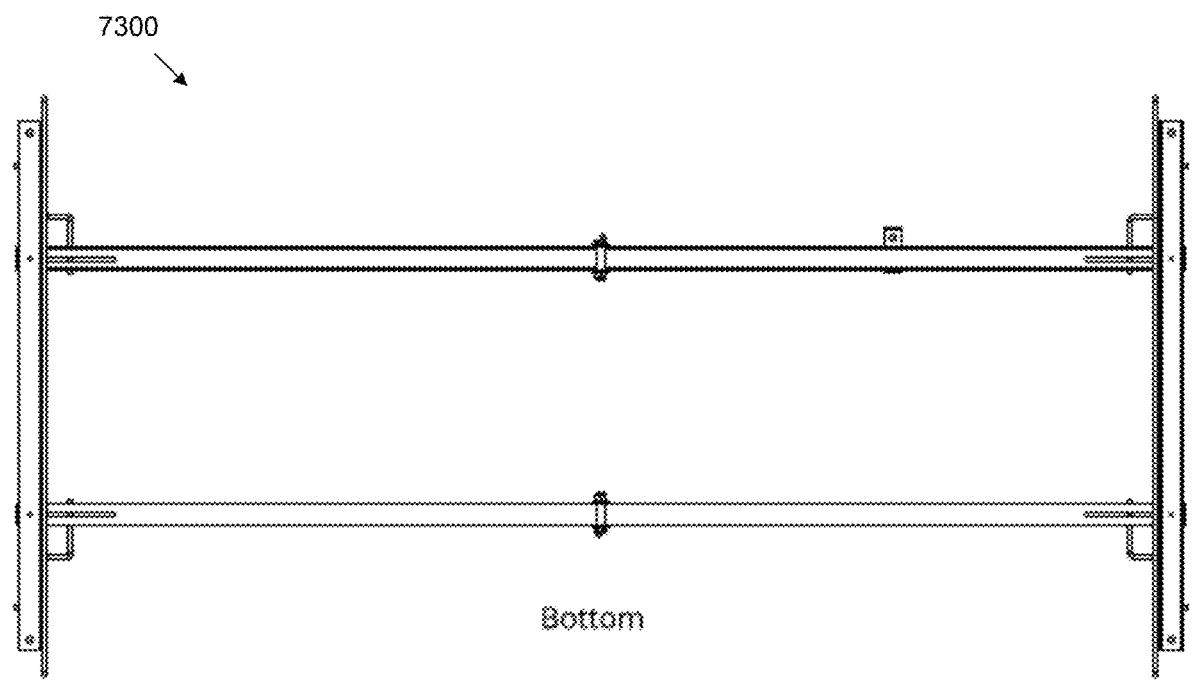
FIG. 73 is a bottom view of the mounting apparatus of FIG. 71.
Figure 74:
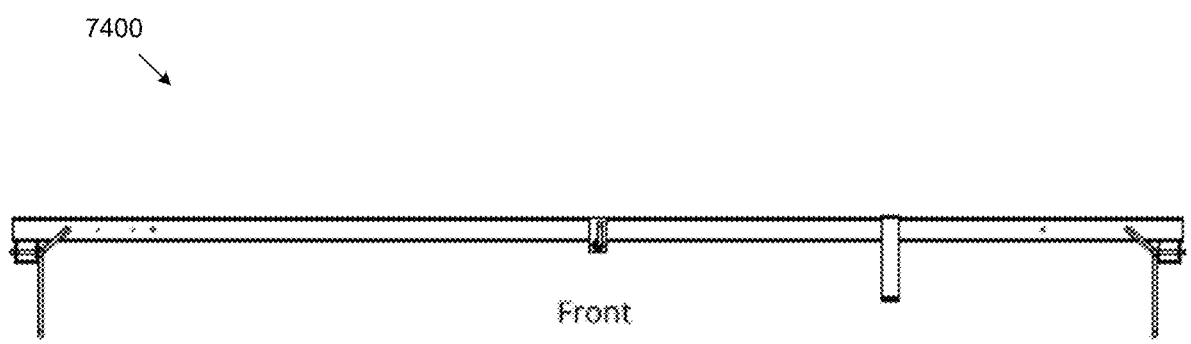
FIG. 74 is a front view of the mounting apparatus of FIG. 71.
Figure 75:
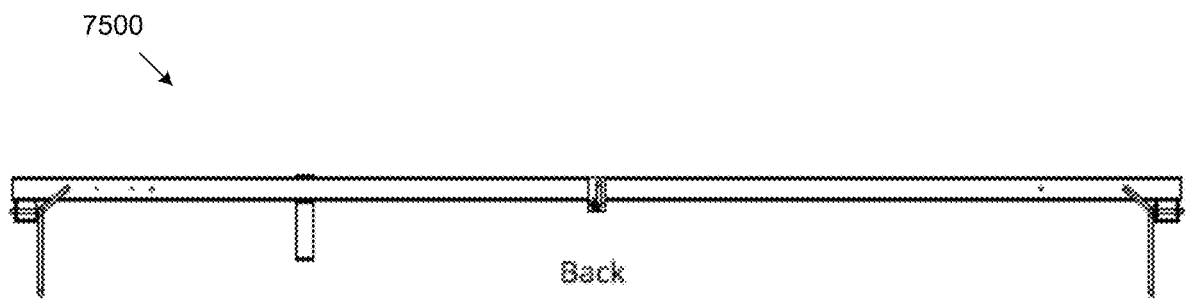
FIG. 75 is a back view of the mounting apparatus of FIG. 71.
Figure 76:
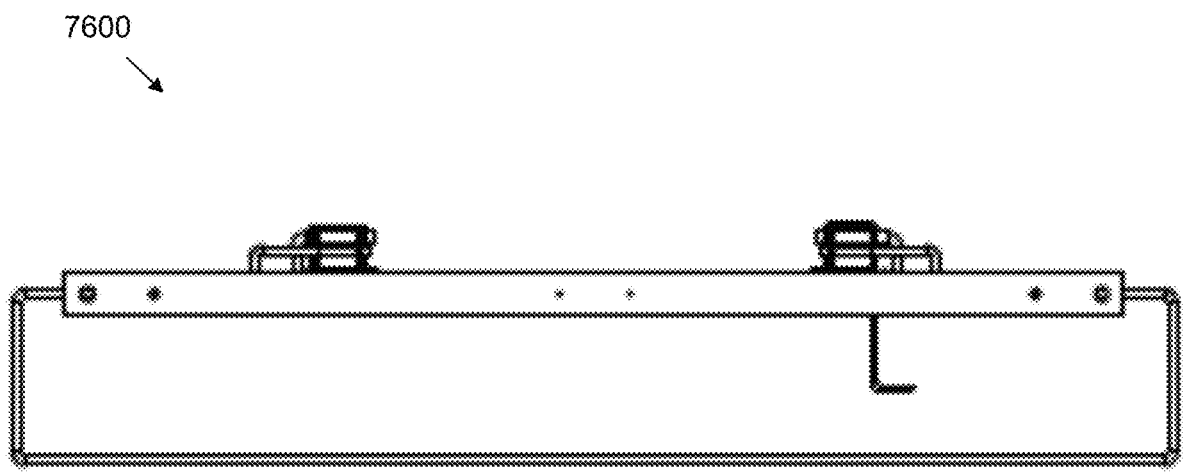
FIG. 76 is a left view of the mounting apparatus of FIG. 71.
Figure 77:
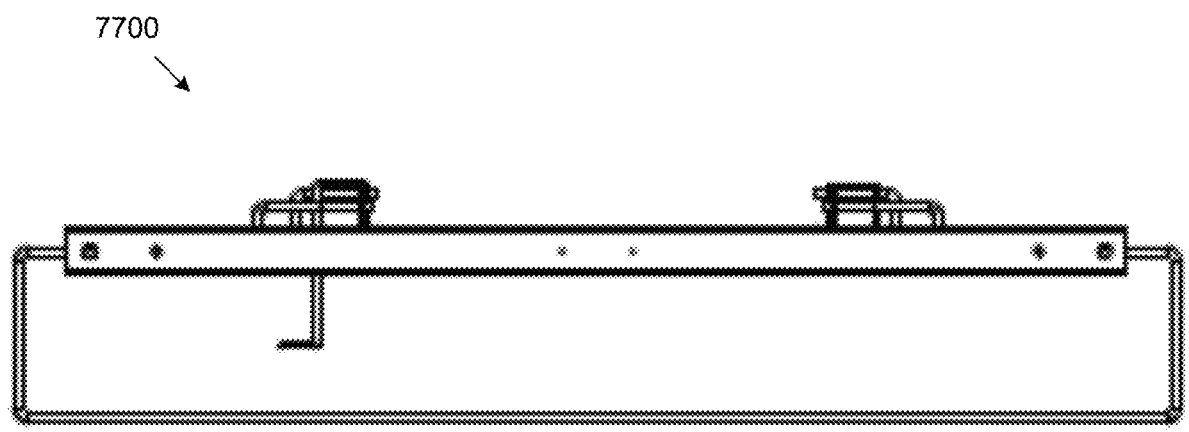
FIG. 77 is a right view of the mounting apparatus of FIG. 71.

FIG. 71 depicts an alternative arrangement, as a mounting system (7100) has a clip variant sensor (7102). Alternative views of the system 7100 are presented in FIGS. 72-77. FIG. 72 presents a top view (7200) of the system 7100. FIG. 73 presents a bottom view (7300) of system 7100. FIG. 74 presents a front view (7400) of the system 7100. FIG. 75 presents a back view (7500) of the system 7100. FIG. 76 presents a left view (7600) of the system 7100. FIG. 77 presents a right view (7700) of the system 7100.

Figure 78:
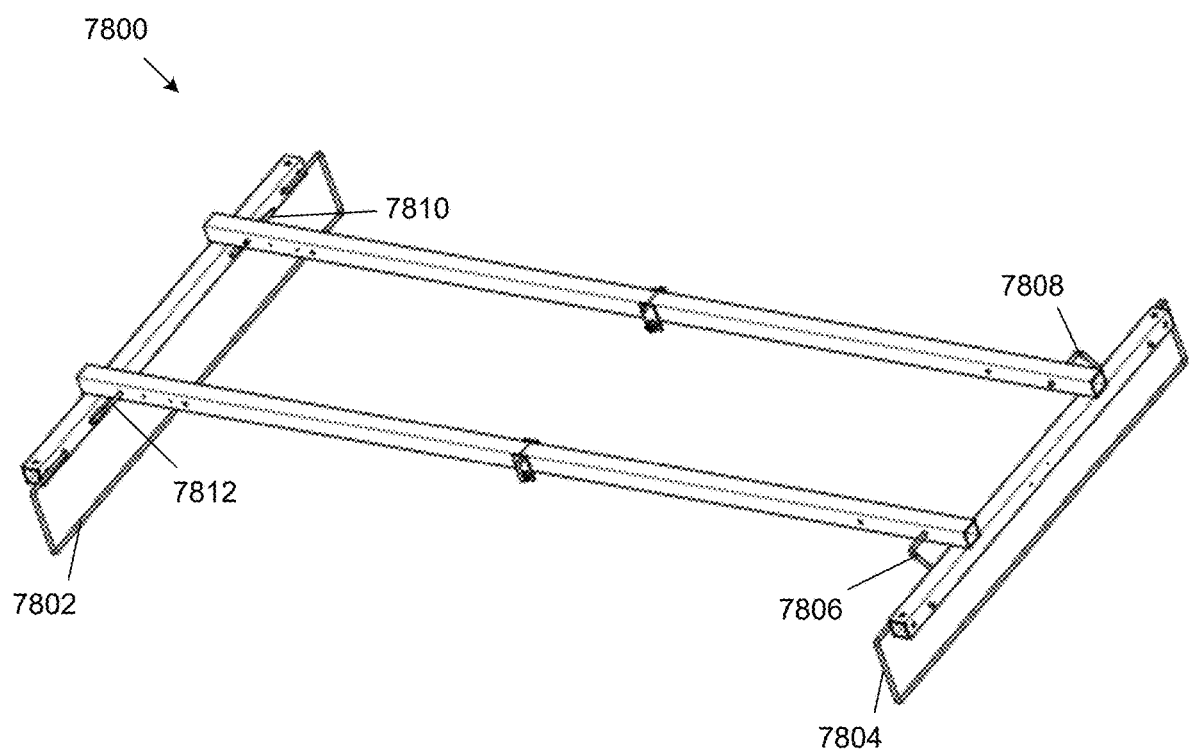
FIG. 78 is a perspective view of an HVAC mounting apparatus, depicting a base frame without leveling indicators and sensor hangers while including pins and drain pan hangers.
Figure 79:
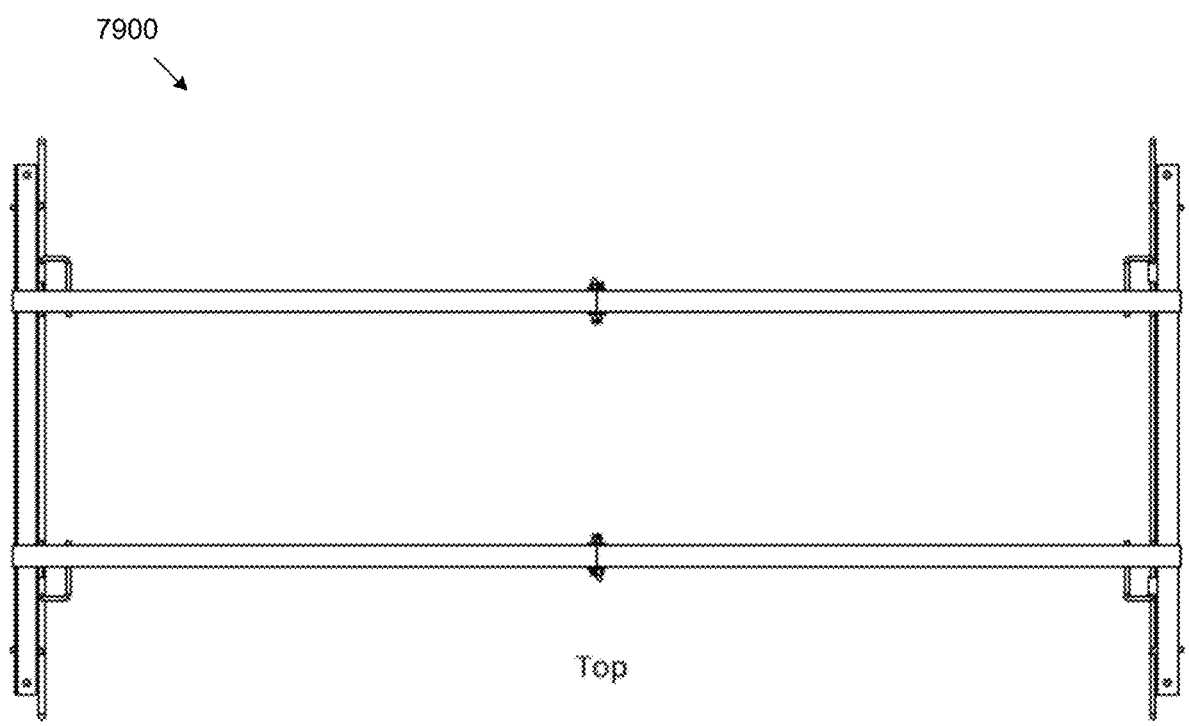
FIG. 79 is a top view of the mounting apparatus of FIG. 78.
Figure 80:
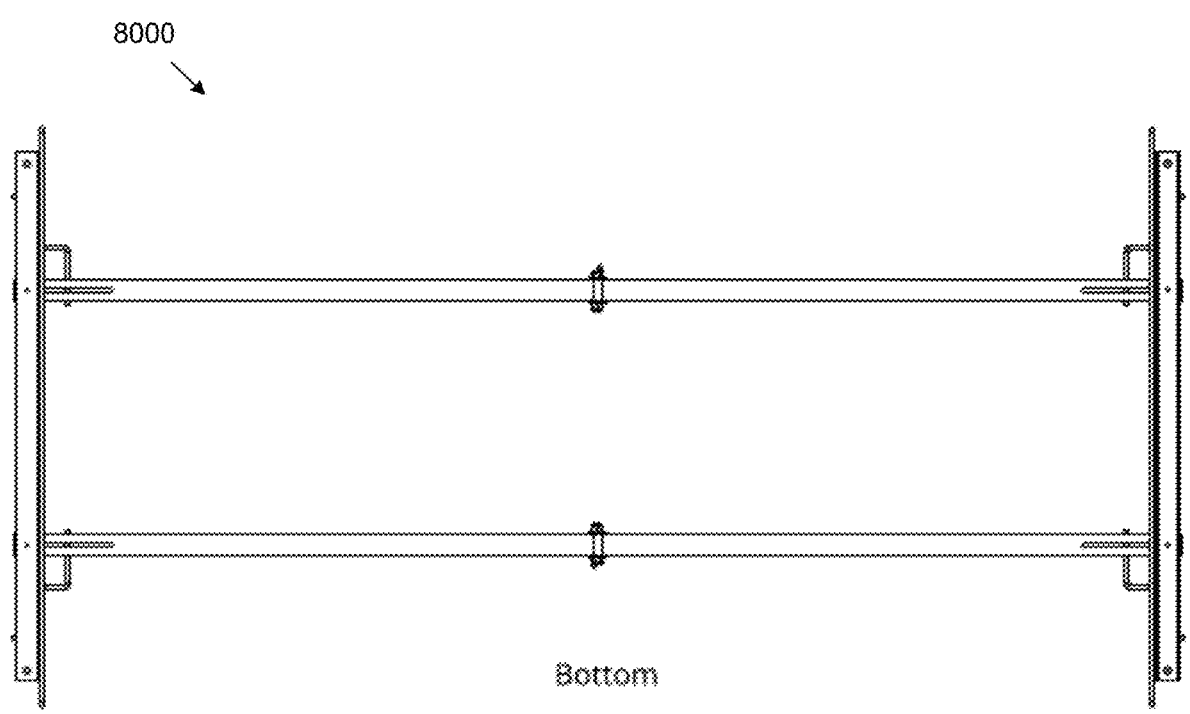
FIG. 80 is a bottom view of the mounting apparatus of FIG. 78.
Figure 81:
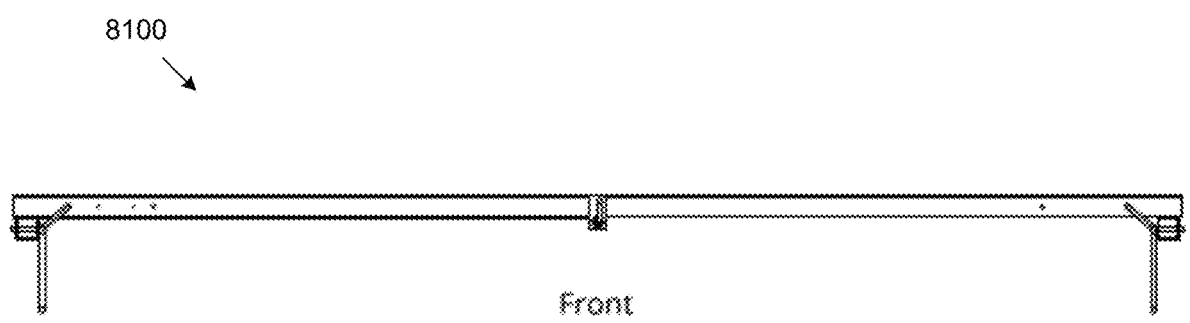
FIG. 81 is a front view of the mounting apparatus of FIG. 78.
Figure 82:
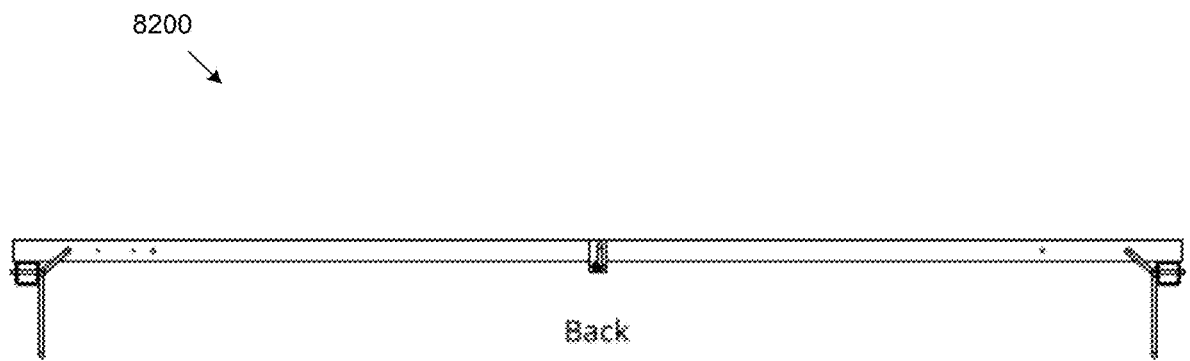
FIG. 82 is a back view of the mounting apparatus of FIG. 78.
Figure 83:
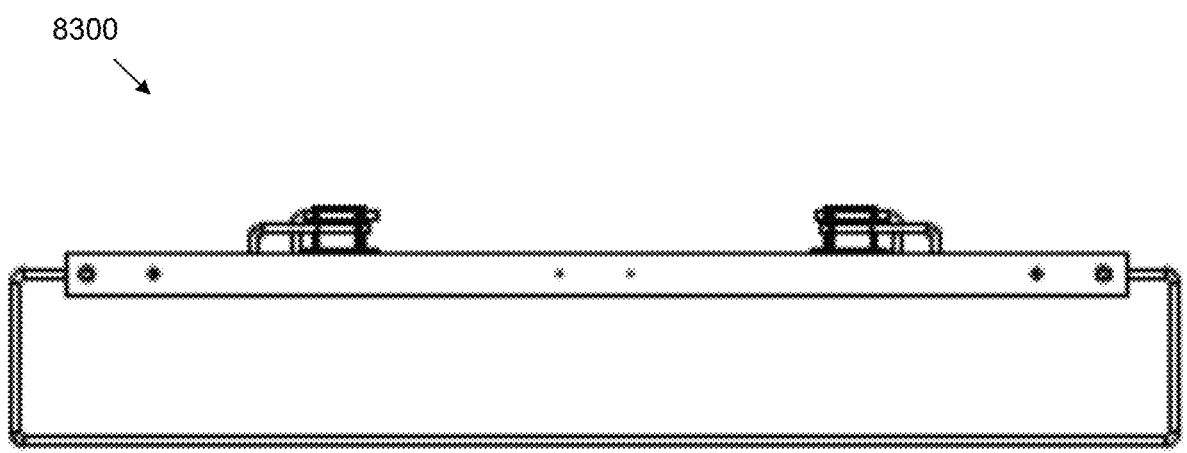
FIG. 83 is a left view of the mounting apparatus of FIG. 78.
Figure 84:
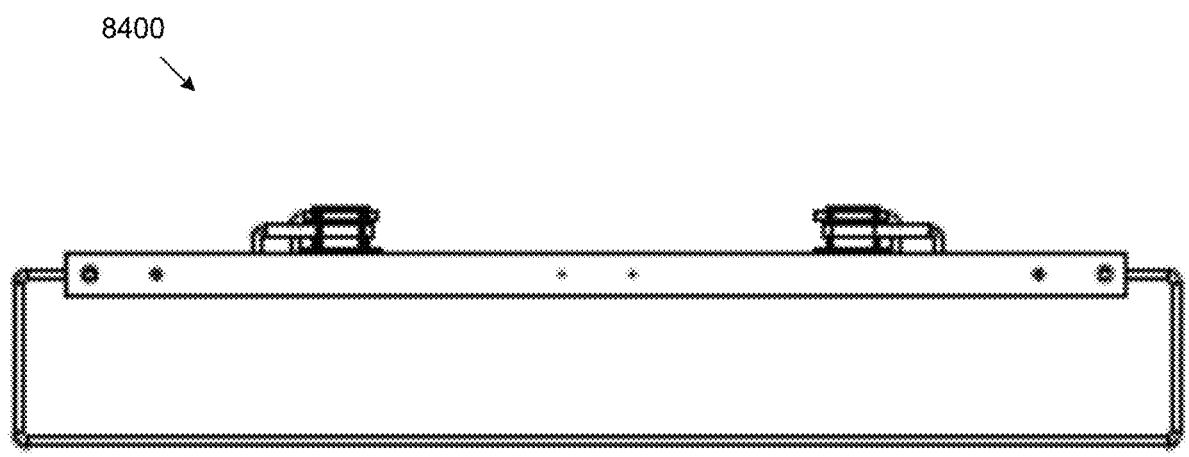
FIG. 84 is a right view of the mounting apparatus of FIG. 78.

Turning to FIG. 78, another implementation of a mounting system (7800) might not include leveling indicators or sensor hangers, while it may include a left drain pan hanger (7802), a right drain pan hanger (7804), and four pins (7806)(7808)(7810)(7812). Alternative views of the system 7800 are presented in FIGS. 79-84. FIG. 79 presents a top view (7900) of the system 7800. FIG. 80 presents a bottom view (8000) of the system 7800. FIG. 81 presents a front view (8100) of the system 7800. FIG. 82 presents a back view (8200) of the system 7800. FIG. 83 presents a left view (8300) of the system 7800. FIG. 84 presents a right view (8400) of the system 7800.

Figure 85:
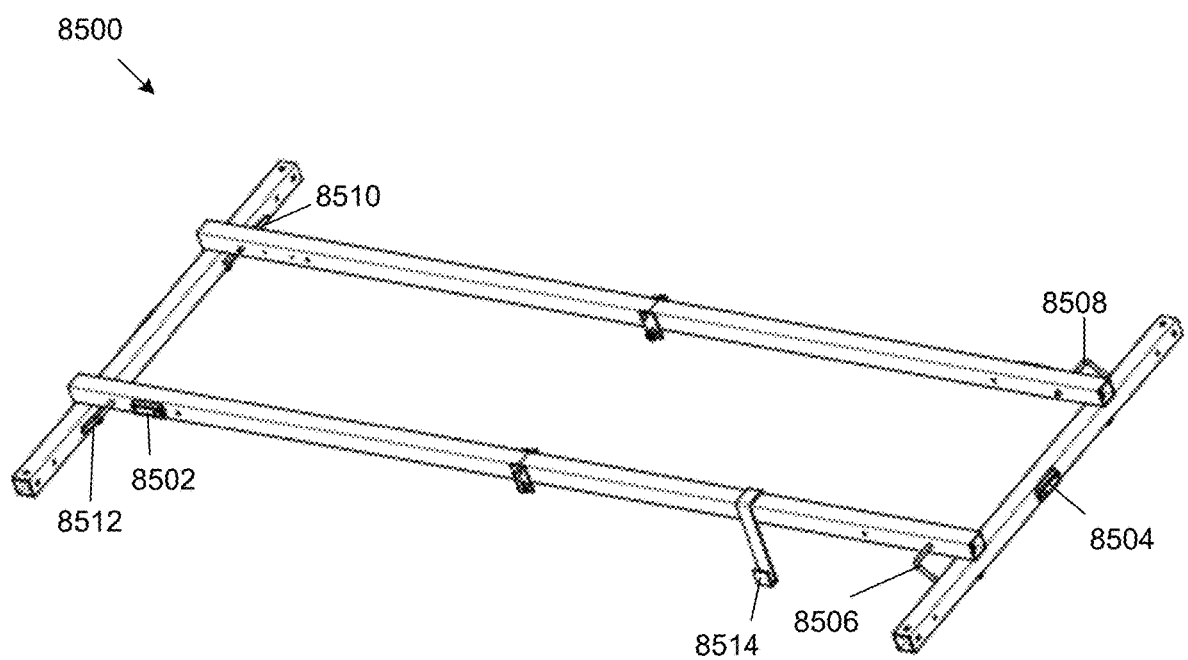
FIG. 85 is a perspective view of an HVAC mounting apparatus, depicting a base frame without drain pan hangers, while including leveling indicators, pins and a hook variant sensor hanger.
Figure 86:
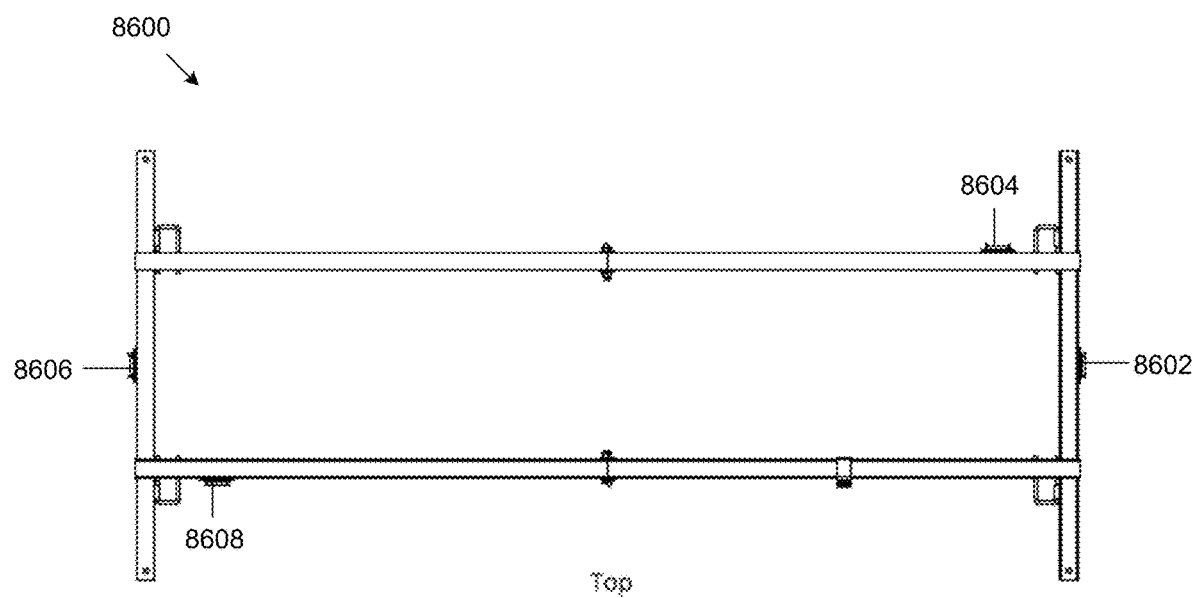
FIG. 86 is a top view of the mounting apparatus of FIG. 85.
Figure 87:
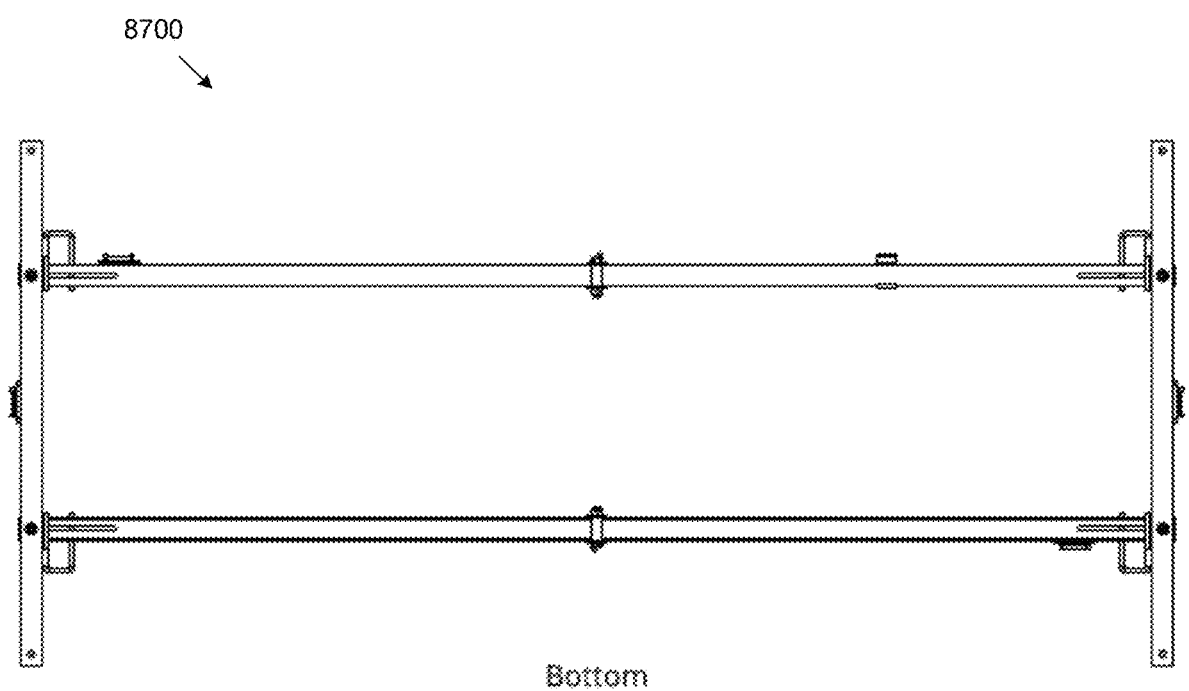
FIG. 87 is a bottom view of the mounting apparatus of FIG. 85.
Figure 88:
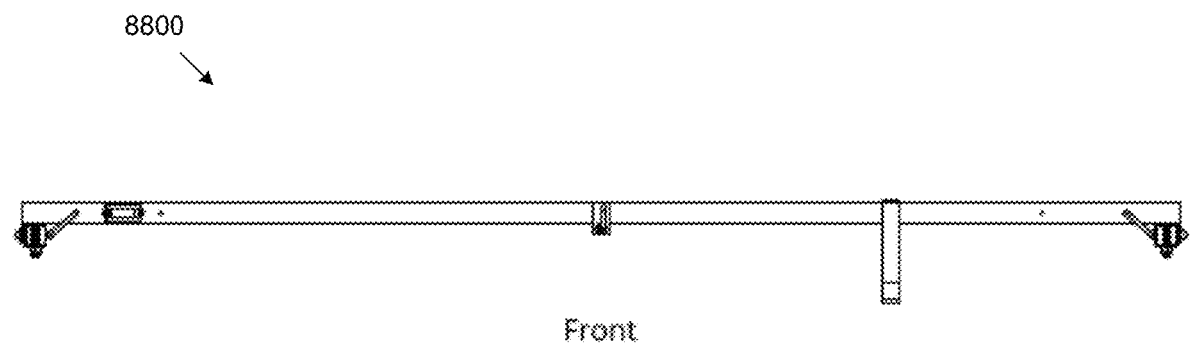
FIG. 88 is a front view of the mounting apparatus of FIG. 85.
Figure 89:
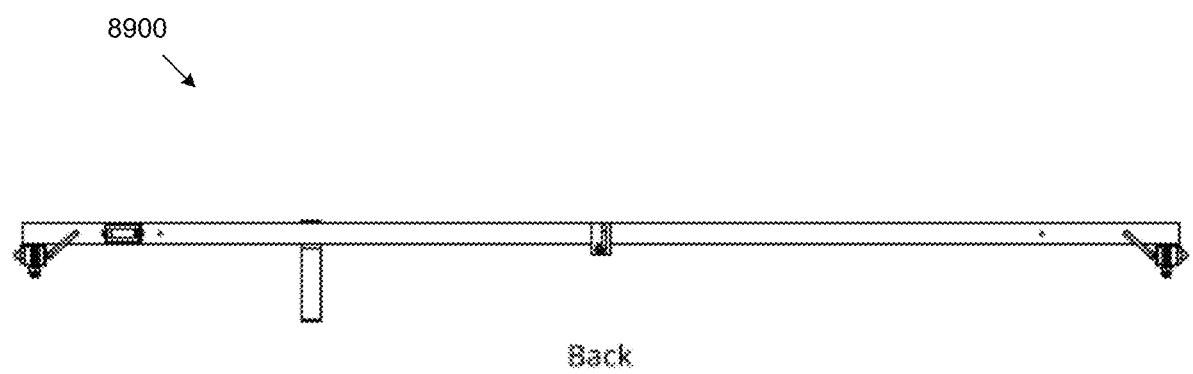
FIG. 89 is a back view of the mounting apparatus of FIG. 85.
Figure 90:
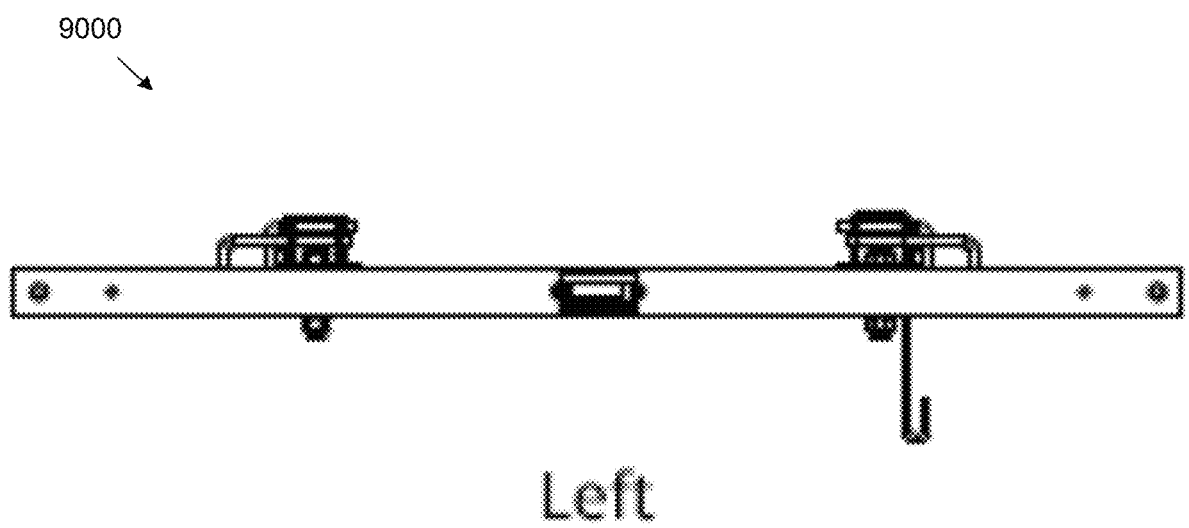
FIG. 90 is a left view of the mounting apparatus of FIG. 85.
Figure 91:
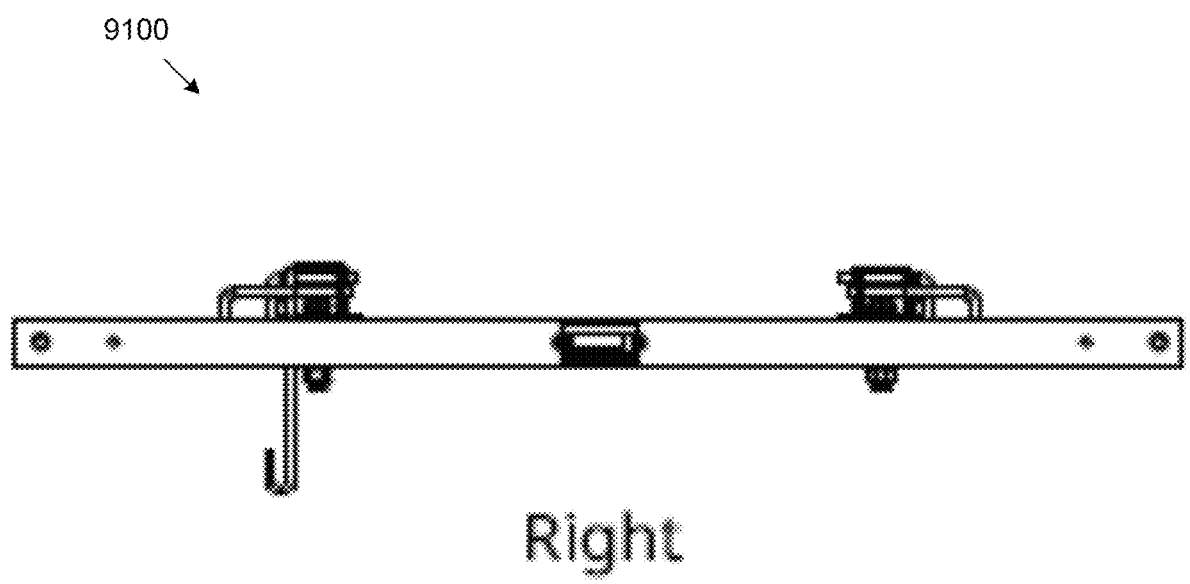
FIG. 91 is a right view of the mounting apparatus of FIG. 85.

Turning to FIG. 85, another implementation of a mounting system (8500) might include leveling indicators, four pins, and a hook variant sensor hanger, while excluding drain pan hangers. FIG. 85 depicts a perspective view of the system (8500), showing two leveling indicators (8502)(8504), pins (8506)(8508)(8510)(8512), and a hook variant sensor (8514). FIG. 86 represents a top view (8600) of the system, which depicts the placement of the four leveling indicators (8602)(8604)(8606)(8608). Alternative views of the system 8500 are presented in FIGS. 87-91. FIG. 87 presents a bottom view (8700) of system 8500. FIG. 88 presents a front view (8800) of the system 8500. FIG. 89 presents a back view (8900) of the system 8500. FIG. 90 presents a left view (9000) of the system 8500. FIG. 91 presents a right view (9100) of the system 8500.

Figure 92:
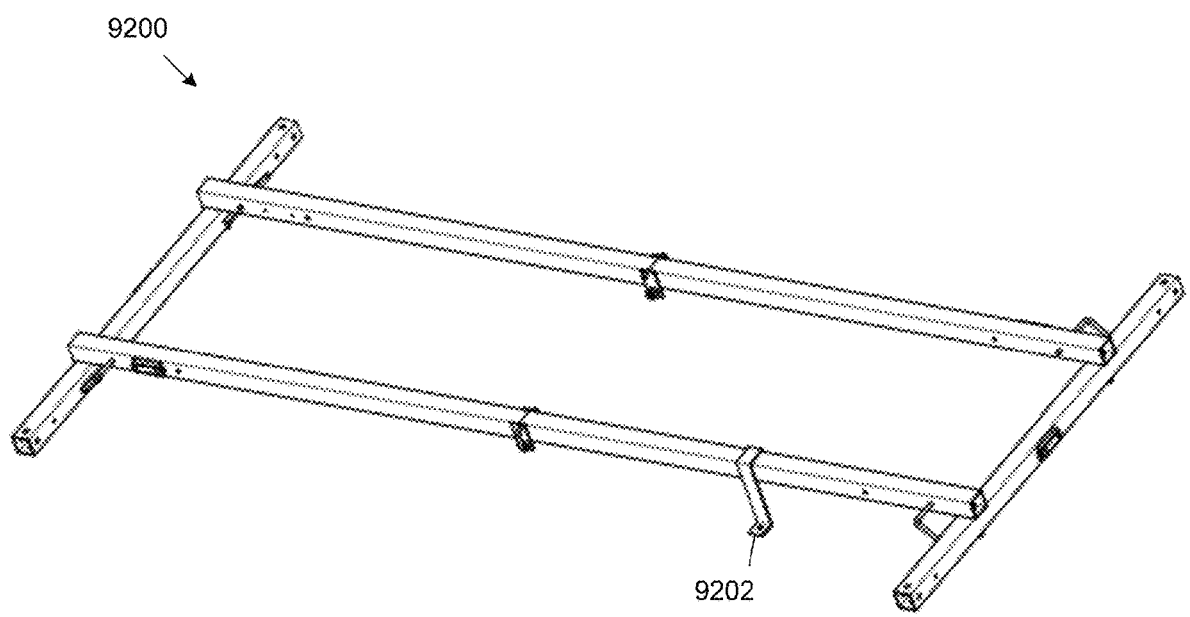
FIG. 92 is a perspective view of an HVAC mounting apparatus, depicting a base frame without drain pan hangers, while including leveling indicators, pins and a clip variant sensor hanger.
Figure 93:
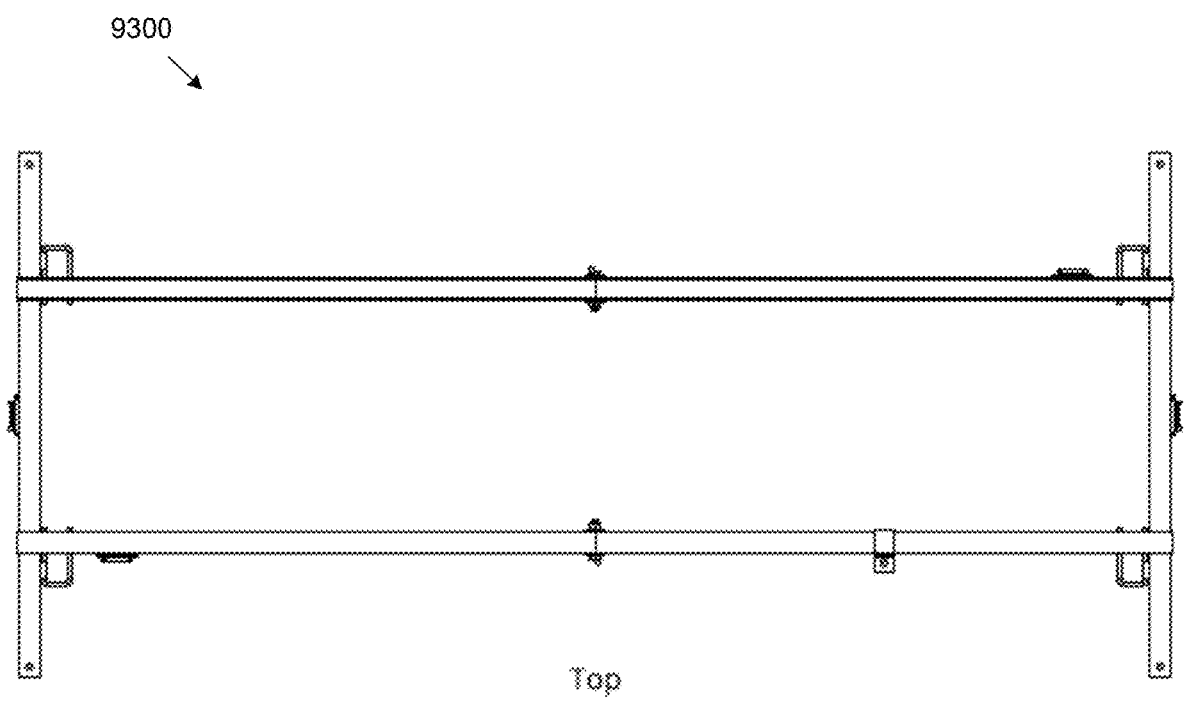
FIG. 93 is a top view of the mounting apparatus of FIG. 92.
Figure 94:
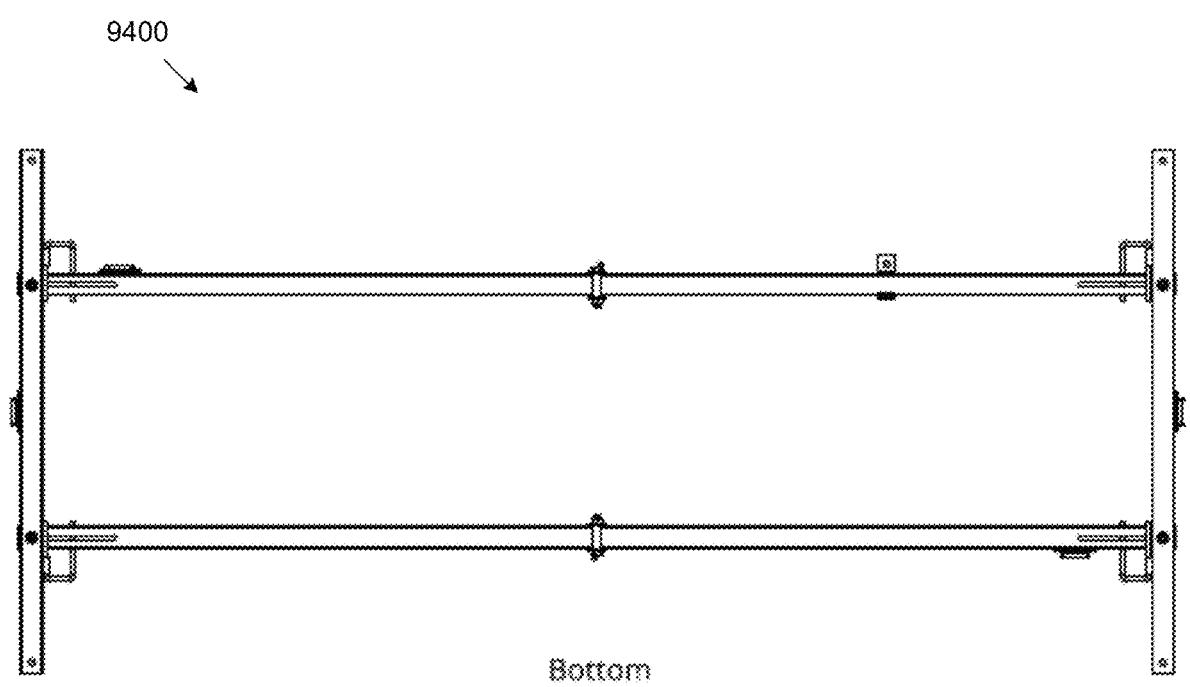
FIG. 94 is a bottom view of the mounting apparatus of FIG. 92.
Figure 95:
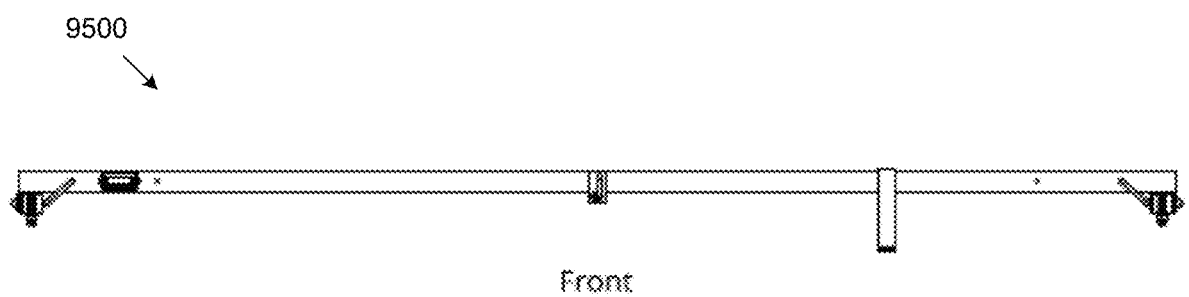
FIG. 95 is a front view of the mounting apparatus of FIG. 92.
Figure 96:
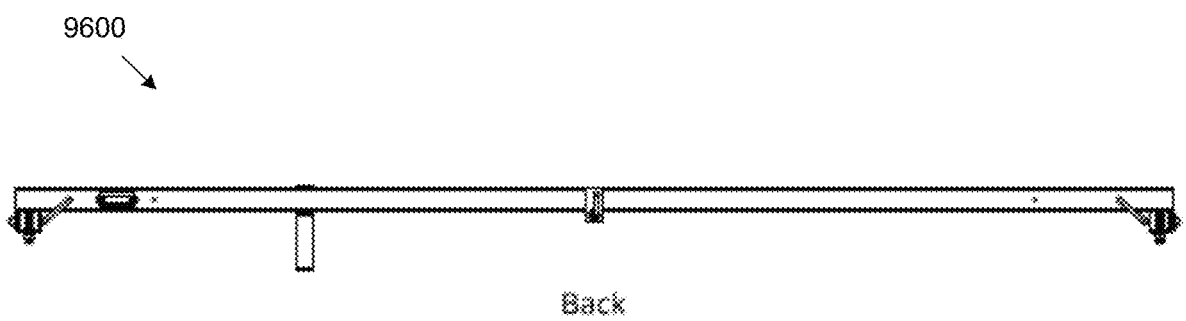
FIG. 96 is a back view of the mounting apparatus of FIG. 92.
Figure 97:
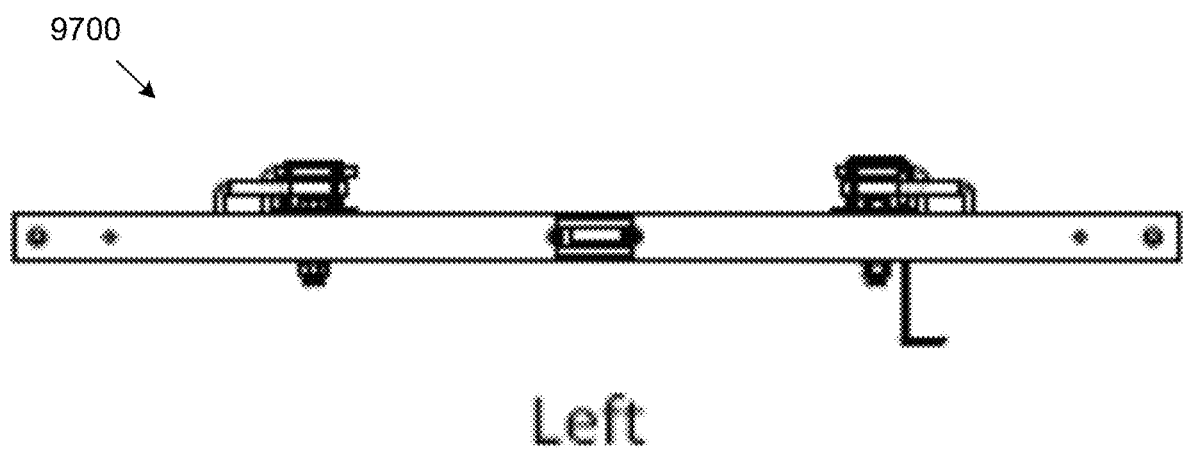
FIG. 97 is a left view of the mounting apparatus of FIG. 92.
Figure 98:
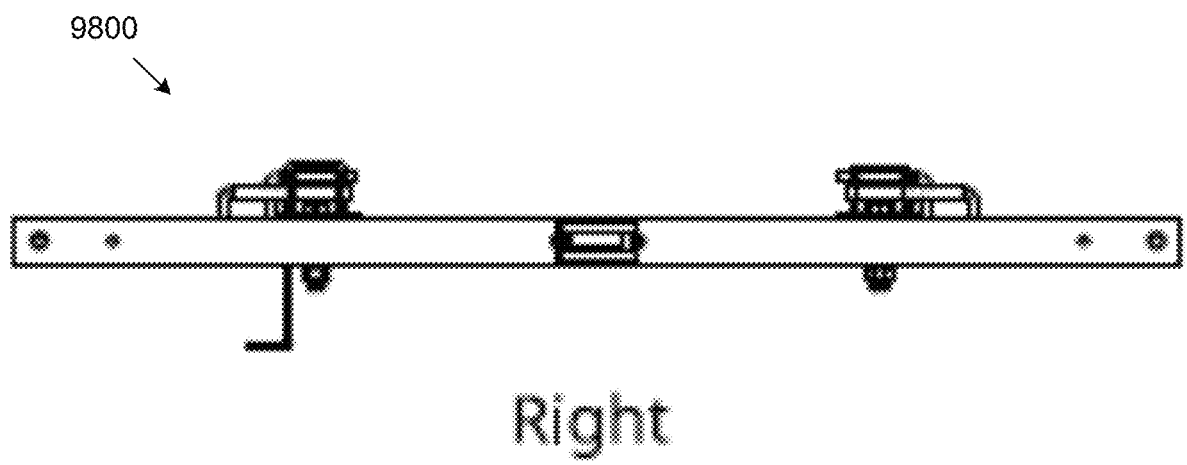
FIG. 98 is a right view of the mounting apparatus of FIG. 92.

FIG. 92 presents a mounting system (9200) that includes a clip variant sensor (9202) instead of a hook variant sensor (as shown in FIG. 85). Alternative views of system 9200 are presented in FIGS. 93-98. FIG. 93 presents a top view (9300) of system 9200. FIG. 94 presents a bottom view (9400) of system 9200. FIG. 95 presents a front view (9500) of system 9200. FIG. 96 presents a back view (9600) of system 9200. FIG. 97 presents a left view (9700) of system 9200. FIG. 98 presents a right view (9800) of system 9200.

Figure 99:
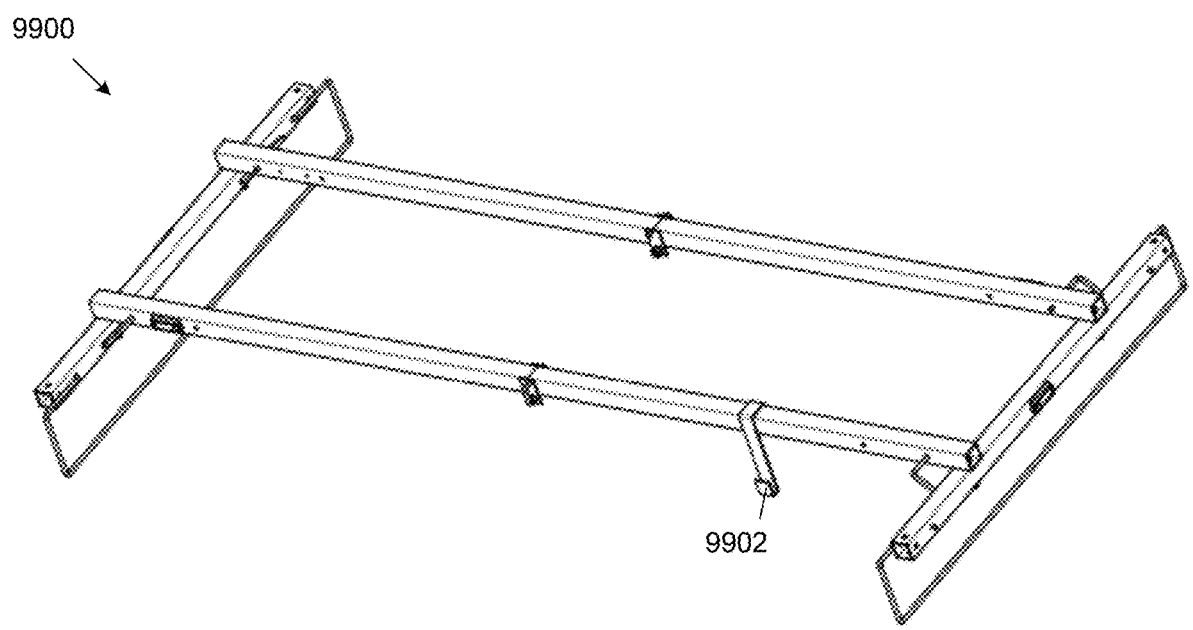
FIG. 99 is a perspective view of an HVAC mounting apparatus, depicting a base frame with drain pan hangers, leveling indicators, pins, and a hook variant sensor hanger.
Figure 100:
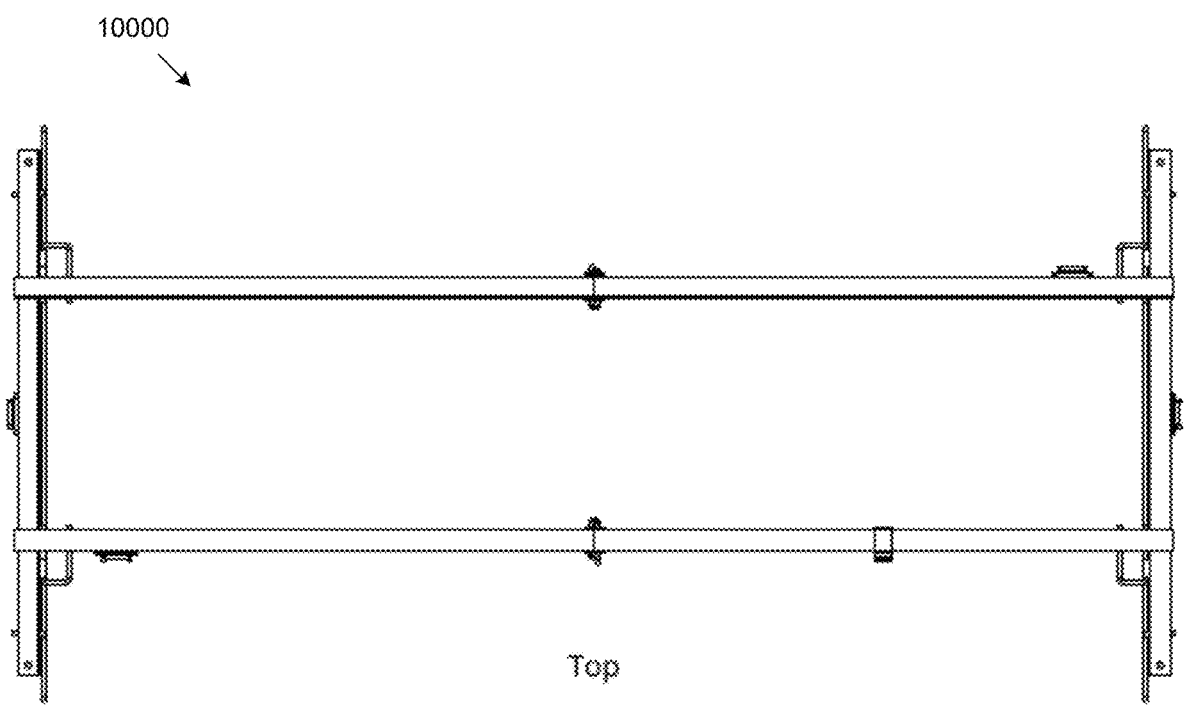
FIG. 100 is a top view of the mounting apparatus of FIG. 99.
Figure 101:
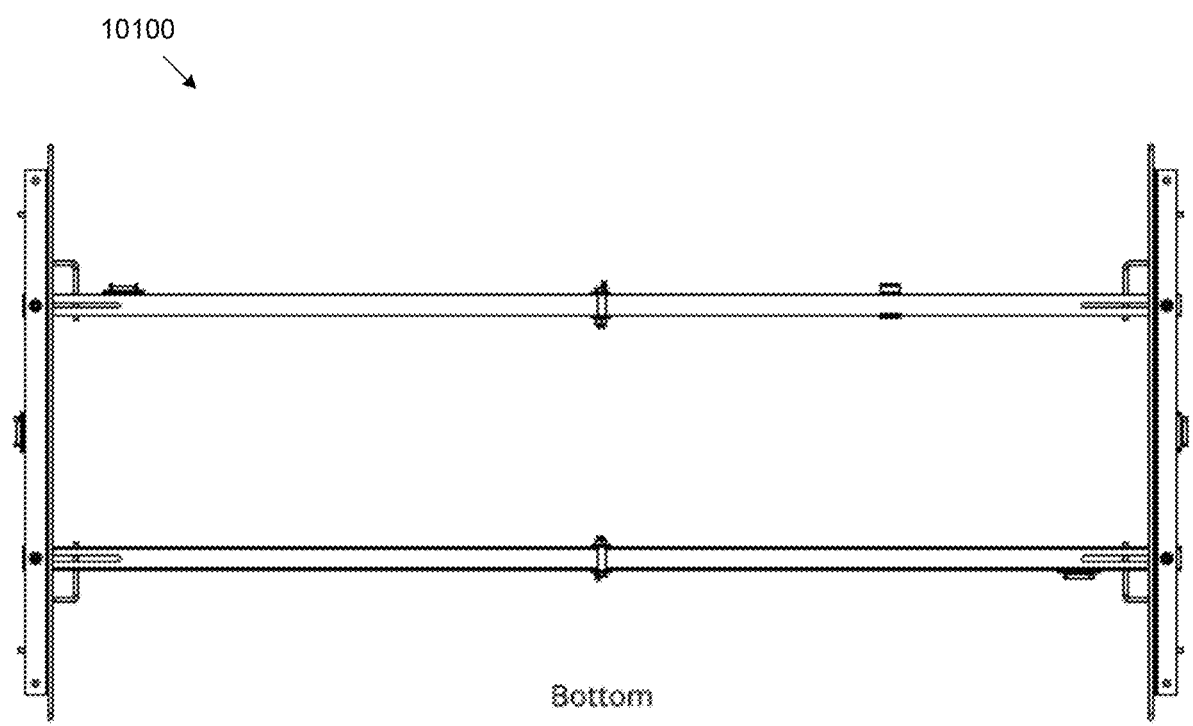
FIG. 101 is a bottom view of the mounting apparatus of FIG. 99.
Figure 102:
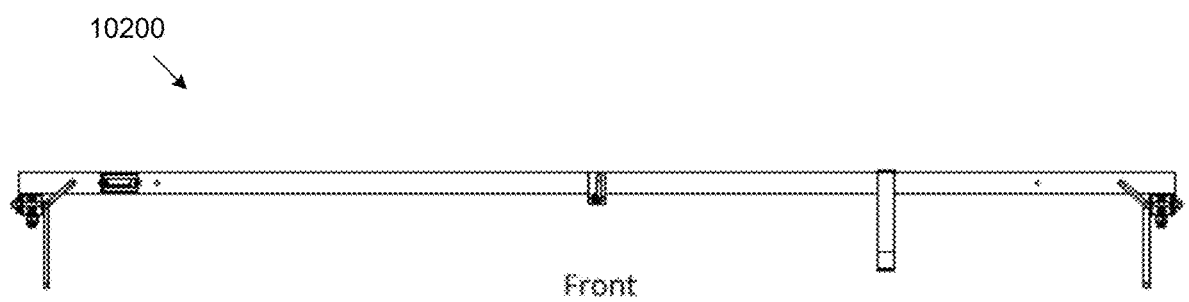
FIG. 102 is a front view of the mounting apparatus of FIG. 99.
Figure 103:
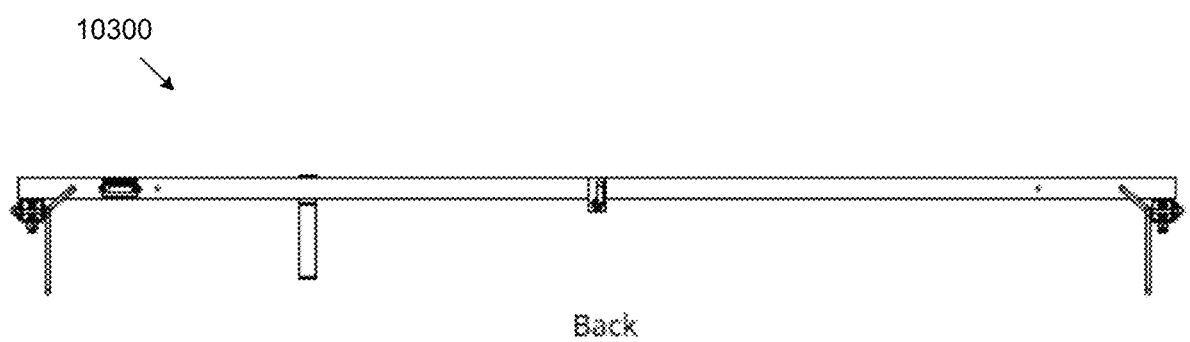
FIG. 103 is a back view of the mounting apparatus of FIG. 99.
Figure 104:
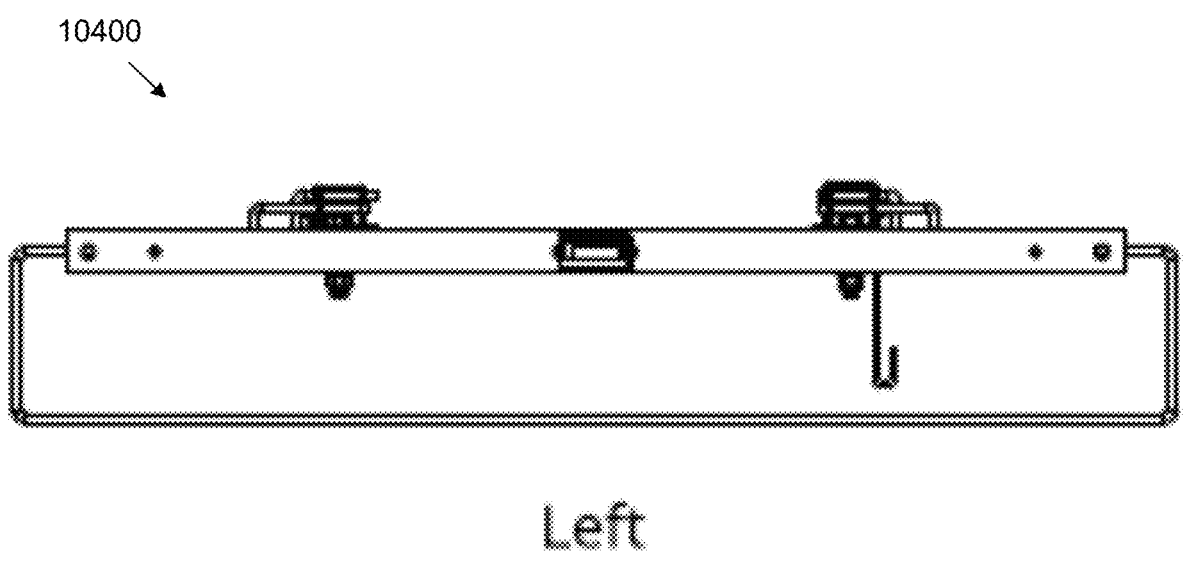
FIG. 104 is a left view of the mounting apparatus of FIG. 99.
Figure 105:
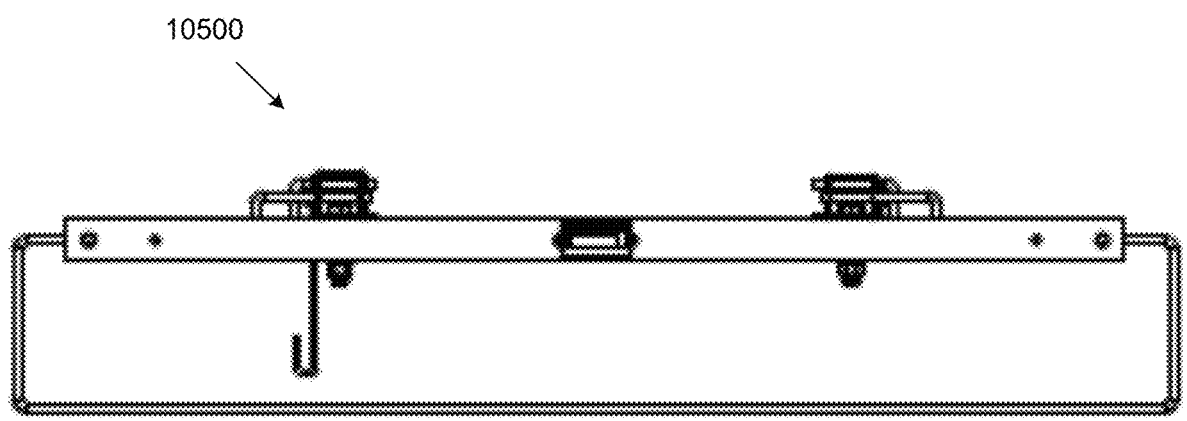
FIG. 105 is a right view of the mounting apparatus of FIG. 99.

Turning to FIG. 99, another embodiment of a mounting system (9900) includes components of the mounting system (100) presented in FIG. 1, while employing only one hook sensor hanger (9902). Alternative views of system 9900 are presented in FIGS. 100-105. FIG. 100 presents a top view (10000) of system 9900. FIG. 101 presents a bottom view (10100) of system 9900. FIG. 102 presents a front view (10200) of system 9900. FIG. 103 presents a back view (10300) of system 9900. FIG. 104 presents a left view (10400) of system 9900. FIG. 105 presents a right view (10500) of system 9900.

Figure 106:
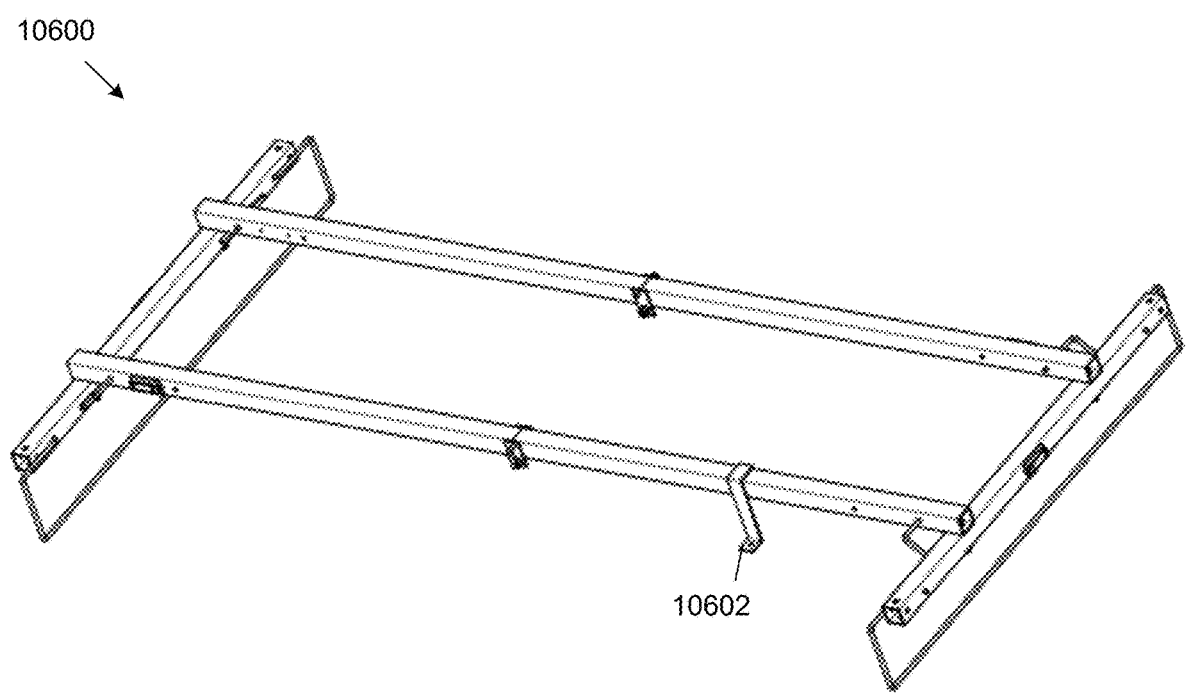
FIG. 106 is a perspective view of an HVAC mounting apparatus, depicting a base frame with drain pan hangers, leveling indicators, pins, and a clip variant sensor hanger.
Figure 107:
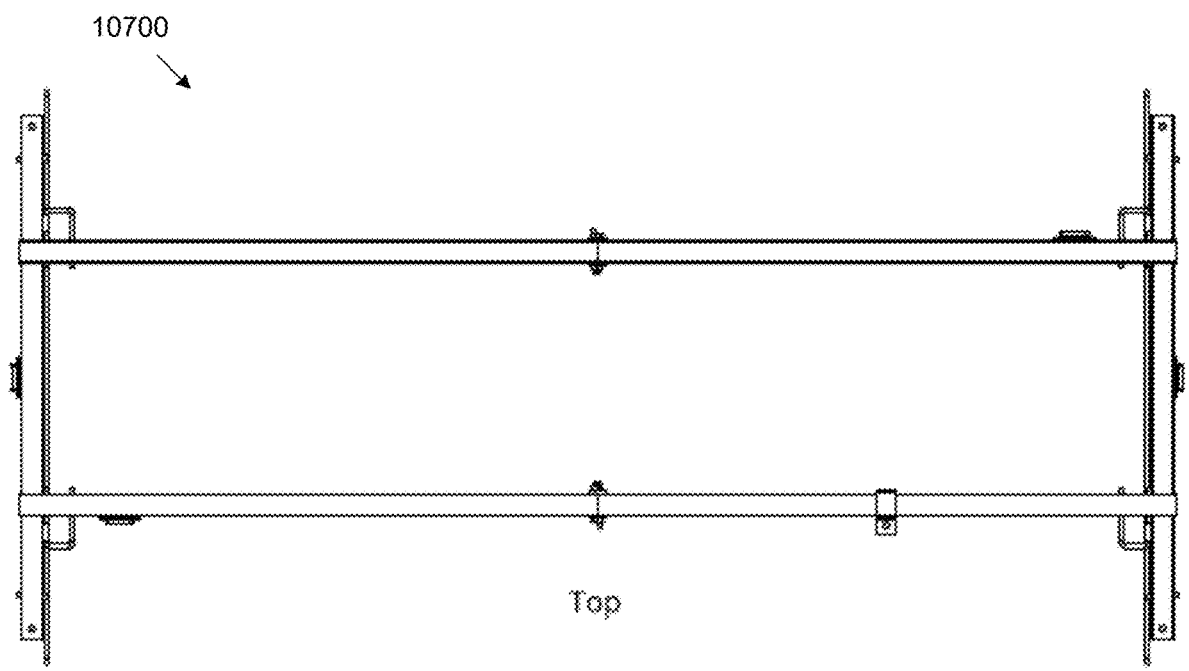
FIG. 107 is a top view of the mounting apparatus of FIG. 106.
Figure 108:
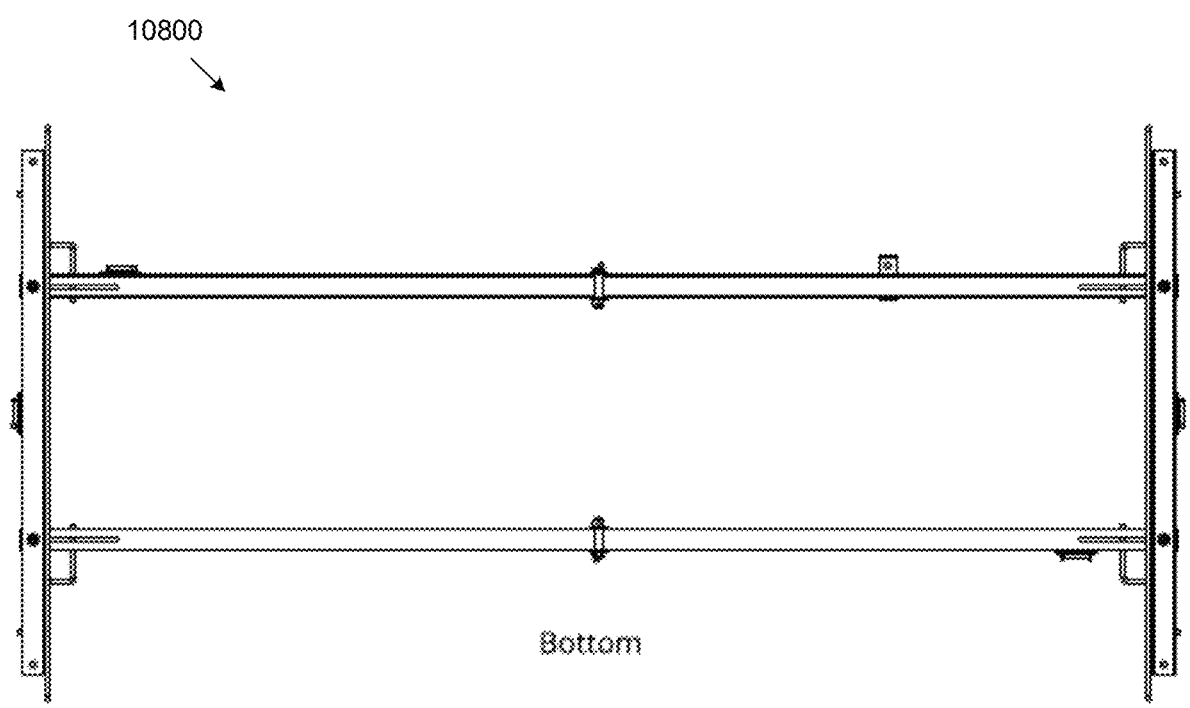
FIG. 108 is a bottom view of the mounting apparatus of FIG. 106.
Figure 109:
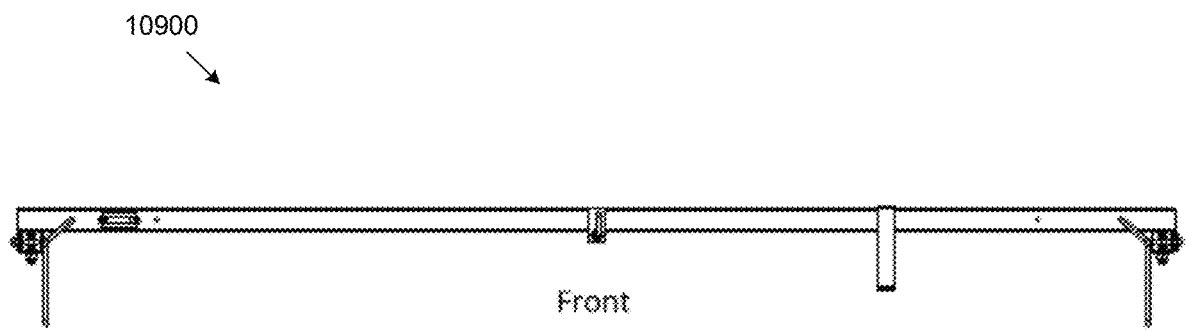
FIG. 109 is a front view of the mounting apparatus of FIG. 106.
Figure 110:
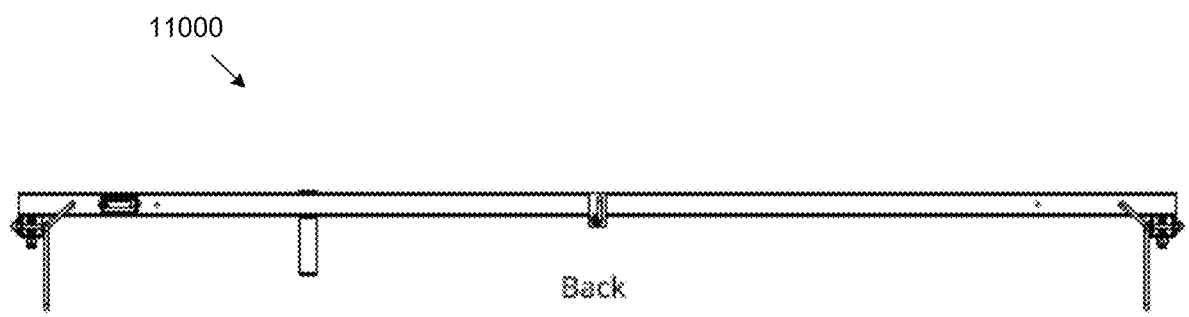
FIG. 110 is a back view of the mounting apparatus of FIG. 106.
Figure 111:
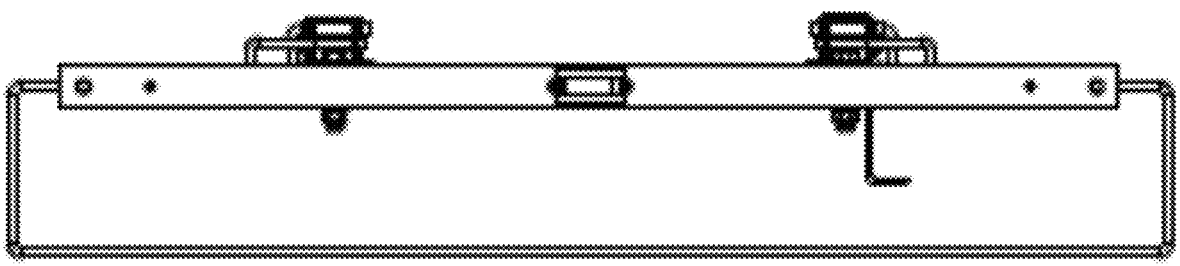
FIG. 111 is a left view of the mounting apparatus of FIG. 106.
Figure 112:
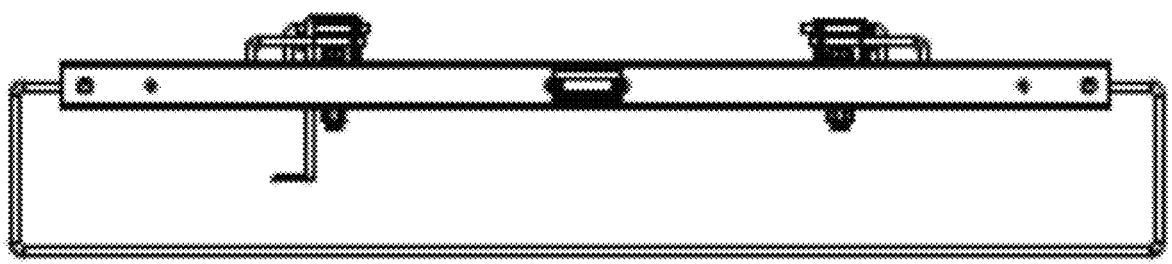
FIG. 112 is a right view of the mounting apparatus of FIG. 106.

Similarly, in another implementation a mounting system (10600) presented in FIG. 106 might employ a clip variant sensor hanger (10602). Alternative views of system 10600 are presented in FIGS. 107-112. FIG. 107 presents a top view (10700) of system 10600. FIG. 108 presents a bottom view (10800) of system 10600. FIG. 109 presents a front view (10900) of system 10600. FIG. 110 presents a back view (11000) of system 10600. FIG. 111 presents a left view (11100) of system 10600. FIG. 112 presents a right view (11200) of system 10600.

Figure 113:
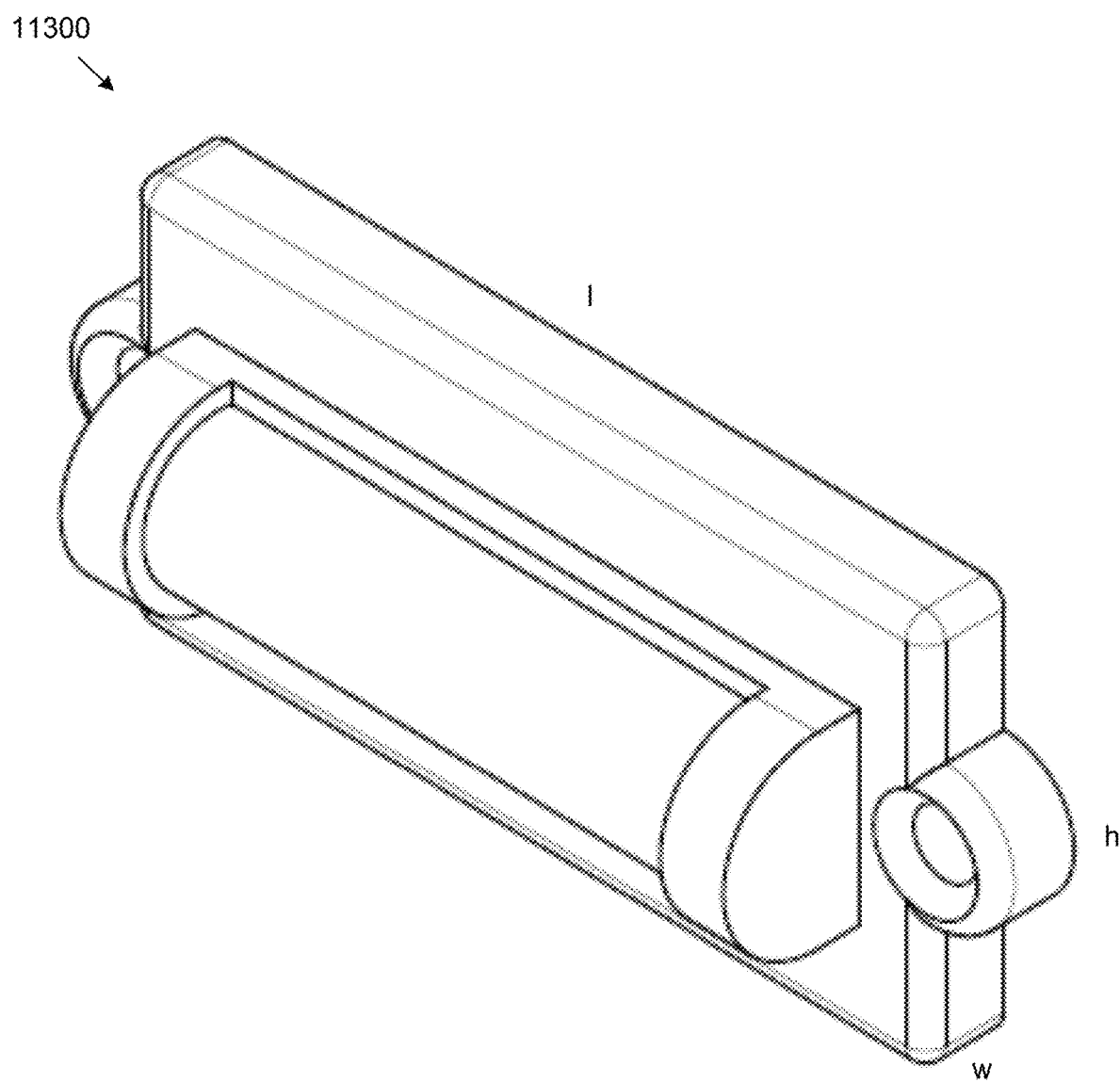
FIG. 113 is a perspective view of a bubble level, which may be configured to the fixed and adjustable support beams.
Figure 114:
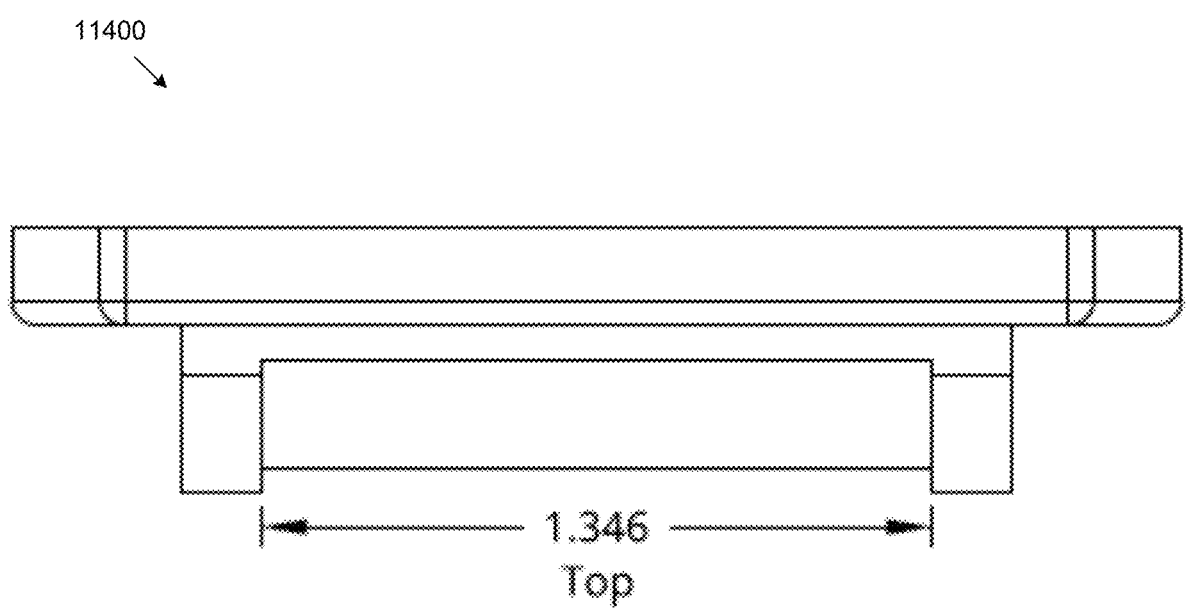
FIG. 114 is a top view of the bubble level of FIG. 113.
Figure 115:
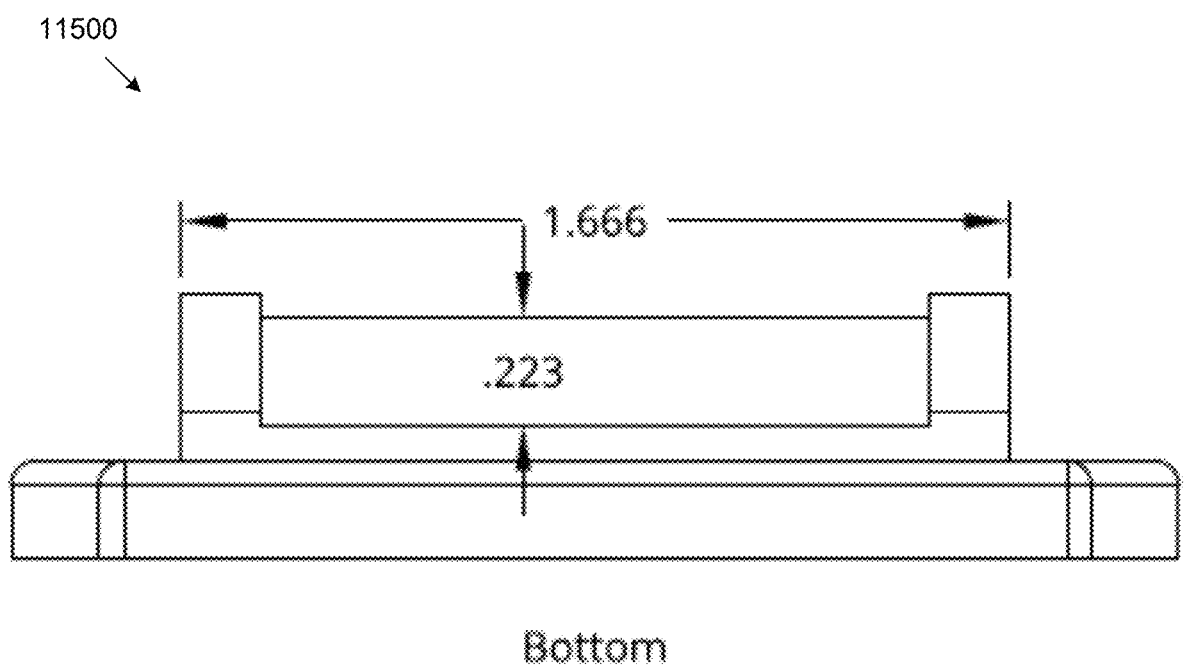
FIG. 115 is a bottom view of the bubble level of FIG. 113.
Figure 116:
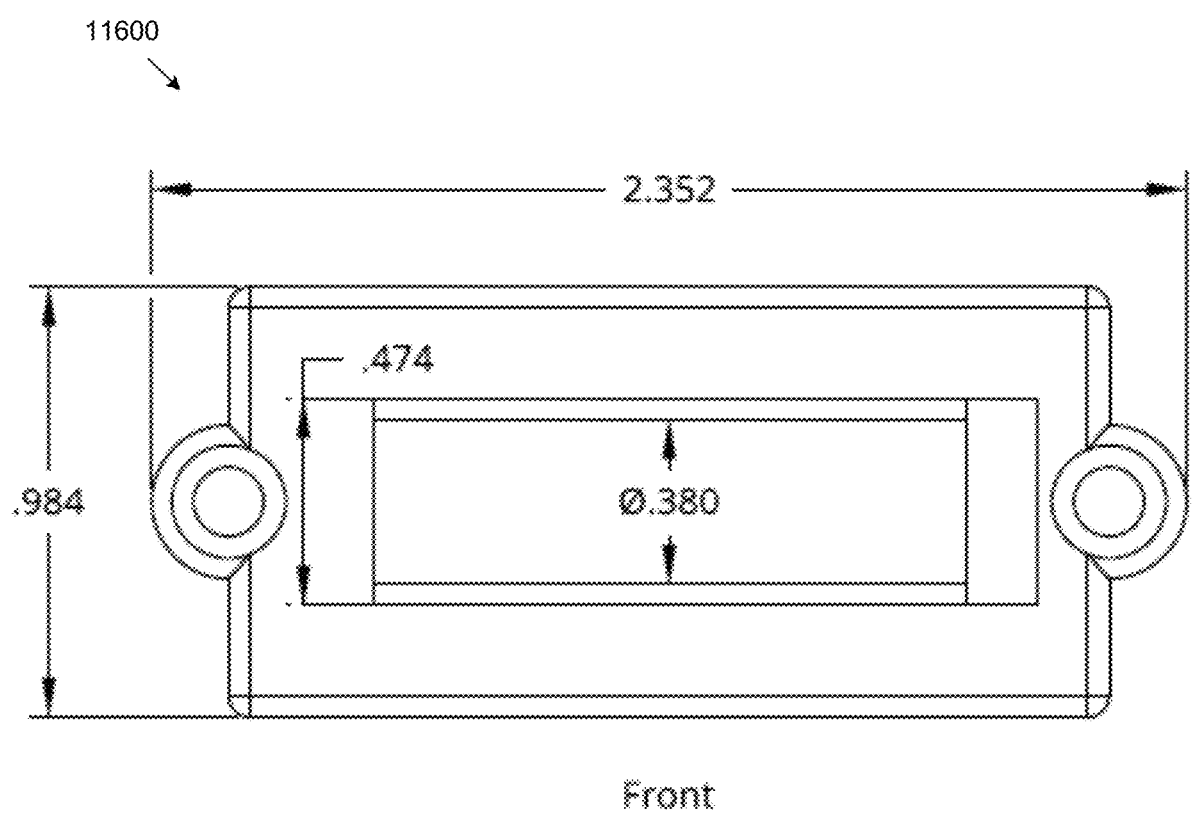
FIG. 116 is a front view of the bubble level of FIG. 113.
Figure 117:
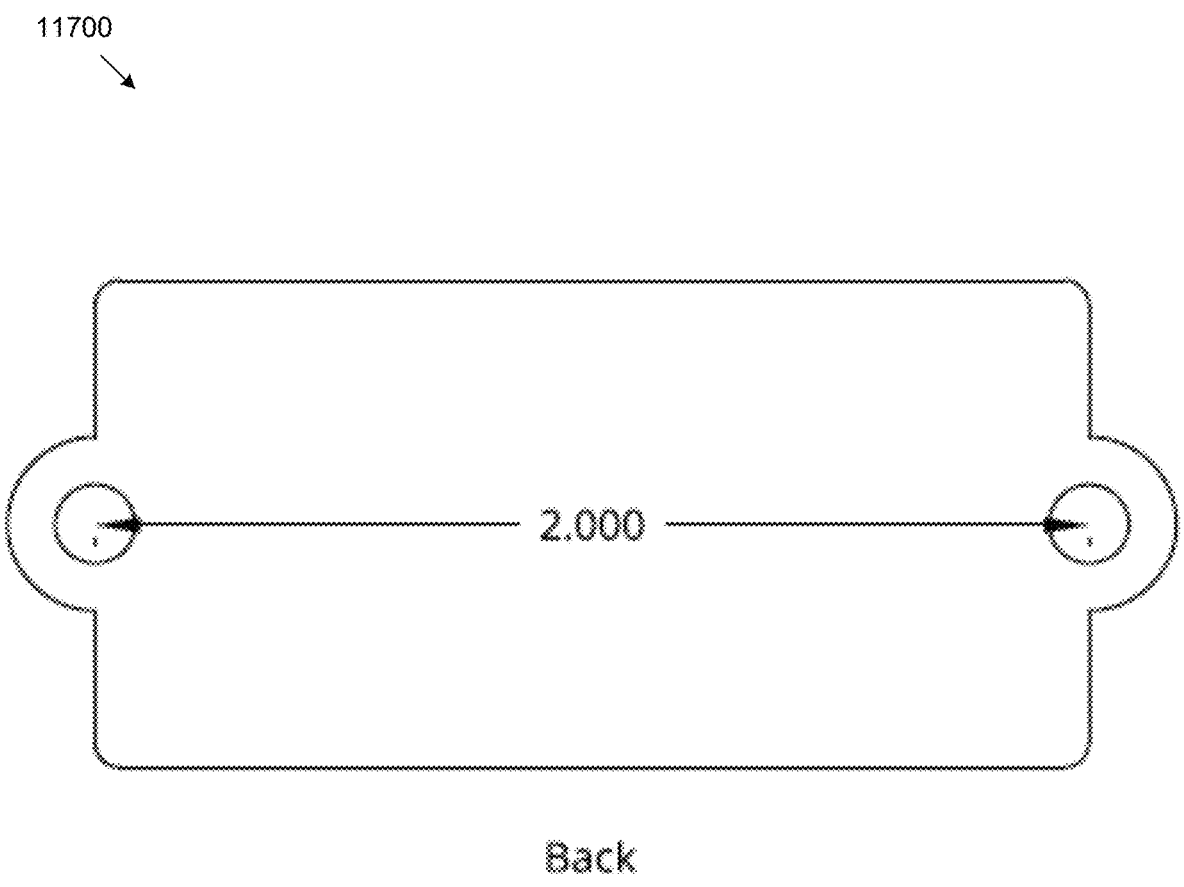
FIG. 117 is a back view of the bubble level of FIG. 113.
Figure 118:
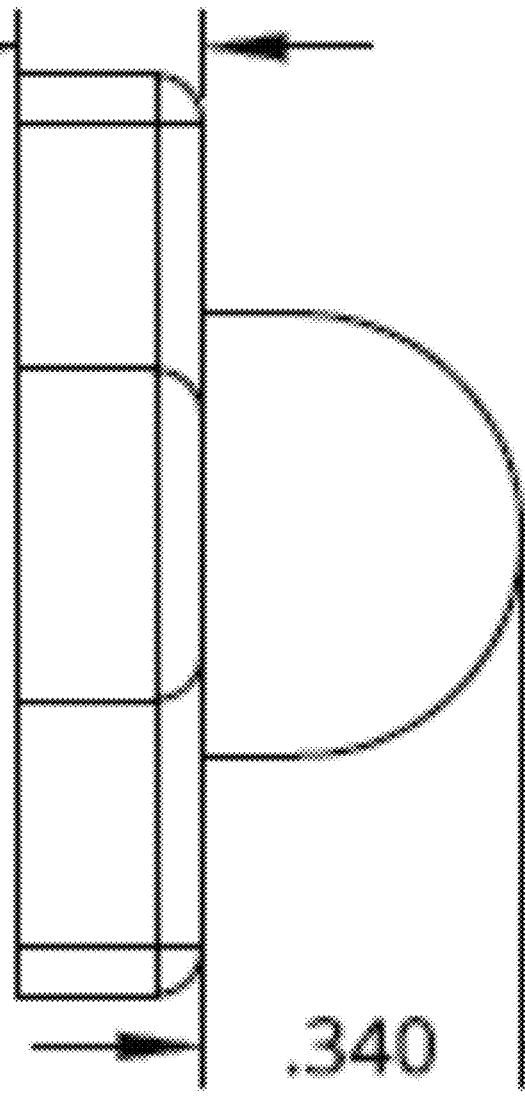
FIG. 118 is a left view of the bubble level of FIG. 113.
Figure 119:
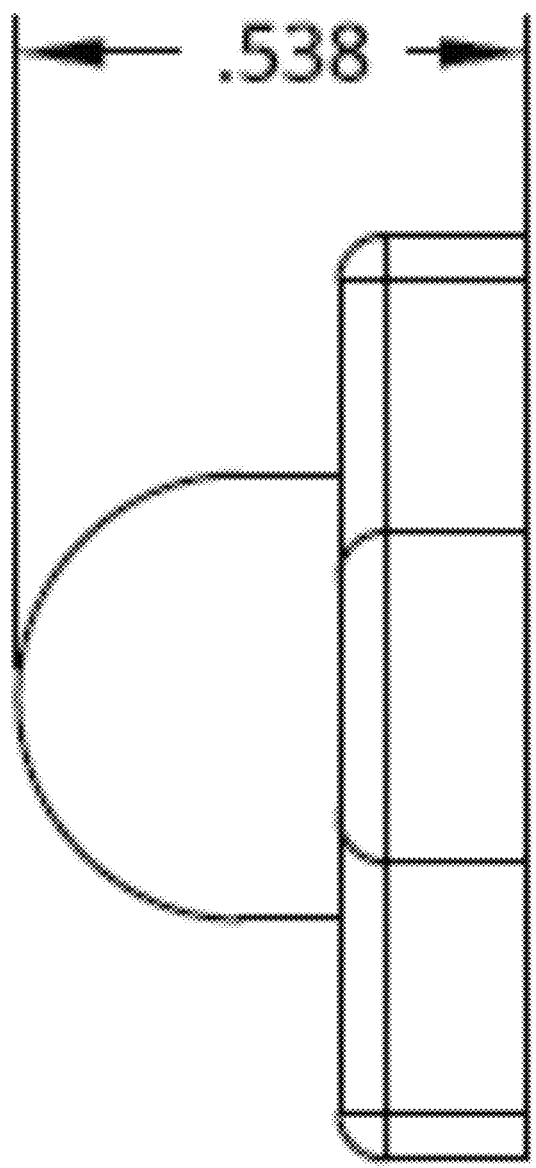
FIG. 119 is a right view of the bubble level of FIG. 113.

As described above, a mounting system may employ a bubble level as a leveling device. FIG. 113 presents a perspective view of one such bubble level (11300), which may be configured to the fixed and adjustable support beams. Alternative views of the bubble level (11300) are presented in FIGS. 114-119. FIG. 114 is a top view (11400) of the bubble level of FIG. 113. FIG. 115 is a bottom view (11500) of the bubble level of FIG. 113; FIG. 116 is a front view (11600) of the bubble level of FIG. 113. FIG. 117 is a back view (11700) of the bubble level of FIG. 113. FIG. 118 is a left view (11800) of the bubble level of FIG. 113. FIG. 119 is a right view (11900) of the bubble level of FIG. 113. As depicted in FIG. 113, the bubble levels may have a rough rectangular shape with a specified width (w), length (l), and height (h). The width may range up to 1 in., the length may range approximately between 2 in. to 5 in., and the height may range approximately between 0.5 in. to 3 in. While the figures depict a preferable dimension of 0.198 in. by 2.352 in. by 0.984 in. for the width, length, and height of the system (among other preferable dimensions), one skilled in the art would recognize that the dimensions and shape of the bubble level or other leveling indicators may differ from those described. In some arrangements, other types of leveling technology may be employed; for example, one or more types of sensors (e.g., acceleration sensors such as accelerometers) may be used for leveling operations. Sensors may be used in concert with one or more bubble levels in some implementations. In some arrangements, data communication techniques (e.g., wireless data transmission techniques) can be employed to send level information to a computing device (e.g., a smart phone, laptop computer, etc.) for collecting, processing, storing, etc. the level information.

Figure 120:
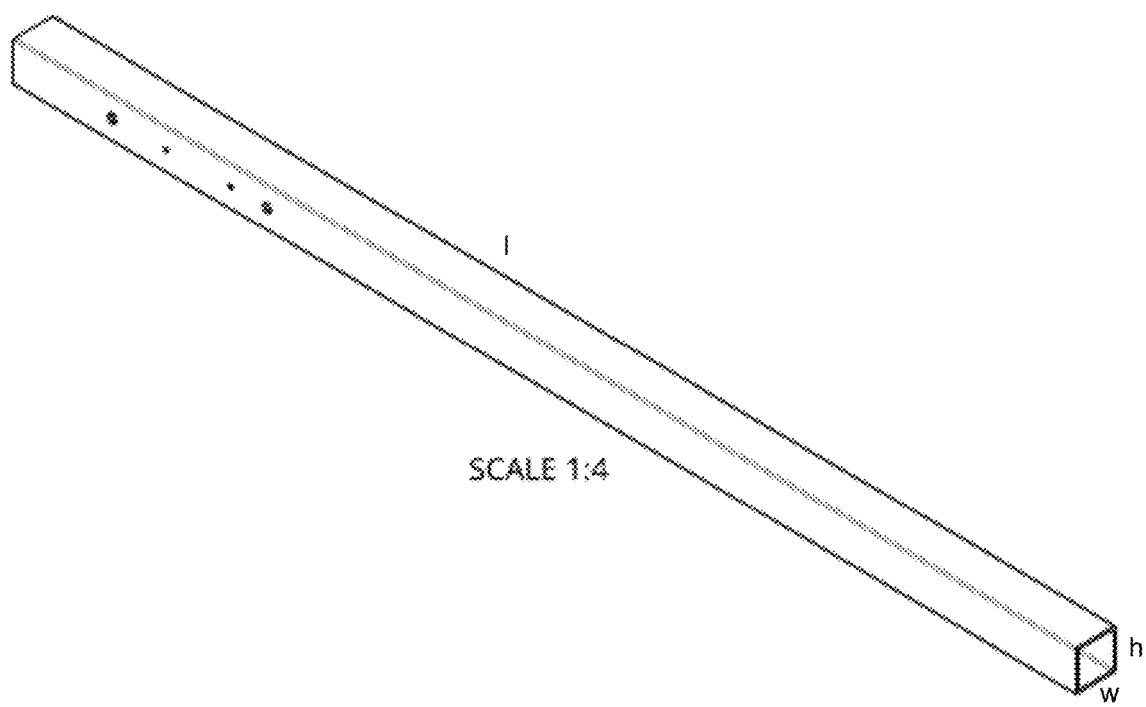
Figure 121:
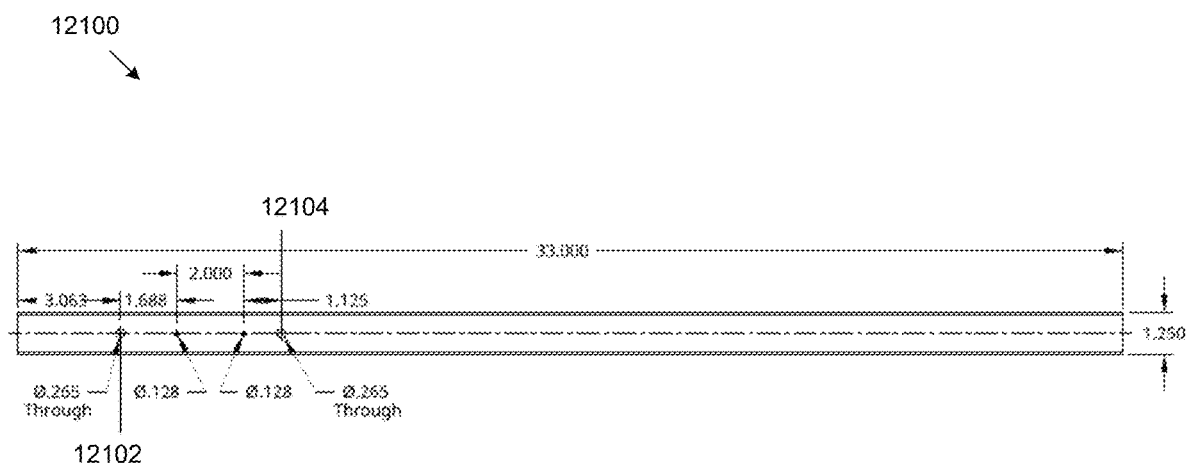

As described above, a mounting system can employ an adjustable support beam. FIG. 120 presents a perspective view of one such adjustable support beam (12000). As depicted, each adjustable support beam may have a rectangular cross-section (or nearly rectangular cross-section) with a specified width (w), length (l), and height (h). The width may range between 1 in. to 3 in., the length may range from 30 in. to 50 in., and the height may range from 1 in. to 20 in. Other width, length, and/or height may be achievable. As is further depicted FIG. 121, which presents a side view (12100) of FIG. 120, the adjustable support beam may be fixed with a first (12102) and a second (12104) extension point, located near the edge of the beam that is fixed to the fixed length support beam. These points enable the system to extend to a first and a second length, as the points may be configured to a pin to lock the system length into place. While the extension points may range in size and shape, they may have a circular shape with an approximate diameter ranging between 0.2 in. to 0.7 in. in a preferred embodiment. While the figures depict dimensions of 1.125 in. by 33 in. by 1.125 in. for the width, length, and height of the beam and 0.265 in. for the diameter of the extension points (among other preferable dimensions) one skilled in the art would recognize that the dimensions and shape of the adjustable support beam may differ from those described or depicted.

Figure 122:
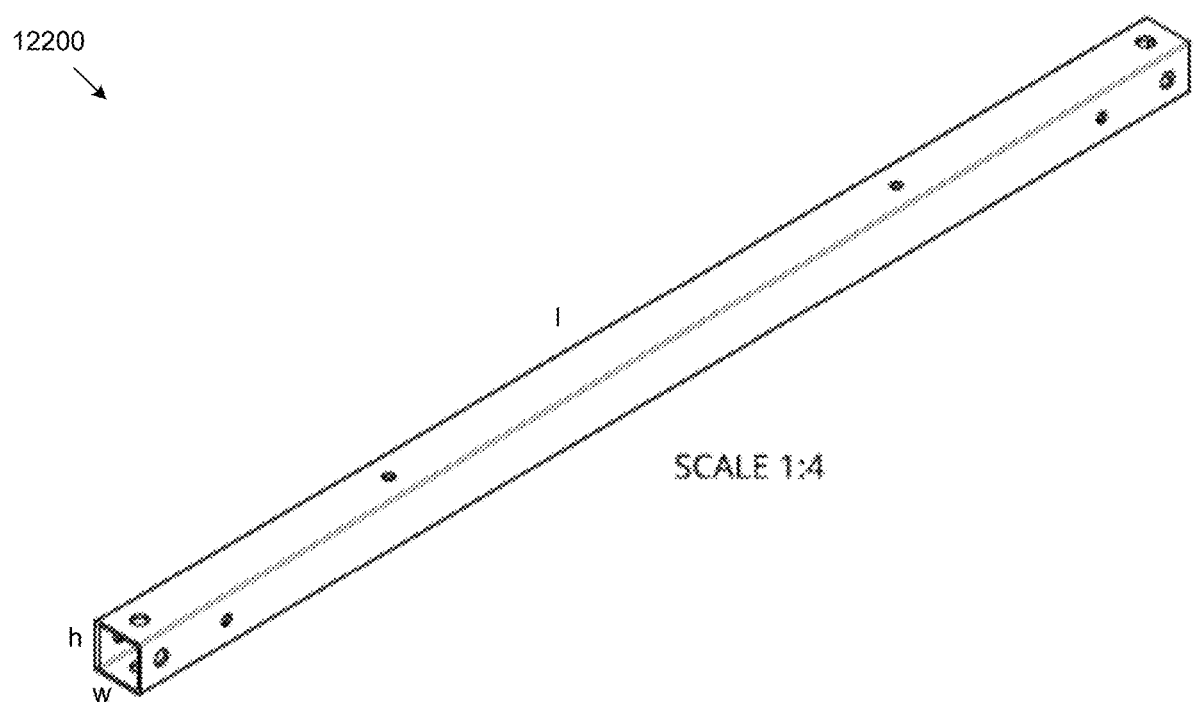
Figure 123:
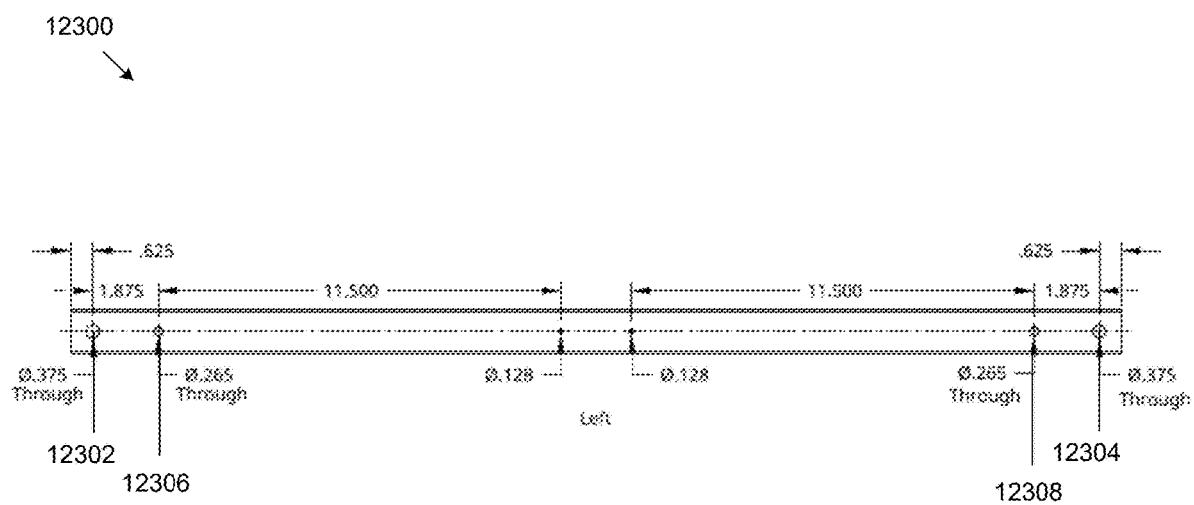
Figure 124:
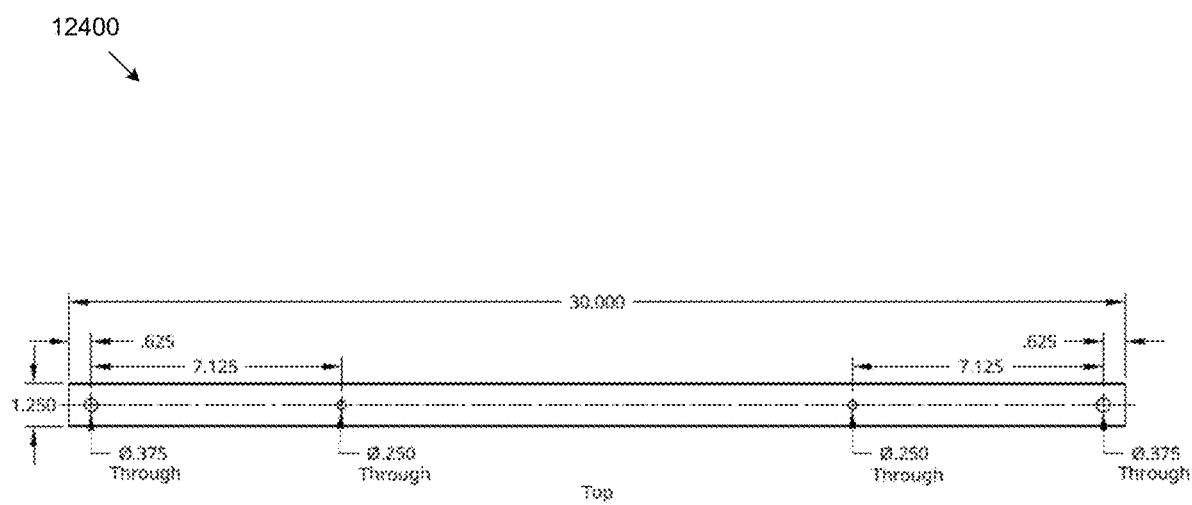

As described above, a mounting system can also employ a fixed length support beam. FIG. 122 presents a perspective view of one such fixed length support beam (12200). Alternative views of the fixed length support beam (12200) are presented in FIGS. 123-124. FIG. 123 is a left view (12300) of the fixed length support beam of FIG. 122. FIG. 124 is a top view (12400) of the fixed length support beam of FIG. 122. As depicted in FIG. 122, each fixed length support beam may have a rectangular cross-section (or nearly rectangular cross-section) with a specified width (w), length (l), and height (h). The width may range between 1 in. to 3 in., the length may range from 25 in. to 50 in., and the height may range from 1 in. to 8 in. As depicted in FIG. 123, the fixed length support beam may be configured with a first (12302) and a second (12304) set of support holes, spaced out on the beam. While these support holes may range in size and shape, they may have a circular shape with an approximate diameter ranging between 0.3 in. to 0.5 in. The fixed length support beam may also be configured with a first (12306) and a second (12308) set of drain pan hanger holes, spaced out on the beam. While the drain pan hanger holes may range in size and shape, they may have a circular shape with an approximate diameter ranging between 0.2 in. to 0.5. While the figures depict dimensions of 1.125 in. by 30 in. by 1.125 in. for the width, length, and height dimensions of the beam, 0.375 in. for the diameter of the support holes, and 0.265 in. for the diameter of the drain pan holes (among other preferable dimensions) one skilled in the art would recognize that the dimensions and shape of the fixed length support beam and holes may differ from those described or depicted.

Figure 125:
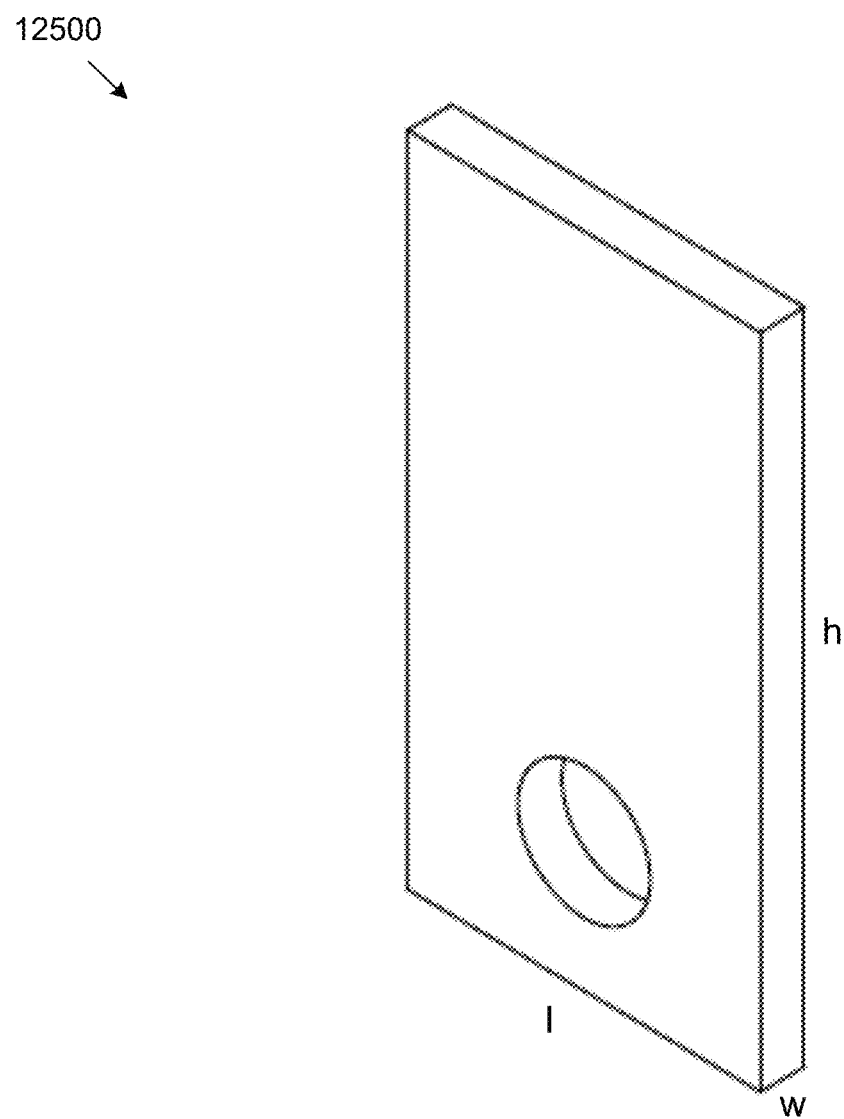
Figure 126:
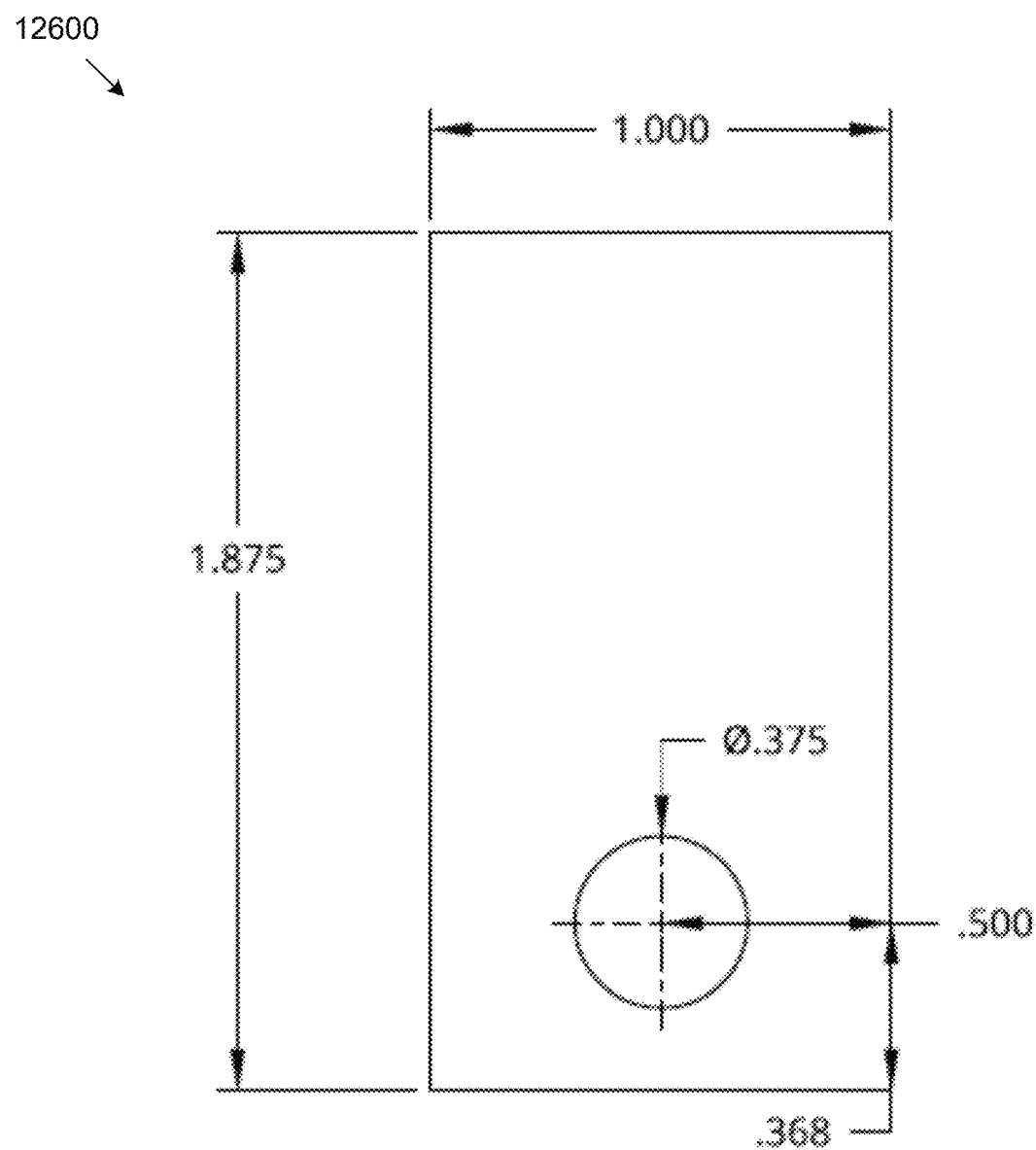
Figure 127:
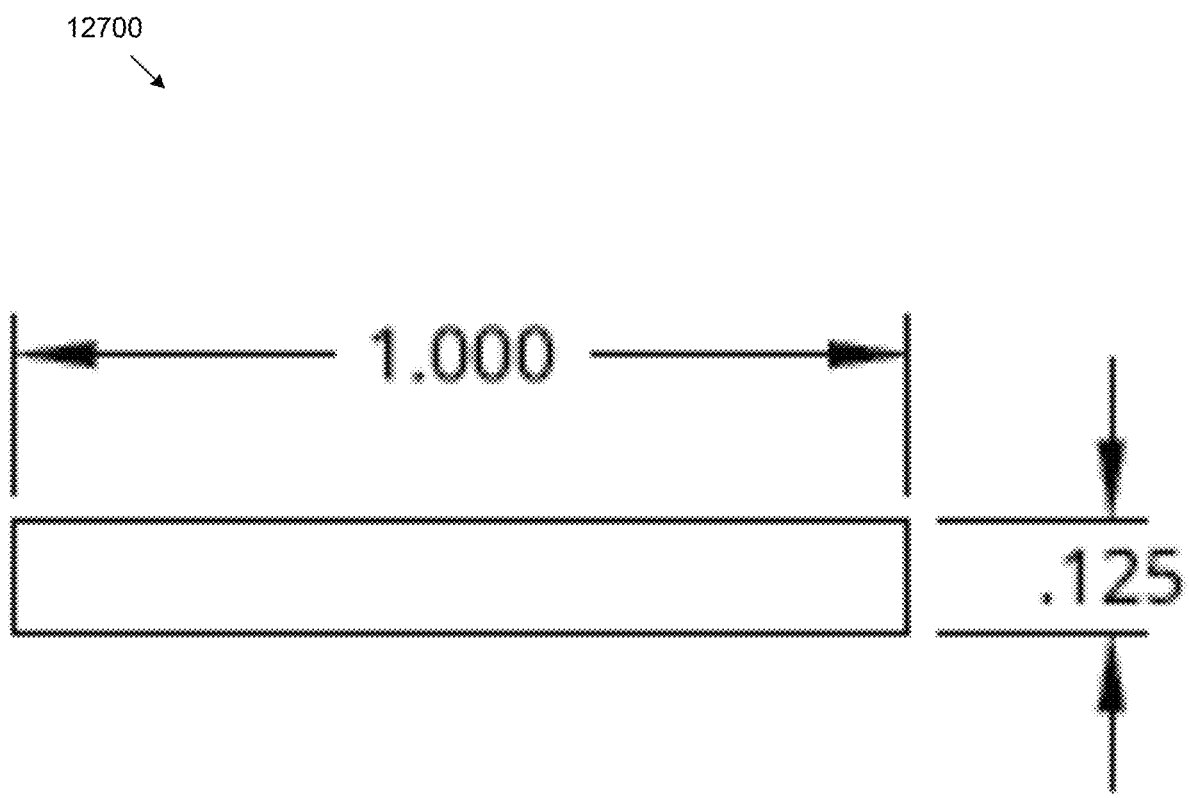

As described above, a mounting system can also employ one or more hinge members and a hinge tube to serve as a folding assembly between the adjustable support beams. FIG. 125 presents a perspective view of one such hinge member (12500), and alternative views of the hinge are presented in FIGS. 126-127. FIG. 126 is a left view (12600) of the hinge of FIG. 125. FIG. 127 is a top view (12700) of the hinge of FIG. 125. As depicted in FIG. 125, the hinge member may have a rectangular shape (or nearly rectangular cross-section) with a specified width (w), length (l), and height (h). The width may range between 0.1 in. to 0.5 in., the length may range from 0.5 in. to 3 in., and the height may range from 1 in. to 5 in. The hinge member may be configured with a hole to engage a pin, which may have an approximate diameter ranging between 0.2 in. to 0.5 in. While the figures depict dimensions of 0.125 in. by 1 in. by 1.875 in. for the w, 1, and h of the hinge member and a 0.375 in. diameter hole within the hinge member (among other preferable dimensions) one skilled in the art would recognize that the dimensions and shape of the hinge member and hinge member hole may differ from those described or depicted.

Figure 128:
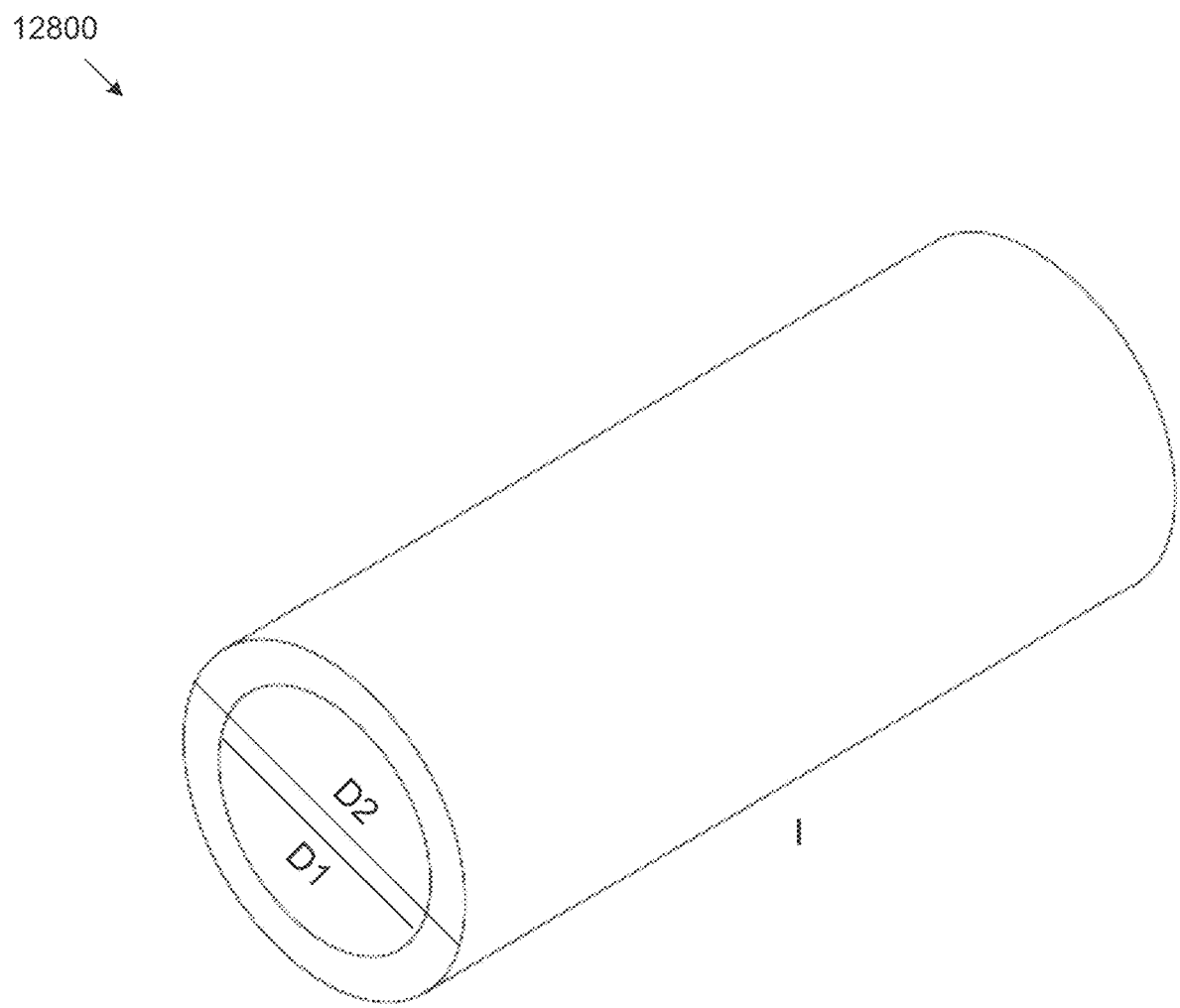
Figure 129:
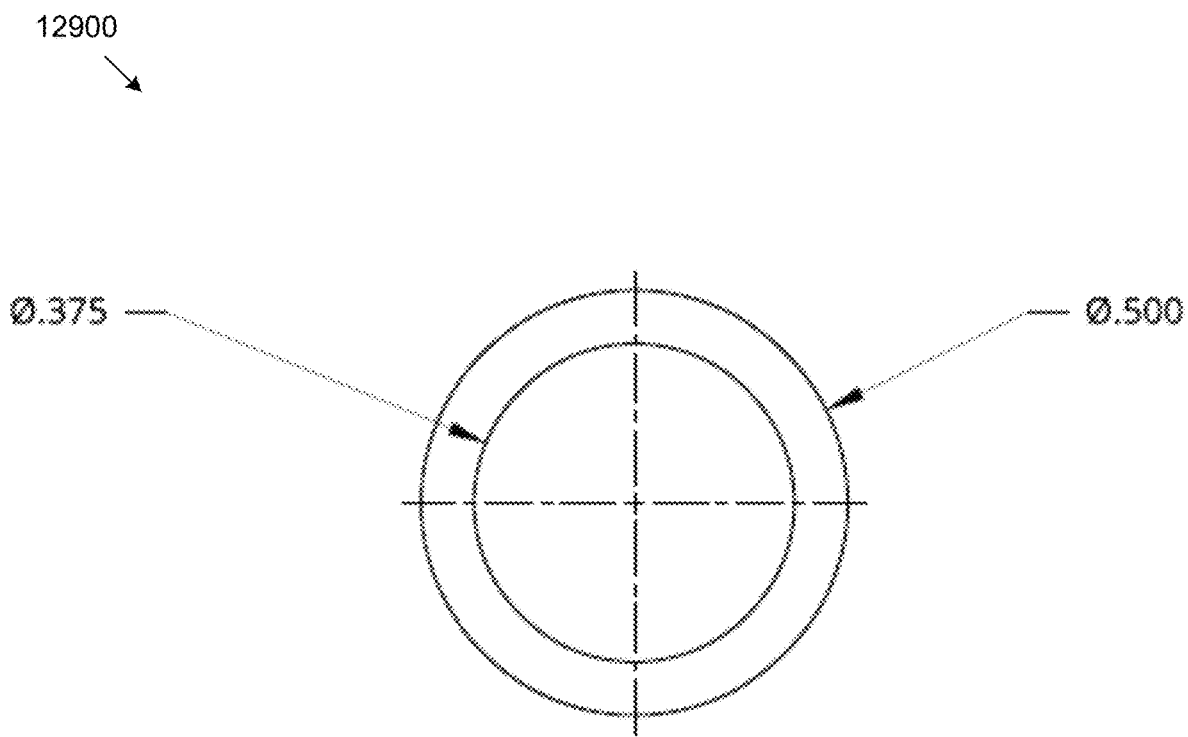
Figure 130:
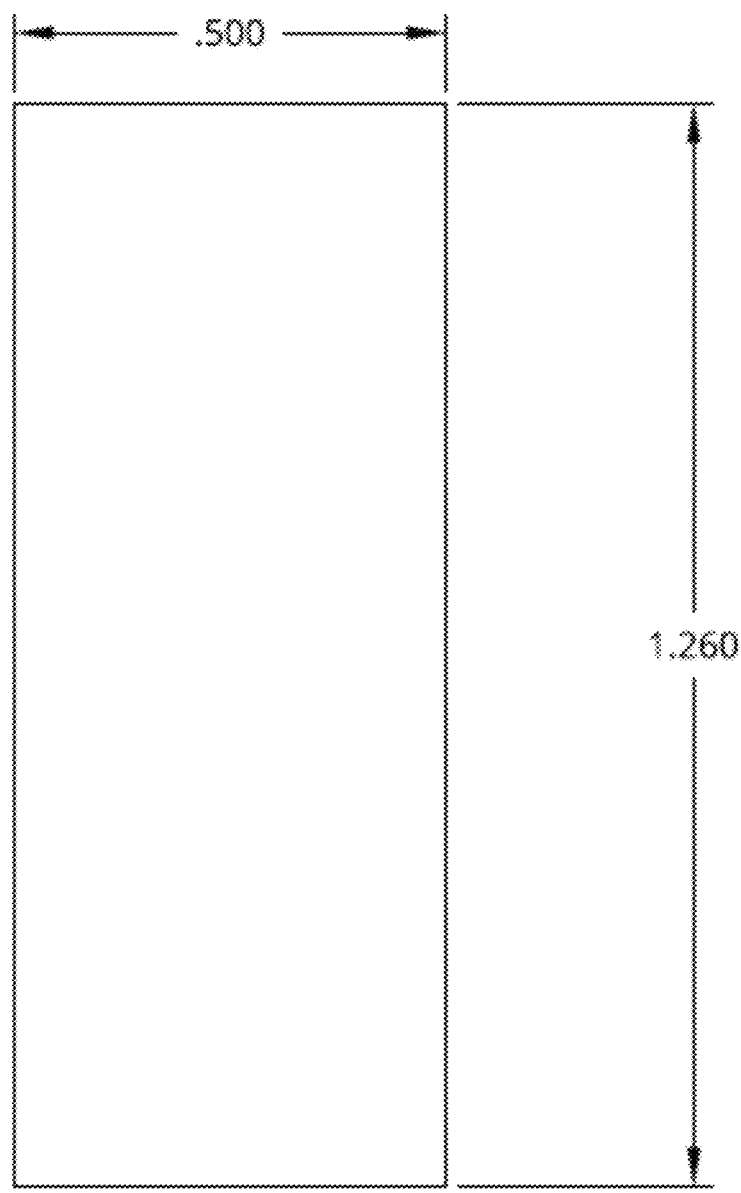

Turning to FIG. 128, a hinge member may be configured to a hinge tube to form the hinge. FIG. 128 presents a perspective view of one such hinge tube (12800). Alternative views of FIG. 128 are presented in FIGS. 129-130. FIG. 129 is a cross-sectional view (12900) of the hinge tube of FIG. 128. FIG. 130 is a top view (13000) of the hinge tube of FIG. 128. As depicted in FIG. 128, the hinge tube may have a rough circular cross-section with an inner diameter (D1), an outer diameter (D2), and a length (l). The inner diameter may range between 0.3 in. to 0.5 in. The outer diameter may range between 0.4 in. to 0.9 in. The length may range between 1 in. to 4 in. While the figures depict an inner diameter of 0.375 in., an outer diameter of 0.5 in., and a length of 1.260 in. (among other preferable dimensions) one skilled in the art would recognize that the dimensions and shape of the hinge tube may differ from those described or depicted.

As described above, a mounting system may additionally employ a drain pan hanger, which may be fixed to the fixed length support beams. FIG. 131 presents a perspective view of one drain pan hanger (13100). Alternative views of the drain pan hanger (13100) are presented in FIGS. 132-133. FIG. 132 is a side view (13200) of the drain pan hanger of FIG. 131. FIG. 133 is a top view (13300) of the drain pan hanger of FIG. 131. As depicted in FIG. 131, the hinge member may have a rectangular shape (or nearly rectangular cross-section) with a specified length (l), and height (h). The drain pan hanger may be configured with a first hanging point (13102) and a second hanging point (13104) to fix the drain pan hanger to the fixed length support beam. The length of the drain pan hanger may range between 30 in. to 40 in., and the height may range between 4 in. to 10 in. As is further depicted in FIG. 132, the drain pan hangers may have a rough circular cross-section, wherein the diameter ray range between 0.2 in. to 0.5 in. While the figures depict a length of 33 in., a height of 5 in., and a circular cross-section diameter of 0.250 in. (among other preferable dimensions) one skilled in the art would recognize that the dimensions and shape of the drain pan hanger may differ from those described or depicted.

As described above, a mounting system may employ a hinge pin, which may be fixed between the first and second fixed length support beams and the adjustable support beams to fix the length of the system. FIG. 134 presents a perspective view of a hinge pin (13400). Alternative views of FIG. 134 are presented in FIGS. 135-136. FIG. 135 is a side view (13500) of the hinge pin of FIG. 134. FIG. 136 is a bottom view (13600) of the hinge pin of FIG. 134. As depicted in FIG. 134, the hinge pin may be configured in a rough L-shape, with a first length (L1) and a second length (L2) positioned approximately perpendicular to one another. The first length may range between 2 in. to 5 in. and the second length may range between 1 in. to 3 in. As is further depicted in FIG. 136, the hinge pin may have a rough circular cross-section, with a diameter ranging between 0.2 in. to 0.5 in. While the figures depict a first length of 2.375 in., a second length of 1.375 in., and a circular cross-section of 0.250 in. (among other preferable dimensions) one skilled in the art would recognize that the dimensions and shape of the hinge pin may differ from those described or depicted.

As described above, a mounting system may alternatively employ a slide lock pin, which may be fixed between the first and second fixed length support beams and the adjustable support beams to fix the length of the system. FIG. 137 presents a perspective view of a slide lock pin (13700). Alternative views of the slide lock pin (13700) are presented in FIGS. 138-139. FIG. 138 is a side view (13800) of the slide lock pin of FIG. 137. FIG. 139 is a bottom view (13900) of the slide lock pin of FIG. 137. As depicted in FIG. 137, the slide lock may have a U shape with a bottom length (L3) and a vertical length (L4). The bottom length may range between 1.5 in. to 2.5 in. and the vertical length may range between 3 in. to 5 in. As is further depicted in FIG. 139, the slide lock pin may have a circular cross-section diameter ranging between 0.2 in. to 0.5 in. While the figures depict a bottom length of 2.204 in., and vertical length of 3.375 in., and a circular cross-section with a diameter of 0.250 in. (among other preferable dimensions), one skilled in the art would recognize that the dimensions and shape of the slide lock pin may differ from those described or depicted.

As described above, a slide lock may be configured to slide into a slide lock tube, which can be fixed inside the base frame of the system. The slide lock tube may guide the slide lock through the extension points on the system. FIG. 140 presents a perspective view of a slide lock tube (14000). Alternative views of the slide lock tube (14000) are presented in FIGS. 141-142. FIG. 141 is a cross-sectional view (14100) of the slide lock tube of FIG. 140. FIG. 142 is a top view (14200) of the slide lock tube of FIG. 140. As depicted in FIG. 140, the slide lock tube may have a rough circular cross-section with an inner diameter (D1), an outer diameter (D2), and a length (l). The inner diameter may range between 0.2 in. to 0.5 in. The outer diameter may range between 0.3 in. to 0.6 in. The length may range between 0.5 in. to 4 in. While the figures depict an inner diameter of 0.250 in., an outer diameter of 0.375 in., and a length of 1 in. (among other preferable dimensions) one skilled in the art would recognize that the dimensions and shape of the slide lock tube may differ from those described or depicted.

As described above, a mounting system may employ a hook sensor hanger, which may be configured to the support frame and suspended above the drain pan level. FIG. 143 presents a perspective view of the hook sensor hanger (14300). Alternative views of the hook sensor hanger (14300) are presented in FIGS. 144, 145, and 146. FIG. 144 is a side view (14400) of the hook sensor hanger of FIG. 143. FIG. 145 depicts details of a portion of the hook sensor hanger (i.e., detail A (14500)) shown in FIG. 143, located near the bottom of the hanger portion configured to hook onto the dimensions of the support frame. FIG. 146 is a bottom view (14600) of the hook sensor hanger of FIG. 143. As depicted in FIG. 143, the hook sensor hanger may have a hook length (L1), a hook width (L2), a hanging length (L3), a hanger width (L4), and a hanger height (L5). L1 and L2 may vary between 1.3 in. to 2 in., L3 may vary between 5 in. to 8 in., L4 may vary between 5 in. to 1 in., and L5 may vary between 0.5 in. to 2 in. While the figures depict an L1 and L2 of 1.650 in., an L3 of 5.875 in., an L4 of 0.625 in., and an L5 of 1.125 in. (among other preferable dimensions) one skilled in the art would recognize that the dimensions and shape of the hook sensor hanger may differ from those described or depicted.

As described above, a mounting system can employ a clip sensor hanger, which may be configured to the support frame and suspended above the drain pan level. FIG. 147 presents a perspective view of the clip sensor hanger (14700). Alternative views of the clip sensor hanger (14700) are presented in FIGS. 148-150. FIG. 148 is a side view (14800) of the clip sensor hanger of FIG. 147. FIG. 149 depicts details of a portion of the clip sensor hanger (i.e., detail B (14900)) shown in FIG. 147, located near the bottom of the hanger portion configured to hook onto the dimensions of the support frame. FIG. 150 is a bottom view (15000) of the clip sensor hanger of FIG. 147. As depicted in FIG. 147, the clip sensor hanger may have a hook length (L1), a hook width (L2), and a hanging length (L3). The clip sensor hanger may include a roughly square bottom clip portion with a length and width (L4). This square clip portion may further be configured with a centered clip hole, with an approximate diameter of D1. L1 and L2 may vary between 1.3 in. to 2 in., L3 may vary between 4 in. to 8 in., L4 may vary between 0.5 in. to 3 in., and D1 may vary between 0.3 in. to 0.6 in. While the figures depict an L1 of 1.6 in., an L2 of 1.510 in., an L3 of 4.750 in., an L4 of 1.125 in., and a D1 of 0.375 in. (among other preferable dimensions) one skilled in the art would recognize that the dimensions and shape of the clip sensor hanger may differ from those described or depicted.

As shown in FIGS. 151-157, another implementation of a mounting frame may include three drain pan hangers, levelling indicators, a sliding extension assembly, and an asymmetrical folding assembly. Referring to FIG. 151, a presented air handler mounting system (e.g., mounting system 15100) includes a first fixed length support beam (15102) and a second fixed length support beam (15104) located parallel to one another, separated by a first distance. The apparatus further includes a first adjustable support beam (15106) and a second adjustable support beam (15108) fixed perpendicular to the first fixed length support beam, and a third adjustable support beam (15110) and a fourth adjustable support beam (15112) fixed perpendicular to the second fixed length support beam, wherein the first adjustable support beam and the fourth adjustable support beam are separated by a second distance to the second adjustable support beam and the third adjustable support beam.

The apparatus may include a drain pan hanger assembly with a first drain pan hanger (15114) fixed to the first fixed length support beam, a second drain pan hanger (15116) fixed to the second fixed length support beam, and a third drain pan hanger (15118) fixed to the first and third adjustable support beams, each configured to support an insertable sliding drain pan structure. While the third drain pan hanger (15118) is depicted fixed to the first and third adjustable support beams, it may be configured to any combination of the adjustable support beams. The third drain pan hanger (15118) may be bendable, flexible, or extendable so it can be fixed to the adjustable support beams. The third drain pan hanger (15118) may be made of copper, iron, or aluminum, molded plastic, hard plaster, resin filling, among other materials which may allow the rod to bend or be fixed to the adjustable support beams. In some implementations, the third drain pan hanger (15118) may be attached to the adjustable support beams through two provided holes offset from the center of the frame, with approximately three inches of separation. The first and second drain pan hangers (15114, 15116) may have a protruded rod that enables them to be fixed to the fixed length support beams. The mounting system 15100 may further include an asymmetrical folding assembly with a first folding assembly (15120) positioned between the first and fourth adjustable support beams, and a second folding assembly (15122) positioned between the second and third adjustable support beams, such that the first folding assembly is located at a different location along the adjustable support beams than the second folding assembly.

In further implementations, a drain pan is included, configured to slide into the drain pan hangers described above. The drain pan may have various dimensions configured to match the plurality of dimensions of the adjustable support members. In one implementation, the drain pan might be extendable to the maximum length of the support members. In another aspect, the drain pan might include a hose attachment or water drainage system. The drain pan might be made of molded plastic, or it can alternatively be made using slush latex, metal, hard plaster, resin filling, or silicon, among other materials. The drain pan might alternatively be configured to sit on the floor and support the frame and HVAC unit above it. In another aspect, it can be hung under the frame using hooks or metal cable attached to the fixed length support beams or one or a combination of the first, second, third, and fourth support beams. The drain pan may also slide into the drain pan hangers from the left or right side of the system.

Finally, the system may include a sliding extension assembly with a sliding extension mechanism configured to the adjustable support beams to extend and lock the system length into place. The sliding extension assemblies may employ a first of four sliding pins (15124) configured to the first adjustable support beam and the first fixed length support beam, a second sliding pin (15126) configured to the second adjustable support beam and the first fixed length support beam, a third sliding pin (15128) configured to the third adjustable support beam and the second fixed length support beam, and a fourth sliding pin (15130) configured to the fourth adjustable support beam and the second fixed length support beam. Sliding pins 15128 and 15130 depict the extension mechanism. The sliding pins may be used to extend, shorten, and secure the length of the system by sliding the fixed length support beams under the adjustable support beams through a channel in the adjustable support beams. As shown in the left-hand side of the figure, sliding pins 15128 and 15130 secured the length of the second fixed length support beam 15103 to a shortened length. While FIG. 151 only depicts this shortened length using the second fixed length support beam, both sides of the system may extend or shorten using similar methods.

The system also has four leveling indicators, two of which are shown in the perspective view (15132)(15134). Alternative views of system 15100 are presented in FIGS. 152-157. FIG. 152 presents a top view (15200) of system 15100. FIG. 153 presents a bottom view (15300) of system 15100. FIG. 154 presents a front view (15400) of system 15100. FIG. 155 presents a back view (15500) of system 15100. FIG. 156 presents a left view (15600) of system 15100. FIG. 157 presents a right view (15700) of system 15100. The placement of the levelling indicators is better shown in FIG. 152, wherein a first of four levelling indicators (15202) may be fixed to the first fixed length support beam, a second levelling indicator (15204) may be fixed to the second fixed length support beam, a third levelling indicator (15206) may be fixed to the first adjustable support beam, and a fourth levelling indicator (15208) may be fixed to the third adjustable support beam.

The placement of the sliding pins and sliding pin channels is better shown in FIG. 153, wherein a first of four channels (15302) is configured to the bottom of the first adjustable support beam, a second channel (15304) is configured to the bottom of the second adjustable support beam, a third channel (15306) is configured to the bottom of the third adjustable support beam, and a fourth channel (15308) is configured to the bottom of the fourth adjustable support beam. A first of four sliding pins (15310) secures the first adjustable support beam to the first fixed length support beam. A second sliding pin (15312) secures the second adjustable support beam to the first fixed length support beam. A third sliding pin (15314) secures the third adjustable support beam to the second fixed length support beam. A fourth sliding pin (15316) secures the fourth adjustable support beam to the second fixed length support beam. As depicted, the pins may be used to extend, shorten, and secure the length of the system. The adjustable support beams are each configured with a maximum extension length ($L1$) and a minimum extension length ($L2$). As depicted, the first and second sliding pins 15310 and 15312 are extended to a maximum length ($L1$). The third and fourth sliding pins 15314 and 15316 are extended to a minimum length ($L2$). While the figure depicts one set of pins extended to a minimum length and one set of pins extended to a maximum length, it should be understood that either side of the system may extend to $L1$ or $L2$, or to any length between $L1$ and $L2$.

Turning to FIG. 158, the frame (15800) might be configured with an asymmetrical folding assembly, which may include a first folding assembly positioned between the first and fourth adjustable support beams and a second folding assembly positioned between the second and third adjustable support beams, wherein the first folding assembly is located at a different position along the adjustable support beams than the second folding assembly. As depicted in FIG. 151, the folding assemblies may be located asymmetrically on the apparatus frame in the unfolded configuration, such that the first folding assembly (15120) may be positioned along the first and fourth adjustable support beams at a length closer to the second fixed length support beam 15104 than the first fixed length support beam 15102. The second folding assembly (15122) may be positioned along the second and third adjustable support beams at a length closer to the first fixed length support beam 15102 than the second fixed length support beam 15104. As depicted in FIG. 158, the system may fold such that the first folding assembly (15802) becomes level with the second folding assembly (15804).

Each folding assembly may employ a hinge. Each hinge has a front hinge member (15806) (15808) fixed to the front side of the adjustable support beams, either between the first and fourth or the second and third adjustable support beams. Each hinge also has a back hinge member (15810)(15812) fixed to the back side of the adjustable support beams, either between the first and fourth or the second and third adjustable support beams. The front and back hinge members may engage a first hinge tube (15814), fixed within the frame between the first and fourth adjustable support beams, and a second hinge tube (15816), fixed within the frame between the second and third adjustable support beams. The hinge tube may have an inner diameter and an outer diameter, wherein the inner diameter may line up with holes in the adjustable support beam. The inner diameter may serve as a guiding tube for a pin, which may be used to secure the folding assemblies and fold the system, wherein the adjustable support beams may pivot around the hinge tube to fold the system. The system is folded at the first (15802) and second (15804) folding assembly, such that the first and second adjustable support beams (15818)(15824) have a folding angle range to fold to an angle ($\delta$) with the third and fourth adjustable support beams (15830) (15828).

The asymmetrical hinges may allow the system to fold into a more compact configuration. In one aspect, some of the sliding pins may slide to a shortened configuration while other sliding pins may be removed, allowing the system to fold into a storable position. In some embodiments, the sliding pin connecting the first adjustable support beam (15818) to the first fixed length support beam (15820) is removed, allowing the first adjustable support beam to swivel around the second adjustable support beam (15824) into a more storable position. Similarly, the sliding pin connecting the third adjustable support beam to the second fixed length support beam (15826) may be removed, allowing for the second fixed length support beam to swivel around the fourth adjustable support beam (15828) into a more storable position. Both fixed length support beams may have a swivel angle range, wherein the adjustable support beam may from a swivel angle (7) with the fixed length support beam. In other embodiments, the sliding pins connecting the second adjustable support beam to the first fixed length support beam and the sliding pin connecting the fourth adjustable support beam to the second fixed length support beam may be removed while the remaining pins are secured to a shortened length, allowing the system to fold into a storable position.

Alternative views of the folded system 15800 are presented in FIGS. 159-164. FIG. 159 presents a top view (15900) of system 15800. FIG. 160 presents a bottom view (16000) of system 15800. FIG. 161 presents a front view (16100) of system 15800. FIG. 162 presents a back view (16200) of system 15800. FIG. 163 presents a left view (16300) of system 15800. FIG. 164 presents a right view (16400) of system 15800. The swivel range and angle (75) described above are best depicted in FIG. 159, which displays how the fixed length support beam (15902) may swivel inwards 78° to help fold the system into a stowed position. In an unfolded configuration, the fixed length support beam (15902) may form an approximate 90° angle with the adjustable support beam (15904), and it may swivel to form an approximate 168° swivel angle (75). Although a 78° swivel range is a preferred dimension of this folding system, one skilled in the art would recognize that the swivel range may be higher or lower than described. The folding range and angle (8) described above are best depicted in FIG. 161, which displays how the first adjustable support beam (16102) may fold 175° to help fold the system into a stowed position. In an unfolded configuration, the first adjustable support beam (16102) may form an approximate 180° angle with the fourth adjustable support beam (16104), and it may fold to form an approximate 5° angle (δ) with the fourth adjustable support beam. Although a 175° folding range is a preferred dimension of this folding system, one skilled in the art would recognize that the folding range may be higher or lower than described. While not depicted in FIGS. 158-164, the system may include detent or sliding pins, which allow the system to slide into a more foldable position. Such sliding or detent pins are depicted integrated with the system in FIG. 186, wherein the four sliding pins are labelled (18602), (18604), (18606), and (18608). FIGS. 214-221 depict the isolated sliding pin components. The system folding process and the function of the sliding or detent pins are described in further detail below.

Referring to FIG. 165, the presented air handler mounting frame (e.g., mounting frame 16500) includes a first fixed length support beam (16502) and a second fixed length support beam (16504) located parallel to one another, separated by a first distance. The apparatus further includes a first adjustable support beam (16506) and a second adjustable support beam (16508) fixed perpendicular to the first fixed length support beam, and a third adjustable support beam (16510) and a fourth adjustable support beam (16512) fixed perpendicular to the second fixed length support beam, wherein the first adjustable support beam and the fourth adjustable support beam are separated by a second distance to the second adjustable support beam and the third adjustable support beam. As depicted in this configuration, the system is extended to a maximum length. Alternative views of the frame 16500 are presented in FIGS. 166-171. FIG. 166 presents a top view (16600) of system 16500. FIG. 167 presents a bottom view (16700) of system 16500. FIG. 168 presents a front view (16800) of system 16500. FIG. 169 presents a back view (16900) of system 16500. FIG. 170 presents a left view (17000) of system 16500. FIG. 171 presents a right view (17100) of system 16500.

As described in more detail above, the system may employ sensor hangers to suspend a sensor above the drain pan level. FIG. 172 depicts an air hander mounting frame (e.g., system 17200) with a base frame assembly and a hook variant sensor hanger (17202). Alternative views of the frame and hook variant sensor hanger 17202 are presented in FIGS. 173-178. FIG. 173 presents a top view (17300) of system 17200. FIG. 174 presents a bottom view (17400) of system 17200. FIG. 175 presents a front view (17500) of system 17200. FIG. 176 presents a back view (17600) of system 17200. FIG. 177 presents a left view (17700) of system 17200. FIG. 178 presents a right view (17800) of system 17200.

As described in more detail above, the system may alternatively employ a clip sensor hanger to suspend a sensor above a drain pan level. FIG. 179 depicts an air handler mounting frame (e.g., system 17900) with a base frame assembly and a clip variant sensor hanger (17902). Alternative views of the frame and clip variant sensor hanger 17900 are presented in FIGS. 180-185. FIG. 180 presents a top view (18000) of system 17900. FIG. 181 presents a bottom view (18100) of system 17200. FIG. 182 presents a front view (18200) of system 17900. FIG. 183 presents a back view (18300) of system 17900. FIG. 184 presents a left view (18400) of system 17900. FIG. 185 presents a right view (18500) of system 17900.

In some embodiments, the system depicted in FIG. 151 may not include levelling indicators and locking pins, while it may include drain pan hangers and sliding or detent pins. This embodiment is depicted in FIG. 186 (e.g., system 18600). As shown, the system may include four detent or sliding pins (18602)(18604)(18606)(18608), which allow a user to adjust the length of the support frame. The pins also enable the system to slide and fold into a more storable configuration. Alternative views of system 18600 are presented in FIGS. 187-192. FIG. 187 presents a top view (18700) of system 18600. FIG. 188 presents a bottom view (18800) of system 18600. FIG. 189 presents a front view (18900) of system 18600. FIG. 190 presents a back view (19000) of system 18600. FIG. 191 presents a left view (19100) of system 18600. FIG. 192 presents a right view (19200) of system 18600.

In some embodiments, the system depicted in FIG. 151 may not include levelling indicators, while it may include drain pan hangers and locking pins. This embodiment is depicted in FIG. 193 (e.g., system 19300). Alternative views of system 19300 are presented in FIGS. 194-199. FIG. 194 presents a top view (19400) of system 19300. FIG. 195 presents a bottom view (19500) of system 19300. FIG. 196 presents a front view (19600) of system 19300. FIG. 197 presents a back view (19700) of system 19300. FIG. 198 presents a left view (19800) of system 19300. FIG. 199 presents a right view (19900) of system 19300. The locking pins are best depicted in the front view (19600) of FIG. 196, which shows a locking pin (19602) configured to the folding assembly (19604).

In some embodiments, the system depicted in FIG. 151 may not include levelling indicators, while it may include drain pan hangers, locking pins, and a hook variant sensor hanger. This embodiment is depicted in FIG. 200 (e.g., system 20000). Alternative views of system 20000 are presented in FIGS. 201-206. FIG. 201 presents a top view (20100) of system 20000. FIG. 202 presents a bottom view (20200) of system 20000. FIG. 203 presents a front view (20300) of system 20000. FIG. 204 presents a back view (20400) of system 20000. FIG. 205 presents a left view (20500) of system 20000. FIG. 206 presents a right view (20600) of system 20000.

In some embodiments, the system depicted in FIG. 151 may not include levelling indicators, while it may include drain pan hangers, locking pins, and a clip variant sensor hanger. This embodiment is depicted in FIG. 207 (e.g., system 20700). Alternative views of system 20700 are presented in FIGS. 208-213. FIG. 208 presents a top view (20800) of system 20700. FIG. 209 presents a bottom view (20900) of system 20700. FIG. 210 presents a front view (21000) of system 20700. FIG. 211 presents a back view (21100) of system 20700. FIG. 212 presents a left view (21200) of system 20700. FIG. 213 presents a right view (21300) of system 20700.

As described in further detail above, the system may employ a sliding or detent pin configured to slide through a channel in the first, second, third, or fourth adjustable support beam in the system. FIG. 214 depicts an example of a sliding pin (21400). Alternative views of system 21400 are presented in FIGS. 215-221. FIG. 215 presents a top view (21500) of slide pin 21400. FIG. 216 presents a bottom view (21600) of slide pin 21400. FIG. 217 presents a front view (21700) of slide pin 21400. FIG. 218 presents a back view (21800) of slide pin 21400. FIG. 219 presents a left view (21900) of system 21400. FIG. 220 presents a right view (22000) of slide pin 21400. Finally, FIG. 221 presents a disassembled view (22100) of slide pin 21400. As depicted in the disassembled view, a threaded rod (22102) is threaded through the bottom of a fixed length support beam in the system to an adjustable support beam. This threaded rod is then secured to a sliding member (22104) which is secured within the channel of the adjustable support beam. This sliding member allows the threaded rod to slide along the length of the channel, which enables the adjustment of the system length, wherein the separation length between the fixed length support beams may be increased or decreased. The threaded rod may be configured to the sliding member, adjustable support beams, and fixed length support beams with bolts, washers, springs, or other securing mechanisms.

As described in further detail above, the system may employ a hinge to fold the system. FIG. 222 depicts a perspective view of a hinge embodiment (22200). Alternative views of the hinge 22200 are presented in FIGS. 223-229. FIG. 223 presents a top view (22300) of hinge embodiment 22200. FIG. 224 presents a bottom view (22400) of hinge embodiment 22200. FIG. 225 presents a front view (22500) of hinge embodiment 22200. FIG. 226 presents a back view (22600) of hinge embodiment 22200. FIG. 227 presents a left view (22700) of hinge embodiment 22200. FIG. 228 presents a right view (22800) of hinge embodiment 22200. Finally, FIG. 229 presents a disassembled view (22900) of hinge embodiment 22200. As shown in FIG. 222, while the hinge member described above in FIG. 125 may just employ one hole to engage the hinge tube, this hinge member embodiment may employ an additional hole (22202) to engage a safety detent or sliding pin to further assist the system in folding to a storable configuration.

FIG. 230-FIG. 234 represent a series of unfolding steps when unfolding the folded system to an unfolded configuration. The folded system is depicted in FIG. 230 (e.g., system 23000), which may have a folding angle (a) ranging between 4.7 degrees to 10 degrees. A view of the first unfolding step (23100) is represented in FIG. 231, which shows how the swiveled first fixed length support beam (23102), the first adjustable support beam (23104), and the second adjustable support beam (23106) swing away from the swiveled second fixed length support beam (23108), the third adjustable support beam (23110), and the fourth adjustable support beam (23112). This figure also depicts how the swiveled first and second fixed length support beams allow the first folding assembly (23114) and the second folding assembly (23116) to be level to one another in a folded configuration. The second unfolding step (23200) is represented in FIG. 232, which shows how the first and second folding assemblies are located asymmetrically to one another when the adjustable support beams are in an unfolded position.

The third unfolding step (23300) is represented in FIG. 233, which shows how the first adjustable support beam (23302) is secured to the first fixed length support beam (23304) at a fully extended length. The third adjustable support beam (23306) is secured to the second fixed length support beam (23308) at a fully extended length. The second adjustable support beam (23310) is secured to the first fixed length support beam (23304) at a length smaller than a fully extended length. The fourth adjustable support beam (23312) is secured to the second fixed length support beam (23308) at a length smaller than a fully extended length. The adjustable support beams are fixed to the fixed length support beams with sliding or detent pins, which are described in detail above. In most embodiments, the sliding or detent pins are always integrated with the system, and they are not removed during the system folding process. In some embodiments, the sliding or detent pins may be removed before folding the system. In these embodiments, some or a portion of the sliding pins are removed from some or a portion of the fixed and adjustable length support beams. This sliding pin removal may allow the fixed length support beams to swivel around the adjustable support beams into a more storable position.

The final unfolding step (23400) is represented in FIG. 234, which shows how the second adjustable support beam (23402) and the fourth adjustable support beam (23404) are fixed to the first (23406) and the second (23408) fixed length support beams at a fully extended length. The figure depicts how the first (23410) and third (23412) adjustable support beams remain fixed to the fixed length support beams at a fully extended length. The figure also more clearly depicts the sliding pins, wherein a first sliding pin (23414) is configured to the first adjustable support beam and the first fixed length support beam, a second sliding pin (23416) is configured to the second adjustable support beam and the first fixed length support beam, a third sliding pin (23418) is configured to the third adjustable support beam and the second fixed length support beam, and a fourth sliding pin (23420) is configured to the fourth adjustable support beam and the second fixed length support beam.

While not depicted in the figures, the apparatus may contain measures to prevent vibration and emitted noise from the unit by employing a noise-reducing pad cover. The padding might employ a noise-reducing foam such as open or closed cell polyurethane foam or melamine foam, rubber, or soft polymer materials. The padding might be configured to sit under or over the unit, it might enclose the sides of the unit, or it may enclose the entire unit. The padding may be configured with slits and folds for simpler storage and placement over the unit in conjunction with the frame.

A number of embodiments have been described. Nevertheless, it will be understood that various modifications can be made without departing from the spirit and scope of the systems described herein. Accordingly, other embodiments are within the scope of the following claims.

What is claimed is:

1. An apparatus for supporting an air handler system, the apparatus comprising:
   a base frame assembly comprising:
      a first fixed length support beam and a second fixed length support beam positioned parallel to one another, separated by a first distance,
      a first adjustable support beam and a second adjustable support beam positioned perpendicular to the first fixed length support beam,
      a third adjustable support beam and a fourth adjustable support beam positioned perpendicular to the second fixed length support beam, wherein the first adjustable support beam and the fourth adjustable support beam are separated by a second distance to the second adjustable support beam and the third adjustable support beam,
      wherein the first adjustable support beam comprises a first sliding extension assembly, the second adjustable support beam comprises a second sliding extension assembly, the third adjustable support beam comprises a third sliding extension assembly, and the fourth adjustable support beam comprises a fourth sliding extension assembly, wherein each of the first sliding extension assembly, the second sliding extension assembly, the third sliding extension assembly, and the fourth sliding extension assembly is extendable to a maximum extension length and to a minimum extension length, and
      at least four leveling indicators, wherein a first leveling indicator of the at least four leveling indicators is attached to the first fixed length support beam, a second levelling indicator is attached to the second fixed length support beam, a third levelling indicator is attached to the first adjustable support beam, and a fourth levelling indicator is attached to the third adjustable support beam,
   a drain pan hanger assembly comprising:
      a first drain pan hanger attached to the first fixed length support beam, a second drain pan hanger attached to the second fixed length support beam, and a third drain pan hanger attached to the first adjustable support beam and the third adjustable support beam, wherein each of the first drain pan hanger, the second drain pan hanger, and the third drain pan hanger is configured to support a sliding drain pan structure, and
   an asymmetrical folding mechanism comprising:
      a first folding assembly positioned along the first and the fourth adjustable support beams and a second folding assembly positioned along the second and the third adjustable support beams, wherein that the first folding assembly is located proximate to the second fixed length support beam, and the second folding assembly is located proximate to the first fixed length support beam.

2. The apparatus of claim 1, further comprising one or more sensor hangers.

3. The apparatus of claim 2, wherein one of the one or more sensor hangers comprises a clip end to position a sensor above the sliding drain pan structure.

4. The apparatus of claim 2, wherein one of the one or more sensor hangers comprises a hook end to position a sensor above the sliding drain pan structure.

5. The apparatus of claim 1, wherein the first adjustable support beam is extendable to one or more selectable lengths.

6. The apparatus of claim 1, further comprising the sliding drain pan structure, insertable into the first, second, and third drain pan hanger.

* * * * *